| (12) | United States Patent<br>Wu et al. | (10) Patent No.: US 10,484,365 B2<br>(45) Date of Patent: Nov. 19, 2019 |
|---|---|---|

(54) SPACE-TIME SEPARATED AND JOINTLY EVOLVING RELATIONSHIP-BASED NETWORK ACCESS AND DATA PROTECTION SYSTEM

(71) Applicant: AUBURN UNIVERSITY, Aburn, AL (US)

(72) Inventors: Chwan-Hwa Wu, Auburn, AL (US); J. David Irwin, Auburn, AL (US); David Charles Last, Auburn, AL (US); Myers Hawkins, Auburn, AL (US); Hao Sun, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 0 days.

(21) Appl. No.: 16/133,173

(22) Filed: Sep. 17, 2018

(65) Prior Publication Data

US 2019/0104118 A1   Apr. 4, 2019

Related U.S. Application Data

(60) Division of application No. 14/960,798, filed on Dec. 7, 2015, now Pat. No. 10,097,536, which is a
(Continued)

(51) Int. Cl.
*H04L 29/06* (2006.01)
*G06F 21/62* (2013.01)
(Continued)

(52) U.S. Cl.
CPC ........ *H04L 63/083* (2013.01); *G06F 21/6209* (2013.01); *H04L 9/0656* (2013.01);
(Continued)

(58) Field of Classification Search
None
See application file for complete search history.

(56) References Cited

U.S. PATENT DOCUMENTS 5,060,263 A * 10/1991 Bosen .................... G06F 21/34
340/5.74
6,993,652 B2  1/2006 Medvinsky
(Continued)

OTHER PUBLICATIONS

Beech, S. et al., "Cloud-Based Information Protection System," Samuel Ginn College of Engineering, Auburn University, 2012.
(Continued)

*Primary Examiner* — Jeffrey L Williams
(74) *Attorney, Agent, or Firm* — Barnes & Thornburg LLP

(57) ABSTRACT

A network security system that employs space-time separated and jointly-evolving relationships to provide fast network access control, efficient real-time forensics capabilities, and enhanced protection for at-rest data in the event of a network breach. The network security system allows, in part, functionality by which the system accepts a request by a user to access the data stored in the database, identifies a sequence of security agents to participate in authenticating and protecting the access of the data by the user, generates a sequence of pseudorandom IDs and space-time varying credentials, checks at each one of the security agents a corresponding one of the credentials, determines that the user is permitted to access the data using access control logs if all the security agents accept the corresponding credentials, and varies the credentials based on a space-time relationship.

13 Claims, 128 Drawing Sheets

Related U.S. Application Data continuation of application No. 14/293,350, filed on Jun. 2, 2014, now Pat. No. 9,208,335.

(60) Provisional application No. 61/878,694, filed on Sep. 17, 2013.

(51) Int. Cl.
  *H04L 9/06* (2006.01)
  *H04L 9/08* (2006.01)
  *H04L 9/32* (2006.01)

(52) U.S. Cl.
  CPC .......... *H04L 9/0825* (2013.01); *H04L 9/0869* (2013.01); *H04L 9/0877* (2013.01); *H04L 9/0891* (2013.01); *H04L 9/0897* (2013.01); *H04L 9/3228* (2013.01); *H04L 9/3234* (2013.01); *H04L 9/3242* (2013.01); *H04L 63/0838* (2013.01); *H04L 63/0846* (2013.01); *H04L 63/10* (2013.01); *G06F 2221/2107* (2013.01); *H04L 2209/38* (2013.01); *H04L 2209/606* (2013.01)

(56) References Cited

U.S. PATENT DOCUMENTS

| | | | |
|---|---|---|---|
| 8,532,287 B2 | 9/2013 | Mizuno | |
| 8,583,926 B1 | 11/2013 | Benson | |
| 9,032,212 B1 | 5/2015 | Juels | |
| 9,119,069 B1 | 8/2015 | Vipond | |
| 9,208,335 B2 | 12/2015 | Wu et al. | |
| 2002/0029341 A1 | 3/2002 | Juels et al. | |
| 2003/0177376 A1 | 9/2003 | Arce Velleggia et al. | |
| 2007/0220597 A1 | 9/2007 | Ishida | |
| 2009/0006858 A1 | 1/2009 | Duane | |
| 2009/0282258 A1* | 11/2009 | Burke | G06F 21/31 713/184 |
| 2011/0145910 A1 | 6/2011 | Barnes et al. | |
| 2012/0179677 A1* | 7/2012 | Roselli | G06Q 10/10 707/736 |
| 2012/0303972 A1 | 11/2012 | Kuno et al. | |
| 2013/0061298 A1 | 3/2013 | Longobardi et al. | |
| 2014/0032922 A1 | 1/2014 | Spilman | |
| 2015/0312242 A1 | 10/2015 | Ogawa | |
| 2016/0182486 A1 | 6/2016 | Wu et al. | |
| 2017/0046713 A1* | 2/2017 | Burke | G06K 9/00885 |
| 2017/0126654 A1* | 5/2017 | Fu | H04L 9/0852 |

OTHER PUBLICATIONS

Brandi, H. "Trusted Computing" The TCG Trusted Platform Module Specification, Embedded Systems, 2004, Infineon Technol. AG Http//www.Wintecindustries Comorderdeskmodcumentstpm12-Basics Pdf.

Cheng S. et al., "A security-enhanced key authorization management scheme for trusted computing platform," in 2012 $2^{nd}$ International Conference on Consumer Electronics, Communicatiosn Networks (CeCNet), 2012, pp. 1573-1576.

Daemen J. et al. "Advanced encryption standard (ES)(FIPS 197), "Technical report, Katholijke Universiteit Leuven/ESAT, 2001.

Gallery, E., "An overview of trusted computing technology," Trust. Comput. vol. 6, p. 29, 2005 (book reference; available upon request).

Heikkila, Faith "Encryption: Security Considerations for Portable Media Devices," Security & Privacy, IEEE, vol. 5, No. 4, pp. 22-27, Jul.-Aug. 2007.

Latham, D.C., "DoD 5200.28-STD-Department of Defense Trusted Computer System Evaluation Criteria," 1985.

Liu, Wentao "Research on cloud computing security problem and strategy," Consumer Electronics Communications and Networks (CECNet), 2012 $2^{nd}$ International Conference, Apr. 21-23, 2012, pp. 1216-1219.

Mauer A. et al., "Limiting Byzantine Influence in Multihop Asynchronous Networks," 2012 IEEE $32^{nd}$ International Conference on Distributed Computing Systems (ACDCS), pp. 183-192, 2012.

McGrew D. et al., "Efficient authentication of large, dynamic data sets using Galois/coutner mode (GCM)," Security in Storage Workshop, 2005, SISW '05. Third IEEE International, 6 pages.

McGrew D. et al., "The Galois/Counter Mode of Operation (GCM)," http://csrc.nist.gov/groups/ST/toolkit/BCM/documents/proposedmodes/gem/gem-spec.pdf, 2004.

Mozaffani-Kermani M. et al., "Efficient and High-Performance Parallel Hardware Architectures for the AES-GCM," Computers, IEEE Transactions on Computers, vol. 61, No. 8, pp. 1165-1178, Aug. 2012.

Pandit V. et al., "Inherent Security Benefits of Analog Network Coding for the Detection of Byzantime Attaches in Multi-Hop Wireless Networks," 2011 IEEE $8^{th}$ International Conference on Mobile Adhoc and Sensor Systems (MASS), pp. 697-702, 2011.

Rivest, R.L. et al., "A method for obtaining digital signatures and public-key cryptosystems," Commun. Acm. vol. 21, No. 2, pp. 120-126, 1978.

Saloway J. et al., "AES Galois Counter Mode (GCM) Cipher Suites for TLS," IETF RFC 5288, 2008.

Shanmugasundaram K. et al., "Automatic reassembly of Document Fragments via Context Based Statistical Models," in Proceedings of the $19^{th}$ Annual Computer security Applications conference (ASAC '03), Washington, D.C., 2003.

Shen Z. et al., "Cloud Computing System Based on Trusted Computing Platform," in 2010 International Conference on Intelligent Computation Technology and Automation (ICICTA), 2010, vol. 1, pp. 942-945.

Shen Z. et al., "The protection for private keys in distributed computing system enabled by trusted computing platform," in 2010 International Conference on Computer Design and Applications (ICCDA), 2010, vol. 5, pp. V5-576-V5-580.

Shen Z. et al., "The security of cloud computing system enabled by trusted computing technology," in 2010 $2^{nd}$ International Conference on Signal Processing Systems (ICSPS), 2010 vol. 2, pp, V2-11-V2-15.

Tao F. et al., "Security Random Network Coding Model Against Byzantine Attack Based on CBD," 2011 International Conference on Intelligent Computing Technology and Automation (ICICTRA), vol. 2, pp. 1178-1181, 2011.

Tomlinson, A. "Introduction to the TPM," in Smart Cards, Tokens, Security and Applications, Spring 2008, pp. 155-172 (book reference; available upon request).

* cited by examiner

```
<PACKET INCOMING>
<TIME = "14830.034482"/>
<SOURCE_IP_ADDRESS = "192.168.45.12"/>
<DESTINATION_IP_ADDRESS = "96.223.45.186"/>
<SEQUENCE_NUMBER = "22489654"/>
<CURRENT_APP_PID = "69784374"/>
<PARENT_APP_PID = "48922537"/>
<USER_PID = "529336201"/>
<HOST_PID = "361203729"/>
... (OTHER PIDs ALSO LISTED)
<PACKET_TYPE = "3325 READ FROM DATABASE"/>
<CONTENT_ID = "34876105"/>
<NETWORK_PATH = "192.168.45.12, 192.168.45.02, 76.167.89.201, ..."/>
<HMAC SSA_A ="396A1DB630D36E8930CA7153.."/>
<HMAC SSA_B= "EF7362B48D22AC3921ED261B..."/>
</PACKET>
```

SA 1 LOG RECORD

```
<PACKET INCOMING>
<TIME = "5301.189456"/>
<SOURCE_IP_ADDRESS = "75.128.32.146"/>
<DESTINATION_IP_ADDRESS = "84.156.32.209"/>
<SEQUENCE_NUMBER = "57812657"/>
<CURRENT_UA_PID = "55197823"/>
<PARENT_UA_PID = "55197823"/>
<USER_PID = "529336201"/>
<CLIENT_PID = "361203729"/>
... (OTHER PIDs ALSO LISTED)
<PACKET_TYPE = "1064 REMOTE TERMINAL"/>
<CONTENT_PID = "0"/>
<NETWORK_PATH = "75.128.32.146, 75.128.32,1 ..."/>
<HMAC SSA_1 ="396A1DB630D36E8930CA7153.."/>
<HMAC SSA_2= "EF7362B48D22AC3921ED261B..."/>
</PACKET>
```

```
<PACKET INCOMING>
<TIME = "5322.467820"/>
<SOURCE_IP_ADDRESS = "75.128.32.146"/>
<DESTINATION_IP_ADDRESS = "96.223.45.186 "/>
<SEQUENCE_NUMBER = "61785278"/>
<CURRENT_UA_PID = "55197823"/>
<PARENT_UA_PID = "55197823"/>
<USER_PID = "529336201"/>
<CLIENT_PID = "361203729"/>
... (OTHER PIDs ALSO LISTED)
<PACKET_TYPE = "1064 REMOTE TERMINAL"/>
<CONTENT_PID = "0"/>
<NETWORK_PATH = "75.128.32.146, 75.128.32.1, ..."/>
<HMAC SSA_1 ="396A1DB630D36E8930CA7153.."/>
<HMAC SSA_2= "EF7362B48D22AC3921ED261B..."/>
</PACKET>
```

SA 2 LOG RECORD

```
<PACKET INCOMING>
<TIME = "5312.497210"/>
<SOURCE_IP_ADDRESS = "75.128.32.146"/>
<DESTINATION_IP_ADDRESS = "128.31.54.232"/>
<SEQUENCE_NUMBER = "59871245"/>
<CURRENT_UA_PID = "55197823"/>
<PARENT_UA_PID = "55197823"/>
<USER_PID = "529336201"/>
<CLIENT_PID = "361203729"/>
... (OTHER PIDs ALSO LISTED)
<PACKET_TYPE = "1064 REMOTE TERMINAL"/>
<CONTENT_PID = "0"/>
<NETWORK_PATH = "75.128.32.146, 75.128.32.1, ..."/>
<HMAC SSA_1 ="396A1DB630D36E8930CA7153.."/>
<HMAC SSA_2= "EF7362B48D22AC3921ED261B..."/>
</PACKET>
```

SA 4 LOG RECORD

```
<PACKET INCOMING>
<TIME = "5317.497210"/>
<SOURCE_IP_ADDRESS = "75.128.32.146"/>
<DESTINATION_IP_ADDRESS = "58.179.34.106"/>
<SEQUENCE_NUMBER = "60458790"/>
<CURRENT_UA_PID = "55197823"/>
<PARENT_UA_PID = "55197823"/>
<USER_PID = "529336201"/>
<CLIENT_PID = "361203729"/>
... (OTHER PIDs ALSO LISTED)
<PACKET_TYPE = "1064 REMOTE TERMINAL"/>
<CONTENT_PID = "0"/>
<NETWORK_PATH = "75.128.32.146, 75.128.32.1, ..."/>
<HMAC SSA_1 ="396A1DB630D36E8930CA7153.."/>
<HMAC SSA_2= "EF7362B48D22AC3921ED261B..."/>
</PACKET>
```

FIG. 32

```
┌─ C:\System\system32\cmd.exe ──────────────────────── _ □ ×─┐
│ ┌──SSA 1 STARTUP─────────────────────────────────────────┐ │
│ │ ======================================                 │ │
│ │ Enter 0 for new SSA startup, 1 if SSA already set up:0  │ │
│ │ Enter 0 for primary SSA, 1 for secondary SSA:0          │ │
│ │                                                         │ │
│ │ **** MESSAGE LISTENER STARTED ****                      │ │
│ │ Received Q1 from /131.204.128.32:8031.  SeqNum: 1339659104 │ │
│ │ Sent Q4 message. Seq #: 1487416476                      │ │
│ │ Received Q1 from /131.204.128.32:8033.  SeqNum: 674633572  │ │
│ │ Sent Q4 message. Seq #: 1612139831                      │ │
│ │ Received Q3 from /131.204.128.32:6031.  SeqNum: 1915897723 │ │
│ │ Sent Q4 message. Seq #: 720637442                       │ │
│ │ Received R4 from /131.204.128.32:8031.  SeqNum: 1339659105 │ │
│ │ Received R4 from /131.204.128.32:8031.  SeqNum: 1339659105 (repeat) │ │
│ │ Sent R5 message. Seq #: 1487416477                      │ │
│ │ -                                                       │ │
│ └─────────────────────────────────────────────────────────┘ │
└─────────────────────────────────────────────────────────────┘
```

FIG. 67A

```
┌─ C:\System\system32\cmd.exe ──────────────────────── _ □ ×─┐
│ ┌──SA 1 STARTUP──────────────────────────────────────────┐ │
│ │ ======================================                 │ │
│ │ Enter the IP Address of the primary SSA:131.204.128.32  │ │
│ │ Sent Q1 message. Seq #: 1339659104                      │ │
│ │ Received Q4 from /131.204.128.32:9031.  SeqNum: 1487416476 │ │
│ │ Entering listen mode. Listen Port: 8032                 │ │
│ │ **** MESSAGE LISTENER STARTED ****                      │ │
│ │ Received Q5 from /131.204.128.32:8033.  SeqNum: 1846087755 │ │
│ │ Sent Q8 message. Seq #: 1780985735                      │ │
│ │ Received R1 from /131.204.128.32:7033.  SeqNum: 1246651337 │ │
│ │ Sent R4 message. Seq #: 1339659105                      │ │
│ │ Re-transmitted data packets.                            │ │
│ │ Sent R2 message. Seq #: 724542297                       │ │
│ │ Received R5 from /131.204.128.32:9031.  SeqNum: 1487416477 │ │
│ │ Sent R8 message. Seq #: 724542298                       │ │
│ │ Sent R7 message. Seq #: 1780985736                      │ │
│ │ Re-transmitted data packets.                            │ │
│ └─────────────────────────────────────────────────────────┘ │
└─────────────────────────────────────────────────────────────┘
```

FIG. 67B

```
<DATA>
<ID data="-867278658">
<INFO data="
E9888357D143C554FE75B8BFEB155F10C3B6ABF
10116D52716A16E9C23B8DDCF12CA1B7BA1ABD3
62848CBA5E4231658AF480AA21F0C9A53091EB54
93B242D195090D4F94DCA984231780F1E800702A
E45F3118BADCE2BA63F43B9F2A803E552DAC7E2
F91BDBEA858B1441D754D12AE9D4C494E7A8242
D2271BBDB7E331ED1F385F7122FF2878E45DB91
5D38F807672526645EE3A03C69397101123F43B
7337AFFD0613F52D6FD10084A29802E428E7237
AB48554DB2AE82F3A08F8F6599F94E67473DE9B
0137DE07DB6302120E9C87949339370ADAF51E2
D4A969537AD3740D887703627E5789750CF12D2
3D6EEF7B10BCA526EC42E0A59F4967F6B132C3D
32DCBF0222D62322C5F001B6D97F43F189764FE
240C8B0E32DA7A53B0EB1FEE6F12415296FDA91
F25B1AD22DDB38F36E04186FCDCC7513CFCB201
2C224E23A7BF49472E5C81F256A4B72D4A516DA
82B362F3C63CB5506A4670A40A6686F03E6DFF
168C29193C6D6DB9A0323DE23573436962A8AE8
F829FE31BD72052BD59CF87E70C4B3C23C9FADF
FB23C2D802AA6778E77887F84F038F4BE744B142
E017484049B3D0B9F64BFDC46A8D00D784785C6
6D0C071874302A437704919BC2739BE5AAEAF88
5D0516762BD30428F75CA9B98066E77F204906
">
</DATA>

<DATA>
<ID data="-1224562899">
<INFO data="
3C4B4559206E616D653D224E4F4E434531222207
616D653D224E4F4E4345322207862697473D2
4F4E4345332220786269747333D2234304543353
">
</DATA>
```

FIG. 69D

CREATEKEY(PASSWORD,SALT,N)
- HASH(PASSWORD+SALT)
- REPEAT N-TIMES
- OUTPUT IS A 256-BIT AES KEY

FIG. 75 { SALTGEN(PASSWORD,LENGTH,TIME-STAMP)
-PASSWORD: USER'S PASS
-LENTH: LENGTH OF SALT IN BITS
-TIME-STAMP: TIME-STAMP OF THE DEVICE

```
QIJ466UGH6MXYOQAPL...LQD3PFDEL4Q==
LJUNPOI4A8COKDNJQZP...J63I5XZDRRQ==
KF0.TXT DROPBOX
KF1.TXT SERVER
KF2.TXT DROPBOX
KF3.TXT SELF
KF4.TXT DEVICE
CON0.TXT DROPBOX
CON1.TXT DEVICE
CON2.TXT SELF
CON3.TXT DROPBOX
CON4.TXT DEVICE
```

RAND#2 & RAND#3 IN BASE64

KF*.TXT FILES ARE THE SPLITS TO THE ENCRYPTED FILES

CON*.TXT FILES ARE THE SPLITS TO THE PROTECTED SALT

```
PROTECTED STATICT STRING TRANSFORM(CHAR KEY) {
STRING KEYSTRING= NULL;
SWITCH (KEY) {
        CASE 'A':CASE 'a': KEYSTRING= "3475475d";
            BREAK;
        CASE 'B':CASE 'b': KEYSTRING= "7ca15fe6";
            BREAK;
        CASE 'C':CASE 'c': KEYSTRING= "5ef1eeb4";
            BREAK;
        CASE 'D':CASE 'd': KEYSTRING= "67d27b7e";
            BREAK;
        CASE 'E':CASE 'e': KEYSTRING= "54937c9f";
            BREAK;
        CASE 'F':CASE 'f': KEYSTRING= "7ecc4da6";
            BREAK;
        CASE 'G':CASE 'g': KEYSTRING= "c332e32f";
            BREAK;
        CASE 'H':CASE 'h': KEYSTRING= "8c1a5b7d";
            BREAK;
        CASE 'I':CASE 'i': KEYSTRING= "8c1a5b7d";
            BREAK;
        CASE 'J':CASE 'j': KEYSTRING= "74064690";
            BREAK;
        CASE 'K':CASE 'k': KEYSTRING= "44745a2e";
            BREAK;
        CASE 'L':CASE 'l': KEYSTRING= "bd0625f0";
            BREAK;
        CASE 'M': 'm': KEYSTRING= "6283d093";
            BREAK;
        CASE 'N': 'n': KEYSTRING= "2744c3e8";
            BREAK;
        CASE 'O': 'o': KEYSTRING= "3e04f0c5";
            BREAK;
        CASE 'P': 'p': KEYSTRING= "b5faba59";
            BREAK;
        CASE 'Q': 'q': KEYSTRING= "432ff018";
            BREAK;
        CASE 'R': 'r': KEYSTRING= "ed9c4981";
            BREAK;
        CASE 'S': 's': KEYSTRING= "61784a64";
            BREAK;
        CASE 'T': 't': KEYSTRING= "b450eeae";
            BREAK;
        CASE 'U':'u': KEYSTRING= "e975639b";
            BREAK;
        CASE 'V':'v': KEYSTRING= "723917a9";
            BREAK;
        CASE 'W': 'w': KEYSTRING= "801f4eba";
            BREAK;
        CASE 'X': 'x': KEYSTRING= "fada19f3";
            BREAK;
        CASE 'Y': 'y': KEYSTRING= "9aea5a69";
            BREAK;
        CASE 'Z': 'z': KEYSTRING= "8d7fe4ee";
            BREAK;
    }
    return KEYSTRING;
}
```

FIG. 120

```
//checks if the input matches the correct PIN
if(sb.toString() .equals("3f819158bf5560028c702c9879585960073ad26df2c567fe6b7b50b4ca3f13c1"))
{
    hashVal = true;
}
```

FIG. 121

RANDOM NUMBER GENERATOR:

```
Random random=null;
byte [] testrngrn = null;
//sets the Random object to use SHA1PRNG
random = SecureRandom.getInstance("SHA1PRNG");
//gets the time of day in nanoseconds
long nanoGMT2 = System.nanoTime();

//loops through several times to get a random salt
for (int i=0; i<4; i++)
{
//sets the random generator seed to the current time
random.setSeed(nanoGMT2);
nanoGMT2 = System.nanoTime();
}
//sets the salt value
salt = random.nextLong();

//adds the salt to the PIN hash
addSalt();

//loops through several times to get a random key
for (int i=0; i<4; i++)
{
//sets the random generator seed to the current time plus
// the salt/password combination
random.setSeed(nanoGMT2+salt);
nanoGMT2 = System.nanoTime();
}
//stores the random 32 byte array
testrngrn = new byte [32];
random.nextBytes(testrngrn);
}

File encryption key generation:

RND genKey = new RND();
key = genKey.getRandom();
SecretKey enckey = new SecretKeySpec(key, "AES");
```

FIG. 124

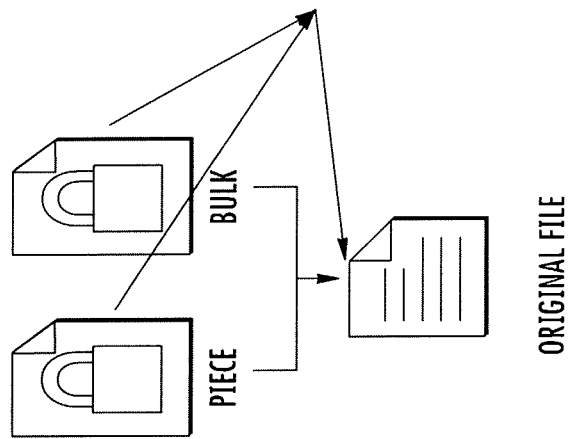

```
bulkContents = getBytesFromFile(new File(fileName.replace(".txt",".bulk")));
pieceContents = getBytesFromFile(new File(fileName.replace(".txt",".piece")));

//puts the pieces back in the bulk content
for(int j = 0; j < bulkContents.length/5; j++)
{
bulkContents[Integer.parseInt(randNums[j])] = pieceContents[j];
}

//saves the merged contents into the original ciphertext file
File original = new File(fileName.replace(".txt",".encrypted"));

FileOutputStream fos = null;
fos = new FileOutputStream(original);
fos.write(bulkContents);
fos.close();
```

FIG. 128

RANDOM NUMBER GERERATOR:

```
Random random=null;
byte [] testrngrn = null;
//sets the Random object to use SHA1PRNG
random = SecureRandom.getInstance("SHA1PRNG");
//gets the time of day in nanoseconds
long nanoGMT2 = System.nanoTime();

//loops through several times to get a random salt
for (int i=0; i<4; i++)
{
//sets the random generator seed to the current time
random.setSeed(nanoGMT2);
nanoGMT2 = System.nanoTime();
}

//sets the salt value
salt = random.nextLong();

//adds the salt to thePIN hash
addSalt();

//loops through several times to get a random key
for (int i=0; i<4; i++)
{
//sets the random generator seed to the current time plus
// the salt/passwordcombination
random.setSeed(nanoGMT2+salt);
nanoGMT2 = System.nanoTime();

//stores the random 32 byte array
testrngm = new byte [32];
random.nextBytes(testrngm);
}

File encryption key generation:

RND genKey=new RND();
key = genKey.getRandom();
SecretKey enckey = new SecretKeySpec(key, "AES");
```

NONCE GENERATION ON BOTH SIDE:

//combine two nonces into new Nonce
System. arraycopy(servNonce, 0, Nonce, 0, servNonce.length);
System. arraycopy(TPMNonce, 0, Nonce, servNonce.length, TPMnonce.length);

VERIFICATION AND RESPONSE:T

// try to verify signature (in java) with the public key
signature sig = Signature.getInstance("SHA1withRSA");

//read the public key from pub.txt
byte[] pKey = FromHex("pub.txt");

// make the public key
KeyFactory keyFactory = KeyFactory.getInstance("RSA");
EncodekeySpec publickeySpec = new X509EncodedKeySpec(pKey);
PublicKey pubKey = keyFactory.generatePublic(publickeySpec);

// assign public key
sig.initVerify(pubKey);
byte[] digest = Hash.hash(Nonce);
//assign hash as data value
sig.update(digest);
boolean verificationOK = sig.verify(signature);

SIGNATURE SIGNING, DELIVERY AND RESPONSE RECEIVING:

byte[] digest = Hash.hash(Nonce);
//create hash object
TcBlobData nonce = TcBlobData.newByteArray(digest);
TclHash hash = context.createHashObject(TcTssConstants.TSS_HASH_SHA1);
hash.updateHashValue(nonce);

//sign the hash object with the private signing key
TcBlobData signature = hash.sign(keyPKRetrieved);
byte[] sig = signature.asByteArray();

//send the signature to server for identity verification
DatagramPacket sign = new DatagramPacket(sig, sig.length, serverIPAddress, servPort);
socketClient.send(sign);
System.out.println("signature has been sent to server!");
byte[] buff = new byte[100];
DatagramPacket sigreply = new DatagramPack(buff, buff.length);
socketClient.receive(sigreply);

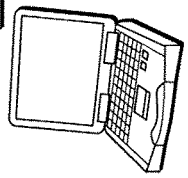

```
PROBLEMS @JAVADOC  DECLARATION  CONSOLE
LOGONSERVER [JAVA APPLICATION] C:\PROGRAM FILES\JAVA\JRE7\BIN\JAVAW.EXE (APR 12, 2013 7:13:38 AM)
  SERVER ADDDRESS: SH-PC/192.168.194.1
  LISTEN ON PORT: 2228
  WAITING FOR PACKETS....
```

```
PROBLEMS  @ JAVADOC  DECLARATION  CONSOLE ✕
LOGONSERVER [JAVA APPLICATION] C:\PROGRAM FILES\JAVA\JRE7\BIN\JAVAW.EXE (APR 12, 2013 7:13:38 AM)
  SERVER ADDDRESS: SH-PC/192.168.194.1
  LISTEN ON PORT: 2228
  WAITING FOR PACKETS....
  MESSAGE FROM CLIENT: 61784a64
  LENGTH OF MESSAGE: 8
  LENGTH OF FINISHED:9!
  FALSE
  /172.17.50.15
  /172.17.50.15
  MESSAGE TO UDP CLIENT: CONTINUE!

MESSAGE FROM CLIENT: 4b9ac4f3
  LENGTH OF MESSAGE: 8
  LENGTH OF FINISHED:9!
  FALSE
  /172.17.53.34
  MESSAGE TO UDP CLIENT: CONTINUE!

MESSAGE FROM CLIENT: 280c1663
  LENGTH OF MESSAGE: 8
  LENGTH OF FINISHED: 9!
  FALSE
  /172.17.50.15
  MESSAGE TO UDP CLIENT: CONTINUE!
```

FIG. 148

| LIBRARY▽ | SHARE WITH▽ | BURN | NEW FOLDER | | |
|---|---|---|---|---|---|
| NAME ▲ | | | DATE MODIFIED | TYPE | SIZE |
| ▢ .SETTINGS | | | 3/13/2013 3:01 PM | FILE FOLDER | |
| ▢ BIN | | | 4/4/2013 11:18 PM | FILE FOLDER | |
| ▢ SRC | | | 3/31/2013 2:40 PM | FILE FOLDER | |
| ▢ .CLASSPATH | | | 3/13/2013 3:01 PM | CLASSPATH FILE | 1KB |
| ▢ .PROJECT | | | 3/13/2013 3:01 PM | PROJECT FILE | 1KB |
| ▢ INDEX.PIECE | | | 4/12/2013 7:34 AM | PIECE FILE | 1KB |
| ▢ PUB | | | 4/12/2013 7:34 AM | TEXT DOCUMENT | 1KB |

SPACE-TIME SEPARATED AND JOINTLY EVOLVING RELATIONSHIP-BASED NETWORK ACCESS AND DATA PROTECTION SYSTEM

PRIORITY CLAIM

This application is a divisional application of U.S. patent application Ser. No. 14/960,798, filed Dec. 7, 2015, which is a continuation application of U.S. patent application Ser. No. 14/293,350, filed Jun. 6, 2014, which claims domestic priority to and the benefit of U.S. Provisional Patent Application Ser. No. 61/878,694, filed Sep. 17, 2013, which applications are hereby incorporated by reference.

BACKGROUND

The present disclosure relates to systems, components, and methodologies for providing network access control, forensics capabilities to identify network attackers and compromised clients or servers, enhanced protection for at-rest data in the event of a network breach, and other network security features.

Attacks on information networks have been increasing in frequency and success in recent years. Attack methods are becoming increasingly sophisticated, and network defense systems have not kept pace. Intrusion Detection Systems ("IDS") and Intrusion Prevention Systems ("IPS") utilizing signature- and statistics-based methods are not always sufficiently agile to address modern network attacks. With the rise of the Internet and computer networks, network security has become increasingly important. Similarly, increased use by organizations of centralized secure datacenters has made network security increasingly important.

Yet network attacks persist, showing that existing information/cyber security technology is not sufficient. These continuing attacks are reminders of how vulnerable network-connected computer systems are, and the regularity with which they are breached. Many of these breaches are the result of the exploitation of zero-day and metamorphic attacks, using previously unseen attack vectors, or metamorphic variants of known attacks, to strike at the vulnerable underbellies of networks.

There has also been an increased prevalence in the rise of insiders leaking confidential information, as well as employees losing laptops and mobile devices containing proprietary information. These activities highlight the need for data networks with defenses against this sort of malicious insider behavior, and for data networks that minimize the effects of memory-scraping and unauthorized information access.

Cloud and mobile devices have become increasingly prevalent as well. Their increasing popularity highlights the need for information to be securely stored and accessible only by the intended user or authorized users. While passwords and tokens can offer some protection and authentication, a password can be compromised by social engineering, key loggers, or zero-day malware. Additionally, because notebook personal computers are increasingly used for e-Commerce, there is a growing need to make the notebook platform more trustworthy. In fact, in the mobile computing context, stolen data is often regarded as being more valuable than the mobile hardware itself.

SUMMARY

According to the present disclosure, systems, components, and methodologies are provided for network access control, forensics capabilities to identify network attackers and compromised clients or servers, enhanced protection for at-rest data in the event of a network breach, and other network security features.

Disclosed embodiments address the above-described technical problems by providing a network security system that exploits space-time separation—that is, the network security system implements authentication and protection in multiple spatial positions, and implements authentication and protection mechanisms that vary over time time in a joint spatial relationship. For example, file, directory and user are identified and protected using a space-time varying identity instead of a fixed identity. The use of space-time separated and jointly-evolving relationships provide network defenses that can defend against a variety of attacks, including zero-day and metamorphic attacks.

In illustrative embodiments, the disclosed systems, components, and methodologies utilizing the space-time separated and jointly-evolving relationships also include sophisticated traceback and logging features that allow for identification of an attack's origin, the attack's culprits, and compromised botnets.

In illustrative embodiments, the disclosed systems, components, and methodologies utilizing the space-time separated and jointly-evolving relationships also provide enhanced protection of at-rest data stored within the network and traceback to the source of leakage.

In illustrative embodiments, the disclosed systems, components, and methodologies accept a request by a user to access data stored in a database; identify a sequence of security agents that will participate in authenticating the access of the data by the user; generate a sequence of passwords; check, at each one of the servers, a corresponding one of the passwords; determine that the user is permitted to access the data if all the servers accept the corresponding password; and vary the passwords over time. The security agents provide mutual support for each other using the space-time varying relationship. Since it is infeasible for attackers to compromise the space-time varying relationship, even when attackers become the superuser of any agent or client using zero-day attacks; when attackers attempt to steal protected resources, the attack will result in violating the space-time varying relationship. Hence, the attack and data leak can be prevented. Furthermore, zero-day attacks involved in the attempt can be identified in real time.

Disclosed embodiments also address the above-described technical problems by providing systems, components, and methodologies that enhance security by splitting sensitive information (e.g., files or folders) into encrypted components and storing each encrypted component in respective spatially separated memory positions. Information regarding positions at which the data is split may be stored in a map, which itself is split into encrypted components stored in respective spatially separated memory positions. In illustrative embodiments, space/time-varying identifiers are assigned to each encrypted component of the data, and the space/time-varying identifiers are used to authenticate whether a given user is authorized to access the data. This provides a fine-grained access control in an automatic manner, even for shared data. Using space/time-varying identifiers and associated protection (such as Mutated ciphertext based on space/time-varying relationship), data leak can be prevented and any insider who is selling the information will be identified in real time.

In illustrative embodiments, the systems, components, and methodologies provide authentication by authenticating the user with multiple devices and passwords.

Disclosed embodiments also address the above-described technical problems by providing systems, components, and methodologies that provide a TPM-enhanced (or equivalent hardware-based security processor) cloud-based file protection system, rather than, for example, a solely-software security implementation.

The AES-GCM program and the file splitting-merging program work mutually with each other. They both can be peroformed multiple times based on the required security strength. First, after the targeted files are encrypted and authenticated, then the encrypted file is split and the file pieces are distributed to the mobile device and PC as well as datacenter servers. Then, the index file will be encrypted and split into pieces and then distributed to server and the client PC as well as datacenter servers. The decryption-merging process is generally an inverse process. The mutated ciphertext is resistant to crypto side-channel attacks.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description makes reference to the accompanying figures in which:

FIG. 32 shows an exemplary log record in which the digital forensics suite searches for "Remote Terminal" packets in the security logs that were sent by the root traitor Client in accordance with the disclosure.

FIG. 67(a) through (d) show exemplary Command Line Interface (CLI) programs implemented in Java, which can be used for various software components, such as all IDACS Network elements (SAs, SSAs, and Databases) and the User Badge (Badge$_{70}$) in accordance with the disclosure.

FIGS. 69(a) through (f) show a BlackBerry implementation of IDACS encryption and distributed storage in accordance with the disclosure. FIG. 69(a) shows file ciphertext with Xslices removed. FIG. 69(b) shows the file ciphertext divided and stored in multiple data files. FIG. 69(c) shows names of data files encrypted and stored in a pointer file. FIG. 69(d) shows Xslices and Xbits are stored on IDACS Database as pure data; no information saved on Database indicating the identity of this data. FIG. 69(e) shows correctly reassembling all distributed and mutated pieces results in correct file decryption. FIG. 69(f) shows distributed storage between Client and User Badge simulated using separate text files.

FIG. 75 shows the function of a SaltGen function in accordance with the disclosure.

FIG. 120 shows a method for the password digit to random number sequence mapping in accordance with the present disclosure.

FIG. 121 shows the hash value stored on the server side in the situation where the password is "sh05" in accordance with the present disclosure.

FIG. 122 shows an overview of the password verification process in accordance with the present disclosure.

FIG. 123 shows an exemplary implementation of a master key generation method in accordance with the present disclosure.

FIG. 124 shows an exemplary implementation of an encryption key generation method in accordance with the present disclosure.

FIG. 125 illustrates an exemplary file encryption implementation in accordance with the present disclosure.

FIG. 126 illustrates an exemplary file decryption implementation in accordance with the present disclosure.

FIG. 127 shows an exemplary implementation for a file split in accordance with the present disclosure.

FIG. 128 shows an exemplary implementation for a file merge in accordance with the present disclosure.

FIG. 129 shows an exemplary implementation for the random number generator in accordance with the present disclosure.

FIG. 130 illustrates an exemplary implementation of binding key creation in accordance with the present disclosure.

FIG. 131 illustrates an exemplary implementation for binding in accordance with the present disclosure.

Figure 132:
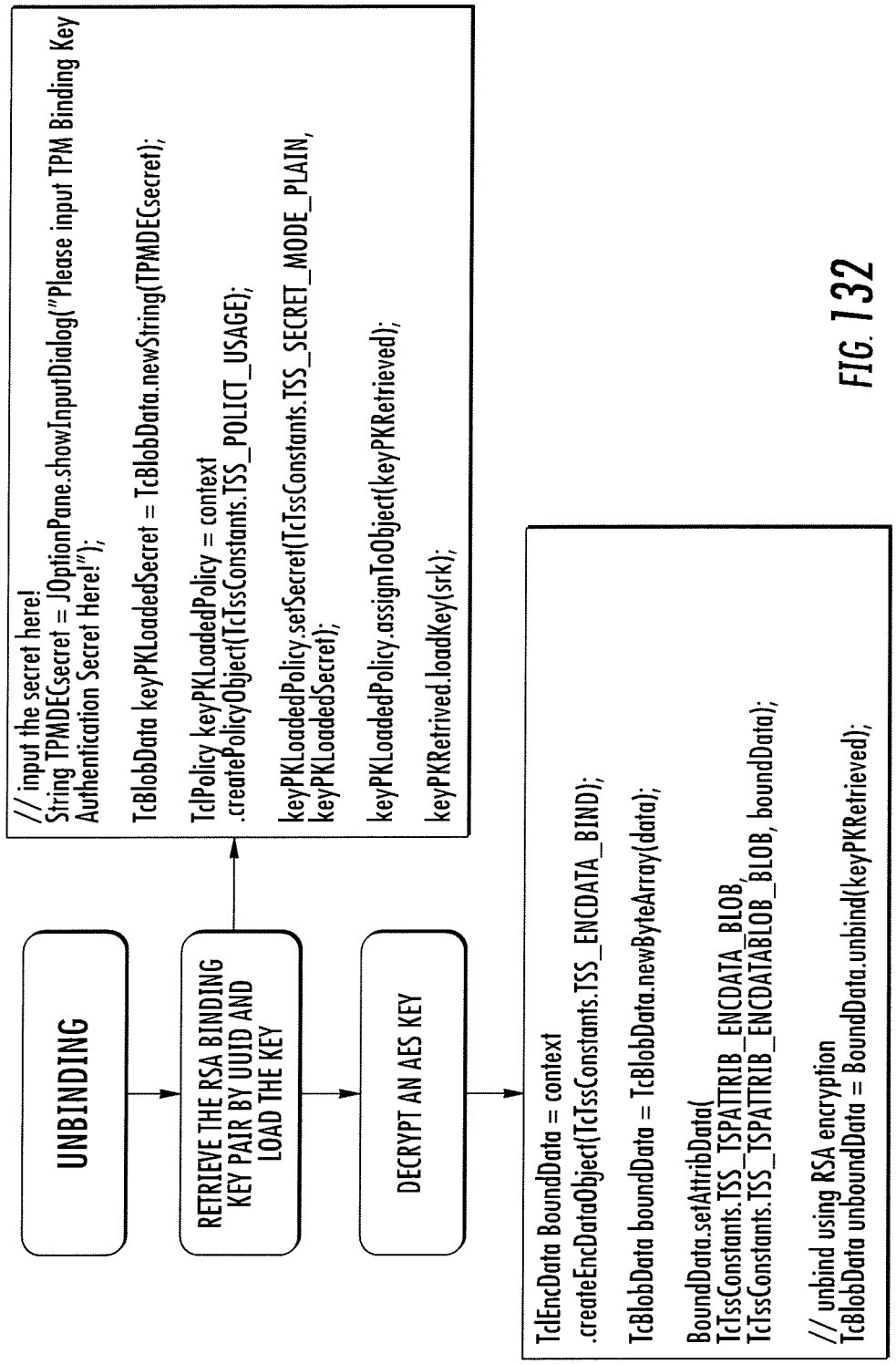

FIG. 132 illustrates an exemplary implementation for unbinding in accordance with the present disclosure.

Figure 133:
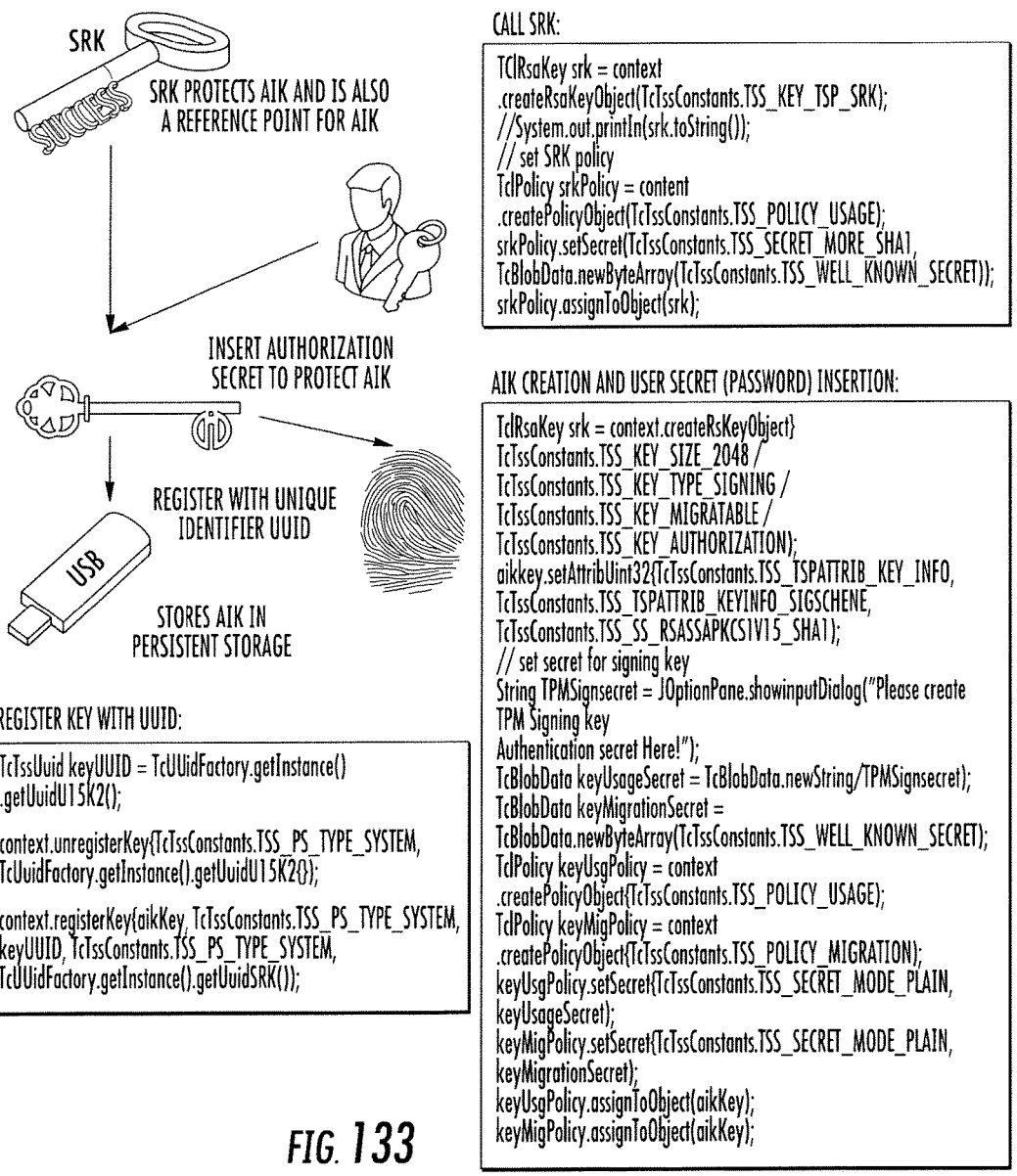

FIG. 133 illustrates an exemplary implementation for Attestation Identify Key generation in accordance with the present disclosure.

Figure 134:
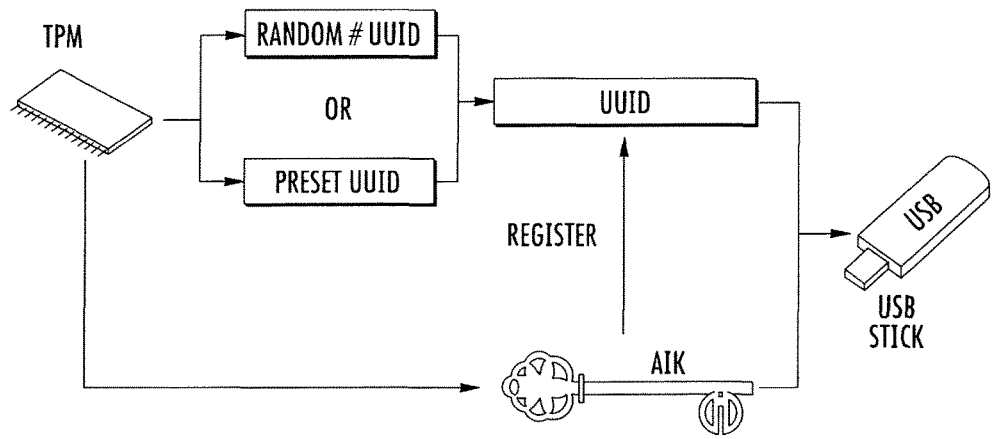

FIG. 134 provides an overview of an exemplary UUID registration process in accordance with the present disclosure.

FIG. 135 provides an overview of an exemplary identity attestation implementation in accordance with the present disclosure.

Figure 136:
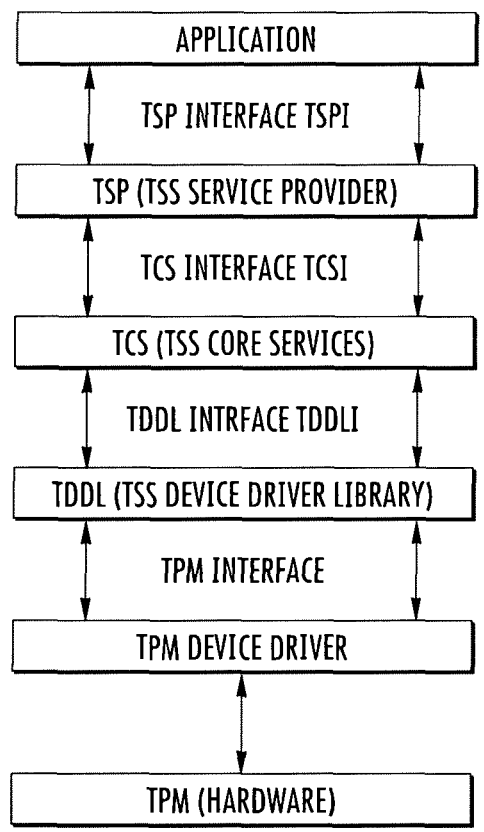

FIG. 136 shows the Trusted Computing Group Software Stack layers to provide usability, functionality and abstraction in accordance with the present disclosure.

Figure 137:
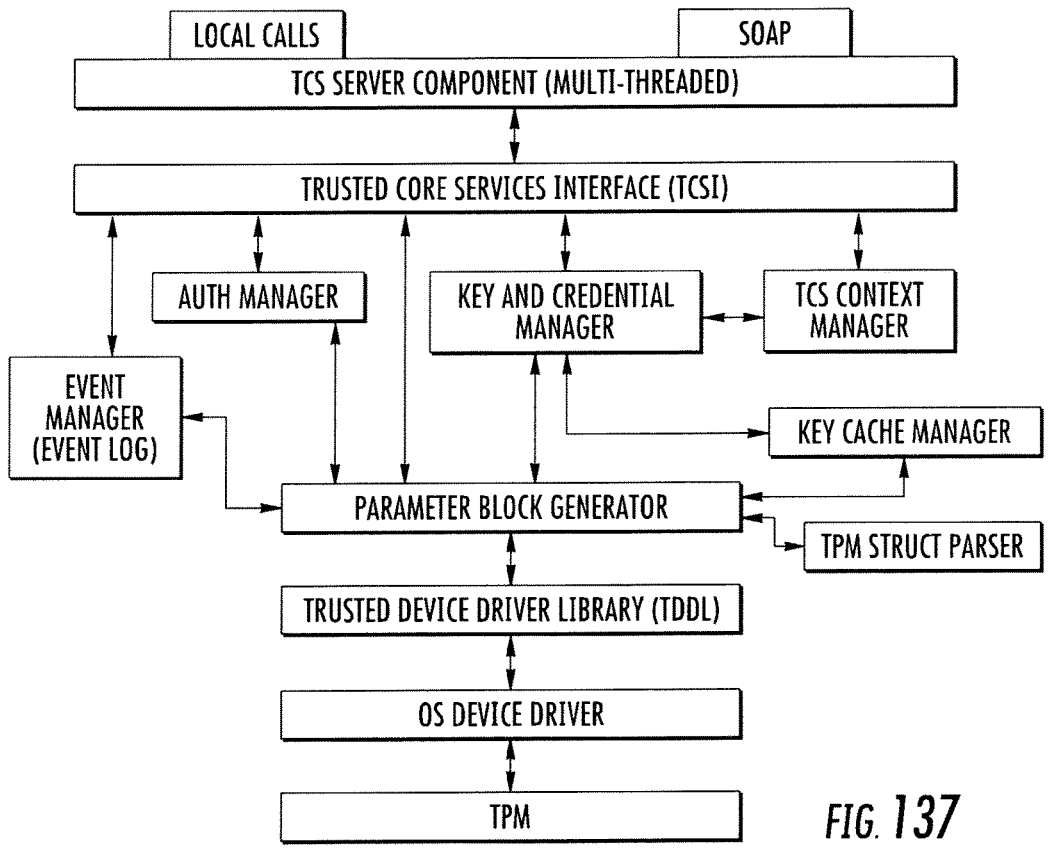

FIG. 137 shows the main components of the Trusted Core Service (TCS) and their interactions in accordance with the present disclosure.

Figure 138:
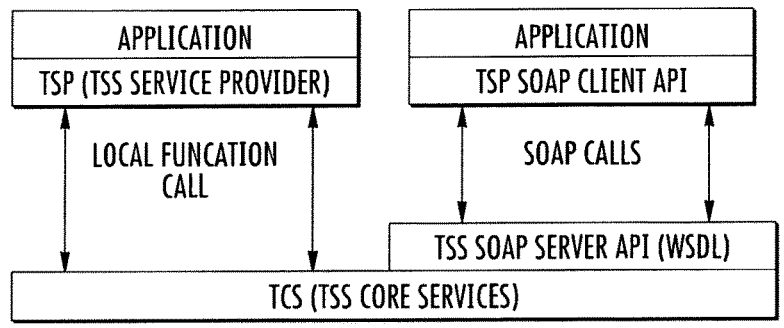

FIG. 138 shows how the TSP and the TCS can communicate either via local method calls or via the Simple Object Access Protocol (SOAP) interface in accordance with the present disclosure.

Figure 139:
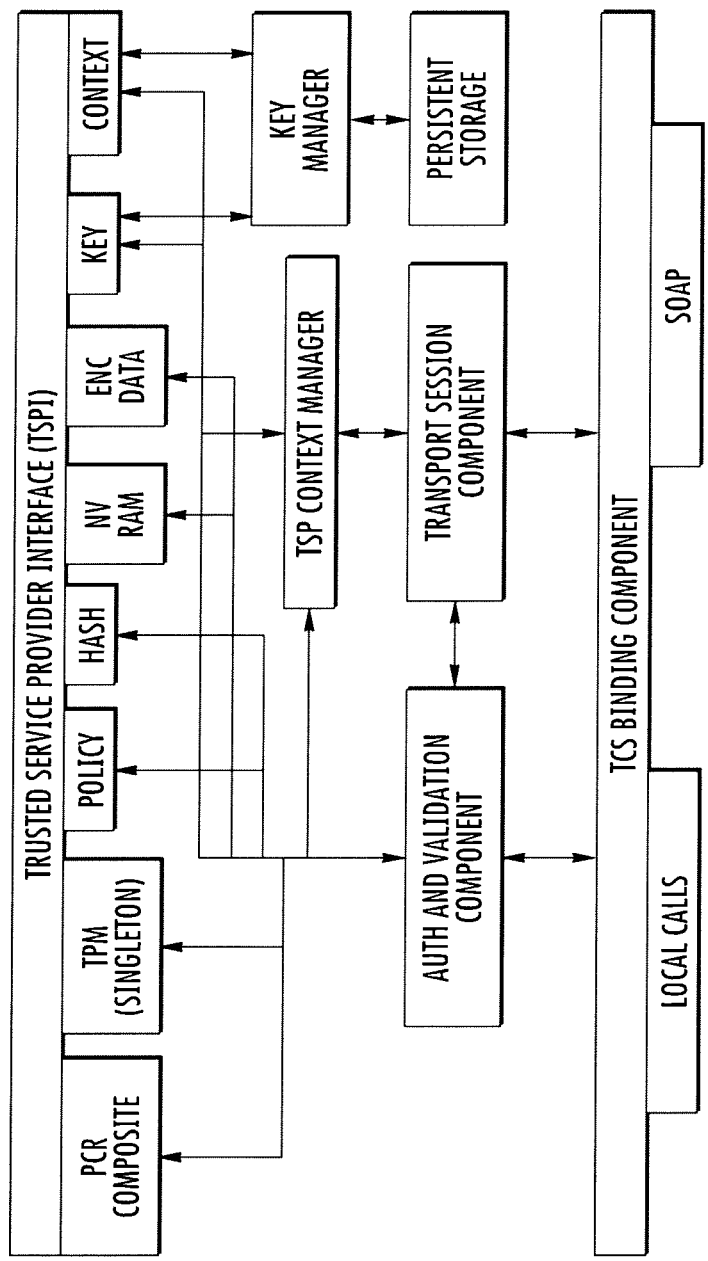

FIG. 139 shows an overview of TSPI in accordance with the present disclosure.

Figure 140:
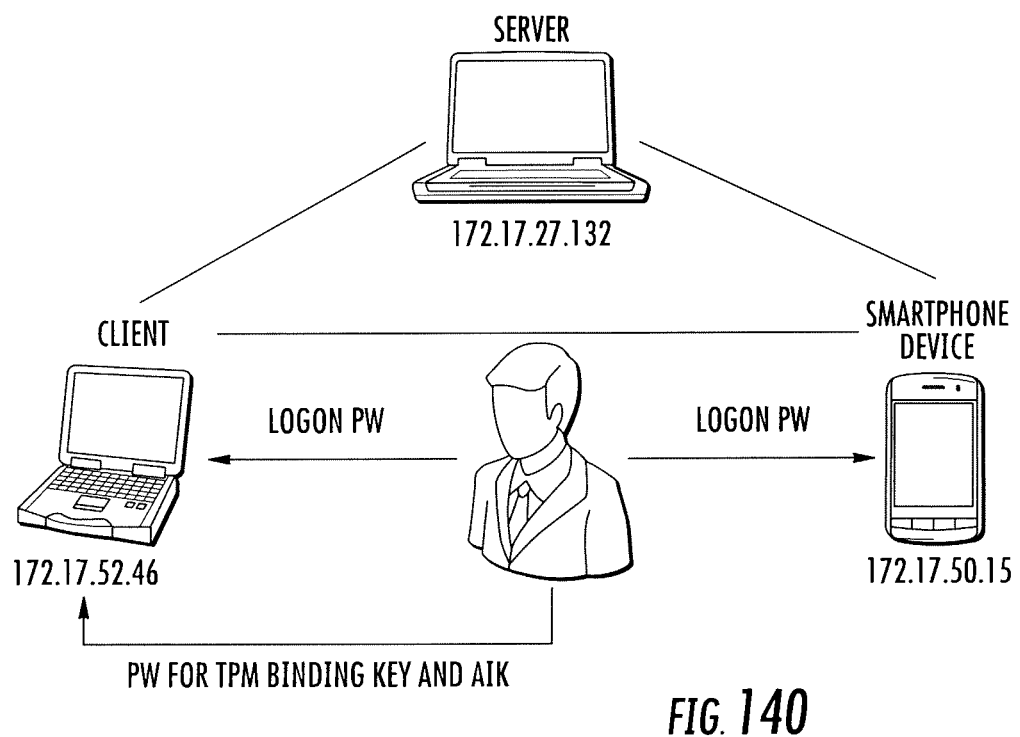

FIG. 140 shows a network diagram used in connection with exemplary implementation in accordance with the present disclosure in accordance with the present disclosure.

Figure 141:
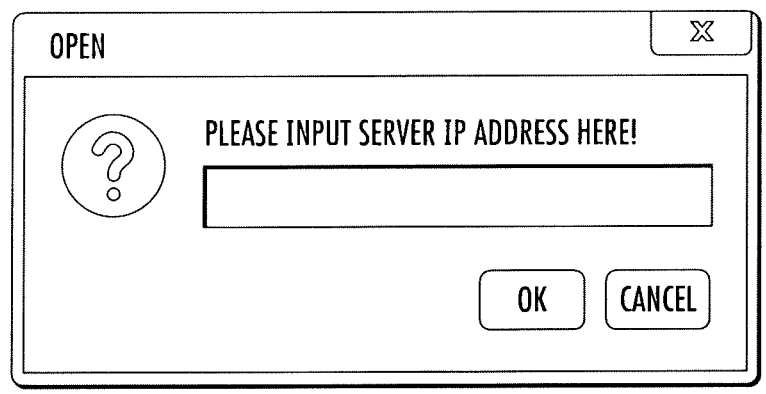

FIG. 141 shows a screen display in which a user can input a server IP address on a client PC in accordance with the present disclosure.

Figure 142:
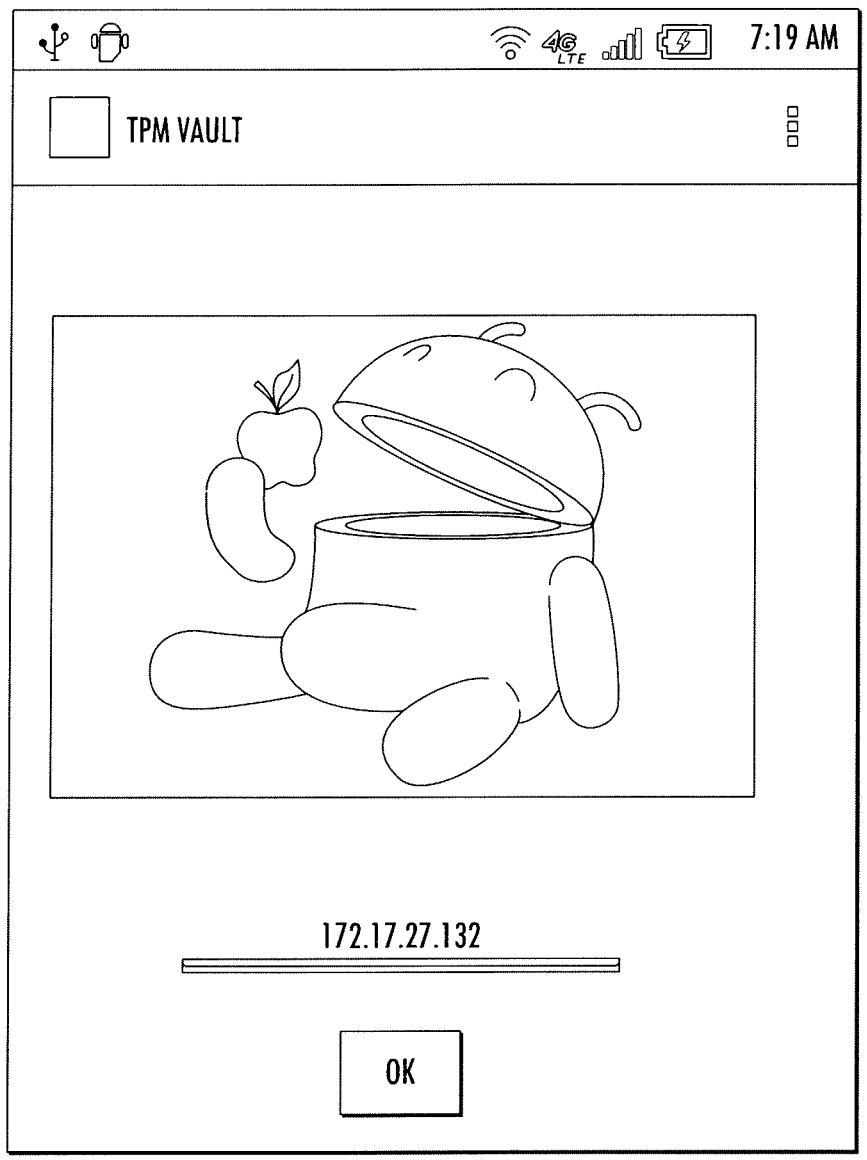

FIG. 142 shows a screen display in which a user can input a server address on the Android Device in accordance with the present disclosure.

Figure 143:
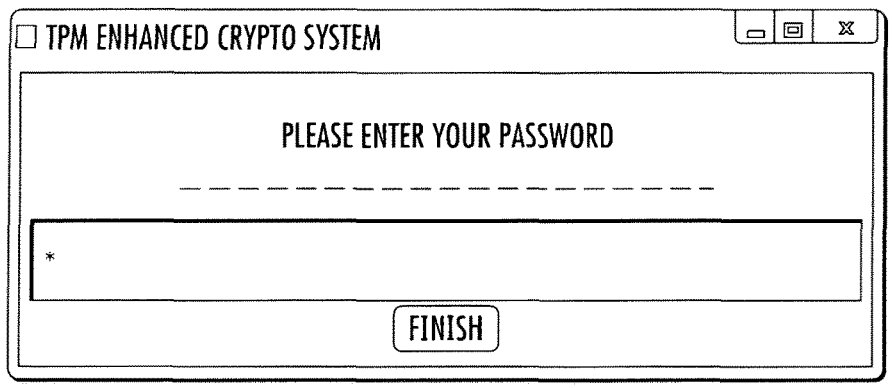
Figure 144:
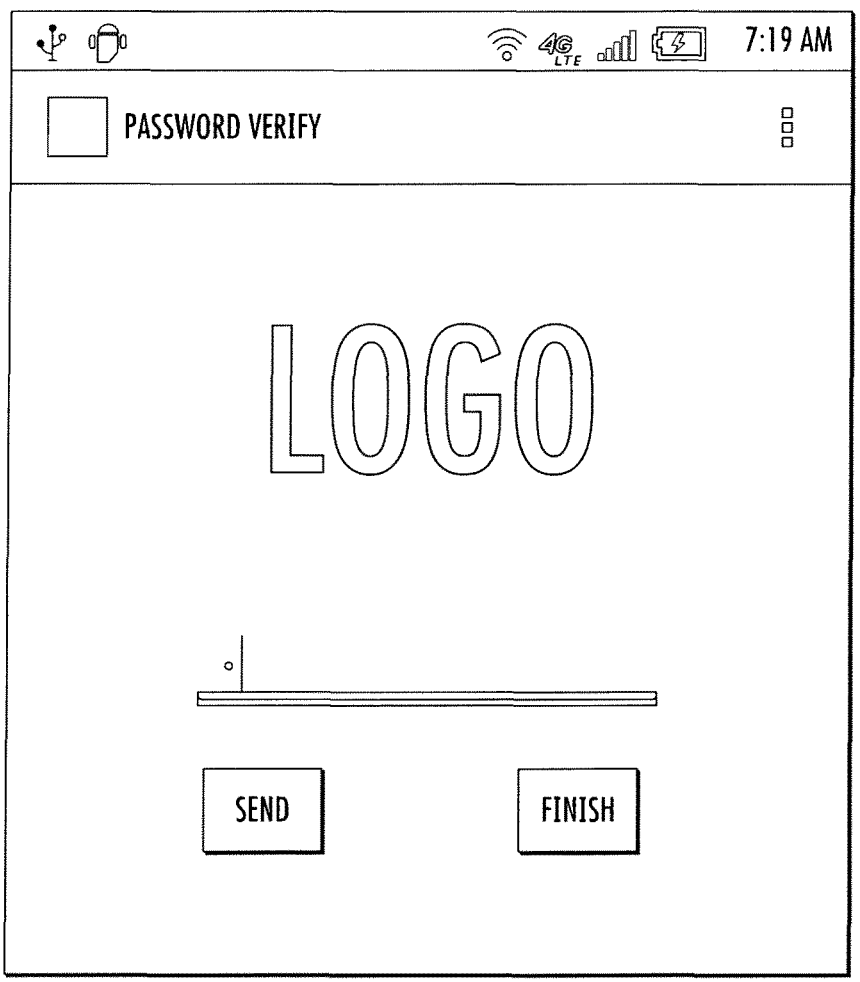

FIG. 143 and FIG. 144 show screen displays in which, after the server IP has been input, a user may click "OK" on both devices and then the password input window will be shown on both the client and the Android Device in accordance with the present disclosure.

Figures 145, 146:
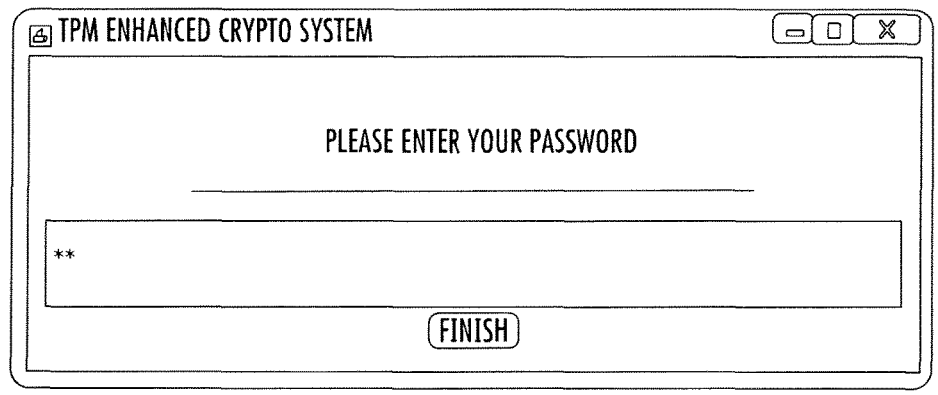

FIG. 145 shows a screen display on the server side, in which the server is ready to receive the random number sequences that represent the password input in accordance with the present disclosure.

Figure 147:
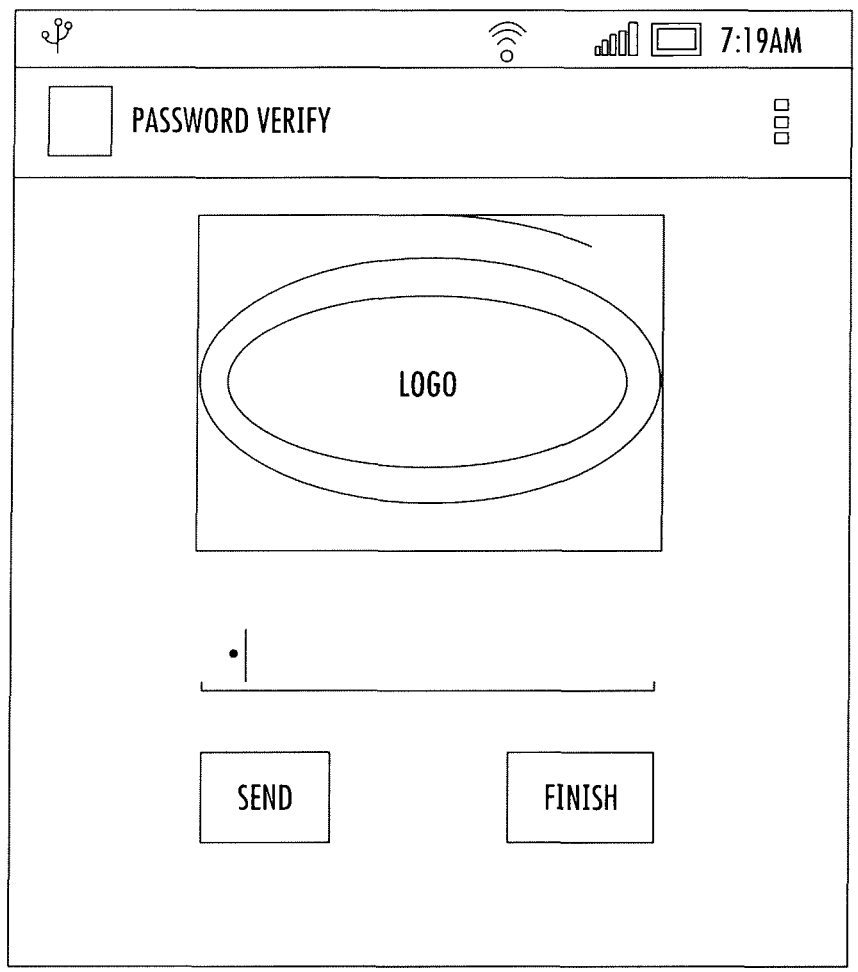

FIG. 146 and FIG. 147 show screen displays by which the password can be input on both the client PC and the Android Device one by one in accordance with the present disclosure.

FIG. 148 illustrates the server side, where the sent random number sequences are received and stored into a random number sequence string based on the order of arriving time in accordance with the present disclosure.

Figure 149:
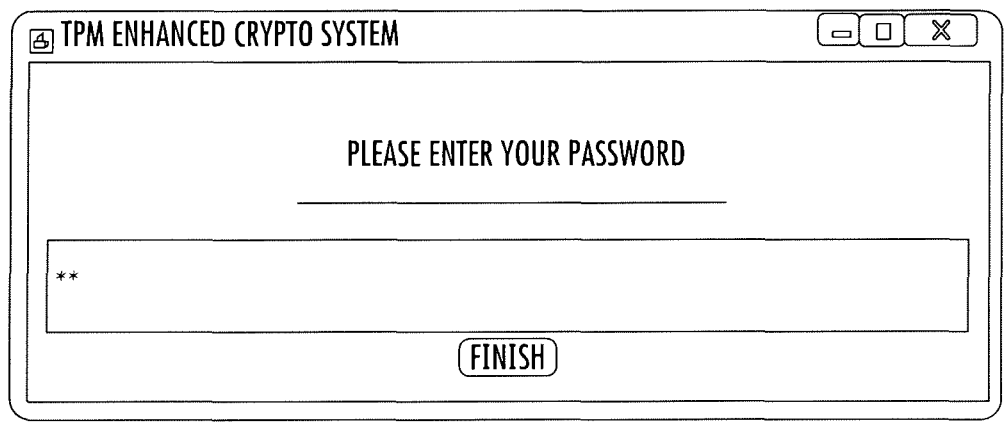

FIG. 149 illustrates a screen display in which, after the password input has finished on the Client and the Android device, the user can click the "finish" button on the Client password input window in accordance with the present disclosure.

Figure 150:
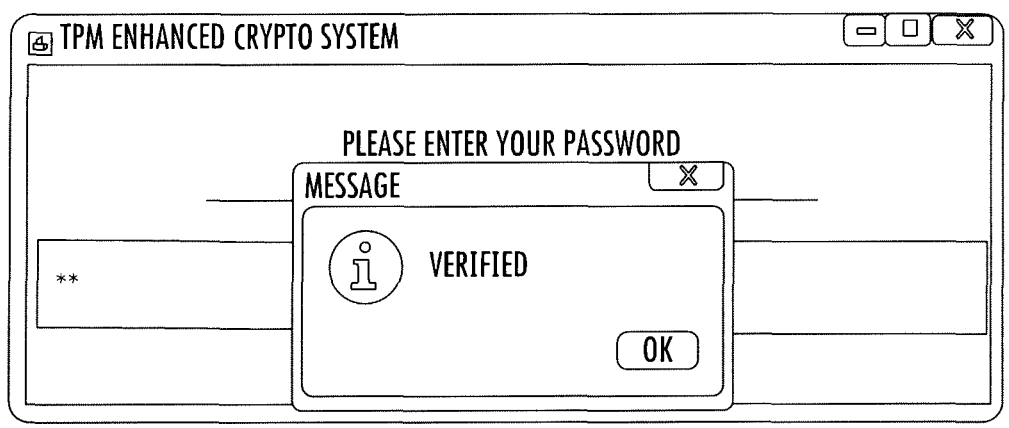

FIG. 150 shows a screen display in the situation after pressing the "Finish" button on the Android Device in accordance with the present disclosure.

Figure 151:
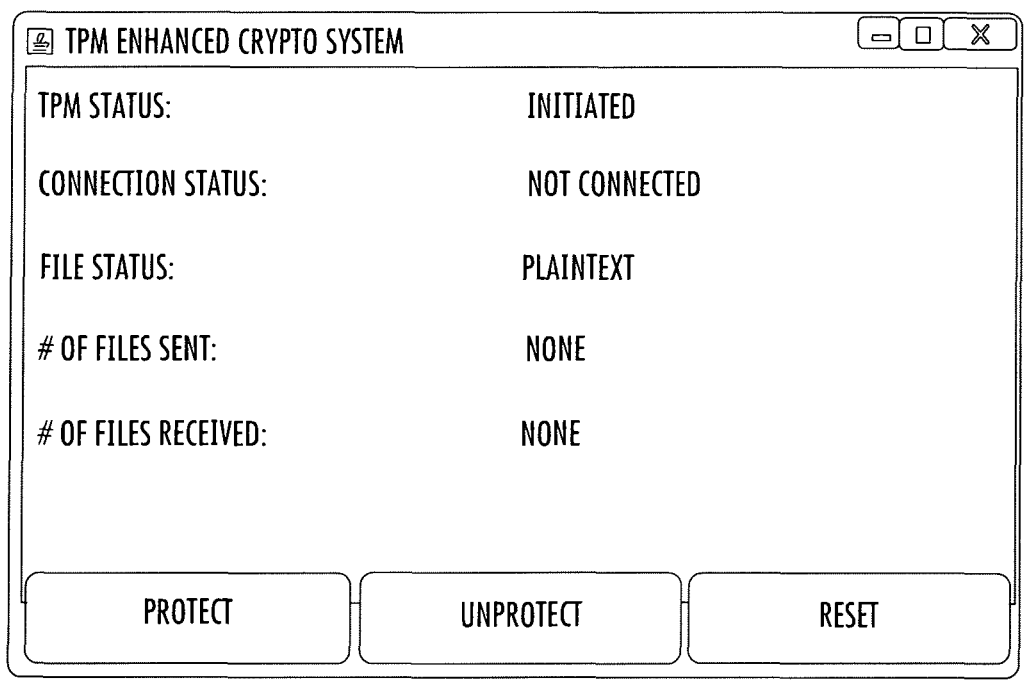

FIG. 151 shows a screen display in which clicking the "OK" button results in the cryptographic window being shown on the client side in accordance with the present disclosure.

Figure 152:
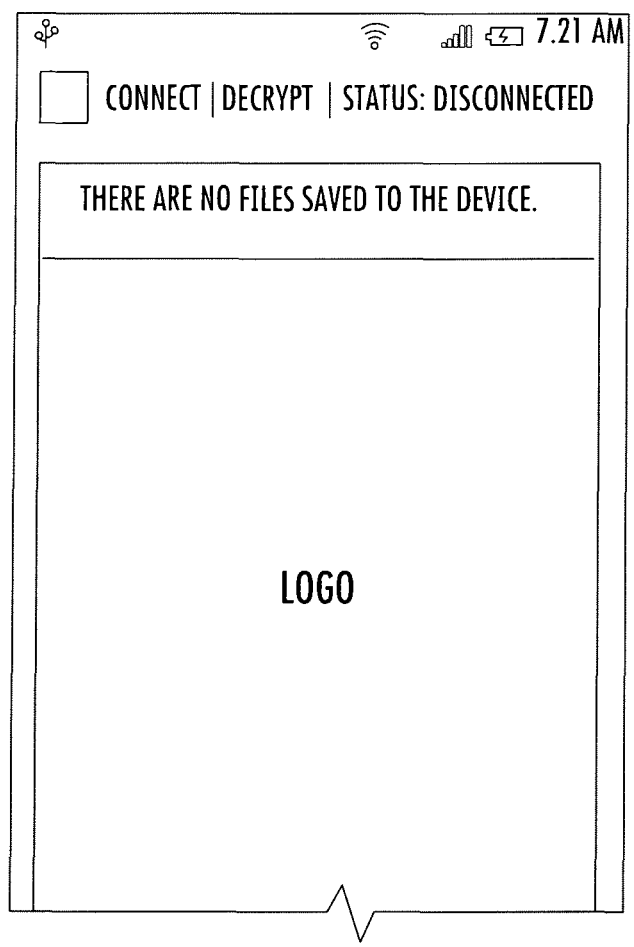

FIG. 152 shows a screen display in which, on the Android side, after the password has been verified, the next cryptographic window will be shown in accordance with the present disclosure.

Figure 153:
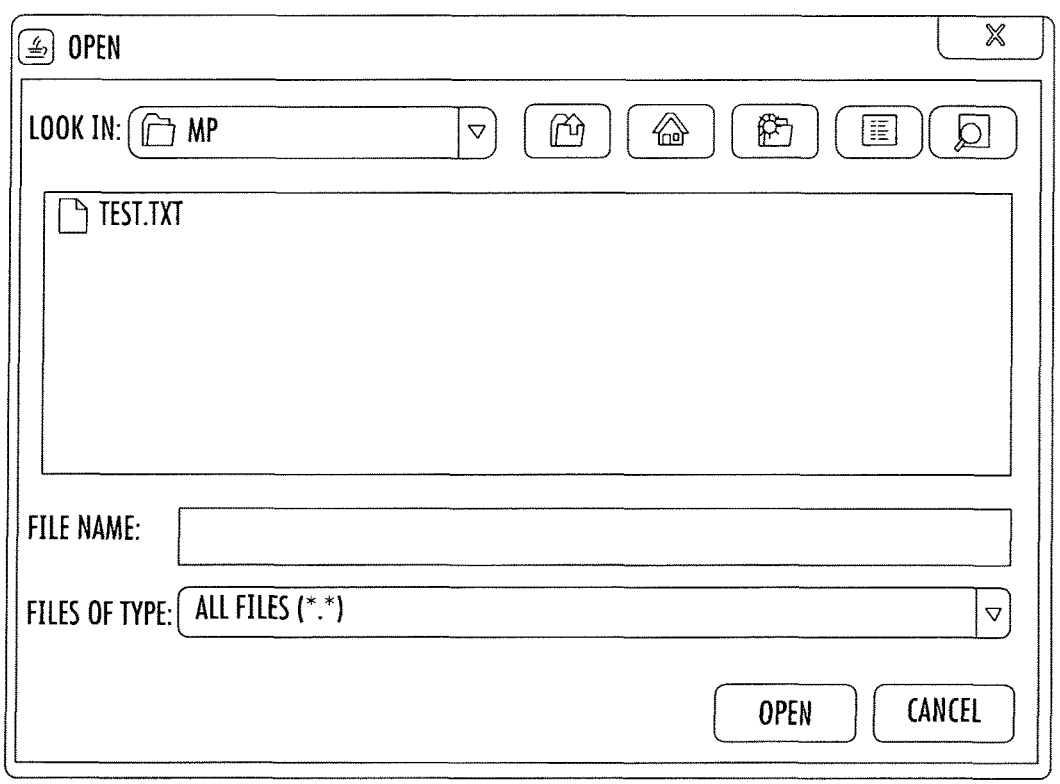

FIG. 153 shows a screen display in which, upon pressing the "Protect" button, the file chooser will be open for user, and the user can select the file that will be encrypted in accordance with the present disclosure.

Figure 154:
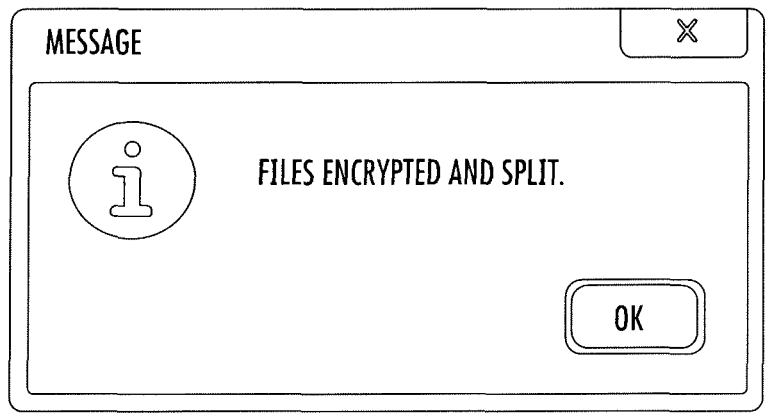

FIG. 154 shows a screen display with a confirmation box that will pop up after the files have been chosen, after the user clicks the "Open" button, and after the protection process starts and the AES-GCM encryption and file splitting process take place in accordance with the present disclosure.

Figure 155:
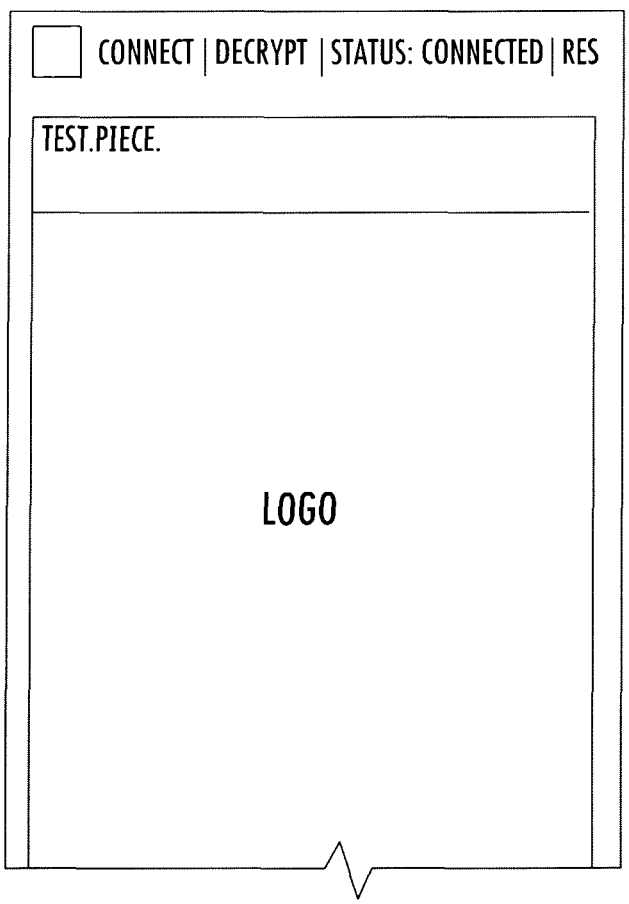

FIG. 155 shows a screen display in which, after a user clicks "OK" and within 15 seconds, the user has to click "Connect" on the Android Device to receive the split file pieces in accordance with the present disclosure.

Figure 156:
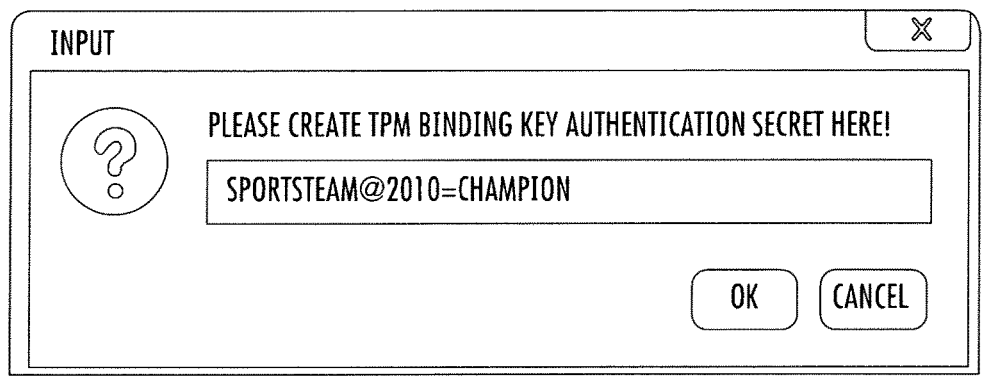

FIG. 156 shows a screen display in which a user inputs the password for the binding key in accordance with the present disclosure.

Figure 157:
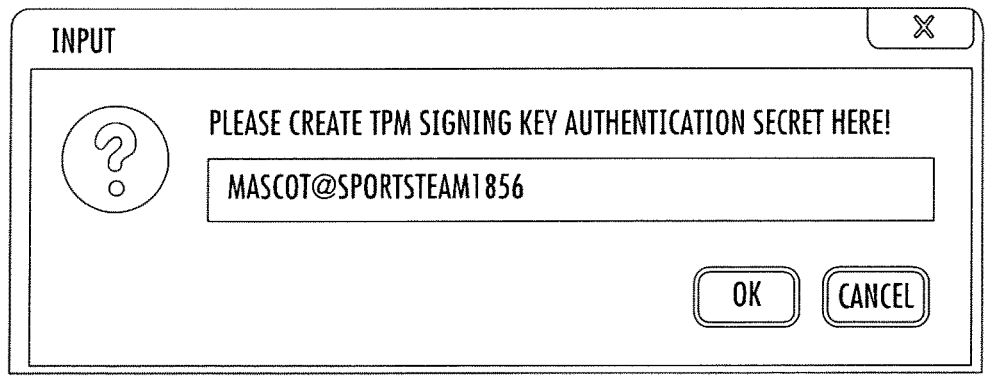

FIG. 157 shows a screen display in which a user inputs the password for the signing key in accordance with the present disclosure.

Figures 158, 159:
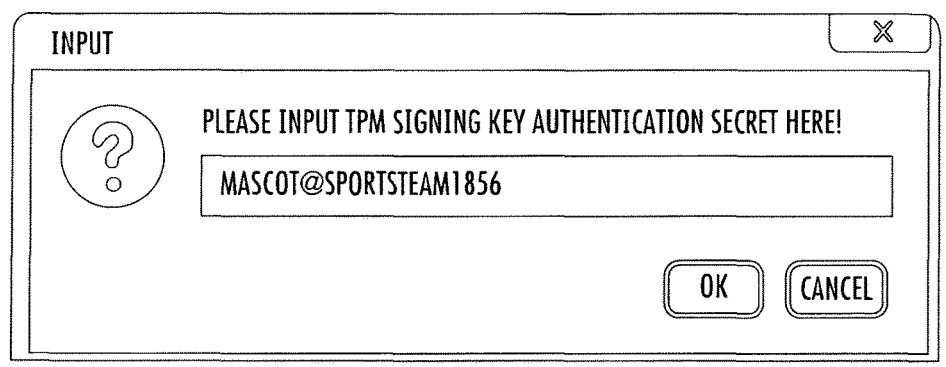

FIG. 158 shows a screen display in which, after the Signing key pair has been generated, the public key and the index .piece file will be sent to server for storage in accordance with the present disclosure.

FIG. 159 shows a screen display in which an authentication secret can be entered in accordance with the present disclosure.

Figure 160:
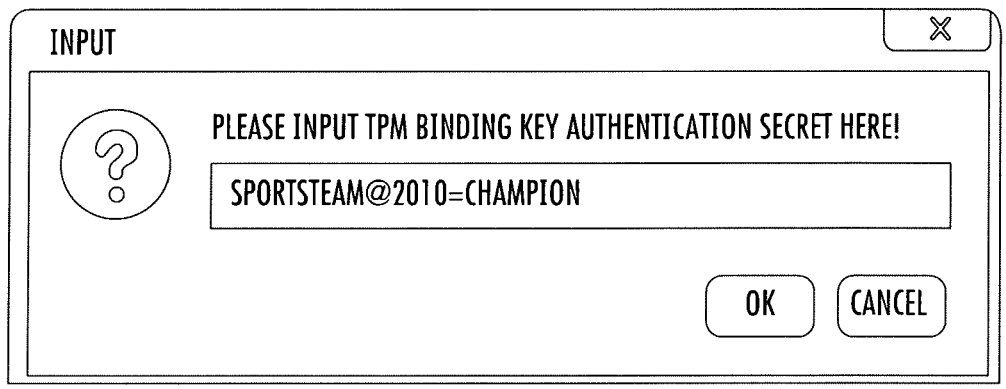

FIG. 160 shows a screen display by which a user inputs the authentication secret to TPM to unbind the key in accordance with the present disclosure.

Figure 161:
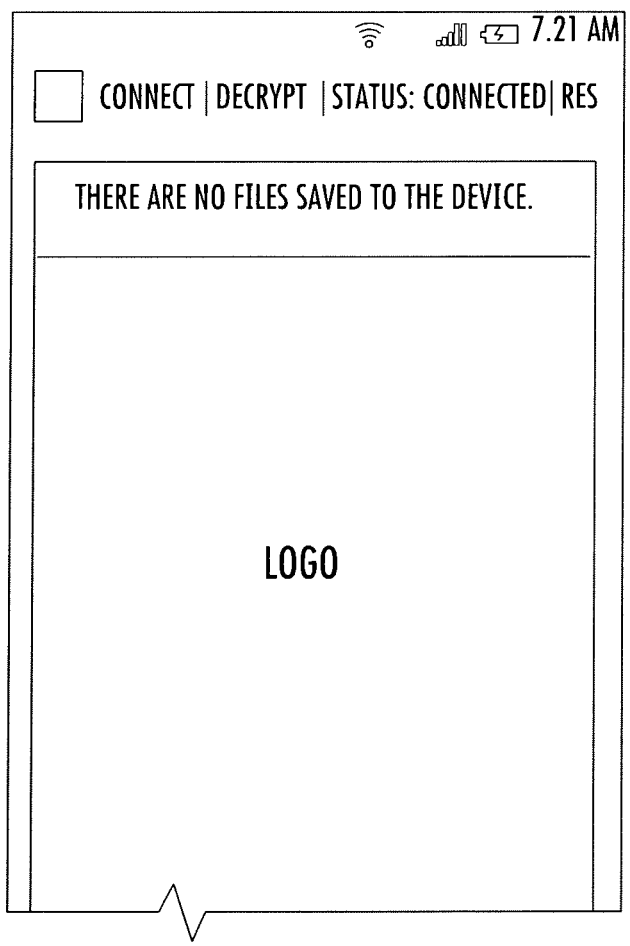
Figure 162:
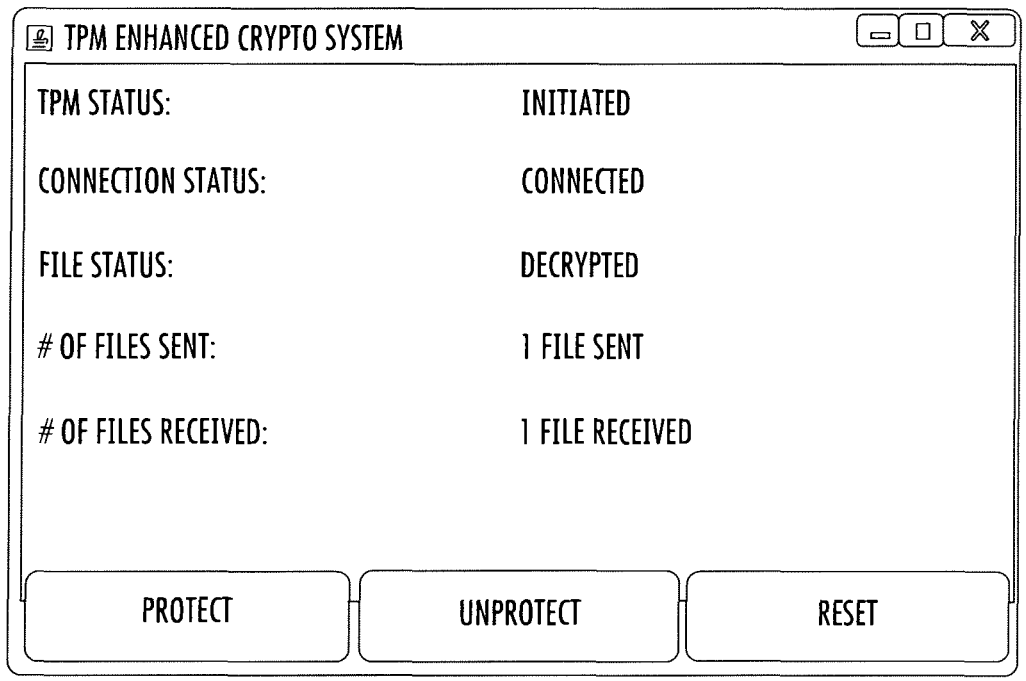

FIG. 161 and FIG. 162 show screen displays after file pieces are sent back to the client in accordance with the present disclosure.

Figure 163:
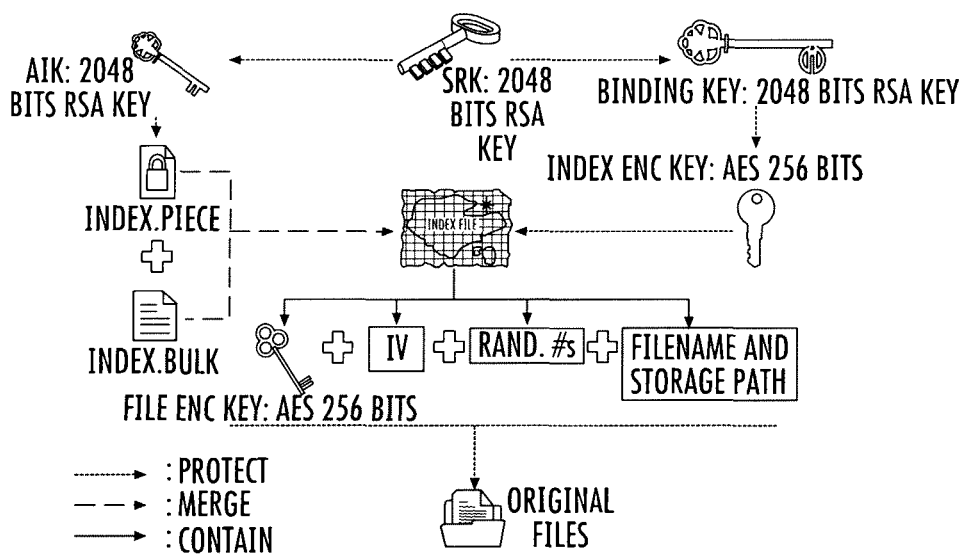

FIG. 163 illustrates the system's security dependency in accordance with the present disclosure.

Figure 164:
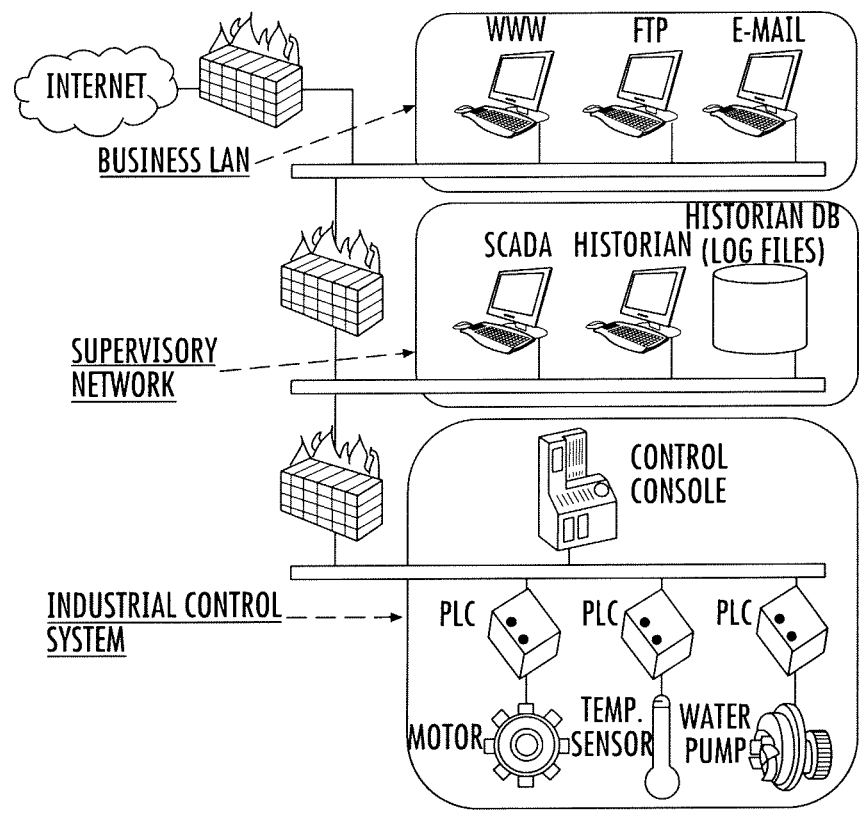

FIG. 164 shows an exemplary industrial network in accordance with the present disclosure.

Figure 165:
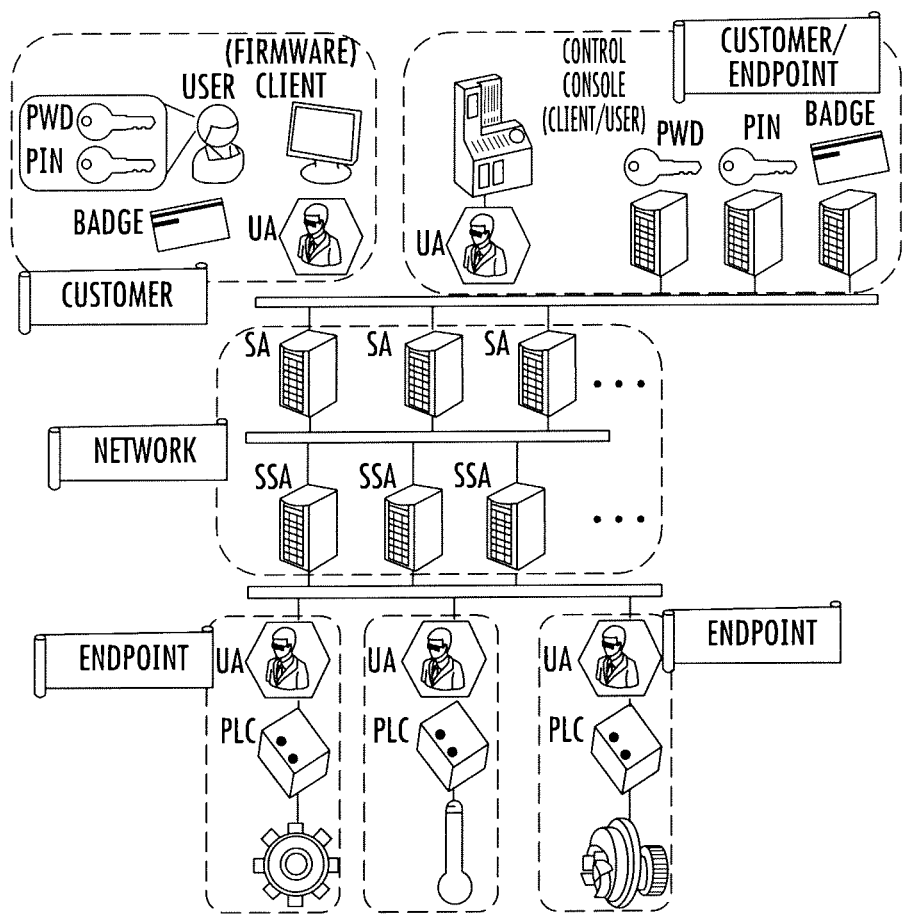

FIG. 165 shows how an illustrative IDACS network topology described above may be used for Industrial Control Systems in accordance with the present disclosure.

DETAILED DESCRIPTION

Glossary

Claim Terminology

Access Control List: One or more files or other programmatic representations that indicate which users or clients are permitted to access which respective pieces of information stored in one or more databases.

Client Security Ticket: A programmatic representation that includes one-time passwords, PIDs, and a merchandise request.

Cryptographic seed information: A value, such as a number, that is provided as an input to a mathematical operation to generate a security token. For example, one or more seeds may be provided as an input to a hash operation to generate a one-time password or a Pseudo-ID.

Database: A system or component containing computer-readable memory that stores data of interest to one or more users in a programmatically organized manner.

Log records: One or more files that contain information regarding network usage, including records of the clients or servers over which given data packets have traversed.

Map: A programmatic representation capable of being stored in computer-readable memory that contains the memory positions at which respective components of a data unit, such as a file or folder, are stored.

Network Security Ticket: A programmatic representation of messages passed between servers that include client security tickets and Xchain values.

One-time password: A password taking on a value capable of authenticating a user or client with a server either once or for a predetermined time subsequent to a first use of the password value. A one-time password may repeatedly take on new values capable of authenticating a user or client with a server subsequent to expiration of a given password value.

Password: A sequence of identifiers, such as characters, numbers, or words, that are uniquely associated with one or more users and that are used to identify, confirm the identity of, or authenticate actions taken by the one or more users.

Server: A system or component that includes software executing on hardware and that performs services in response to requests from one or more users or clients. Multiple servers may be provided in separate respective hardware units or multiple servers may be provided as separate software objects that run on a single hardware unit.

Storing data in spatially separated memory positions: Storing the data in disparate positions on one or more computer-readable memory components as compared to where a file system would store the data in a single write operation. The disparate positions may reside on one memory component in a single device or may reside on multiple memory components on multiple different devices, such as for example a PC, a cloud server, and a smartphone.

Time-dependent authentication vectors: A sequence of security tokens that vary over time and that are used by servers to identify, confirm the identity of, or authenticate other services.

Time-varying identifier: A security token that varies over time and that is used by servers to identify, confirm the identity of, or authenticate actions taken by the one or more users. For example, the time-varying identifier may vary after the lapse of a predetermined period of time, after transmission of a data packet, after a request from a user to access data has been serviced, or after a user logs off from a usage session.

Trusted Platform Module: A security chip, embodied in hardware, that can perform security operations, including to create and store cryptographic keys.

Other Terms Appearing in Disclosure

Binding: Encrypting a message using a key.

Botnet: A group of computers compromised by an attacker.

Client/client computing device: A device containing software, memory, and a processor that is accessed by a user to interface, directly or indirectly, with a database. For example, a client/client computing device may include a PC, laptop, workstation, or smartphone.

Customer: A programmatic representation of a combination of a user and/or client and one or more security tokens associated with the user and/or client.

Location: A physical computing device. Examples of locations include clients, servers, and databases.

Merchandise Request: A programmatic representation of the type of data request a user seeks to perform. For example, a merchandise request may be to read, write, or execute operations on data in a database.

NP-complete problem: A problem for which, in a worst-case scenario, there is no known algorithm that can solve the problem in polynomial time. Generally, if a problem is NP-complete, there is no known algorithm for solving all instances of the problem efficiently in less than exponential time.

Pseudo-ID (PID): A unique identifier used for identification or authentication that may change over time and that is generated through a mathematical operation based on a permanent identifier. For example, a PID may be used to identify a user, a client, an application, content, or pieces of content.

Security Agent: A type of server that provides network security functionality in connection with a user request to access data and that is in networked communication with one or more other security agents or clients.

Security token: A physical object or programmatic construct that is used to identify, confirm the identity of, or authenticate one or more users. Examples of security tokens include passwords, PIDs, PINs, badges, and smart cards.

State: Memory contents of a location or virtual location, or the combination of contents of locations or virtual locations.

Super Security Agent: A type of server that provides network security functionality and is in networked communication with one or more security agents, super security agents, or databases.

Super state: A type of state that is a combination of states.

Transform: A mathematical operation which accepts a set of states and/or locations or virtual location as inputs and produces a set of states and/or locations or virtual locations as outputs.

User Agent Software: Software that runs on a client and that interfaces with security agents, super security agents, and/or databases.

Virtual location: A software object with memory storage and data processing capabilities. A virtual location is capable of residing in one or more different physical locations.

Xchain values: Values that are the product of mathematical operations and used by servers to identify, confirm the identity of, or authenticate actions taken by other servers.

Slave device: A member of a botnet.

Xslices: Portions of data removed from encrypted cyphertext and stored separately, in either contiguous or non-contiguous locations.

Xbits: Bits of seeds that are removed from seeds and stored in a separate location.

End of Glossary

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

At least one disclosed embodiment utilizes the concept of a space-time separated and jointly-evolving relationship to provide network defenses that can defend against attacks including zero-day and metamorphic attacks. A description thereof may be provided with reference to an exemplary implementation called the Intrusion-resilient, Denial-of-Service resistant, Agent-assisted Cybersecurity System (IDACS), but it should be understood that the IDACS implementation described herein is merely an illustrative example in accordance with the present disclosure.

In one respect, according to illustrative embodiments, network security systems may be designed by mathematically defining "correct" network access behavior for protected information and services, and blocking all other behavior. The mathematically-governed access behaviors may provide sufficient complexity to be unpredictable to attackers, but may be easily verified by the security system. This design may provide three mathematically-related capabilities: i) rigorous but fast network access control; ii) efficient real-time forensics capabilities; and iii) further protection of at-rest data in case of a network breach.

The mathematical design that provides this level of protection may be based on the theory of the Space-Time Separated and Jointly Evolving relationship. This theory calls for space-time evolving relationships between authentication credentials, file/database systems, and protected data in the realms of space and time to render the breaking of the access control system mathematically infeasible. Furthermore, this space-time separated and evolving relationship may be encoded into network application layer packets, and become a means for rapidly tracing attacks back to the source attacker, thus providing real-time forensics capability. The relationship may also determine the storage locations of protected data (e.g., in a cloud) and authentication credentials (e.g., on security tokens) in a time-evolving manner so that it becomes infeasible for attackers to decode the dynamic relationships. Hence, three distinct capabilities (or modules) of a security system may be described by a single principle of the space-time separated and evolving relationship.

IDACS leverages the space-time separated and jointly-evolving relationship to defend against these types of leaks of at-rest data. It also provides detection, traceback and accountability for the sources of data leaks. By separating encrypted data into pieces that are useless by themselves and storing them in separate and time-changing locations, IDACS can greatly increase the security of stored data. Herein is provided the principles and methods by which IDACS provides this data security, and it will provide proofs for the mathematical strength of these methods. Additionally, simulations will demonstrate the real-world effectiveness of such a system, even in the presence of a high number of insider traitors.

As mentioned above, IDACS may provide network security in three key areas: attack detection and prevention, digital forensics to identify the origin of the attack, and deep protection of at-rest encrypted data in case of a successful network breach and traceback to the source of leakage. IDACS combines these three aspects into a complex space-time relationship that provides mutual reinforcement between these aspects. A mathematical analysis of IDACS reveals that several facets of its network defense are NP-complete, presenting a potential attacker with an incredibly complex problem to solve. Multiple simulations of a fielded IDACS system demonstrate the high attack detection rate, network traitor identification rate, and data protection capabilities provided by this system.

Figure 1:
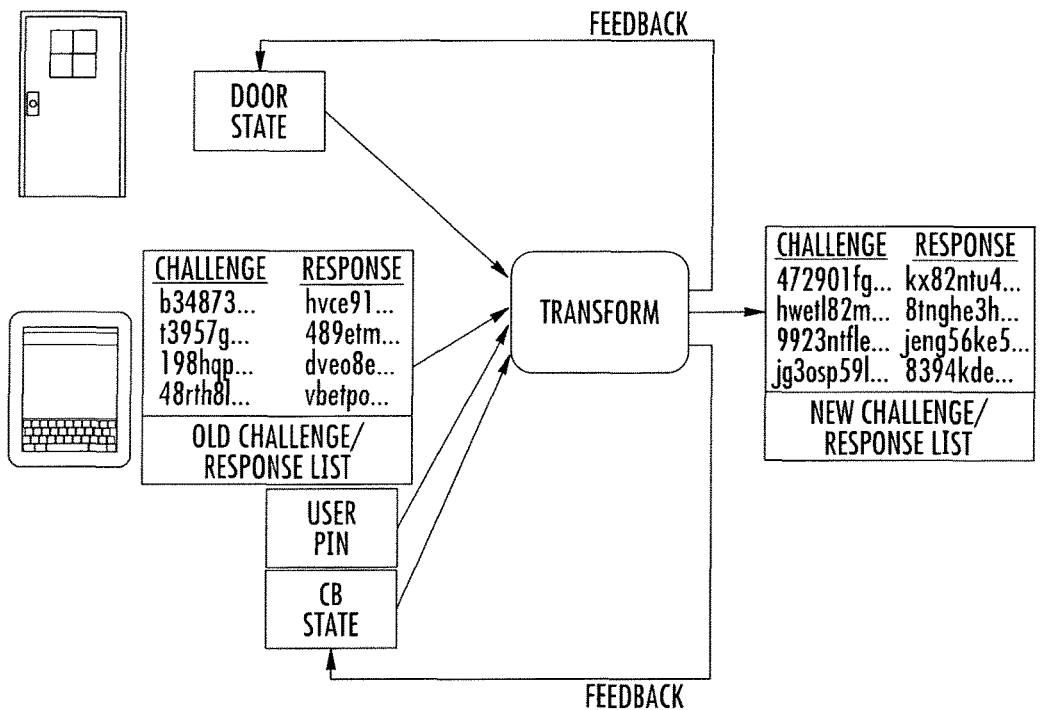
FIG. 1 depicts an example that explains the benefits and advantages of space-time separated and jointly evolving relationship concept involving a military-style restricted area that uses a challenge-response system to unlock the doors to restricted areas in accordance with the disclosure.

FIG. 1 depicts an example that explains the benefits and advantages of space-time separated and jointly evolving relationship concept involving a military-style restricted area that uses a challenge-response system to unlock the doors to restricted areas. In this example, any user U must carry an electronic codebook CB which contains a list of challenges and responses. This list is generated from a few cryptographic seeds unique to U as well as the U's PIN, the state of CB, and the state of the current door. Each door between restricted areas presents U with a challenge code; U must use CB to locate the corresponding response code to open the door. As soon as U opens the door, the state of the door and the state of CB are pseudo-randomly changed with forward secrecy, resulting in a new challenge-response list if U attempts to re-open this door. Additionally, the cryptographic seeds associated with U residing on CB are changed at regular time intervals (e.g., $\Delta t=1$ minute) with forward secrecy; these changes are propagated to all doors in the system. Each door presents U with multiple challenges, and multiple doors must be opened to access different restricted areas. Additionally, the system maintains logs of the histories of the CB state, the door states, and the challenge-response pairs; if an attacker A attempts to open a door using an older, stolen challenge-response pair, the door system can compare this pair to all previous challenge-response pairs to trace back where and when A stole this pair, thus identifying security breaches in the system.

IDACS similarly implements the concept of the space-time separated and jointly evolving relationship to achieve a high level of security in computer and information networks. Three aspects of IDACS facilitate this functionality. First, the space-time separated and evolving relationship is used as a basis for the IDACS Network Access Control protocol. By using multiple space-separated and time-evolving items for identifying an information or service access, e.g., file name and user ID, IDACS can efficiently allow legal access and block illegal access to the IDACS network. Second, the mathematical properties of the space-time separated and evolving relationship of the IDACS Network Access Control protocol provide a number of built-in forensics capabilities. Attacks by unauthorized users can be detected, blocked, traced back to the origin of the attack, and analyzed to determine what authentication items have been compromised, all in a very quick and efficient manner using the properties of this relationship. Third, IDACS uses the space-time separated and time-evolving relationship to protect at-rest encrypted data stored on network-connected devices (e.g., in the cloud or on PCs or mobile devices such as tablets or smartphones). IDACS uses jointly space-separated and time-evolving storage to store critical pieces of at-rest ciphertext in the IDACS network so that reassembling and decrypting the mutated ciphertext without access to the distributed pieces spread in the cloud is mathematically infeasible.

The space-time separated and evolving relationship aspect of authentication seeds is transparent to legitimate users, but it presents a virtually insurmountable barrier to attackers due to the NP-completeness of generating authentication credentials as well as the encoded file/database systems using space/time-varying IDs, locations, and protections. Additionally, this relationship aspect of authentication seeds and states contributes to the speed of the IDACS forensics capabilities.

Space separation can be understood by way of reference to computer access systems in which a user is required to have a password. One method would involve giving each user a unique password, such as a password tied to a user-specific username. By issuing different login credentials to different users, space separation of login credentials is achieved.

Another space separation concept is realized in a computer access system that has multiple authentication agents. For example, a system may require a user to authenticate with several authentication servers. The user may need to authenticate with each authentication server before access is granted to the system. Each authentication server may require a unique password or other authentication credential from the user; thus, possession of multiple passwords may be required for the user to use the system. In this manner, space separation of login credentials may be accomplished.

Time separation can be explained with reference to One-Time Passwords (OTP). In a OTP authentication system, a user may be given an OTP that may allow access to the computer system. Once the OTP has been used, it may be valid for a short period of time (e.g. $t=60$ seconds). After the OTP time period has expired, the OTP may no longer be used to login, either by a legitimate user or an attacker that has managed to steal the OTP.

Figure 2:
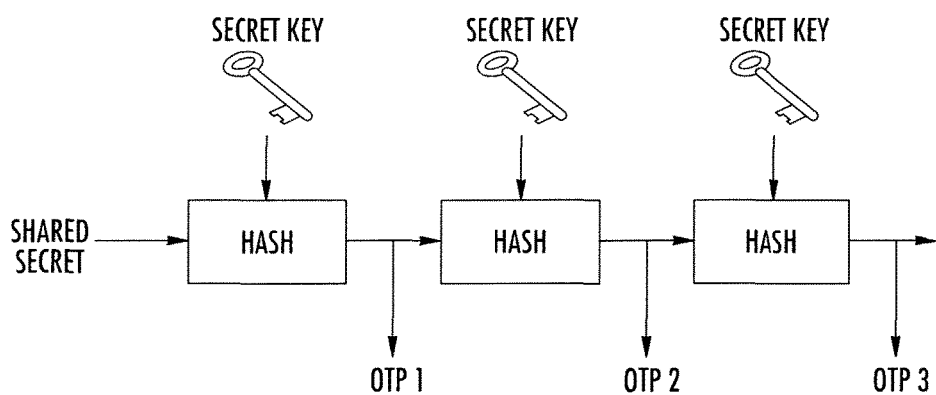
FIG. 2 shows a use of time separation that may involve a hash chain in accordance with the disclosure.

FIG. 2 shows a use of time separation that may involve a hash chain. In a hash chain, a user and an authentication server share some secret information. The user is able to login to the authentication server by hashing the secret information into an OTP. Once this OTP has been used, it may no longer be valid for login. At the next login session, the User may need to hash the old OTP with the secret information to form a new OTP. OTPs are invalid after the first use, so an intercepted OTP is of no use to an attacker. Even if an attacker manages to get his hands on a valid, unused OTP, it may be useful for only one attack; future OTPs may not be able to be derived without knowledge of the shared secrets.

Figure 3:
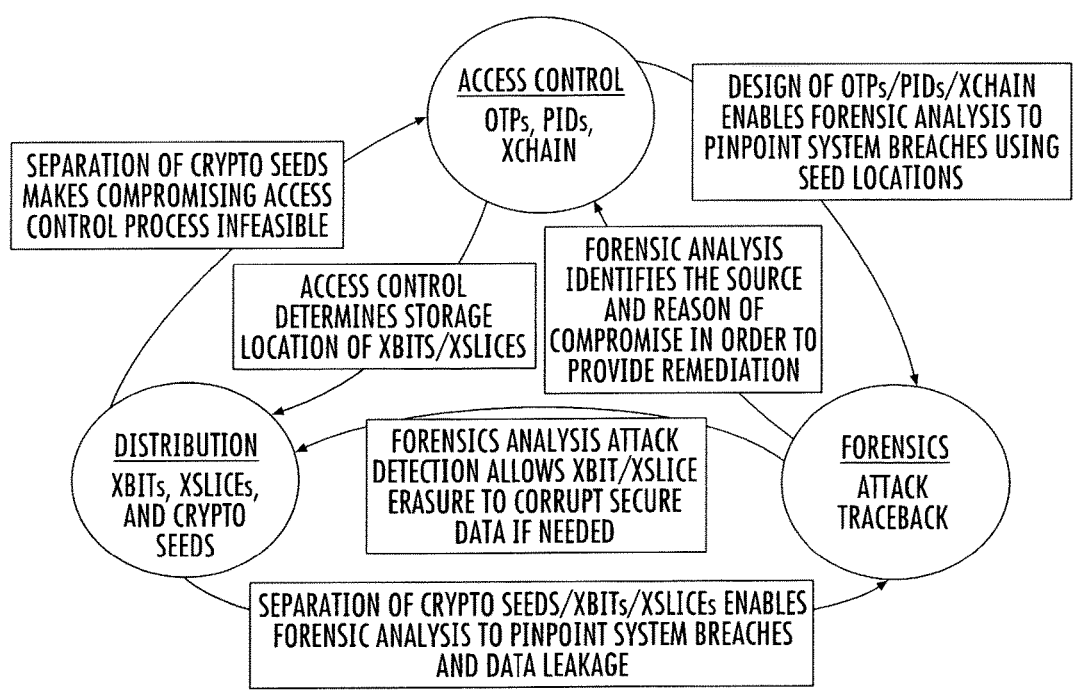
FIG. 3 shows three modules of an Intrusion-resilient, DOS-resistant, Agent-assisted Cybersecurity System (IDACS) that are interconnected using the space/time relationship and provide mutual support for each other, including an Access Control module, a Forensics module, and a Distribution module in accordance with the disclosure.

FIG. 3 shows three modules of IDACS that are interconnected using the space/time relationship and provide mutual support for each other, including an Access Control module, a Forensics module, and a Distribution module. The IDACS network and these modules are discussed in more detail below. Generally, the systems, components, and methodologies discussed herein represent improvements over alternative systems, including Intrusion Detection and Prevention systems, many of which use two major methods for attack detection: signatures and/or statistics. Both these approaches focus on the characteristics of illegal activity. In today's threat environment, however, new threats are cropping up at a prodigious rate, and many attacks go undetected by signature- or statistics-based methods. The systems, components, and methodologies discussed herein, in contrast to alternatives, apply the idea of space-time separated and jointly evolving relationships to mathematically define and permit only "correct" network access. Network authentication and authorization are spread across space (e.g., multiple network authentication points) and time (e.g., time-evolving authentication credentials) with joint evolution between the space and time parameters to make "correct" network behavior and its history mathematically infeasible for an attacker to reconstruct.

The systems, components, and methodologies discussed herein also provide benefits and improvements in connection with real-time forensics for attack traceback capabilities and attack report correlation and aggregation capabilities. In contrast to alternative systems for digital forensics and attack report correlation, the space/time relationships exploited in accordance with the present disclosure have not been previously leveraged to provide speed and accuracy and to avoid ambiguity.

The systems, components, and methodologies provide still other benefits and improvements in connection with distributed data storage. Whereas alternative distributed data storage systems focus on scalability and redundancy for integrity and availability, the present disclosure addresses distributed storage for security purposes.

The following characterizations and notation are used as the basis for the description of the exemplary IDACS network discussed herein. As explained, the IDACS network is merely an illustrative embodiment in accordance with the present disclosure, and the characterizations provided below are to facilitate an explanation of the exemplary IDACS network.

Characterization 1: A location for the purpose of this exemplary description is a physical device with an associated physical location. The physical device includes memory storage and data processing capabilities. A virtual location for the purpose of this exemplary description is a software object with memory storage and data processing capabilities. A virtual location is capable of residing in different physical locations.

Characterization 2: A state for the purpose of this exemplary description represents the PID (Characterization 3) and memory contents associated with a piece of data that can change over time. It can also represent the memory contents of a physical location. The relationship between states and locations is further explained in Characterization 17.

Characterization 3: A location or state may be represented by a permanent, well-protected ID, or by a time-changing Pseudo-ID (PID). The PID may be computed according to a variety of methods. In illustrative embodiments, both a user and a client are assigned several different permanent IDs upon registration with the IDACS system. The user and client may hash these permanent IDs together with other pieces of secret and time-dependent information to generate time-changing PIDs. These PIDs may be used for both identification and authentication when the User attempts to log into the IDACS system. These PIDs may change between secure communication sessions as the secret time-dependent information changes. On user login, the user and/or client may exchange these PIDs with security agents via an encrypted tunnel. According to an embodiment in accordance with the present disclosure, the PID is derived by PID(A)=hash(ID(A), crypto seeds, time-changing sequence number)

However, other computational techniques for generating the PID are within the scope of the present disclosure.

As used herein, PID(A) may also be represented implicitly as A. Specific exemplary applications of PIDs are discussed in Characterization 21.

Characterization 4: A transform for the purpose of this exemplary description is a mathematical operation which accepts a set of states and/or locations as inputs and produces a set of states and/or locations as outputs. In this form. For example, a transform that computes a cryptographic hash of the inputs would be called F-box(hash), with "hash" being represented as $\mathbf{H}$ash; the remaining parameters would detail the inputs to the hash function.

$$\text{output} = F\text{-box}(\mathbf{H}\text{ash, input data})$$

Transforms may be combined in a particular order to form new transforms. For example, a given transform may involve a lookup ($\mathbf{L}$ookup) followed by a concatenate ($\mathbf{C}$oncat) of the outputs of the lookup. Transforms may be combined according to the following notation:

$$\text{output} = F\text{-box}(\mathbf{L}\text{ookup} \cdot \mathbf{C}\text{oncat, input\_1, input\_2, input\_3})$$

Many transforms make changes to their input superstates (e.g., $\mathcal{S}\text{Cust}_\psi$, as discussed in Characterization 17), although these changes are abstracted in this notation.

Characterization 5: Some variables discussed in connection with this exemplary description are a function of other variables; that is, if the value of variable A is a function of the values of variable B and time t, then the value of A depends on the value of B at time t. For the purpose of this exemplary description, this relationship is represented by the notation A:f(B, t).

This relationship implies that B is the input to an F-box( ) that is used to calculate the value of output A.

Characterization 6: A set of elements $\overline{E} = \{E_1, E_2, \ldots E_\chi\}$ is used in this exemplary description to refer to a collection of elements. An ordered set, for the purpose of this exemplary description, shall be characterized as a set where the ordinality (order) of the elements in the set is one of the attributes of the set. Changing the ordinality of the members of $\overline{E}$ creates a different set $\overline{E}'$. Therefore, if $\overline{E} = \{E_1, E_2, E_3\}$ and $\overline{E}' = \{E_3, E_1, E_2\}$, then $\overline{E} \neq \overline{E}'$. Unless specified, all sets are unordered.

Figure 4:
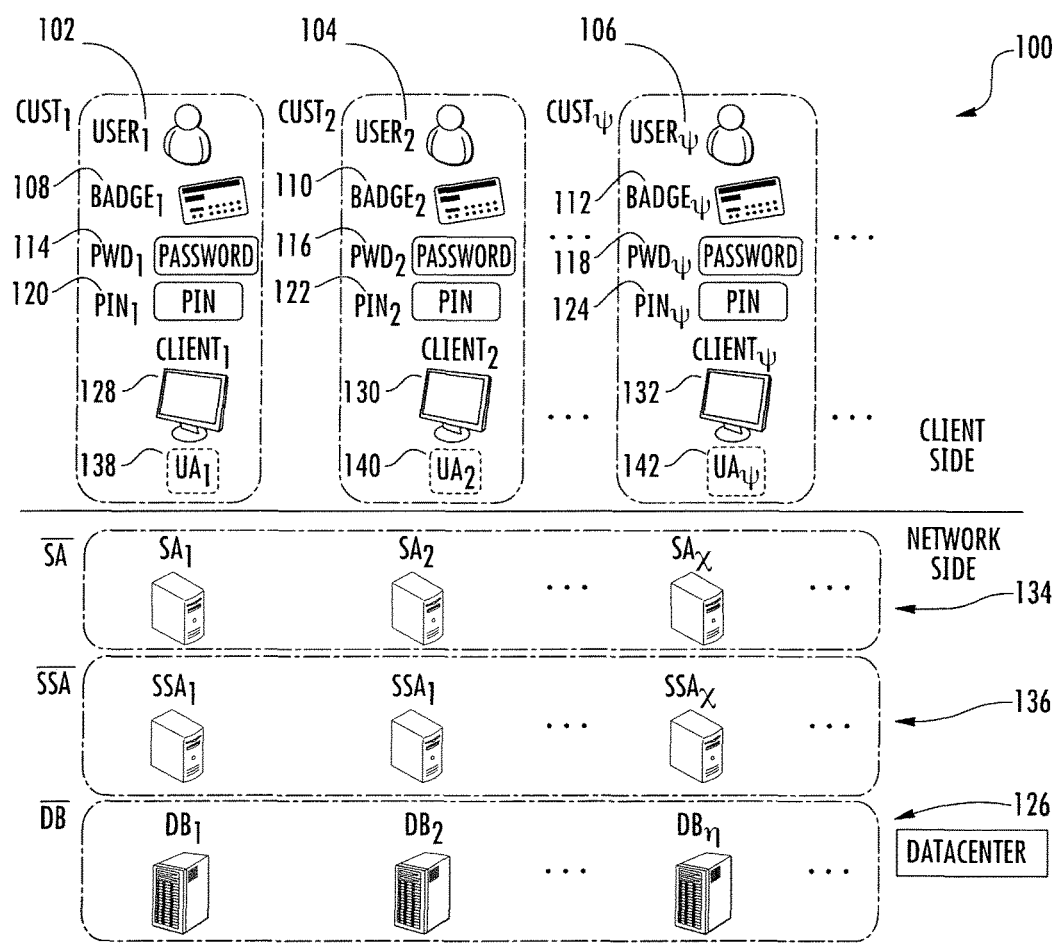
FIG. 4 provides an overview of the IDACS system architecture and shows the network entities that compose the IDACS Network in accordance with the disclosure.

FIG. 4 provides an overview of the IDACS system architecture and shows the network entities that compose the IDACS Network. These items are characterized in Characterization 7 to Characterization 16. Given the IDACS Network, it contains the elements shown in Table 1.

TABLE 1

IDACS System Elements

| | ... a set of | ... termed | ... which are | There are | The set of | ... is represented as |
|---|---|---|---|---|---|---|
| Characterization 7 | Servers | Security Agents (SAs) | locations. | q SAs $SA_\chi$, $\chi \in [1, q]$. | $SA_\chi$ | $\overline{SA} = \{SA_1, SA_2, \ldots, SA_q\}$ |
| Characterization 8 | Servers | Super Security Agents (SSAs) | locations. | n SSAs $SSA_\kappa$, $\kappa \in [1, n]$. | $SSA_\kappa$ | $\overline{SSA} = \{SSA_1, SSA_2, \ldots, SSA_n\}$ |
| Characterization 9 | Servers | Databases | locations. | h Databases $DB_\gamma$, $\gamma \in [1, h]$ | $DB_\gamma$ | $\overline{DB} = \{DB_1, DB_2, \ldots, DB_h\}$ |
| Characterization 10 | Humans | Users | humans. | u Users, $User_\omega$, $\omega \in [1, u]$. | $User_\omega$ | $\overline{User} = \{User_1, \ldots, User_u\}$ |
| Characterization 11 | Computers/ Devices | Clients | locations. | z Clients, $Client_\rho$, $\rho \in [1, z]$. | $Client_\rho$ | $\overline{Client} = \{Client_1, \ldots, Client_z\}$ |
| Characterization 12 | Smartcards | Badges | locations. | y Badges $Badge_\zeta$, $\zeta \in [1, y]$. | $Badge_\zeta$ | $\overline{Badge} = \{Badge_1, \ldots, Badge_y\}$ |
| Characterization 13 | user passwords | | states. | θ User Passwords $Pwd_\theta$, $\theta \in [1, w]$. | $Pwd_\theta$ | $\overline{Pwd} = \{Pwd_1, Pwd_2, \ldots, Pwd_w\}$ |
| Characterization 14 | Badge PINs | | states. | x Badge PINs $PIN_\lambda$, $\lambda \in [1, x]$. | $PIN_\lambda$ | $\overline{PIN} = \{PIN_1, PIN_2, \ldots, PIN_x\}$ | disclosure, transforms may be represented by the notation F-box( ). In this notation, the parentheses contain a number of parameters which are inputs to the transform. The first parameter defines the actual internal operation of the trans- Certain properties apply for the exemplary IDACS network.

Property 1: In the exemplary IDACS network, the $Pwd_\theta \in \overline{Pwd}$ and the $PIN_\lambda \in \overline{PIN}$ are stored in the brains of $User_\omega \in$ User, and need not be stored at any other location. However, cryptographic hashes of all $Pwd_\theta \in \overline{Pwd}$ and all $PIN_\lambda \in \overline{PIN}$ are stored at locations (SAs and SSAs) that are used to verify these $Pwd_\theta$ and $PIN_\lambda$. This space-separated relationship allows $Pwd_{74}$ and $PIN_\lambda$ to be verified when they are provided by $User_\omega$, without providing useful information (due to the one-way property of the cryptographic hash) to an attacker who gains access to a location's memory contents.

Characterization 15: Given the IDACS Network, when $User_{107}$, seeks to use $Client_\rho$ to communicate with the IDACS servers at time t, $Client_\rho$ downloads a unique User Agent software program $UA_\beta$ from the network. This $UA_\beta$ handles communications between $Client_\rho$ and the IDACS servers. $UA_\beta$ is considered a virtual location. $UA_\beta$ is a function of $User_\omega$, $Client_\rho$, and time, thus $UA_\beta$: $f(User_\omega, Client_\rho, t)$. $UA_\beta$ is the entity that performs most of the operations on the client side in the IDACS Network, so the following characterizations and procedures in this illustrative discussion references a single $UA_\beta$.

Characterization 16: Given the IDACS Network, at time t there are c sets of $User_\omega$, $Client_\rho$, $Badge_\varsigma$, $Pwd_\theta$, $PIN_\lambda$, and $UA_\beta$ (denoted as $\{User_\omega, Client_\rho, Badge_\varsigma, Pwd_\theta, PIN_\lambda, UA_\beta\}$) that are authorized to access the network. These combinations are termed Customers $Cust_\psi$, $\psi \in [1, c]$. $Cust_\psi$ is considered a state. Since $Cust_\psi$ represents a combination of the other parameters, $Cust_\psi$: $f(User_\omega, Client_\rho, Badge_\varsigma, Pwd_\theta, PIN_\lambda, UA_\beta, t)$.

Characterization 17: Given the locations characterized in the IDACS network, some of the following characterizations depend on the state that describes the configuration and memory contents of a combination of certain locations. These states represent a combination of other states as characterized in Characterization 2, so for purposes of the present illustrative discussion, they are termed super-states. The symbol $\mathcal{S}$ represents the super-state covering the entire IDACS system, with other symbols representing more narrowly-defined super-states that are subsets of $\mathcal{S}$, e.g., $\mathcal{S}Client_\rho$ represents the state of $Client_\rho$ in combination with $UA_\beta$.

$$\mathcal{S}_{Client_\rho}: f(Client_\rho, UA_\beta, t)$$

The characterization of $\mathcal{S}$ depends mainly on the memory contents of different locations and the results of the lookup transform as characterized in Characterization 24. Similar notation is used for $Badge_\varsigma$, $\overline{Badge}$, $PIN_\lambda$, $\overline{PIN}$, $Pwd_\theta$, $\overline{Pwd}$, $SA_\chi$, $\overline{SA}$, $SSA_\kappa$, and $\overline{SSA}$. These super-states represent the basis of the space-time separated and jointly evolving relationship in IDACS.

As explained, the locations, states, transforms, notations, and characterizations are merely provided to facilitate discussion of the illustrative IDACS network. They are summarized in Table 2 for reference.

TABLE 2

Summary of Notation

| Symbol | Name | Type | Description |
|---|---|---|---|
| $SA_\chi$ | Security Agent | Location | Network-side authentication machine |
| $SSA_\kappa$ | Super Security Agent | Location | Network-side authorization machine |
| $DB_\gamma$ | Database | Location | Network-side data storage machine |
| $User_\omega$ | User | Human | Human User of the IDACS network |
| $Client_\rho$ | Client computer | Location | Client-side computer (laptop, smartphone, etc.) |
| $Badge_\varsigma$ | User Badge | Location | Client-side smartcard security badge |
| $Pwd_\theta$ | User Password | Location | Client-side password |
| $PIN_\lambda$ | Badge PIN | State | Client-side PIN entered into User Badge |
| $UA_\beta$ | User Agent | virtual location | Small software application downloaded from IDACS Network to Client computer to perform security operations |
| $Cust_\psi$ | Customer | State | Combination of $User_\omega$, $Client_\rho$, $Badge_\varsigma$, $Pwd_\theta$, $PIN_\lambda$, and $UA_\beta$, authorized to access the ID CS Network |
| $Seed_\sigma$, $\overline{Seed_\chi}$, $\overline{Seed_\epsilon}$, $\overline{Seed_\chi} \diamond PIN_\lambda$, $Seed_\epsilon \diamond Badge_\varsigma$ | Seed | State | Cryptographic seed stored on $Client_\rho$, $Badge_\varsigma$, $SA_\chi$, or $SSA_\kappa$ or derived from $Pwd_\theta$ or $PIN_\lambda$ |
| $\mathcal{S}$, $\mathcal{S}Client_\rho$, $\mathcal{S}\overline{Client}$ | Super-state | State | Represents a combination of states |
| $Ticket_\psi$ | Client Security Ticket | State | Data structure used to send, authenticate, and authorize a data or service request from $Cust_\psi$ to IDACS Network |
| $Req_\psi$ | Merchandise Request | State | Data request that specifies target data and desired operation |
| $OTP_\chi$, $\overline{OTP_\psi}$ | One-Time Password (OTP) | State | Used to authenticate $Cust_\psi$ with all $SA_\chi$ in $\overline{SA}$ |
| $PID_\epsilon$, $\overline{PID_\psi}$ | Pseudo-ID (PID) | State | Used to authorize $Cust_\psi$ and $Req_\psi$ with $\overline{SA}$ and $\overline{SSA}$ |
| N | Authentication Chain Length | State | Length of Authentication Chain, i.e. how many SAs and SSAs are in the approach and return authentication chains |
| Key(A, B) | Shared cryptographic key | State | Cryptographic key shared between locations A and B |
| $XV_1$ | Xchain value | State | Cryptographic hash value calculated for authentication between machines in $\overline{SA}$ and $\overline{SSA}$ |
| $TK_2$ | Network Security Ticket | State | IDACS network message containing $Ticket_\psi$ and XV values |
| $\backslash TK_2 \backslash$ | Packet record | State | Log record of the critical attributes of an IDACS network message |
| F-box(Lookup) | Lookup transform | Transform | Based on certain inputs (super-states), returns a particular ordered set of seeds from a location or state |

TABLE 2-continued

Summary of Notation

| Symbol | Name | Type | Description |
|---|---|---|---|
| F-box(Concat) | Concatenate transform | Transform | Concatenates a set of objects |
| F-box(Hash) | Hash transform | Transform | Performs a cryptographic hash on the inputs |
| F-box(Next) | Next-SA-SSA transform | Transform | Calculates the next SA or SSA in the authentication chain |
| F-box(Insert) | Insert Log Record transform | Transform | Inserts a packet record \TK\ for received network message TK into a location's security logs |
| F-box(Rtrv) | Retrieve Log Record transform | Transform | Retrieves a packet record from a location's security logs based on specified search criteria |
| F-box(Mrand) | Random transform | Transform | Returns a random byte string |
| F-box(Offset) | Data Block Offset transform | Transform | Returns the length of the next Data Block |
| F-box(XLth) | Xslice Length transform | Transform | Returns the length of the next Xslice |
| F-box(SString) | Substring transform | Transform | Returns a substring of the input string |
| F-box(Encrypt) | Encrypt transform | Transform | Encrypts the input data with the input key |
| $A \diamond B$ | | Notation | Data block A is stored at location/state B |
| $A \rightarrow B: C$ | | Notation | Location A sends message C to location B |
| $\overline{E} = \{E_1, E_2, \ldots\}$ | | Notation | Notation indicating a set of objects |

Client-side operations of IDACS. Details are now provided regarding how the IDACS Network Access Control protocol is handled for Customer authentication and authorization to allow customers to access data or services residing on a DB.

Characterization 18: Given the set $\overline{Cust}$, for $Cust_\psi$ to initiate communications with the IDACS servers (SAs and SSAs) and perform network actions (e.g., Read/Write/Execute a piece of data on $DB_\gamma$), $Cust_\psi$ will present a Client Security Ticket $Ticket_\psi$ to the IDACS network. $Ticket_\psi$ is considered a state. $Ticket_\psi$ is a function of both $Cust_\psi$ and time t; thus, $Ticket_\psi$:$f(Cust_\psi, t)$. $Ticket_\psi$ is the set containing the sets $\overline{OTP_\psi}$ and $\overline{PID_\psi}$, and the state $Req_\psi$ (all characterized in the following characterizations); i.e. $Ticket_\psi = \{\overline{OTP_\psi}, \overline{PID_\psi}, Req_\psi\}$.

Characterization 19: $Ticket_\psi$ uses a Merchandise Request $Req_\psi$ which communicates the specifics of the desired network action. $Req_\psi$ is considered a state. $Req_\psi$ specifies the request type (e.g., Read/Write/Execute a piece of data on $DB_\gamma$), the unique PID for $Cust_\psi$, the Content($PID_\epsilon$) tied to the specified data (as characterized in Characterization 22), and the data itself. The mechanics of the formation of $Req_\psi$ also depend on $\mathcal{S}Cust_\psi$; $Req_\psi$: $f(\mathcal{S}Cust_\psi, \overline{PID_\psi})$.

Characterization 20: $Ticket_\psi$ uses a set $\overline{OTP_\psi}$ of q One-Time Passwords (OTP) $OTP_\chi$, $\chi \in [1, q]$. The One-Time Password (OTP) may be a per-packet password that authenticates the user or client with an individual security agent. The client or user may have an authentication relationship with each security agent, in that each relationship may consist of an independently established set of keys and sequence number, which provides space separation. The OTP may be a hash of previously established keys and sequence number. The sequence number may increment for each packet; thus, the OTP may be different for each packet, which provides time separation. Additionally, the keys may be changed after each secure session initiated by a client or user, which provides time separation. Possession of the correct keys, which are secrets, and the correct sequence number, which is not a secret, may be used to calculate the OTP.

Since $OTP_\chi$ are data structures, they are considered states. These $OTP_\chi$ are used for pairwise authentication between $Cust_\psi$ and each $SA_\chi$. Each calculated $OTP_\chi$ is a function of the $Cust_\psi$ calculating it, the $SA_\chi$ which will be verifying it, and time t; thus, $OTP_\chi$:$f(Cust_\psi, SA_\chi, \chi, t)$. The set $\overline{OTP_\psi}$ of $OTP_\chi$ for all $SA_\chi$, which is calculated by the $UA_\beta$ associated with $Cust_\psi$ is represented as $\overline{OTP_\psi} = \{OTP_1, OTP_2, \ldots, OTP_q\}$. $\overline{OTP_\psi}$: $f(Cust_\psi, \mathcal{S}\overline{SA}, t)$. Algorithm 2 illustrates an exemplary procedure by which $OTP_\chi$ is calculated.

Characterization 21: $Ticket_\psi$ uses a set $\overline{PID_\psi}$ of r Psuedo IDs (PID) $PID_\epsilon$, $\epsilon \in [1, r]$. Since $PID_\epsilon$ are data structures, they are considered states. These $PID_\epsilon$ are used for access control; they verify the identity of $Cust_\psi$ as well as the permissions of $Cust_\psi$ to perform the requested network action in $Req_\psi$, and they identify the information associated with $Req_\psi$ residing on $DB_\gamma$. Each calculated $PID_\epsilon$ is a function of the associated $Cust_\psi$ and $Req_\psi$, the index $\epsilon$, and time t. Thus, $PID_\epsilon$: $f(Cust_\psi, Req_\psi, \epsilon, t)$. The set $\overline{PID_\psi}$ of $PID_\epsilon$ calculated by the $UA_\beta$ associated with $Cust_\psi$ to authorize with the network is represented as $\overline{PID_\psi} = \{PID_1, PID2, \ldots, PID_r\}$. $\overline{PID_\psi}$: $f(Cust_\psi, Req_\psi, t)$. Algorithm 3 illustrates an exemplary procedure by which $PID_\epsilon$ is calculated.

Characterization 22: Given $\overline{PID_\psi}$, one of the $PID_\epsilon$ in $\overline{PID_\psi}$ is tied to the specific piece of data (merchandise) specified in $Req_\psi$. This particular $PID_\epsilon$ is called for purposes of the present illustrative discussion the Content PID; it is represented by Content($PID_\epsilon$). Generally, each piece of sensitive information in the database may be identified by a Content ID (CID) which may be unique both to the information and to each user allowed to access that information. A piece of sensitive information may exist in one place, or it may be split into several pieces with each piece having a unique Content ID and residing in different locations on a single database or in locations across multiple databases, which provides space separation. In accordance with embodiments disclosed herein, a user requesting access to the sensitive information may need the current Content Pseudo IDs (PIDs) that are associated with the permanent Content IDs. Changing these Content PIDs after each data access may add more security to the system through time separation.

The Content PID indicates the data being accessed in a Read or Execute operation, or establishes a data PID for future reference in a Write operation. Permission is granted to different $Cust_\psi$ to access different pieces of data residing on $DB_y$; checking the permissions of $Cust_\psi$ to access a requested piece of data is part of the IDACS Network Access Control mechanism. To protect Content($PID_\varepsilon$) for data residing in $\overline{DB}$ from attacks against relatively less-protected SAs, the information needed to calculate Content($PID_\varepsilon$) may in illustrative implementations reside only on the relatively better-protected SSAs; in such implementations, only SSAs are capable of verifying Content($PID_\varepsilon$). Such an implementation is reflected in the discussion of simulations, herein.

Access to sensitive information may also be controlled by means of authorization privileges (permissions). The SSAs may maintain an Access Control List, which may specify which clients and which users are permitted to access which pieces of sensitive information. The SSAs may also share this list with the SAs. Whenever an SA or an SSA handles an information access request, the calling client and/or user may be checked against the Access Control List for the requested piece of information.

Pieces of information residing in the database may be tied to a unique Content ID, and accessible by one or more, though perhaps not all, user/client combinations, which provides space separation. When a user attempts to access a piece of information, the user may be required to provide a collection of different authorization items proving permission to access the information. Each SA and SSA may thus possess a copy of an Access Control List (ACL), which may contain entries corresponding to the information on the Database and the related Content IDs. The ACL record may consist of several time-varying authorization PIDs, which provides time separation, associated with both the information's permanent Content ID and the user/client identity, all of which the user/client may be required to provide correctly to be authenticated by the SA or SSA. Because the ACL records may change with space and time, attacks against IDACS may be exponentially more difficult, as discussed herein.

The ACL may contain entries that contain the following fields: User PID, Host PID, Source IP Address, Destination IP Address, Current Application PID, Parent Application PID, Content PID, Network protocol PID, Host Statement of Health, Host OS PID, Network path (PIDs of SAs and SSAs), Valid Time Period when Information Can Be Accessed. All of the above-mentioned PIDs may be generated by hashing different pieces of information tied to a particular PID, such as the permanent ID associated with that PID, the time-varying secret associated with that PID (changed each time a new client-SA security tunnel is established), a transaction number that may monotonically increase with each transaction (read or write operation), and a publically-known permanent string associated with that type of PID. The different types of PIDs may equate to the different "flavors" (F) as discussed herein. In illustrative embodiments, for the above-mentioned PIDs, a $PID_k$ may be computed in the following way:

$$PID_k = h^2(PID\_secret_k, ID_k, \text{Transaction number}_k, PID\text{--specific\_string}_k)$$

Here, "$h^2(M)$" indicates M being hashed twice. When known and secret items are hashed together, it may be easier to reverse engineer the secret items if the known information is put at the beginning of the hash. Therefore, in this illustrative embodiment, the secrets are placed at the beginning of the hash. These four items are generated by one of the SSAs and distributed to the client and relevant SAs and SSAs at the client's request. The method for distributing these items discussed further herein. Additionally, these items may be stored in a distributed (space-separated) manner on both the client and SAs. The distributed storage may contribute to the security of the system, and may also assist in the traceback algorithms to be discussed herein.

Property 2: Although $\overline{OTP_\psi}$, and $\overline{PID_\psi}$, are calculated similarly, they serve separate functions in this illustrative embodiment. In this embodiment, the elements of $\overline{OTP_\psi}$ are used for authentication to verify the identity of $Cust_\psi$, while the elements of $\overline{PID_\psi}$ are used for access control to verify that $Cust_\psi$ is allowed to perform the action specified in $Req_\psi$ on the data specified by Content($PID_\varepsilon$). Thus, in this exemplary implementation, $\overline{OTP_\psi}$ provides space-time separated and evolving authentication (Property 3), while $\overline{PID_\psi}$ provides per-customer and per-data access control which enforces broader group-based access policies.

Notation: When a piece of data A is stored at a location or state B at time t, for purposes of the present description, this is indicated by the notation $A \diamond (B, t)$. However, the time parameter is often abstracted, so the notation may be simplified to $A \diamond B$.

Characterization 23: Given $\overline{Client}$, every $Client_\rho$ can store up to $\zeta$ cryptographic seeds $Seed_\sigma$, $\sigma \in [1, \zeta]$. $Seed_\sigma$ is considered to be a state. The set of all $Seed_\sigma \diamond Client_\rho$ is represented as $\overline{Seed} \diamond Client_\rho = \{Seed_1 \diamond Client_\rho, Seed_2 \diamond Client_\rho, \ldots, Seed_\zeta \diamond Client_\rho\}$. These relationships are represented by $Seed_\sigma \diamond Client_\rho$: $f(Client_\rho, t)$ and $\overline{Seed} \diamond Client_\rho$: $f(Client_\rho, t)$. All $Badge_\zeta$ can also store a set $\overline{Seed} \diamond Badge_\zeta$ of $Seed_\sigma \diamond Badge_\zeta$, so $Seed_\sigma \diamond Badge_\zeta$: $f(Badge_\zeta, t)$ and $\overline{Seed} \diamond Badge_{70}$: $f(Badge_\zeta, t)$. Additionally, $Seed_\sigma$ can be derived from $Pwd_\theta$ and $PIN_\lambda$ by applying the cryptographic hash function to a concatenation of $Pwd_\theta$ or $PIN_\lambda$ with pseudo-random nonces and time-evolving sequence numbers. Thus, $Seed_\sigma \diamond Pwd_\theta$: $f(Pwd_\theta, t)$, $\overline{Seed} \diamond Pwd_\theta$: $f(Pwd_\theta, t)$, $Seed_\sigma \diamond PIN_\lambda$: $f(PIN_\lambda, t)$, and $\overline{Seed} \diamond PIN_\lambda$: $f(PIN_\lambda, t)$.

Characterization 24: Given the sets $\overline{Pwd}$, $\overline{PIN}$, $\overline{Badge}$, or $\overline{Client}$, each $Pwd_\theta$, $PIN_\lambda$, $Badge_\zeta$, or $Client_\rho$ stores (q+r) ordered sets $\overline{Seed}_{OTP,\chi}$ or $\overline{Seed}_{PID,\varepsilon}$ each consisting of j seeds $Seed_\sigma \diamond Pwd_\theta$, $Seed_\sigma \diamond PIN_\lambda$, $Seed_\sigma \diamond Badge_\zeta$, or $Seed_\sigma \diamond Client_\rho$. Each set is used to calculate one $OTP_\chi$ or one $PID_\varepsilon$, respectively. The F-box(lookup) transform takes the item type (OTP or PID), the index ($\chi$ or $\varepsilon$), the superstate $\mathcal{S}Client_\rho$, $\mathcal{S}Badge_\zeta$, $\mathcal{S}PIN_\lambda$, or $\mathcal{S}Pwd_\theta$ (which provides the seeds and states), and $\mathcal{S}Cust_\psi$ (which determines the order of the seeds in different $\overline{Seed}_{OPT,\chi}$ and $\overline{Seed}_{PID,\varepsilon}$) as inputs; and outputs the ordered set of $Seed_\sigma$ which corresponds to the item type and index. This transform is represented by $$\overline{Seed}_{OTP,\chi} \diamond Client_\rho = F\text{-box}(\mathbf{L}\text{ookup}, \mathcal{S}Cust_\psi, \mathcal{S}Client_\rho, OTP_{,102})$$

where $\mathcal{S}Client_\rho$ can be replaced by $\mathcal{S}Badge_\zeta$, $\mathcal{S}PIN_\lambda$, or $\mathcal{S}Pwd_\theta$, and $(OTP_{,\chi})$ may be replaced by $(PID, \varepsilon)$. For some combinations of inputs, the output set may be an empty set, i.e. j=0 and $\overline{Seed}_{OTP,\chi} \diamond Client_\rho = \emptyset$.

Property 3: The members of $\overline{Seed}_\chi \diamond Client_\rho$, $\overline{Seed}_\varepsilon \diamond Badge_\zeta$, etc. are not necessarily stored consecutively in their respective locations; they are stored randomly in that location's memory. Additionally, based on the IDACS state history and nonces, their positions in memory may change in time with forward secrecy. This provides the space-time separation and the space-time joint evolution of IDACS.

Because of this, the F-box($\mathbf{L}$ookup) transform is non-trivial for an attacker to break (see Theorem 1, below).

Characterization 25: Given a group of n generic objects $O_1, O_2, \ldots, O_n$, the F-box(concatenate) transform accepts this group of objects as input and outputs the objects concatenated into an ordered set. The generic objects may be individual objects, or they may be sets of objects. In equation notation, the "concatenate" is represented by $\mathcal{C}$oncat. For example, $$\overline{Seed}OTP;\chi = F\text{-box}(\mathcal{C}\text{oncat}, \overline{Seed}_{OTP,\chi} \Diamond \text{Client}_\rho,$$
$$\overline{Seed}_{OTP,\chi} \Diamond \text{Badge}_\zeta, \overline{Seed}OTP;\chi \Diamond \text{PIN}_\lambda,$$
$$\overline{Seed}_{OTP,\chi} \Diamond \text{Pwd}_\theta) \overline{OTP}_\psi = F\text{-box}(\mathcal{C}\text{oncat},$$
$$OTP_1, OTP_2, \ldots, OTP_n)$$

Characterization 26: The F-box(random) transform generates a random byte array. For this illustrative embodiment, the array may be 256 bits long (corresponding to the SHA-256 hash algorithm).

$$XV_1 = F\text{-box}(\mathcal{m}\text{rand})$$

Characterization 27: Given a generic set of inputs, the F-box(hash) transform applies a cryptographic hash function (e.g., SHA-256) to a byte array representation of the inputs and outputs the resulting byte array.

$$\text{output} = F\text{-box}(\mathcal{H}\text{ash, inputs})$$

A specific instance of this transform operates as follows. Given an item type OTP or PID of index $\chi$ or $\varepsilon$, the transform accepts the item type(OTP or PID), the index ($\chi$ or $\varepsilon$), and the associated set of $\overline{Seed}_{OTP,\chi}$ or $\overline{Seed}_{PID,\varepsilon}$ as inputs. The output $OTP_\chi$ or $PID_\varepsilon$ is calculated by applying the cryptographic hash to $\overline{Seed}_{OTP,\chi}$ or $\overline{Seed}_{PID,\varepsilon}$ combined with well-known (system-wide for IDACS and publically known) values and a time-evolving sequence number. Different but well-known values and order of the $\overline{Seed}$s are used for each $OTP_\chi$ or $PID_\varepsilon$; thus, each $OTP_\chi$ or $PID_\varepsilon$ is calculated differently, but the calculation method is well-known. The time-evolving sequence number is used to accomplish anti-replay functionality of the output.

$$OTP_\chi = F\text{-box}(\mathcal{H}\text{ash}, \mathcal{S}\text{Cust}_\psi, \overline{Seed}_{OTP,\chi}, OTP, \chi)$$

Property 4: Due to Property 3, the outputs of the F-box($\mathcal{L}$ookup) transform and the composition of $\overline{Seed}_{OTP,\chi}$ and $\overline{Seed}_{PID,\varepsilon}$ are drawn from space-separated elements that are time-evolving with forward secrecy. Additionally, when a $OTP_\chi$ or $PID_\varepsilon$ is being calculated using $\overline{Seed}_{OTP,\chi}$ or $\overline{Seed}_{PID,\varepsilon}$ as inputs to F-box($\mathcal{H}$ash), a time-evolving sequence number is used as another of the inputs. As a result, the $\overline{OTP}_\psi$ and $\overline{PID}_\psi$ that depend on these values are also space-time separated and jointly evolving. An attacker who intercepts $\overline{OTP}_\psi$, $\overline{PID}_\psi$, or any $\overline{Seed}_{OTP,\chi}$ or $\overline{Seed}_{PID,\varepsilon}$ will be unable to use them after the sequence number or any of the $\overline{Seed}_\sigma$ have changed, as they will be invalid. Additionally, an attacker cannot use an intercepted $OTP_\chi$ or $PID_\varepsilon$ to obtain any information regarding the $\overline{Seed}_\sigma$ used to calculate them (due to the one-way property of the cryptographic hash function).

Given Characterization 17, Characterization 24, and the related Property 3, the following Theorems may be formed as to show the benefits of the systems, components, and methodologies in accordance with the present disclosure. Both of these Theorems are proved below:

Theorem 1: Given the F-box($\mathcal{L}$ookup) transform, which takes as inputs (a) a super-state $\mathcal{S}\text{Client}_\rho$, $\mathcal{S}\text{Badge}_\zeta$, $\mathcal{S}\text{PIN}_\lambda$, or $\mathcal{S}\text{Pwd}_\theta$(which contain cryptographic $\overline{Seed}$s), (b) the super-state $\mathcal{S}\text{Cust}_\psi$, and (c) an OTP or PID index ((b) and (c) are used together to determine the identity and order of the seeds returned by the F-box($\mathcal{L}$ookup) transform). This transform returns an ordered subset of the seeds derived from (a). An attacker who wishes to recreate the F-box($\mathcal{L}$ookup) transform and has access to (c) and all or part of (a) but not (b) faces an NP-complete problem due to the order of the output seeds.

Theorem 2: Given the IDACS system and an attacker who is trying to calculate $\overline{OTP}_\psi$ and $\overline{PID}_\psi$ without access to the super-states $\mathcal{S}\text{Client}_\rho$, $\mathcal{S}\text{Badge}_\zeta$, $\mathcal{S}\text{PIN}_\lambda$, $\mathcal{S}\text{Pwd}_\theta$, or $\mathcal{S}\text{Cust}_\psi$. Such an attacker must reassemble $\mathcal{S}\text{Cust}_\psi$ (which contains $\mathcal{S}\text{Client}_\rho$, $\mathcal{S}\text{Badge}_\zeta$, $\mathcal{S}\text{PIN}_\lambda$, and $\mathcal{S}\text{Pwd}_\theta$) to successfully calculate $\overline{OTP}_\psi$ and $\overline{PID}_\psi$. It is an NP-complete problem for the attacker to reassemble $\mathcal{S}\text{Cust}_\psi$ or any other super-state.

As mentioned, FIG. 4 illustrates an overview of the IDACS system architecture and the network entities that compose the IDACS network are illustrated. As illustrated in FIG. 4, the IDACS network 100 interacts with users 102, 104, and 106. Each user has a number of security tokens. For example, users 102, 104, and 106 have respective badges 108, 110, and 112; respective passwords (PWDs) 114, 116, and 118; and respective PINs 120, 122, and 124. FIG. 4 shows exemplary security tokes in the form of badges 108, 110, 112; passwords 114, 116, and 118; and PINs 120, 122, and 124, but other forms of security tokens, such as smart cards, can be used as well.

The IDACS network 100 includes databases 126. In operation, the users 102, 104, and 106 seek to access data stored in databases 126, write data to memory locations in databases 126, and/or execute operations on data stored in databases 126. To do so, the users 102, 104, and 106 access the IDACS network through client computing devices 128, 130, and 132, respectively. The users 102, 104, and 106 and the client computing devices 128, 130, and 132 may need to register with the IDACS network. The IDACS network 100 may include two sets of servers, security agents 134 and super security agents 136. The IDACS network 100 may include a configurable number of security agents 134 and super security agents 136, which may act as security barriers for accessing data in the databases 126. The data of interest may reside on one of the database 126 or may be split, as described in more detail herein, among multiple databases 126.

The security agents 134 and the super security agents 136 play a role in authenticating the users 102, 104, and 106 to ensure that the users 102, 104, and 106 are authorized to access the databases 126 and/or are authorized to access or execute operations on the data of interest within databases 126. In certain embodiments, the client computing devices 128, 130, and 132 may authenticate with each of security agents 134 individually, with the authentication process being monitored and further authenticated by the super security agents 136, providing space separation of authentication. Authentication credentials to be discussed herein may change per transaction, per session, and/or per packet, which provides time separation and joint evolution of authentication credentials. When the User/Client successfully authenticate with IDACS, access is granted to the information, which may be stored in one location on one Database, or may be spread across multiple Databases (space separation of information).

To interface with the security agents 134, the super security agents 136, and the databases 126, user agent software components 138, 140, and 142 are downloaded from the network (e.g., from security agents 134, super security agents 136, or elsewhere) and run on the client computing devices 128, 130, and 132. In certain embodiments, a different application must be downloaded for each new session, thus providing the system with time evolution.

Each application that is downloaded may have a random, unique Application PID. The security agents 134 and/or super security agents 136 may maintain logs detailing which Application PIDs were issued to which client computing devices 128, 130, and 132 at which times. The user agent software components 138, 140, and 142 may handle all IDACS communication between the client computing devices 128, 130, and 132 and the rest of IDACS.

The security agents 134 and super security agents 136 are depicted in FIG. 4 as standalone servers, and in such implementations, may include respective processors, memory (e.g., RAM), and hard drives. The security agents 134 and super security agents 136 will generally operate according to program instructions in the form of computer source code compiled into object code and stored onto a memory, from which it is read and executed by a processor. Exemplary programming languages are discussed below, but it should be understood that any suitable programming language for implementing the functionality disclosed below may be suitable, e.g., Java, C, C++, scripts, or others.

In other implementations, the security agents 134 and super security agents 136 may merely reference hardware or software components that are part of a single device, such as a router, gateway, or other network-enabled electronics component. In such instances, all the network security functions disclosed with respect to the security agents 134 and super security agents 136 disclosed herein may be provided within a single network component.

The databases 126 can be conventional databases, such as those operating in Oracle®, DB2, or SQL Server environments. The database 126 may represent cloud storage solutions, such as Google® Drive, Microsoft® Cloud, Amazon® Cloud Drive, or others. The database 126 may generally represent any device with memory capable of storing programmatic data. In exemplary implementations in which the security agents 134 and super security agents 136 are provided within a single network-enabled electronics component, the databases 126 may be provided within that same network-enabled electronics component.

The client computing devices 128, 130, and 132 may be implemented as a mobile smartphone (e.g., Android®, Apple® iOS device, Windows® Phone device, Blackberry®, etc.), tablet, a Personal Data Assistant (PDA), a PC/workstation/laptop (e.g., running Windows®, Unix®, Linux®, Apple® operating systems, etc.), and the like. The client computing devices 128, 130, and 132 will generally include network connectivity, such as cellular network connectivity and/or wireless local area networking capabilities (i.e., "WiFi") or Ethernet. The client computing devices 128, 130, and 132 will generally include a processor, a memory (e.g., RAM), and a hard drive. Client computing devices 128, 130, and 132 will operate according to program logic implemented by computer source code that is compiled into object code and stored on a memory, from where it is read and executed by a processor. Certain programming languages are disclosed herein, but any suitable programming language can be used, such as C, C++, Java, scripts, and the like.

FIG. 4 shows a division between a "client side" and a "network side." Communication between the client side and the network side can take place over a communications network 144. Network 144 may include any type of communication network, such as the Internet, any TCP/IP network, a cellular communication network, including but not Global System for Mobile Communications (GSM), Wideband Code Division Multiplex Access (WCDMA), Code Division Multiplex Access (CDMA), or Time Division Multiplex Access (TDMA), General Packet Radio Services (GPRS), Universal Mobile Telephone System (UMTS), or any other type of network suitable for computer-based communications.

According to certain illustrative embodiments, the IDACS system utilizes one or more of three basic types of authentication, alone or in combination with other features disclosed herein. These forms of authentication may be used to ensure that a User/Client combination is only allowed to access information it is authorized to access. The first is the One-Time Password (OTP), which provides user-SA authentication to verify the identity of the user. The second is the Access Control List (ACL) PIDs, which are used by the SAs and SSAs to further verify the identity of the user as well as the user's information access permissions (the OTPs and the PIDs may collectively be referred to as the Client Security Ticket). The third is the Network Security Ticket, which may be used for SA-SSA authentication to prove that an information access request has previously been authenticated by a genuine SA or SSA.

The systems, components, and methodologies by which the IDACS network 100 operates are discussed in further detail herein.

Figure 5:
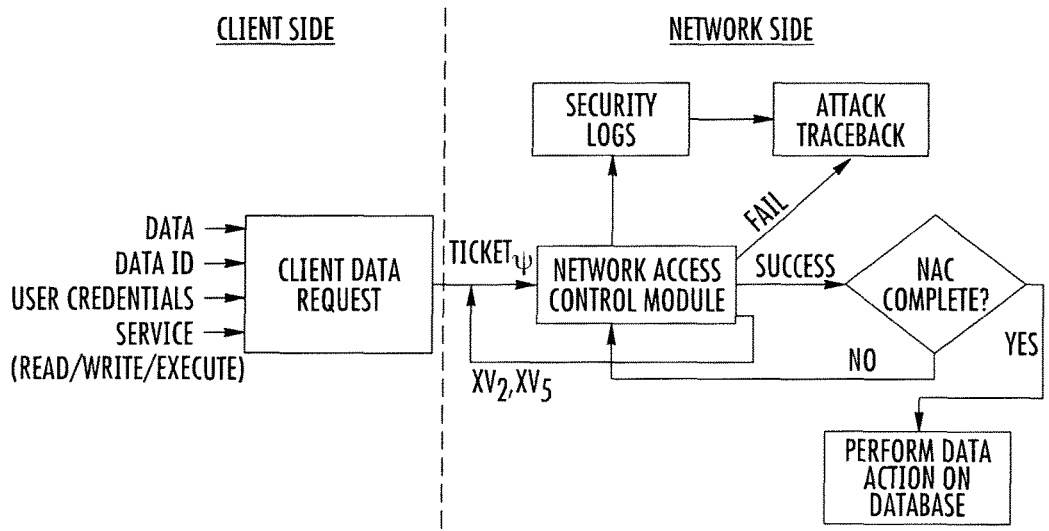
FIG. 5 graphically depicts an exemplary IDACS Network Access Control procedure in accordance with the disclosure.

Exemplary implementations for the Client-side operations in accordance with the present disclosure for IDACS network authentication and authorization are now provided with reference to the above-provided characterizations. FIG. 5 graphically depicts an exemplary IDACS Network Access Control procedure. The exemplary IDACS Network Access Control procedure is set forth in Algorithm 1 (shown below) and its contained sub-algorithms. Exemplary Client-side operations are further discussed in Algorithm 2 and Algorithm 3 (also shown below). Network-side operations are further described herein.

Note that for purposes of the present disclosure, the notation A→B: C indicates that message C is being sent from party A to party B. Parenthetical notations are provided in the following descriptions with reference to algorithm line numbers.

In Algorithm 1, $UA_\beta$ first calculates the $\overline{OTP_\psi}$ (1) and $\overline{PID_\psi}$ (2) needed to authenticate the data request $Req_\psi$ (3) with the IDACS network and packages them together into $Ticket_\psi$ (4). $Cust_\psi$ then sends $Ticket_\psi$ to a pre-determined $SA_1$ (5) to begin the network access control process. The network access control module characterized in Algorithm 4 uses SAs and SSAs to authenticate $Ticket_\psi$, as many times as necessary (as characterized by the authentication chain length, AO according to the specific IDACS implementation (7 and 8) using randomly generated $XV_1$ and $XV_4$ values (6) for the first iteration of the module. If the network access control module fails at any time, the data request is dropped (10). After the network access control module has been run several times, the final SSA to handle $Ticket_\psi$, sends $Req_\psi$ to $DB_\gamma$ for processing (11).

The $\overline{OTP_\psi}$ and $\overline{PID_\psi}$ used in Algorithm 1 are calculated according to Algorithm 2 and Algorithm 3.

Algorithm 1. IDACS Network Access Control procedure:

input: $Cust_\psi$, $\mathcal{S}\overline{SA}$, $\mathcal{S}\overline{SSA}$, $\mathcal{S}\overline{DB}$, data operation (Read/Write/Execute), data, $SA_1$, N
output: $Cust_\psi$, $\mathcal{S}\overline{SA}$, $\mathcal{S}\overline{SSA}$, $\mathcal{S}\overline{DB}$
    at $UA_\beta$
1   $\overline{OTP_\psi}$ = calculate_OTPs($\mathcal{S}Cust_\psi$, $Cust_\psi$)
2   $\overline{PID_\psi}$ = calculate_PIDs($\mathcal{S}Cust_\psi$, $Cust_\psi$)
3   $Req_\psi$ = F-box($\mathcal{C}$oncat, (Read/Write/Execute), PID($Cust_\psi$), Content($PID_\varepsilon$), data)
4   $Ticket_\psi$ = F-box($\mathcal{C}$oncat, $\overline{OTP_\psi}$, $\overline{PID_\psi}$, $Req_\psi$)
5   $Cust_\psi \rightarrow SA_1$ : $Ticket_\psi$
6   $XV_1$ = F-box($\mathcal{M}$rand)   $XV_4$ = F-box($\mathcal{M}$rand)
7   for n = 1 to N
8   { $XV_1$, $XV_4$, $SA_1$, $SSA_2$, passed } = run_auth_chain($SA_1$, $XV_1$, $XV_4$, $Ticket_\psi$)
9   if (passed =
false)
10  exit algorithm
   End
   End
11  $SSA_2 \rightarrow DB_\gamma$ : $Req_\psi$ In Algorithm 2, if $\overline{OTP_\psi}$ is being calculated by $Cust_\psi$ (1), each individual $OTP_\chi$ (2) is calculated by gathering the relevant $\overline{Seeds}$ from the relevant $Client_\rho$, $Badge_\xi$, $PIN_\lambda$, and $Pwd_\theta$ (3), and hashing them together (4). The individual $OTP_\chi$ are concatenated together to generate the set $\overline{OTP_\psi}$ (5). If the calculation is being performed by $SA_\chi$ (7), then only $OTP_\chi$ is needed to be authenticated rather than the entire set $\overline{OTP_\psi}$. Thus, all of the relevant seeds are gathered and hashed together to generate $OTP_\chi$ (8). On the other hand, the entire set $\overline{PID_\psi}$ is generated by $Cust_\psi$, and the entire set is authenticated by each $SA_\chi$ or $SSA_\kappa$ (excluding Content ($PID_\varepsilon$), which is only checked by $SSA_\kappa$). In Algorithm 3, $Cust_\psi$ gathers all of the relevant seeds from $Client_\rho$, $Badge_\xi$, $PIN_\lambda$, and $Pwd_\theta$ (3) and hashes them together (4) for each individual $PID_\varepsilon$ (1). Any $SA_\chi$ or $SSA_\kappa$ gathers the seeds and hashes them together (6) to generate each individual $PID_\varepsilon$ (1). Finally, all $PID_\varepsilon$ are concatenated to form $\overline{PID_\psi}$ (7).

Figure 6:
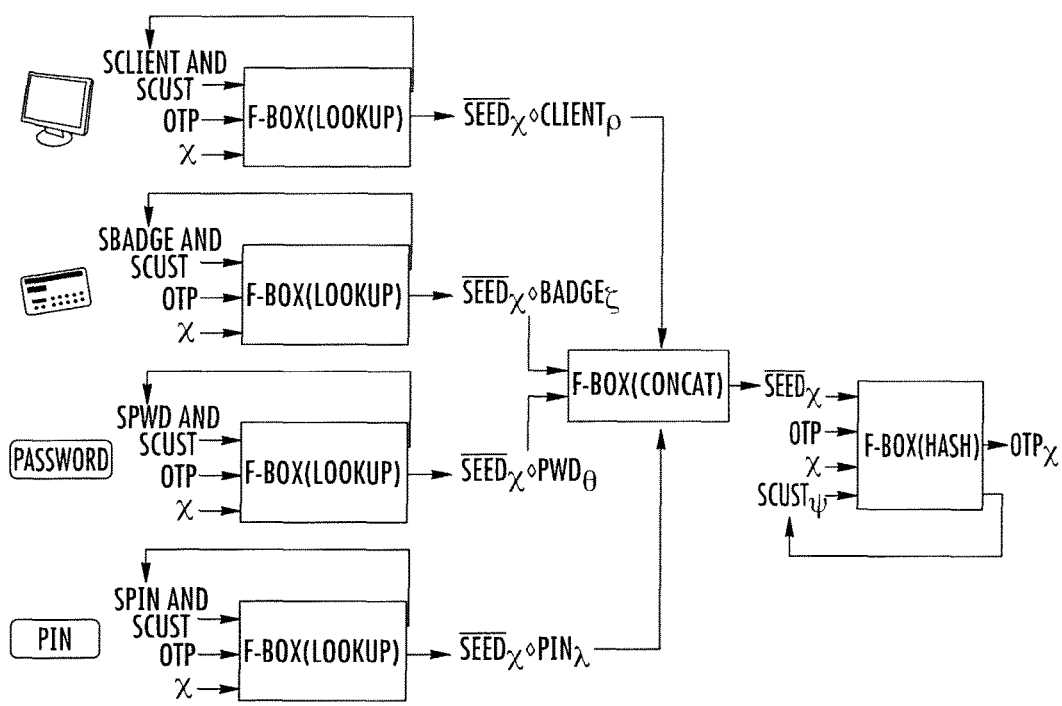
FIG. 6 graphically depicts the procedure for calculating a single $OTP_\chi$ at $Cust_\psi$ in accordance with the disclosure.

FIG. 6 graphically depicts the procedure for calculating a single $OTP_\chi$ at $Cust_\psi$. The depicted procedure is in accordance with Algorithm 2, and it should be understood that the procedure for calculating a single $PID_\varepsilon$ at $Cust_\psi$ is similar.

Algorithm 2. calculate_OTPs( )

input: location, $Cust_\psi$
output: $\overline{OTP_\psi}$ or $OTP_\chi$
1  if (location == $\mathcal{S}Cust_\psi$)
2  for $\chi$=1 to q
3    $\overline{Seed}_{OTP,\chi}$ = F-box($\mathbf{L}$ookup•$\mathcal{C}$, $\mathcal{S}Cust_\psi$, OTP, $\chi$)
4    $OTP_\chi$ = F-box($\mathbf{H}$ash, $\mathcal{S}Cust_\psi$, $\overline{Seed}_{OTP,\chi}$, OTP, $\chi$)
    end
5  $\overline{OTP_\psi}$ = F-box($\mathcal{C}$oncat, $OTP_1$, $OTP_2$, ..., $OTP_q$)
6  return $\overline{OTP_\psi}$
7  else if (location == $\mathcal{S}SA_\chi$)
8    $OTP_\chi$ = F-box($\mathbf{L}$ookup•$\mathbf{H}$ash, PID($Cust_\psi$), $\mathcal{S}SA_\chi$, OTP, $\chi$)
9  return $OTP_\chi$
    End Algorithm 3. calculate_PIDs( )

input: location, $Cust_\psi$
output: $\overline{PID_\psi}$
1  for $\varepsilon$=1 to r
2  if (location == $\mathcal{S}Cust_\psi$)
3    $\overline{Seed}_{PID,\varepsilon}$ = F-box($\mathbf{L}$ookup•$\mathcal{C}$, $\mathcal{S}Cust_\psi$, PID, $\varepsilon$)
4    $PID_\varepsilon$ = F-box($\mathbf{H}$ash, $\mathcal{S}Cust_\psi$, $\overline{Seed}_{PID,\varepsilon}$, PID, $\varepsilon$)
5  else if (location == $\mathcal{S}SA_\chi$ or $\mathcal{S}SSA_\kappa$)
6    $PID_\varepsilon$ = F-box($\mathbf{L}$ookup•$\mathbf{H}$ash, PID($Cust_\psi$), $\mathcal{S}$location, PID, $\varepsilon$)
    end
    End
7  $\overline{PID_\psi}$ = F-box($\mathcal{C}$oncat, $PID_1$, $PID_2$, ..., $PID_r$)
8  return $PID_\psi$ With the above-provided understanding of an exemplary IDACS client-side authentication and authorization procedures for gaining access to data stored on a DB in mind, details are now provided regarding corresponding exemplary network-side procedures that verify $\overline{OTP_\psi}$ and $\overline{PID_\psi}$ to authenticate $Cust_\psi$ and grant DB access.

Characterization 28: Given $\overline{SA}$ and $\overline{SSA}$, each pair of two machines from these sets share a cryptographic key. This key is used for encryption and cryptographic hash functions. A cryptographic key shared between machines A and B is represented as Key(A, B). These shared keys are referenced in Algorithm 4 (shown below).

Characterization 29: Given $Ticket_\psi$, $\overline{SA}$, and $\overline{SSA}$, $Ticket_\psi$, is authenticated ($\overline{OTP_\psi}$) and authorized ($\overline{PID_\psi}$) by multiple $SA_\chi$ and $SSA_\kappa$ (space separation and redundancy) both before it reaches $\overline{DB}$ and before it returns to $Cust_\psi$. As $Ticket_\psi$ is passed through this authentication chain, there is also an authentication method for messages passed between the $SA_\chi$ and $SSA_\kappa$ to verify the identity of the sending $SA_\chi$ or $SSA_\kappa$. Xchain Values may be used in these messages for inter-machine authentication. Details on how these values may be calculated are included in Algorithm 4. The notation for these values is $XV_A$, $A \in [1, 6]$ as described in Algoritm 4.

Characterization 30: Given $Ticket_\psi$, which is sent by $Cust_\psi$ to the IDACS network, the $\overline{OTP_\psi}$ and $\overline{PID_\psi}$ contained in $Ticket_\psi$ is verified by an authentication chain of multiple $SA_\chi$ and $SSA_\kappa$ before it is sent to $DB_\gamma$ (as detailed in Algorithm 1 and Characterization 29). The order in which $SA_\chi$ and $SSA_\kappa$ verify $Ticket_\psi$ may be pseudo-random, but calculated by the F-box(next-SA-SSA) transform. This transform accepts $Ticket_\psi$, the current location $SA_\chi$ or $SSA_\kappa$, and $\mathcal{S}SA$ or $\mathcal{S}SSA$ as inputs and outputs index $\chi$ or $\kappa$ for the next-hop SA or SSA (next-hop $SA_\chi \in \overline{SA}$, next-hop $SSA_\kappa \in \overline{SSA}$). The transform applies F-box($\mathbf{H}$ash) to $Ticket_\psi$, and then calculates the Hamming distance between F-box($\mathbf{H}$ash, $Ticket_\psi$) and PID($SA_\chi$) or PID($SSA_\kappa$) for $\chi \in [1, q]$ and $\kappa \in [1, n]$. The index $\chi$ or $\kappa$ where PID($SA_\chi$) or PID($SSA_\kappa$) has the lowest Hamming Distance (excluding all $SA_\chi$ or $SSA_\kappa$ already in the authentication chain) is the index of the next-hop SA or SSA. The F-box(next-SA-SSA) is represented in equation notation by $$\chi = F\text{-box}(\textbf{N}\text{ext}, \text{Ticket}_\psi, SA_\chi, \mathcal{S}\overline{SA})$$

PID($SA_\chi$) or PID($SSA_\kappa$) are shared among all $SA_\chi$ or $SSA_\kappa$, but in this exemplary implementation they are not shared with $Cust_\psi$. In this exemplary implementation, the F-box(next-SA-SSA) transform only occurs at SA or SSA locations.

Characterization 31: Given $Ticket_\psi$, and XV values, the complete messages passed between multiple $SA_\chi$ and $SSA_\kappa$ are termed Network Security Tickets, denoted $TKA_A$, $A \in [1, 5]$. Details regarding the Network Security Tickets are shown in Algorithm 4. $TK_A$ is a concatenation of the relevant $Ticket_\psi$ and Xchain values.

Characterization 32: Given network message B, any $SA_\chi$ or $SSA_\kappa$ processing B will record a Security Ticket Log Record \B\ detailing the vital information regarding B (e.g., the time B was processed, the IP address of the $Cust_\psi$ that sent B, etc.) B may be any $Ticket_\psi$ or TK network messages. The logs residing on $SA_\chi$ or $SSA_\kappa$ are part of $\mathcal{S}SA_\chi$ or $\mathcal{S}SSA_\kappa$.

Characterization 33: Given Characterization 32, any SA or SSA that processes a network message (e.g., TK) records a log record \TK\ using the F-box(insert-log-record) transform. This transform accepts $\mathcal{S}SA_\chi$ or $\mathcal{S}SS_\kappa$ and TK as inputs and outputs an updated version of $\mathcal{S}SA_\chi$ or $\mathcal{S}SSA_\kappa$ which contains \TK\. The F-box(insert-log-record) transform is represented in equation notation by $$\mathcal{S}_{SA_\chi} = F\text{-box}(\textbf{I}\text{nsert}, \mathcal{S}_{SA_\chi}, TK)$$

Characterization 34: Given Characterization 33, any $SA_\chi$ or $SSA_\kappa$ may search its own log entries for a given \TK\ that matches certain input parameters such as time, IP address of sending $Cust_\psi$, etc. These input parameters are not rigidly defined, and may exist in many combinations. The F-box (retrieve-log-record) transform accepts $\mathcal{S}SA_\chi$ or $\mathcal{S}SSA_\kappa$ and a list of conditions as inputs and outputs one or more matching log records \TK\, or 'null' if no matching records are found. This transform is represented in equation notation by $$\TK\ = F\text{-box}(\textbf{R}\text{trv}, \mathcal{S}_{SA_\chi}, \{\text{conditions}\})$$

At beginning of Algorithm 4, values set forth below reside at the indicated locations after the last iteration of this algorithm, or are sent to ($Ticket_\psi$) or generated at ($XV_1$ and $XV_4$) the indicated locations during the first iteration of the algorithm.

---

Algorithm 4. run_auth_chain( )

```
input:  SA₁, XV₁, XV₄, Ticket_ψ
output: XV₂, XV₅, SA₂, SSA₂, passed
1   XV₁ ◊ SA₁
2   Ticket_ψ ◊ SA₁
3   XV₄ ◊ SSA₁
    at SA₁
4   ⁻𝒮SA₁ = F-box(Insert, 𝒮SA₁, Ticket_ψ)
5   if (check_OTP_PID(SA₁,Ticket_ψ, Cust_ψ) == false)   return (passed = false)
6   SA₂ = F-box(Next, Ticket_ψ, SA₁, 𝒮SA̅)             SSA₁ = F-box(Next, Ticket_ψ, SA₁, 𝒮SSA̅)
7   XV₂ = F-box(Hash, XV₁, Key(SA₁, SA₂))
8   SA₁ → SA₂: TK₁ = { Ticket_ψ, XV₁, XV₂ }
9   SA₁ → SSA₁: TK₂ = { Ticket_ψ, XV₂ }
    at SSA₁
10  𝒮SSA₁ = F-box(Insert, 𝒮SSA₁, TK₂)
11  if (check_OTP_PID(SSA₁, Ticket_ψ ◊ TK₂, Cust_ψ) == false)   return (passed = false)
12  SA₂ = F-box(Next, Ticket_ψ ◊ TK₂, SSA₁, 𝒮SA̅)       SSA₂ = F-box(Next, Ticket_ψ ◊ TK₂, SSA₁, 𝒮SSA̅)
13  XV₃ = F-box(Hash, XV₂, Key(SSA₁, SA₂))              XV₅ = F-box(Hash, XV₄, Key(SSA₁, SSA₂))
14  SSA₁ → SA₂: TK₃ = { Ticket_ψ, XV₃, XV₅ }
15  SSA₁ → SSA₂: TK₄ = { Ticket_ψ, XV₄, XV₅ }
    at SA₂
16  ⁻𝒮SA₂ = F-box(Insert, 𝒮SA₂, TK₁, TK₃)
17  if (XV₂ ◊ TK₁ != F-box(Hash, XV₁ ◊ TK₁, Key(SA₁, SA₂)) or (XV₃ ◊ TK₃ != F-box(Hash, XV₂ ◊ TK₁, Key(SSA₁, SA₂))
18      report_and_trace_attack( )    return (passed = false)
    End
19  SSA₂ = F-box(Next, Ticket_ψ, SA₂, 𝒮SSA̅)
20  XV₆ = F-box(Hash, XV₅, Key(SA₂, SSA₂))
21  SA₂ → SSA₂: TK₅ = { Ticket_ψ, XV₆ }
    at SSA₂
22  ⁻𝒮SSA₂ = F-box(Insert, SA₂, TK₄, TK₅)
23  if (XV₅ ◊ TK₄ != F-box(Hash, XV₄ ◊ TK₄, Key(SSA₁, SSA₂)) or (XV₆ ◊ TK₅ != F-box(Hash, XV₅ ◊ TK₄, Key(SA₂, SSA₂))
24      report_and_trace_attack( )    return (passed = false)
    End
25  return (passed = true)
```

---

The exemplary network-side authentication and authorization process described in algorithm 1 is carried out in the function described in Algorithm 4.

The initial inputs to Algorithm 4 are handled separately depending on if this is the first call of the function (Algorithm 1 (8) with n=1) or a subsequent call. For the first call of the function, $SA_1$ has been randomly selected by $Cust_\psi$, $Ticket_\psi$ has been sent from $Cust_\psi$ to $SA_1$ (Algorithm 1(5) connected to Algorithm 4(2)), and $XV_1$ and $XV_4$ have been randomly generated by $SA_1$ and $SSA_1$, respectively (Algorithm 1(6) connected to Algorithm 4(1) and (7)). For subsequent function calls, $SA_1$ and $SSA_1$ in the current Algorithm 4 function call are $SA_2$ and $SSA_2$ from the previous Algorithm 4 function call, and $Ticket_\psi$ resides at $SA_1$ as a consequence; $XV_1$ and $XV_4$ in the current Algorithm 4 function call are $XV_2$ and $XV_5$ from the previous Algorithm 4function call, respectively (Algorithm 1(8) connected to Algorithm 4(1) and (3)) (see FIG. 7 and FIG. 8, to be discussed below, for details on how consecutive calls to Algorithm 4 are linked).

Figure 7:
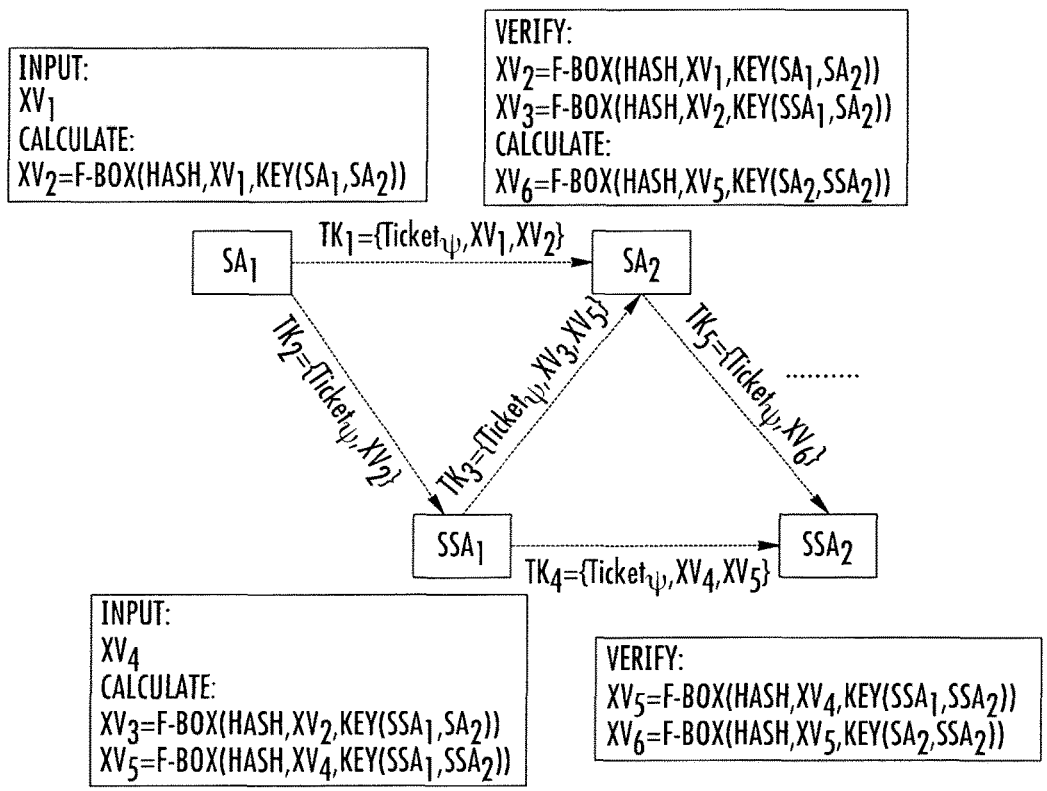
FIG. 7 shows a graphical representation of an exemplary network-side authentication and authorization process in accordance with the disclosure.

FIG. 7 shows a graphical representation of an exemplary network-side authentication and authorization process. The process depicted in FIG. 6 is in accordance with Algorithm 4. First, $SA_1$ records a security log record of $Ticket_\psi$ (4). Next, $SA_1$ verifies the associated $OTP_\chi$ and also $\overline{PID_\psi}$ extracted from $Ticket_\psi$; if the verification fails, then the function returns "false" (5). The next-hop $SA_2$ and $SSA_1$ are determined (6), and $XV_2$ is calculated (7). $TK_1$ is formed and sent to $SA_2$ (8), and $TK_2$ is formed and sent to $SSA_1$ (9). $SSA_1$ mirrors this process; $SSA_1$ records a security log record of $TK_2$ (10) and verifies $\overline{PID_\psi}$ extracted from $Ticket_\psi$ which is extracted from $TK_2$ (11). $SSA_1$ then calculates the next-hop $SSA_2$ and $SA_2$ (12) and also calculates $XV_3$ and $XV_5$ (13). $SSA_1$ then forms $TK_3$ and sends it to $SA_2$ (14) and forms $TK_4$ and sends it to $SSA_2$ (15).

While $SA_1$ and $SSA_1$ verify $OTP_\chi$ and $\overline{PID_\psi}$, $SA_2$ and $SSA_2$ verify the Xchain values (however, $SA_2$ and $SSA_2$ will also be verifying $OTP_\chi$ and $\overline{PID_\psi}$ as $SA_1$ and $SSA_1$ in the next function call of Algorithm 4). $SA_2$ first records security log records for $TK_1$ and $TK_3$ (16). Next, the relationship between $XV_1$ and $XV_2$ and also the relationship between $XV_2$ and $XV_3$ are verified (17). If the XV relationships fail verification, the authentication process is stopped (18). The next-hop $SSA_2$ (19) and $XV_6$ (20) are both calculated. Finally, $TK_5$ is formed and sent to $SSA_2$ (21). $SSA_2$ verifies its received Xchain values in a similar fashion (22-24). If all of the authentication checks and Xchain verifications pass, the function returns successfully (25).

| Algorithm 5. check_OTP_PID( ) |
| --- |
| input: location, $Ticket_\psi$, $Cust_\psi$ |
| output: passed |
| 1   if (location $\overline{SA}$) and ($OTP_{location} \diamond Ticket_\psi$ != calculate_OTPs ($\mathcal{S}$location, $Cust_\psi$)) |
| 2   report_and_trace_attack( )   return (passed = false) <br> End |
| 3   if($\overline{PID_\psi} \diamond Ticket_\psi$ != calculate_PIDs($\mathcal{S}$location, $Cust_\psi$)) |
| 4   report_and_trace_attack( )   return (passed = false) <br> End |
| 5   return (passed = true) |

Algorithm 5 outlines the procedure used by SAs and SSAs to verify the $\overline{OTP_\psi}$ and $\overline{PID_\psi}$ contained in $Ticket_\psi$. The $OTP_\chi$ associated with $SA_\chi$ is verified by each $SA_\chi$ (1), and the entire $\overline{PID_\psi}$ is verified by each $SA_\chi$ and $SSA_\varepsilon$ (3) (excluding Content($PID_\varepsilon$), which is only checked by $SSA_\kappa$). If either of these checks fail, the "report_and_trace_ attack( )" function is called to identify the source of error (which is assumed to be an attacker with incomplete authentication credentials). The details of this algorithm are discussed herein.

The following properties explain the operation and purpose of the Xchain values.

Property 5: The procedure outlined in Algorithm 4 provides mutually-supported authentication between the SAs and SSAs authenticating $Ticket_\psi$. FIG. 7 graphically illustrates the XV portion of Algoritm 4 run_auth_chain( ). During the first iteration of run_auth_chain( ), $XV_1$ and $XV_4$ are randomly generated; in subsequent iterations, they are given the values of $XV_2$ and $XV_5$ from the previous iteration. $SA_1$ calculates $XV_2$ by hashing $XV_1$ with Key($SA_1$, $SA_2$), and sends both values to $SA_2$, $SA_2$ is able to verify $XV_2$ using its own copy of Key($SA_1$, $SA_2$), which verifies the identity of $SA_1$. $SA_1$ also sends $XV_2$ to $SSA_1$, which calculates $XV_3$ by hashing $XV_2$ with Key($SSA_1$, $SA_2$) and sends it to $SA_2$. $SA_2$ is able to verify the $SA_1$-$SSA_1$ connection as well as the identity of $SSA_1$ by verifying $XV_3$. Similarly, $SSA_1$ calculates $XV_5$ by hashing $XV_4$ with Key ($SSA_1$, $SSA_2$) and sends both $XV_4$ and $XV_5$ to $SSA_2$ but only $XV_5$ to $SA_2$. $SA_2$ calculates $XV_6$ by hashing $XV_5$ with Key($SA_2$, $SSA_2$) and sends it to $SSA_2$. $SSA_2$ is then able to verify the identity of $SSA_1$ by verifying $XV_5$ and is able to verify the $SSA_1$-$SA_2$ link as well as the identity of $SA_2$ by verifying $XV_6$.

Figure 8:
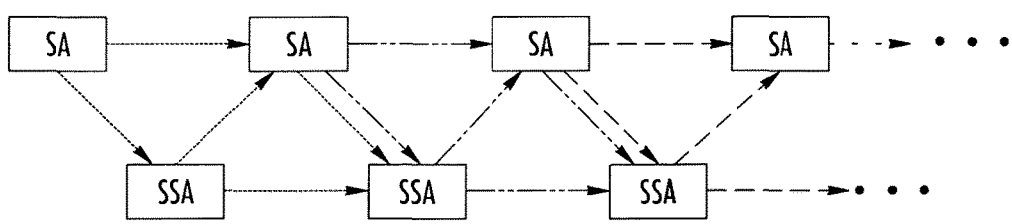
FIG. 8 shows how an exemplary network-side authentication and authorization process (the run_auth_chain( )algorithm) may be cascaded across N SAs and SSAs to accomplish a desired number of authentications in accordance with the disclosure.

FIG. 8 shows how an exemplary network-side authentication and authorization process (the run_auth_chain( ) algorithm) may be cascaded across N SAs and SSAs to accomplish a desired number of authentications. In this way, the authentication chain provides mutually-supported space-separated authentication that is time-evolving between the SAs and SSAs.

Property 6: When the run_auth_chain( )algorithm is cascaded, $XV_2$ and $XV_5$ of one iteration are, in fact, the $XV_1$ and $XV_4$, respectively, for the next iteration; cascaded iterations of the run_auth_chain( )algorithm are seamlessly integrated (FIG. 8). This is demonstrated at (8).

In this way, consecutive iterations provide mutually-connected authentication for each other.

Figure 9A:
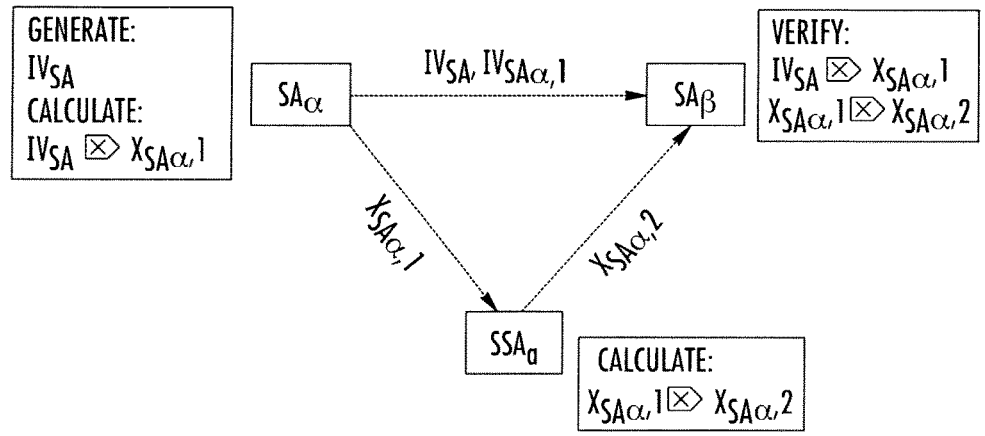
FIGS. 9(a), 9(b), 9(c), and 9(d) provide additional illustrations of the authentication chains in accordance with the present disclosure.

FIGS. 9(*a*), 9(*b*), 9(*c*), and 9(*d*) provide additional illustrations of the authentication chains in accordance with the present disclosure. In accordance with this illustrative depiction, a sensitive data access request may pass from the client to the database, before which it may need to be authenticated by the SAs and SSAs. The request, along with relevant OTPs and PIDs, may be bundled into a single Client Security Ticket. As the Client Security Ticket is passed between SAs and SSAs, additional SA-SSA authentication may be provided to guard against attackers impersonating or controlling SAs or SSAs. This authentication may be based on a set of keys where a unique set of keys can be shared between each SA/SSA pair. These keys are used with hashes (e.g., CBC-MAC) to provide authentication between SSAs and SAs.

FIG. 9(*a*) demonstrates one stage of the SA-SSA authentication. In this illustration, $SA_\alpha$ receives the database request along with the Client Security Ticket containing all of the client-SA OTPs and PIDs. Once $SA_{60}$ has authenticated the request, it may generate an Initial Vector $IV_{SA}$ for the SA-SSA authentication. $SA_{60}$ may then performs the security operation '⊠' where $$M_1 \boxtimes M_1' \text{ means } M_1' = \text{CBC-MAC}(K, M_1)$$

Here, K is the key shared between the machine performing the operation and the machine that verifies the operation (in this case, $SA_{60}$ and $SA_\beta$). In this case, the result of the operation is $$IV_{SA} \boxtimes X_{SA\alpha,1} \tag{1}$$

Here, "$\alpha$,1" correlates with the time and location parameters. $SA_{60}$ may then passes [$IV_{SA}$, $X_{SA\alpha}$,1, Client Security Ticket] to $SA_\beta$ and [$X_{SA\alpha}$,1, Client Security Ticket] to $SSA_\alpha$. $SSA_\alpha$, after checking the Client Security Ticket PIDs, may perform the operation $$X_{SA\alpha,1} \boxtimes X_{SA\alpha,2} \tag{2}$$

The key shared between $SSA_\alpha$ and $SA_\beta$ may be used. $SSA_\alpha$ may then pass [$X_{SA\alpha,2}$, Client Security Ticket] on to $SA_\beta$. $SA_\beta$ may now able to verify the correctness of the values of $X_{SA\alpha,1}$ and $X_{SA\alpha,2}$ based on the previous calculations. Verifying the relationship ($IV_{SA} \boxtimes X_{SA\alpha,1}$) can authenticate $SA_\alpha$, while verifying the relationship ($X_{SA\alpha,1}$ ⊗ $X_{SA\alpha,2}$) can authenticate $SA_{60}$ and $SSA_a$ together.

Figure 9B:
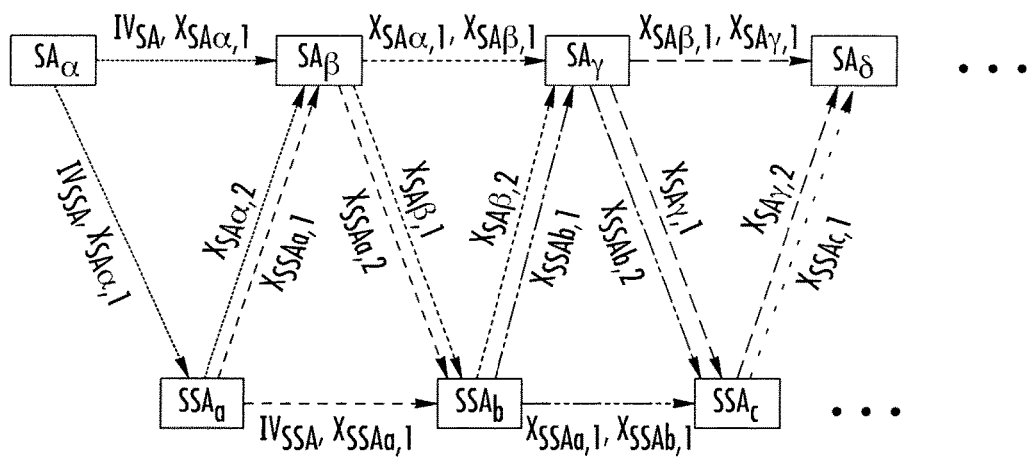

As the database access request passes through the SA-SSA layer, each three-machine combination in the process may performs an authentication process like the one described above. FIG. 9(b) shows an example of relationships among three-machine combinations for performing authentications. In this illustrative embodiment, the relationships are interlocking, and the final leg of the authentication "anchored" by $SA_{60}$ (the value $X_{SA\alpha,2}$ sent from $SSA_a$ to $SA_\beta$) can be contained in the same packet as the first leg of the authentication "anchored" by $SSA_a$ (the value $X_{SSA\alpha,1}$ sent from $SSA_a$ to $SA_\beta$). In addition to the pictured authentication mechanisms, each packet exchanged between any two machines may be accompanied by a hash message authentication code (HMAC) that hashes together the authentication items in that packet along with the Client Security Ticket. The IDACS architecture in certain illustrative implementations may contain only one $SSA_\kappa$ while others may contain multiple SSAs. Either approach is within the scope of the present disclosure.

Figures 9C, 9D:
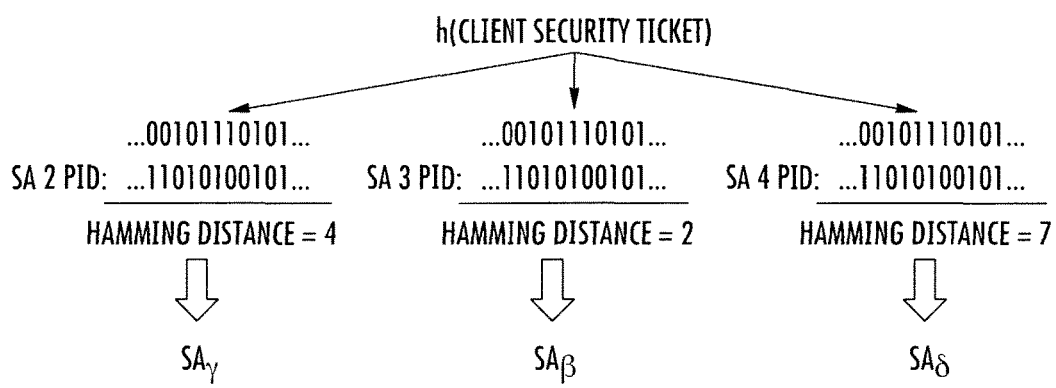

FIG. 9(c) shows a representation of different authentication relationships by two independent security hash chains corresponding to the authentication chain depicted in FIG. 9(b). The depicted X parameters may be referred to collectively as "XChain values."

If an attacker controls a single SA or $SSA_\kappa$ this condition can be detected by the IDACS network. For example, if $SA_{60}$ is controlled by an attacker and clears an unauthorized Client Security Ticket (unauthorized due to OTP or ACL PID violations) and provides a correct $X_{SA\alpha,1}$ value, $SSA_a$ may not authorize the Client Security Ticket (based on OTP/PID) and may not generate the correct $X_{SA\alpha,2}$ value. Thus, $SA_\beta$ can quickly detect that the Client Security Ticket was not correctly authorized by $SA_\alpha$ and $SSA_a$ in combination. If an attacker can control both $SA_{60}$ and $SSA_a$, then $SA_\beta$ may be fooled to believe the Client Security Ticket was approved. Alternatively, the SAs and SSAs may be fooled if the Client Security Ticket could be successfully forged. However, forging a Client Security Ticket without access to the user's security token (e.g., password, smart card, client machine, etc.) is an NP-complete problem. This cross-connected authorization checking provides a means to detect the compromise of the user's security tokens and can therefore provide an effective defense against zero-day malware attacks.

In illustrative embodiments, the process of choosing $SA_\alpha$, $SA_\beta$, $SSA_\alpha$, etc. may be pseudo-random, but predictable. At the beginning of the authentication chain, the client randomly chooses $SA_{60}$ and may send it the Client Security Ticket. $SA_{60}$ may then perform an operation to determine the path of the Client Security Ticket. $SA_{60}$ may hash the Client Security Ticket and then compare the result to the PIDs of all other SAs that they use to identify themselves to each other. FIG. 9(d) shows that each comparison may generate a Hamming Distance, and the SA with the lowest Hamming Distance becomes $SA_\beta$, the SA with the second-lowest Hamming Distance becomes $SA_\gamma$, etc. Similarly, $SA_{60}$ may compare the Client Security Ticket hash to the PIDs used by the SSAs. The SSA with the lowest Hamming Distance may become $SSA_\alpha$, the SSA with the second-lowest Hamming Distance may become $SSA_b$, etc. In this way, the Client Security Ticket path may be determined at the beginning of the authentication chain. Any SA or SSA in the chain can independently verify the expected Client Security Ticket path. If this path is altered by an attacker, this deviation can be detected and the attack prevented. The length of the authentication chain can be configured based on the current security requirements of the system. Knowledge of the expected and actual paths can also be used for the attack tracebacks.

Figure 10A:
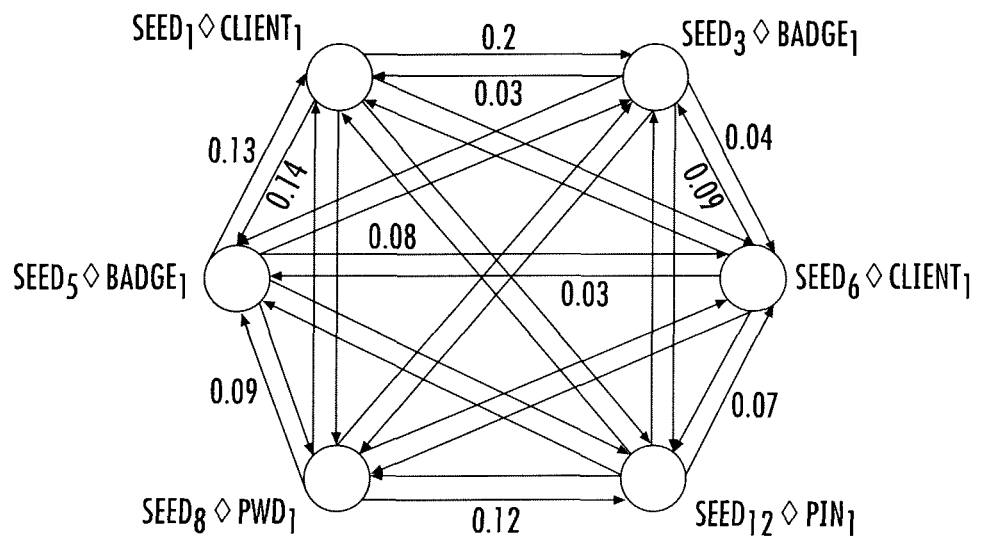
FIG. 10(a) shows a directed graph representing a seed reassembly program, used to visualize a proof showing properties of the exemplary IDACS network security procedures in accordance with the disclosure.
Figure 10B:
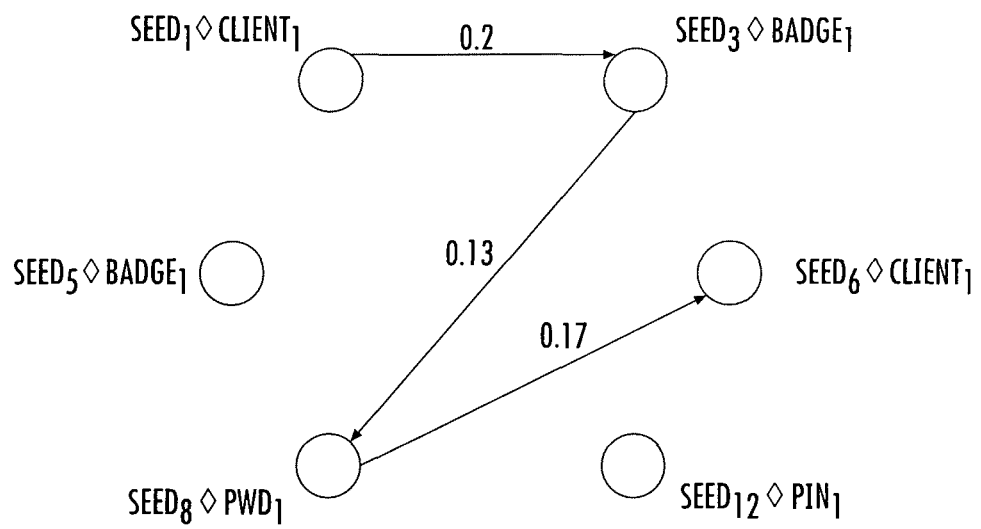
FIG. 10(b) shows a solution to a Maximum Weight Directed Path of Specified Length problem, also used to visualize a proof showing properties of the exemplary IDACS network security procedures in accordance with the disclosure.
Figure 11A:
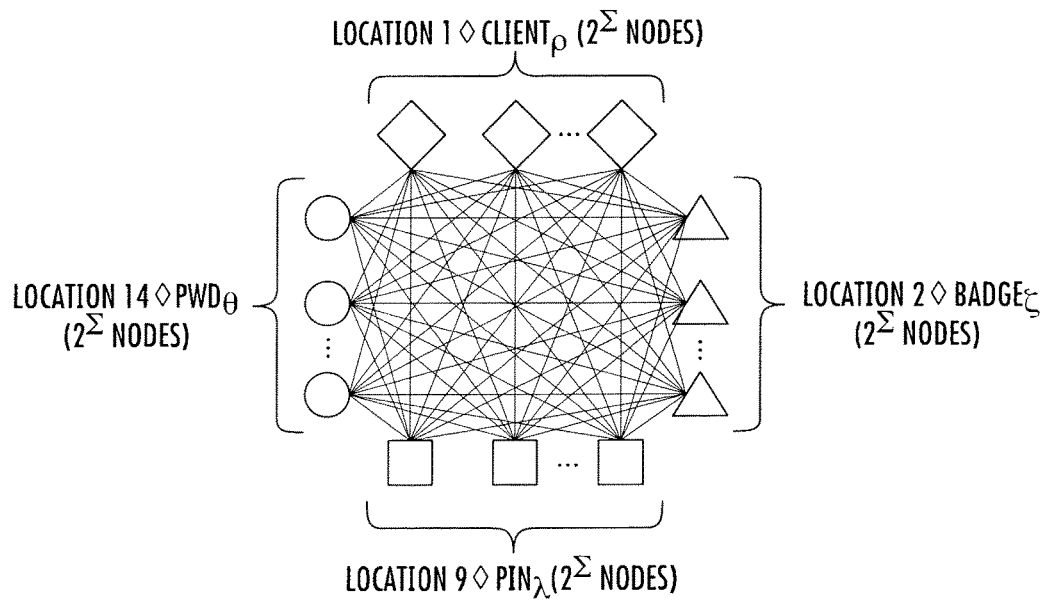
FIG. 11(a) shows a graph representing a memory reassembly problem, used to visualize a proof showing properties of the exemplary IDACS network security procedures in accordance with the disclosure.
Figure 11B:
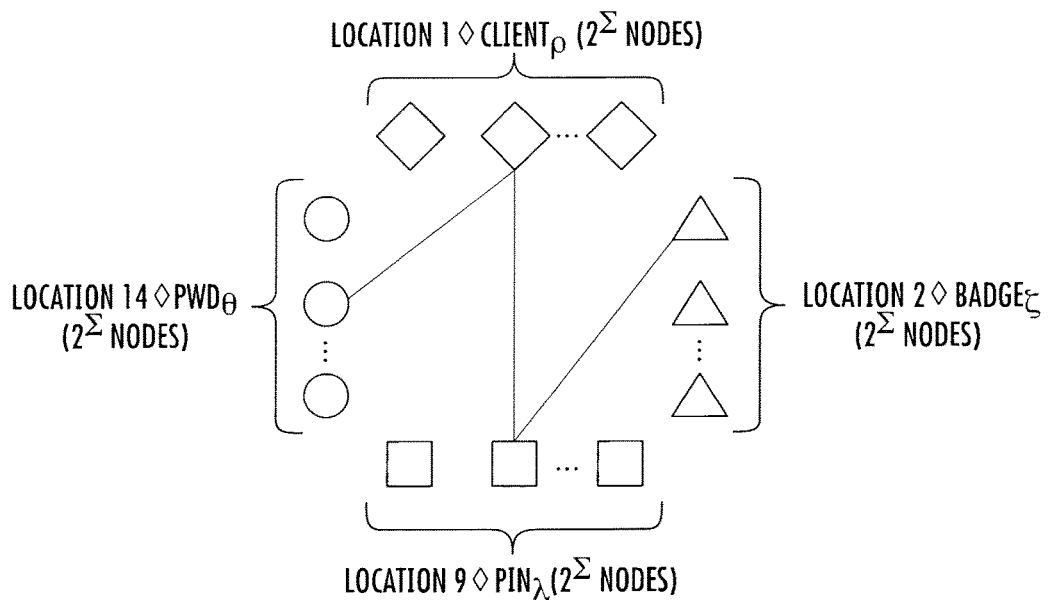
FIG. 11(b) shows a solution to a Maximum Weight Path of Specified Length problem, also used to visualize a proof showing properties of the exemplary IDACS network security procedures in accordance with the disclosure.

FIG. 10(a) shows a directed graph representing a $\overline{Seed}$ reassembly program, used to visualize a proof showing properties of the exemplary IDACS network security procedures. FIG. 10(b) shows a solution to a Maximum Weight Directed Path of Specified Length problem, also used to visualize a proof showing properties of the exemplary IDACS network security procedures. FIG. 11(a) shows a graph representing a memory reassembly problem, used to visualize a proof showing properties of the exemplary IDACS network security procedures. FIG. 11(b) shows a solution to a Maximum Weight Path of Specified Length problem, also used to visualize a proof showing properties of the exemplary IDACS network security procedures. These figures will be referenced in connection with the discussion below.

Consider the following scenario: an attacker wishes to replicate the IDACS Network Access Control procedure for a legitimate $Cust_\psi$ to impersonate $Cust_\psi$ and gain access to $Cust_\psi$'s data residing on $DB_\gamma$. To impersonate $Cust_\psi$, the attacker requires correctly generated $\overline{OTP}_\chi$ and $\overline{PID}_\epsilon$ for $Cust_\psi$. To accomplish this, the attacker requires two things: a) the cryptographic $\overline{Seeds}$ residing on/derived from $Client_\rho$, $Badge_\zeta$, $PIN_\lambda$, and $Pwd_\theta$ (i.e. $\overline{Seed}_o \Diamond Client_\rho$, $\overline{Seed}_o \Diamond Badge_\zeta$, $\overline{Seed}_{94} \Diamond Pwd_\theta$, and $\overline{Seed}_o \Diamond PIN_\lambda$) and b) the order in which these seeds must be hashed to generate all $OTP_\chi$ and $PID_\epsilon$ (i.e., the output of the F-box($\mathcal{L}$ookup) transform in Algorithm 2(3) and Algorithm 3(3)). An attacker who is able to steal or clone a $Client_\rho$, $Badge_\zeta$, $Pwd_\theta$, or $PIN_\lambda$ can gain access to (a) through memory scraping or other memory access strategies. However, to obtain (b), the attacker needs access to $\mathcal{S}Cust_\psi$, which is the critical input to the F-box($\mathcal{L}$ookup) transform. Now, $\mathcal{S}Cust_\psi$ is composed of $\mathcal{S}Client_\rho$, $\mathcal{S}Badge_\zeta$, $\mathcal{S}Pwd_\theta$, and $\mathcal{S}PIN_\lambda$; the entire $\mathcal{S}Cust_\psi$ does not reside with any one of these locations or states. Therefore, an attacker who does not possess all four of these items cannot recreate $\mathcal{S}Cust_\psi$ apart from a brute-force attack; such an attacker must resort to other means to recreate (b) (i.e. the output of the F-box($\mathcal{L}$ookup) transform).

The attacker faces an order-reassembly problem; this problem can be represented using graph theory. The group of $\overline{Seed}_o$ is represented as a set of vertices $\mathbf{V}$ and a set of directed edges E, where each $v \in \mathbf{V}$ is connected to every other $v \in \mathbf{V}$ by a pair of directed edges $e \in E$ with opposite directions. Each $e \in E$ is given an associated weight W(e), $0 \leq W(e) \leq 1$ (FIG. 10(a)). Each $e \upsilon E$ with a tail connecting to vi and a head connecting to v2 ($v_1, v_2$ E $\mathbf{V}$), represents the possibility that $v_2$ follows $v_1$ in the output of the F-box($\mathcal{L}$ookup) transform, while W(e) represents the associated probability (the determination of W(e) is discussed herein). Presumably, the path connecting N vertices (where N is known to be the number of Seeds output by the F-box($\mathcal{L}$ookup) transform) that has the highest sum W(e) of any path with N vertices will be the correct solution to the F-box($\mathcal{L}$ookup) transform (FIG. 10(b)). The problem of finding the highest sum W(e) path is defined as the Maximum Weight Directed Path of Specified Length (MWDPSL) problem; this problem is proven NP-complete herein. The NP-complete proof of the (MWDPSL) problem in turn proves Theorem 1.

Consider a second scenario. The same attacker does not have access to $Client_\rho$, $Badge_\xi$, $Pwd_\theta$, or $PIN_\lambda$ (and therefore not $\mathcal{S}Cust_\psi$ either). This attacker must recreate $\mathcal{S}Client_\rho$, $\mathcal{S}Badge_\xi$, $\mathcal{S}Pwd_\theta$, and $\mathcal{S}PIN_\lambda$ to gain access to both (a) and (b); therefore, the attacker must correctly reassemble the memory contents of $Client_\rho$ and $Badge_\xi$ and an analogous representation of $Pwd_\theta$, or $PIN_\lambda$ (these memory contents are the characterization of $\mathcal{S}Client_\rho$, $\mathcal{S}Badge_\xi$, $\mathcal{S}Pwd_\theta$, and $\mathcal{S}PIN_\lambda$). Each of these items is represented by b memory locations, each of which is $\Sigma$ bits long; therefore, each memory location contains one of $2^\Sigma$ possible values. This situation can be represented using an undirected "colored" graph. The possible values for a given memory location can be represented by a group of $2^\Sigma$ vertices v of the same "color", $v \in \mathbf{V}$, and each memory location can be represented by a different "color" group (represented as different shapes in FIG. 11). Each $v \in \mathbf{V}$ is connected to every other $v \in \mathbf{V}$ (except for v of the same "color") by an undirected edge $e \in E$, and each $e \in E$ has an associated weight W(e), $0 \leq W(e) \leq 1$. Each edge represents the possibility that the two connected v are both present in the correct reconstruction of the memory contents, and the associated W(e) represents the probability (again, the manner in which W(e) is assigned is discussed herein). A path connecting one v of each "color" that has the highest sum W(e) will represent the correct reconstruction of the memory contents (FIG. 11). This problem is defined as the Maximum Weight Path of Specified Length (MWPSL) problem; this problem is also proved NP-complete herein. In turn, the proof of the MWPSL problem proves Theorem 2.

While the discussion above was set forth in terms of an attacker that must recreate $\mathcal{S}Client_\rho$, $\mathcal{S}Badge_\xi$, $\mathcal{S}Pwd_\theta$, and $\mathcal{S}PIN_\lambda$, it should be understood that a similar result would apply with respect to an attacker that must recreate the Access Control List, discussed above, which may include similar information. Particularly, as mentioned, each SA and SSA may possess a copy of the ACL, which may contain multiple records that specify who is allowed to access which data (which may be specified by the Content PID). When a user seeks to access a piece of data, the request may be checked by every SA or SSA in the process against the ACL to authorize the request.

In illustrative embodiments, reconstructing an ACL record is an NP-complete problem. This can be understood by considering an IDACS system that uses the above-described ACL format. This ACL format uses p different types of ACL record items (e.g. User PID, Client PID, Content PID, etc.). These different types of ACL record items may be referred to as "flavors", symbolized by F, such that there are p different "flavors" in this system. Each of these p "flavors" may be x bits long; therefore, each item can exist as one of $2^x$ possible values, or "states", symbolized by S(F). The challenge to the attacker, in forging a single ACL record, is to find the correct S(F) for each of the F in the ACL record.

To frame this problem in terms of graph theory, one can consider vertices and edges as follows:

TABLE 3

| | |
|---|---|
| Vertex ($\mathbf{V}$) | A vertex in the graph represents one of all possible states for a given flavor. Each vertex is specified as a given flavor. There are $2^x$ vertices for each flavor. |
| Edge (E) | An edge connects two $\mathbf{V}$, or endpoints. It may be alternatively represented as the pair of $\mathbf{V}$ that it connects, ($\mathbf{V}_1, \mathbf{V}_2$). In this graph, there are no loops (edges with the same $\mathbf{V}$ as both endpoints). The edge represents a possibility that the two endpoint S(F) both exist in the actual ACL record. |
| Flavor (F) | The flavor of a node is equivalent to the idea of "graph coloring". Given a graph G = ($\mathbf{V}$, E), a p-coloring of G is a map F: $\mathbf{V} \to \{1, 2, \ldots, p\}$ and given vertices u and v, (u, v) $\in$ E implies that F(u) $\neq$ F(v). In other words, every $\mathbf{V}$ is assigned an F such that adjacent $\mathbf{V}$ cannot be assigned the same F. |
| State (S(F)) | An S(F) is a $\mathbf{V}$ representing a possible value for the ACL record item with a flavor F. |
| Edge Weight (W) | Each E has an associated weight W, $0 \leq W \leq 1$. This weight represents the probability that the two endpoint S(F) both exist in the actual ACL record. The method for determining this probability is discussed herein. |
| Path (P) | An alternating sequence of $\mathbf{V}$ and E, beginning and ending with a $\mathbf{V}$, where each $\mathbf{V}$ is connected to both the previous and following E in the sequence. No E or $\mathbf{V}$ are repeated. |
| Specified Length Path (SLP) | A P containing a specified number of $\mathbf{V}$. In this particular problem, the specified number of $\mathbf{V}$ is always p; each specified length path contains one $\mathbf{V}$ of each F, and no specified length path contains multiple $\mathbf{V}$ of the same F. A specified length path represents a legitimate value for an ACL record; all SLPs are candidates for the actual ACL record in question. |
| Maximum Weight Path (MWP) | This is the SLP of length p where the sum of all of the W in the SLP are greater than or equal to all other possible SLP in the graph problem. |

"Flavors" and "states" may be described as:

The challenge to the attacker would be to solve this graph problem. It should be noted that due to the time-changing nature of the ACL, the attacker may be faced with a new ACL record graph problem each time the ACL record changes.

Given a pile of data fragments (analogous to the S(F) in the ACL record problem), a PPM model can be used to automate the reassembly of the fragmented file(s). Given fragments A and B, the PPM model can analyze both fragments and generate a probability that fragments A and B are adjacent in the original file.

Figure 12:
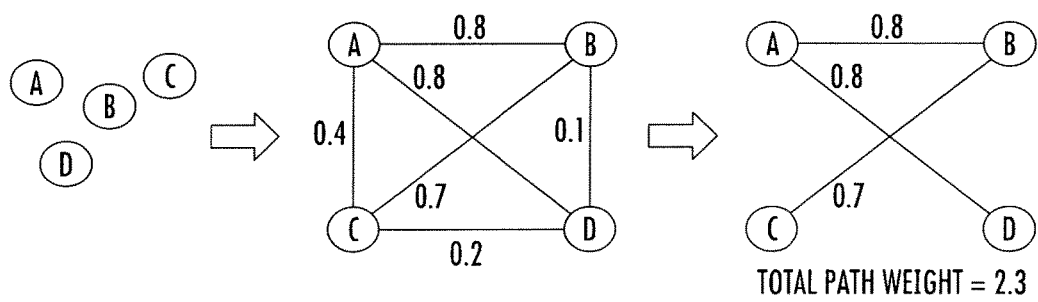
FIG. 12 shows that file fragments and probabilities can be used to form a complete undirected graph, where the file fragments are represented by vertices in the graph and the probabilities between any two fragments are represented by a weighted graph edge in accordance with the disclosure.

FIG. 12 shows that file fragments and probabilities can be used to form a complete undirected graph, where the file fragments are represented by vertices in the graph and the probabilities between any two fragments are represented by a weighted graph edge. At this point, the graph can be used to generate possible fragment orderings of the original file(s). If it is known that the pile of file fragments represents a single file, then in theory the Hamiltonian path (a path that touches each vertex exactly once) with the highest total edge weight would represent the most likely file fragment ordering. Assuming that a human forensics analyst could recognize correct matches between fragments, the graph solution could provide large pieces of the solution to the file reconstruction problem.

It is now possible to show that the ACL record graph problem derives from the file reassembly PPM problem. The states (S(F)) in the ACL record problem are analogous to the data fragments in the PPM problem. The edges (E) and edge weights (W) in both problems represent probabilities of relationships between the vertices (V). In the PPM problem, the goal is to isolate the Maximum Weight Hamiltonian Path (a path that covers all of the vertices), whereas the goal of the ACL record problem is to isolate a Maximum Weight Path of Specified Length (covering only p vertices). Both graphs would be solved in a similar manner.

Given that an attacker can use this graph method to attack the ACL record, the question of interest becomes, how efficient is PPM/ACL record graph reassembly, and what are the implications for IDACS security? To answer this question, one can examine the complexity of the reassembly algorithm. For purposes of this analysis, it is assumed the time needed to generate the W is constant for each pair of V; thus, the running time to construct the complete graph is equal to the number of E in the graph. In the ACL record reassembly problem, the total number of E is $2^{(2x-1)}(p^2-p)$; therefore the complexity of assembling the graph is $O((p^{*2x})^2)$. The main question, however, is how long does it take to determine the Maximum Weight Path of length p (which should provide the solution to the ACL record item matching problem)? This problem can be represented by the Maximum Weight Path of Specified Length problem. This problem is intractable, or NP-complete.

Thus, in the ACL record reconstruction problem, if $F_1=F_2$, then there is no E connecting $S(F_1)$ and $S(F_2)$. Assuming that the "correct" solution to the ACL record reconstruction problem is an MWP, then the ACL record reconstruction problem is equivalent to the Maximum Weight Path of Specified Length problem. Therefore, the ACL record reconstruction problem is NP-complete.

Since this problem has been proven NP-complete, it may be regarded as providing a high level of security provided that x is sufficiently large. Table 4 demonstrates that x in a realistic IDACS system is sufficiently large as to make the problem solution run-time prohibitively large. Additional security is provided if the ACL record graph W are sufficiently uniform.

reassembly problem, and the difficulty in finding the MWDPSL lies in the fact that the maximum weight path is not immediately apparent. If the graph in FIG. 10 contained a few very high-weight edges and the remaining edges had lower weights, this would provide a significant portion of the solution and greatly reduce the problem complexity.

Figure 13:
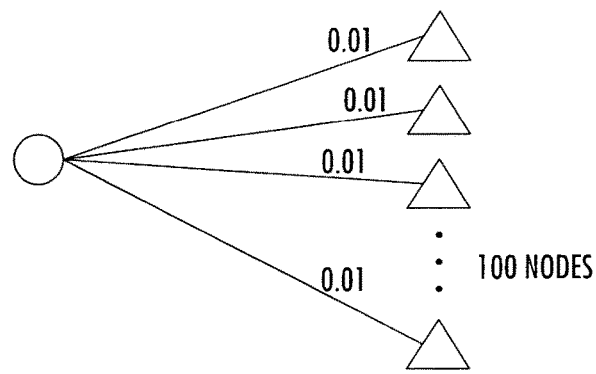
FIG. 13 shows a graph problem having uniform distribution of edge weights in accordance with the disclosure.
Figure 14:
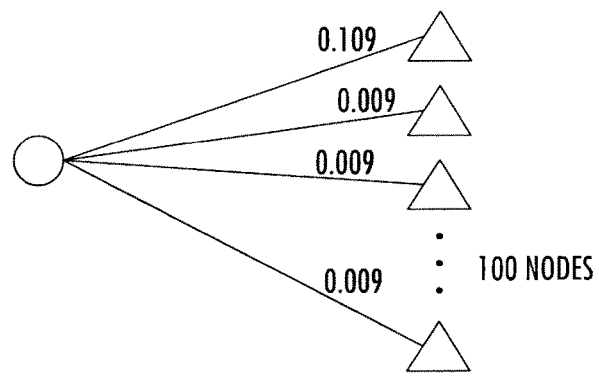
FIG. 14 shows a graph problem with relatively few high-weight edges in accordance with the disclosure.

FIG. 13 shows a graph problem having uniform distribution of edge weights. FIG. 14 shows a graph problem with relatively few high-weight edges. Generally, it is understood that data fragments (e.g., file fragments or $\overline{Seed}$) that are more "random" will have a low correlation with each other; when analyzed for likelihood of matching, they will result in a uniform distribution of edge weights as depicted in FIG. 13. A strong Random Number Generator would be expected to generate this type of result. However, if the data fragments are highly patterned (e.g., the outputs of a poorly-designed hash function), the analysis will result in a graph with a few high-weight edges, as depicted in FIG. 14. The question arises which of these two situations most closely matches the analysis of the IDACS $\overline{Seed}$.

The National Institute of Standards and Technology (NIST) has provided a battery of tests that analyze the outputs of Random Number Generators (RNGs) to measure their "randomness" by looking for patterns. This battery of tests has also been used on ciphertext from various encryption algorithms to measure how closely it matches truly random data. This battery contains 15 individual tests, each of which measures different aspects of "randomness" in a set of data. Each test, when analyzing a data sample, asks this general question: "If the algorithm that generated this data sample was truly random, what is the probability that this specific data sample could have been generated?" The test responds with a p-score for the analyzed data sample; this p-score is a probability in the range [0, 1]. NIST recommends interpreting these p-scores using a "significance level" of 0.01; if a data sample's p-score is above 0.01, then the data sample has passed the randomness test. Some data samples that are truly random will generate a failing p-score, which would be a "false negative" for randomness; this is due to inherent weaknesses in the tests. There are two ways to interpret the results of these tests. The first way is to look at the proportion, or percentage, of data samples with passing p-scores. According to the parameters in A. R. et al., "*A Statistical Test Suite for Random and Pseudorandom Number Generators for Cryptographic Applications,*"

TABLE 4

Time to reconstruct a single ACL record at $10^6$ oracle queries per second

| | | Number of ACL items (p) | | | |
|---|---|---|---|---|---|
| | | 7 | 8 | 9 | 10 |
| Bit Length of ACL Items (x) | 128 | $1.7 * 10^{256}$ yrs. | $5.7 * 10^{294}$ yrs. | $1.9 * 10^{333}$ yrs. | $6.6 * 10^{371}$ yrs. |
| | 256 | $8.8 * 10^{525}$ yrs. | $1.0 * 10^{603}$ yrs. | $1.2 * 10^{680}$ yrs. | $1.4 * 10^{757}$ yrs. |
| | 512 | $2.5 * 10^{1065}$ yrs. | $3.3 * 10^{1219}$ yrs. | $4.4 * 10^{1373}$ yrs. | $6.0 * 10^{1527}$ yrs. |

The NP-completeness set forth above with respect to ACL recreation and similarly set forth above in Theorem 1 and Theorem 2 with reference to $\mathcal{S}Cust_{\psi}$, or any other superstate points to a high level of security for IDACS, since NP-completeness is associated with an exponential increase in the problem solution complexity. However, NP-completeness speaks only to the worst-case (for the attacker) situation. It may be that the problem solution can be found with significantly less than exponential complexity. As mentioned, FIG. 10 shows a directed graph representing the seed

*Gaithersburg, Md.,* 2010, the contents of which are incorporated herein by reference, for a set of tests run with 1000 data samples, a truly random RNG will have a minimal proportion of 0.9805068, i.e., a minimum 98.05% pass rate. The second way is to look at the distribution of the test p-scores. For a set of truly random data samples being subjected to a test, it is expected that the p-scores of the data samples should be evenly distributed. Evenness of distribution can be measured by calculating P-value$_T$ based on the chi-square statistic for each test as discussed in A. R. et al.

if each test has P-value$_T$≥0.0001, then the p-scores are considered to be evenly distributed.

To determine the "randomness" of $\overline{Seed}$ used in IDACS, the NIST battery of tests was applied to a number of SHA-256 cryptographic hash outputs designed to simulate the $\overline{Seed}$ used by IDACS. The battery of tests was applied to 1000 data samples of sizes dictated by the NIST battery.

Figure 15:
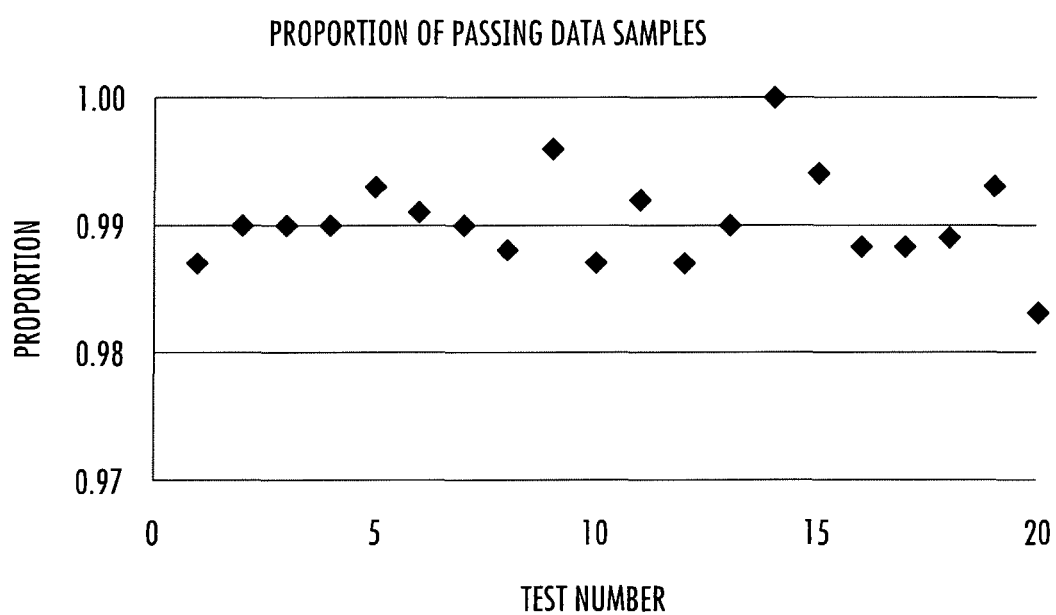
FIG. 15 shows an analysis of the exemplary IDACS network based on a battery of tests, and shows the proportions of data samples that pass each test in graph form in accordance with the disclosure.

Of the 15 tests in the battery, two of the tests were run twice during the course of the battery. Results for both tests are reported here. Three of the tests were run a number of times; results for two randomly chosen instances of those tests are reported here. All other tests were run once, and the results are reported here. There are a total of 20 separate test results. FIG. 15 shows an analysis of the exemplary IDACS network based on a battery of tests, and shows the proportions of data samples that pass each test in graph form. It can be seen that all tests exceed the minimum pass proportion of 0.9805068.

For the second analysis, the P-value$_T$ for each of the tests is presented in Table 5. It can be seen that all tests exceed the minimum pass value of 0.0001.

TABLE 5

P-value$_T$ for each test

| Test # | P-value$_T$ |
|---|---|
| 1 | 0.461612 |
| 2 | 0.328297 |
| 3 | 0.134944 |
| 4 | 0.788728 |
| 5 | 0.918317 |
| 6 | 0.605916 |
| 7 | 0.018668 |
| 8 | 0.378705 |
| 9 | 0.572847 |
| 10 | 0.873987 |
| 11 | 0.581082 |
| 12 | 0.444691 |
| 13 | 0.455937 |
| 14 | 0.052531 |
| 15 | 0.907498 |
| 16 | 0.345744 |
| 17 | 0.915241 |
| 18 | 0.078567 |
| 19 | 0.278461 |
| 20 | 0.614226 |

It can similarly be shown that the Network Security Ticket approval chain, discussed above with respect to Xchain values and other features, is secure. As mentioned, the Network Security Ticket may make use of XChain values, which may be generated using the CBC-MAC encryption, and the HMAC. Thus, this discussion of the security of the Network Security Ticket addresses these items. The Network Security Ticket approval chain system is secure because it is more difficult to break than the underlying CBC encryption mode used for the XChain values, and the HMAC, which are generally known to be secure. Moreover, the network security system as a whole is at least as strong as the security provided by the Network Security Ticket approval chain. Thus, the entire network is secure as well.

Implications of the disclosed embodiments may be better understood based on the following disclosure. Consider the attacker in the scenarios; an attacker who has access to cryptographic seeds but not $\mathcal{S}Cust_\psi$ (Theorem 1) OR no access to any memory locations at all (Theorem 2) faces the NP-complete reassembly problem. There is no known solution to these problems with a complexity polynomial to the problem size (number of seeds or memory locations in the graph). A polynomial-time solution could exist for certain situations meeting special constraints; however, due to the demonstrated randomness of the $\overline{Seed}$ used in IDACS, it is expected that the best algorithm will be of exponential complexity to the problem size. Having no special algorithms to aid him, and the attacker will be reduced to brute-force attacks. FIG. 10(b) shows a Theorem 1 situation, in which he must try every possible seed combination solution to F-box($\mathcal{L}$ookup) to guess the solution. FIG. 11(b) shows a Theorem 2 situation, in which he must try every possible memory value to guess the solution as shown in. Such attacks will be detected quickly, and the security log/forensics capabilities of IDACS will allow the system to identify which seeds, locations, and states have been compromised by the attacker. The attacker will be foiled even if the some (but not all) of {Client$_\rho$, Badge$_\varsigma$, PIN$_\lambda$, Pwd$_\theta$} are stolen. Furthermore, even if the attacker is able to guess the solution, because of Property 3, the identity, memory locations, and order of the cryptographic seeds evolve in time, presenting the attacker with totally new problems as shown in FIG. 10(a) and FIG. 11(a).

By way of illustration, consider a Theorem 1 situation where the attacker has access to all of the Seed$_\sigma$ needed to calculate $\overline{OTP_\psi}$ and $\overline{PID_\psi}$ (but without access to the F-box($\mathcal{L}$ookup) transform). For an IDACS system with a given q (number of SA$_X$, with the same number of OTP$_X$ to be calculated) and a given r (number of PID$_\varepsilon$ to be calculated) and a given number of Seed$_\sigma$ used to calculate each OTP$_X$ and PID$_\varepsilon$, Table 6 shows how long it would take the attacker (on average), trying all possible permutations of Seed$_\sigma$ at $10^6$ permutations per second, to find the ordering to correctly calculate $\overline{OTP_\psi}$ and $\overline{PID_\psi}$.

TABLE 6

| | | # Seed$_\sigma$ per OTP/PID | | |
|---|---|---|---|---|
| | | 8 | 12 | 16 |
| # OTPs (SAs) + # of PIDs | 6 + 8 | 3.13 * $10^{174}$ years | 4.01 * $10^{294}$ years | 8.87 * $10^{422}$ years |
| | 8 + 8 | 6.11 * $10^{207}$ years | 5.63 * $10^{348}$ years | 1.36 * $10^{499}$ years |
| | 10 + 8 | 8.80 * $10^{241}$ years | 1.59 * $10^{404}$ years | 1.14 * $10^{577}$ years |

Figure 16:
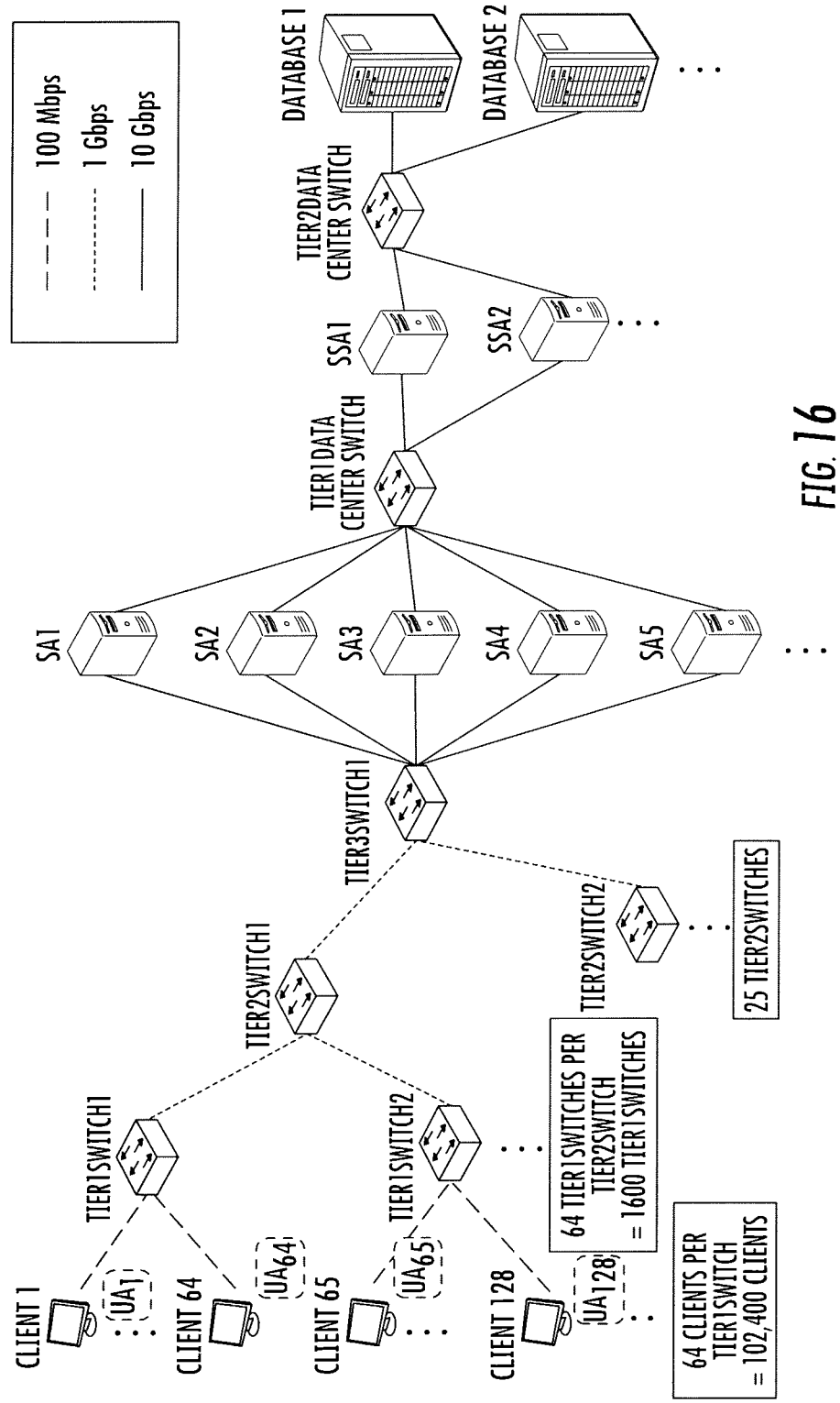
FIG. 16 shows a simulation network to demonstrate the exemplary IDACS network's capabilities in accordance with the disclosure.

FIG. 16 shows a simulation network to demonstrate the exemplary IDACS network's capabilities. Simulations for this research were carried out using a model of an IDACS network built using MATLAB. The network contains a variable number of Clients up to a maximum of 102,400. The SA barrier consisted of four SAs (with the possibility for future expansion). The network contained one or two SSAs and one Database (both with the possibility for future expansion). Network links were built according to the bandwidths indicated in FIG. 16, and were full-duplex.

During all simulations, background traffic was introduced into the network to simulate normal operating conditions. It was determined that introducing network traffic on the slower network connections did not affect the simulation results (but made the simulation running time prohibitively long). Therefore, all background traffic was introduced between the SAs and the SSAs. Uniformly distributed background traffic equal to 80 Kbps/Client was divided equally between the SAs and sent from each SA to each SSA. An equal amount of traffic was also sent from each SSA to each SA. This rate of background traffic ranged from a one-way 80% load on a 10 Gbps link for a full-sized network (102,400 Clients) to a much smaller load for smaller networks (0.8% load for 1000 Clients). This rate of background traffic affected both SA/SSA security log size (which has a substantial effect on real-time forensics, which is discussed herein and packet transit time in the datacenter (due to network congestion). Additionally, realistic packet delay times for routers were obtained from router manufacturer documentation and incorporated into the simulation. Packet processing delays for Clients, SAs, SSAs, and Databases were estimated; when the IDACS prototype implementation is completed by the researchers, more precise packet processing times will be measured and incorporated into the simulation.

Each simulation consisted of two phases. In the first phase, each Attacker would build a set of compromised Slaves (a botnet) gathered from a pool of vulnerable Clients. The attacker would compromise the Clients (turning them into bots) by sending a Compromise packet to each Slave candidate. During the second phase, each Attacker would send out a specified number of Read and Write attacks using a random-length Attack Chain of chained Slaves (the details of the attack scenarios used in this simulation are discussed herein). The start times for these attacks were uniformly distributed over a 20 millisecond period. These attack packets would be checked for $\overline{OTP_\psi}$ and $\overline{PID_\psi}$ by the SAs and the SSAs according to normal IDACS operations. If the packet failed any of these checks, the packet would be dropped as an attack. If an attack packet was able to bypass all of the security checks and successfully carry out a Database Read or Write operation, the attack was considered successful. Background traffic was present in the network during both of these phases.

In the simulation, if the attack packet did not possess the proper $\overline{OTP_\psi}$ and $\overline{PID_\psi}$, any SA or SSA would detect the attack 100% of the time. In reality, however, some attacks may go undetected due to various attack methods (zero-day attacks, SQL injection, buffer overflow, etc.) Therefore, for purposes of the present simulation, SAs and SSAs were classified as "fully compromised" and "partially compromised". A "fully compromised" SA or SSA would pass a failed $\overline{OTP_\psi}$ or $\overline{PID_\psi}$ check as successful 100% of the time; this situation represents an SA or SSA that is fully controlled by an attacker. A "partially compromised" SA or SSA would pass a failed $\overline{OTP_\psi}$ or $\overline{PID_\psi}$ check 50% of the time; this represents a "normal", or uncontrolled by an attacker, SA or SSA. The rationale behind setting a "partially compromised" SA or SSA to a 50% fail rate is twofold. First it simulates zero-day attacks, etc.; second, it demonstrates the strength of the IDACS system, even under "poor" conditions and makes more visible the effect of other variables on network performance. Generally, it is expected that the failure rate of "normal" machines may be less than 50%.

Additional probability variables were also used to govern other factors in the simulation. During chained attacks (in which an Attacker uses a chain of Slaves (bots) to launch an attack; this is discussed herein below), the attacker was given an 80% probability of stealing the cryptographic seeds needed to calculate $\overline{OTP_\psi}$, and $\overline{PID_\psi}$, and an 80% chance of an attack chain packet (prior to the final leg of the chained attack) passing a failed permissions check based on Content ($PID_\epsilon$).

During the simulations, one of the statistics that were tracked was the traceback time. Each time an attack was detected, the simulation time was recorded as T1 for that attack. When the SSA completed the traceback to identify the attacker, that time was recorded as T2. When the SSA completed the log search and correlation to identify all slaves of that attacker, that time was recorded as T3. These three times were used to compile statistics about the traceback speed of the IDACS system (which are shown in the following graphs). The two times of interest are the traceback time (T2−T1) and the All Slaves Identified time (T3−T1). These times demonstrate the real-time capability for forensics reporting in IDACS. It should be noted that for any given attack, (T2−T1) will always be shorter than (T3−T1), since (T3−T1) =(T2−T1)+(T3−T2). Tracebacks in this simulation were based solely on the log correlation method; other traceback methods such as PID examination can be examined in the following paper.

All tests were based on 1000 attacks for a given test case; 500 Read attacks and 500 Write attacks. Some tests used 1 SSA, and some used 2 SSAs. The first set of tests (FIG. 17) demonstrates the performance of the IDACS system under casualties ("fully compromised" SAs). It shows that even with multiple SAs compromised, the attack detect ratio is still very high. One SSA was used in these tests.

Figure 17:
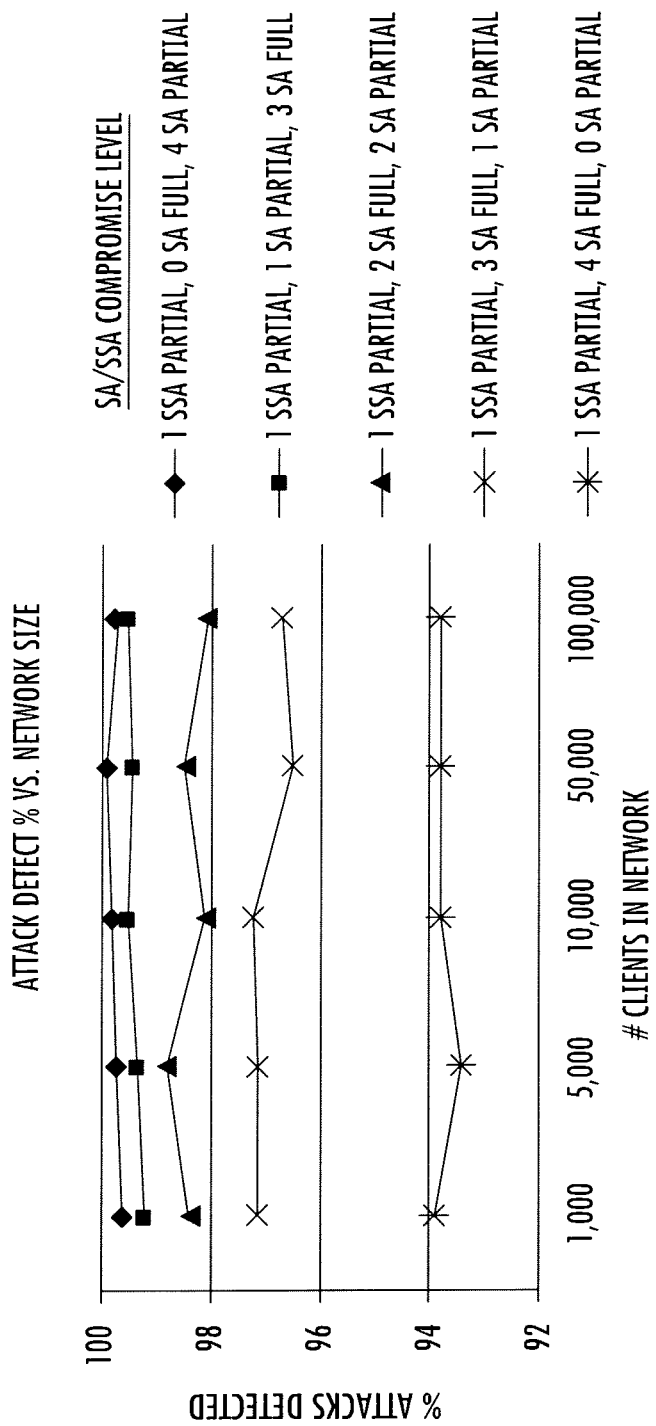
FIG. 17 shows simulation results for the exemplary IDACS network, and shows that the Attack Detection Ratio is fairly constant across network sizes in accordance with the disclosure.

FIG. 17 shows simulation results for the exemplary IDACS network, and shows that the Attack Detection Ratio is fairly constant across network sizes. However, the Attack Detection Ratio is affected by the number of "fully compromised" SAs. When no SAs are "fully compromised", the system performs very well, with an average detection ratio above 99.5%. With one or two SAs "fully compromised", the detection ratio is still fairly high. Thus, it can be seen that the system provides an excellent defense against attacks, even under heavy casualties.

Figure 18:
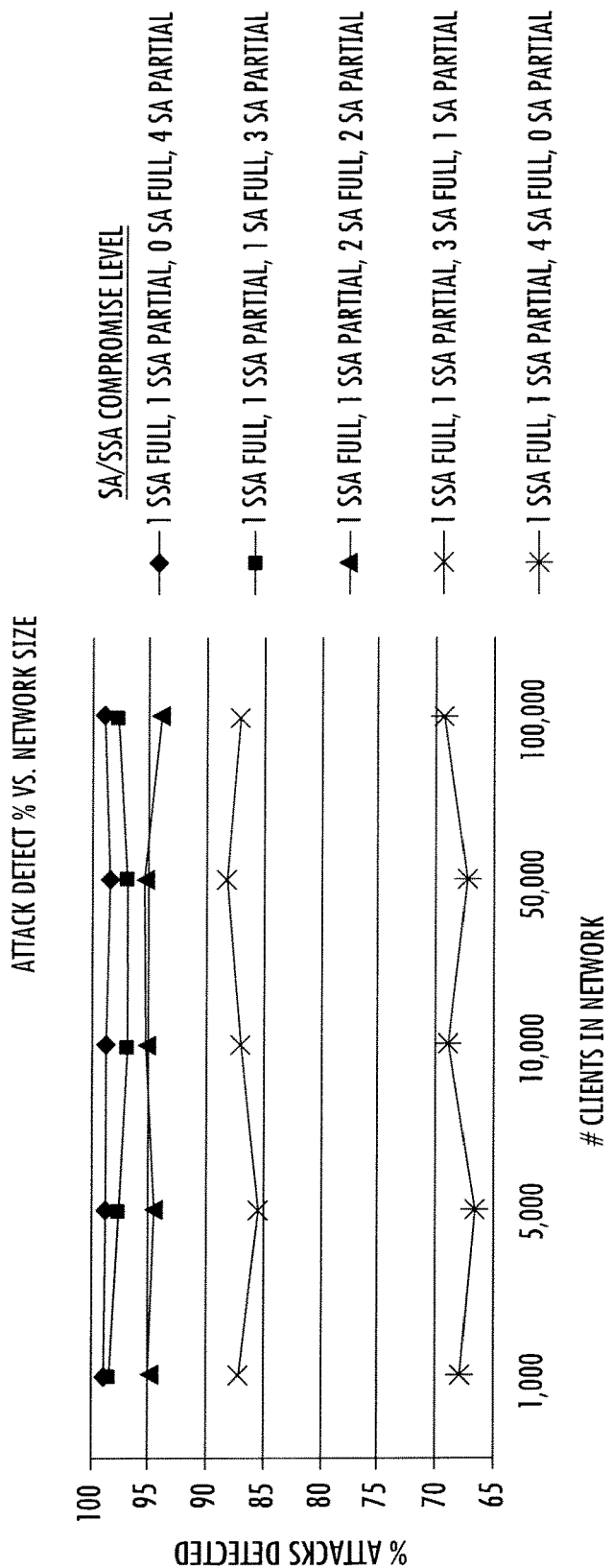
FIG. 18 shows a set of tests for the exemplary IDACS network performed to test the system under an SSA "full compromise" mode in accordance with the disclosure.

FIG. 18 shows a set of tests for the exemplary IDACS network performed to test the system under an SSA "full compromise" mode. The simulated network in these tests contained two SSAs; one was "fully compromised" and the other was "partially compromised". By comparing FIG. 17 and FIG. 18, it can be seen that the compromise of an SSA has greater effect on the Attack Detection Ratio than the compromise of an SA. This is because the simulation specified the chances of an attacker obtaining $\overline{OTP_\psi}$ and $\overline{PID_\psi}$ for a Slave were fairly high (80% chance), thus making permissions checks based on the Content($PID_\epsilon$) (which were only performed at SSAs) the primary mode of detecting attacks. Thus, the loss of an SSA has a greater effect on system security. However, even with an SSA and up to 2 SAs "fully compromised", the Attack Detect Ratio was still above 94%. This test shows that protecting the SSAs may be made a priority in system implementation.

Figure 19:
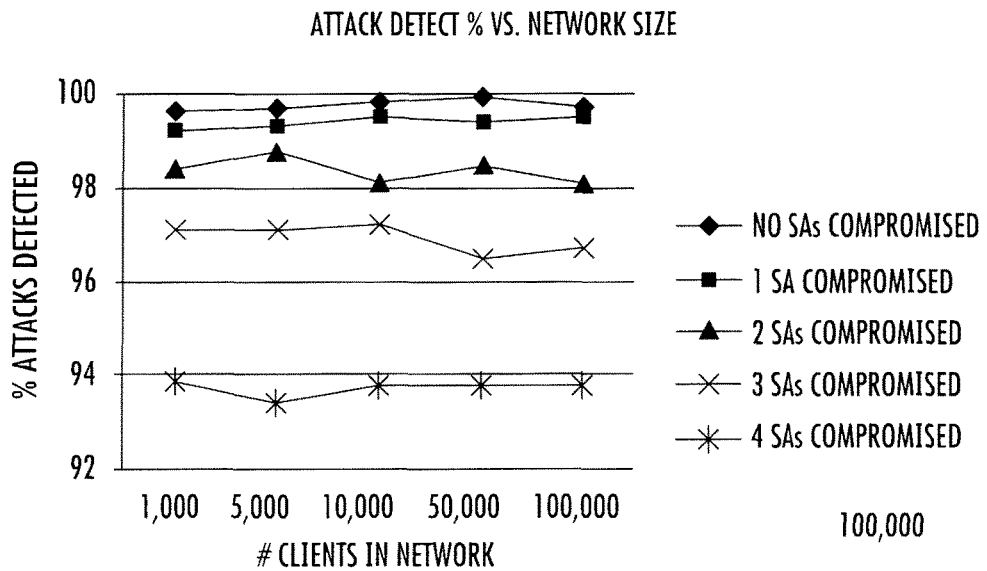
FIG. 19 demonstrates the performance of the IDACS system under casualties in accordance with the disclosure.

FIG. 19 demonstrates the performance of the IDACS system under casualties. It shows that even with multiple SAs compromised, the attack detect ratio is still very high. 1 SSA was used in these tests.

As expected, FIG. 19 shows that the Attack Detection Ratio is fairly constant across network sizes. However, the Attack Detection Ratio is affected by the number SAs compromised. When no SAs are compromised, the system performs very well, with an average detection ratio above 99.5%. With one or two SAs compromised, the detection ratio is still fairly high. Thus, it can be seen that the system provides an excellent defense against attacks, even with a heavily compromised system.

Figure 20:
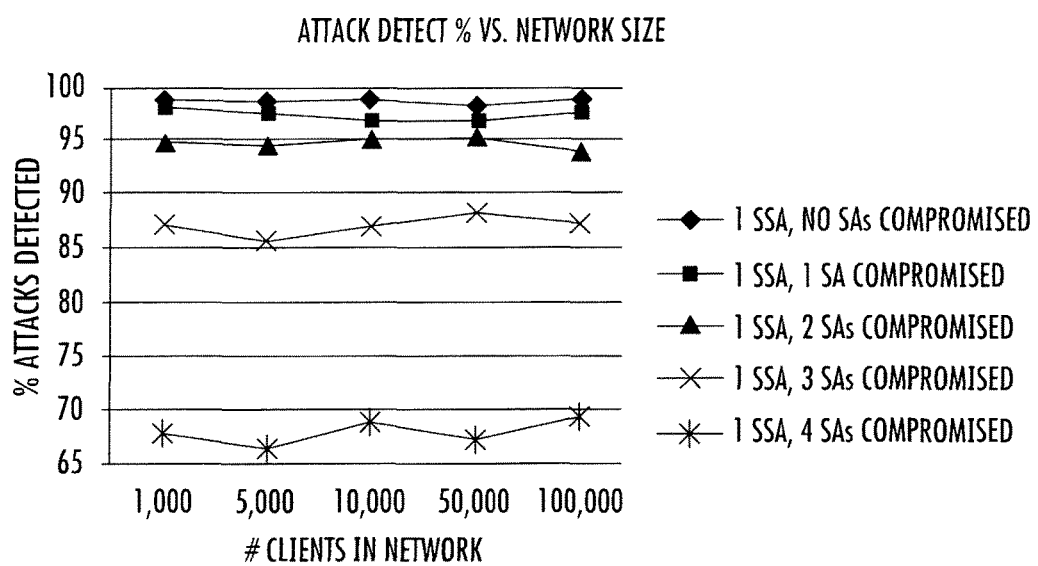
FIG. 20 shows the results of tests performed to test the system under SSA compromise in accordance with the disclosure.

FIG. 20 shows the results of tests performed to test the system under SSA compromise. The simulated network in these tests contained two SSAs, one of which was compromised. By comparing these figures, it can be seen that the compromise of an SSA has greater effect on the Attack Detection Ratio than the compromise of an SA. This is because the simulation specified the chances of an attacker obtaining authentication credentials for a Slave (e.g., Badge and Password) were fairly high (80% chance), thus making authorization (permissions) checks the primary mode of detecting attacks. Since the SSAs perform half of the permissions checks, the loss of an SSA has a greater effect on system security. However, even with an SSA and up to 2 SAs compromised, the Attack Detect Ratio was still above 94%. This test shows that protecting the SSAs should be a top priority in any implementation of this system.

Figure 21:
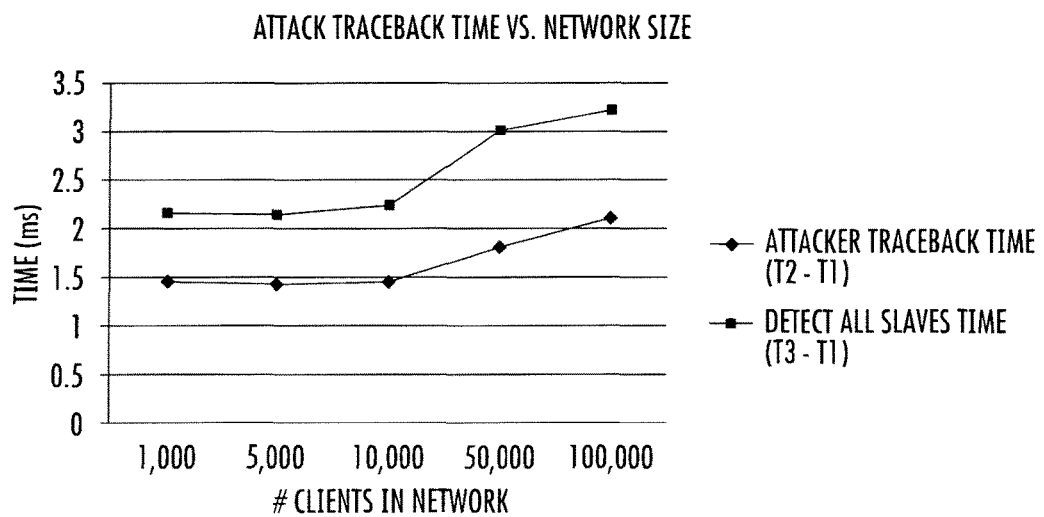
FIG. 21 shows the average attack traceback time for an IDACS system with 1 SSA and no SAs or SSAs compromised in accordance with the disclosure.

An advantage of the IDACS system is its ability to identify the attacker and all of the attacker's slaves quickly. FIG. 21 shows the average attack traceback time for an IDACS system with 1 SSA and no SAs or SSAs compromised.

FIG. 21 shows that the attack traceback times are very short, with even the (T3-T1) traceback time under 3.5 milliseconds. Even as the network size grows, the traceback time grows very slowly relative to the network size. This is because the simulation uses $\log_2(\ )$ to calculate log search time, since there are currently log search methods that are better than $\log_2(\ )$. Because the attack traceback is so fast, the IDACS system can begin defensive or counterattack procedures before the attacker even realizes that the attack has been detected and blocked.

Figure 22:
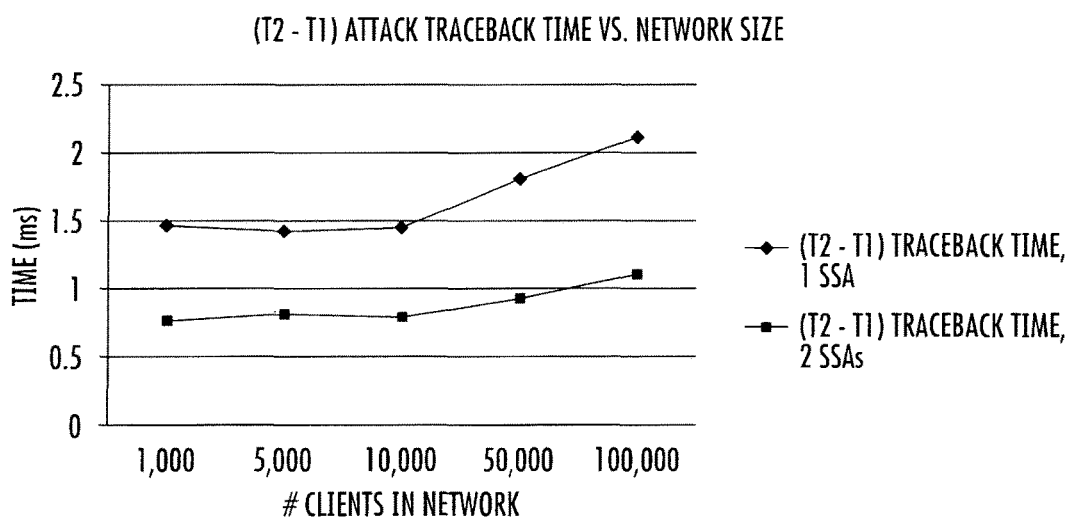
FIG. 22 and FIG. 23 show the average traceback times for different networks, one with one SSA, and one with two SSAs.
Figure 23:
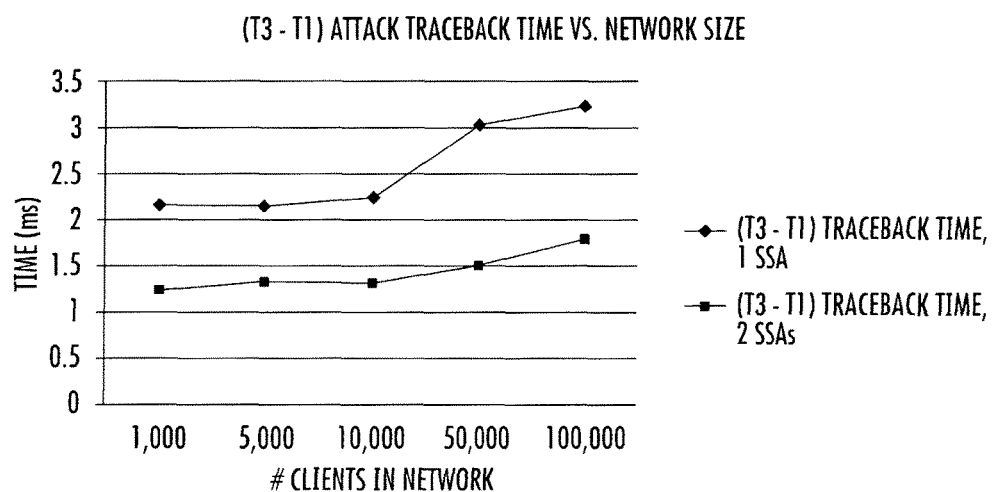

Another benefit of the IDACS system is that traceback can be improved by adding additional machines to the SA/SSA barrier. FIG. 22 and FIG. 23 show the average traceback times for different networks, one with one SSA, and one with two SSAs.

FIGS. 22 and 23 show that the introduction of a second SSA into the system can dramatically reduce the attack traceback time. This is because the presence of multiple SSAs spreads the traceback workload between different machines, increasing total system performance. This performance upgrade is a significant incentive for expanding the system during future development.

One of the main features of IDACS is the real-time forensics capability. Through log examination and correlation, IDACS is able to trace back and correctly identify the origin of an attack, whether the attack is launched directly by the attacker or indirectly using a botnet of legitimate IDACS users.

In today's network security environment, it is important to detect and prevent network intrusions. It is also important to trace network attacks to their origins and identify the culprits and their methods. This allows the guilty parties to be held liable for their actions; it also allows network administrators to focus their resources once they know the weak spots in their defenses.

Thus, disclosed embodiments provide real-time digital forensics capabilities that can identify network attackers as well as their collaborators, and even traitors within IDACS itself. Explanation is now provided regarding those capabilities possessed by IDACS and how they can be used to detect, block, and trace attacks to their origins. Additionally, simulations demonstrate the ability of IDACS to detect attacks and self-heal even when the network contains a high percentage of insider traitors.

When an attacker wishes to defeat the IDACS Network Access Control Protocol to gain access to protected data or services residing within the IDACS datacenter, there are several general attack vectors available. Three exemplary attack vectors (which may be used alone or in combination) include:

Attack vector 1: Forge legitimate $Cust_\psi$ credentials ($Client_\rho$, $Badge_\zeta$, $Pwd_\theta$, and $PIN_\lambda$) to impersonate a legitimate $Cust_\psi$ Attack vector 2: Steal/hack credentials for a legitimate $Cust_\psi$ Attack vector 3: Hack and gain control over one or more SAs and/or SSAs to manipulate the authentication process Attack vector 1) requires brute-force guessing of $\mathcal{S}Client_\rho$, $\mathcal{S}Badge_\zeta$, $\mathcal{S}Pwd_\theta$, and $\mathcal{S}PIN_\lambda$; this is generally infeasible according to Theorem 2. Attack vector 2) may be more effective, although the space-separation of $Client_\rho$, $Badge_\zeta$, $Pwd_\theta$, and $PIN_\lambda$ makes it more difficult for an attacker to collect them all and acquire a botnet of complete $Cust_\psi$. By using attack vector 3), an attacker can use a botnet of SAs and SSAs to bypass $\overline{OTP_\psi}$ and $\overline{PID_\psi}$ checks and even manipulate the correct authentication chain path. Attack vector 3) can be accomplished by hacking loyal SAs and SSAs, turning them into traitor machines; these traitor machines possess all of the $seed_\sigma$ used by that particular IDACS machine. Additionally, it may be possible to use a hostile machine to impersonate, or spoof, legitimate SAs and SSAs, although a spoofed machine would not possess the $seed_\sigma$ associated with the legitimate machine. The most effective attack scenario combines vectors 2) and 3) in an attempt to access the IDACS datacenter.

Figure 24:
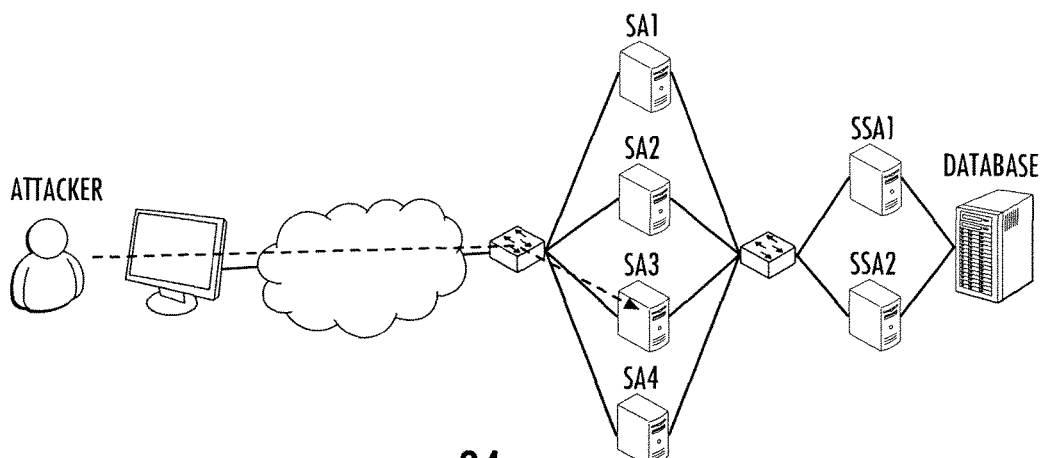
FIG. 24 depicts an attempt to attack the IDACS data center through a direct attack in accordance with the disclosure.

FIG. 24 depicts an attempt to attack the IDACS data center through a direct attack. If an attacker is able to use attack vector 1) possibly combined with 3) to control a single $Cust_\psi$, he will most likely attempt to access the IDACS datacenter directly.

Figure 25:
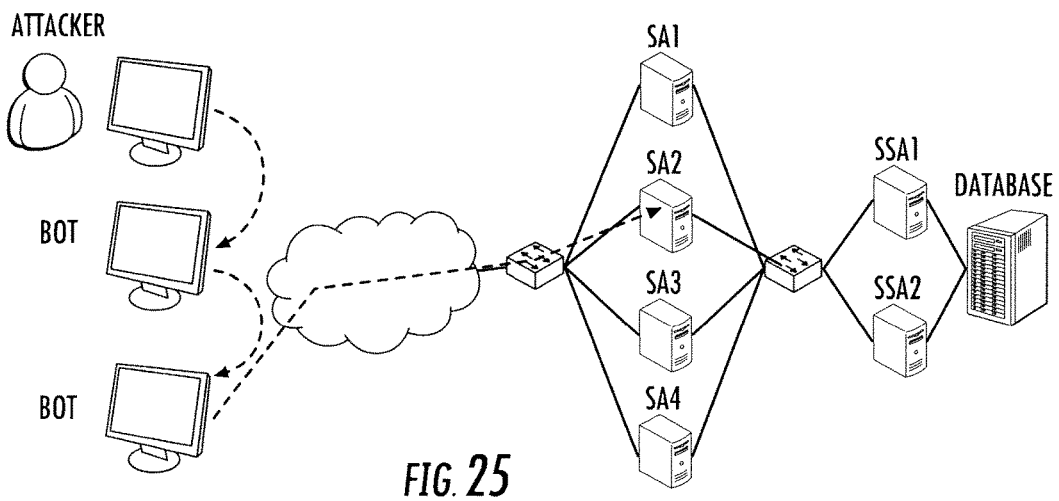
FIG. 25 depicts an attempt to attack the IDACS data center through a botnet attack in accordance with the disclosure.

FIG. 25 depicts an attempt to attack the IDACS data center through a botnet attack. If the attacker uses 2) to build a botnet of traitor $Cust_\psi$, he may choose to send $Ticket_\psi$, through multiple traitor $Cust_\psi$. In this way, the attacker is able to accomplish several objectives. First, the attacker takes advantage of the credentials owned by the traitor $Cust_\psi$ to send a legitimate $Ticket_\psi$. Second, in the case that the attack is detected, he masks his identity from the IDACS forensics suite. An attacker may build a botnet through any number of methods, such as Trojans contained on poisoned websites or in email attachments. In such an attack scenario, an attacker making use of a botnet to launch an attack may use one compromised machine or several machines "chained" together to launch the attack. However, even in such situations, once an attack is detected, the IDACS real-time forensics will be able to identify the attacker through the methods described herein.

By means of attack vectors 2) and 3), any $Cust_\psi$, $SA_\chi$, or $SSA_\kappa$ can be turned into a traitor machine. When this happens, the machine becomes a Byzantine actor (i.e. a malicious system actor that actively works to defeat the correct operation of the system). As known in the art, it is of interest to be able to prove that a given system is Byzantine-resistant, able to operate correctly in the presence of a given number of Byzantine actors.

The incorporation of the space-separated time-evolving relationship into the IDACS Network is based on a principle which affects its real-time forensics capabilities.

Principle 1: Any $Cust_\psi$, $SA_\chi$, or $SSA_\kappa$ in IDACS can be hacked and turned into a traitor/Byzantine actor. Any Customer ($Cust_\psi$), authenticating machine ($SA_\chi$ or $SSA_\kappa$), or real-time forensics machine ($SSA_\kappa$) can be turned into a traitor/Byzantine actor.

This principle is a reason for the decentralized approach of separating authentication capabilities in space and time. With a design that keeps this principle in mind, IDACS is able to detect and prevent almost all illegal $Ticket_\psi$ that are passed to it. In fact, IDACS is demonstrably secure against any illegal $Ticket_\psi$ under certain conditions. The following illustrative capabilities of this exemplary implementation generally hold under certain assumptions outlined below.

Assumption 1: For purposes of the present illustrative discussion, assume that any $Cust_\psi$ can only communicate with $\overline{SA}$.

Assumption 2: For purposes of the present illustrative discussion, assume that any member of $\overline{SA}$ can communicate with any $Cust_\psi$, any member of $\overline{SSA}$, and any other member of $\overline{SA}$.

Assumption 3: For purposes of the present illustrative discussion, assume that any member of $\overline{SSA}$ can communicate with any member of SA or DB, and any other member of $\overline{SSA}$.

Assumption 4: For purposes of the present illustrative discussion, assume that any member of $\overline{DB}$ can communicate with any member of $\overline{SSA}$.

Assumption 5: For purposes of the present illustrative discussion, assume that an attacker who is forming $Ticket_\psi$ has access to all $seed_\sigma$ stored on traitor $SA_\chi$ or $SSA_\kappa$.

Assumption 6: For purposes of the present illustrative discussion, assume that a spoofed $SA_\chi$ or $SSA_\kappa$ does not have access to the $Seed_\sigma$ stored on the machine it is spoofing.

Assumption 7: For purposes of the present illustrative discussion, assume that any $DB_\gamma$ that receives a $Ticket_\psi$ can verify whether or not the $SSA_\kappa$ that sent it was the correct $SSA_\kappa$ at the end of the calculated authentication chain.

Assumption 8: For purposes of the present illustrative discussion, assume that when processing $Ticket_\psi$, IDACS performs $\overline{OTP_\psi}$ or $\overline{PID_\psi}$ checks on both the approach from $Cust_\psi$ to $\overline{DB}$, and on the return from $\overline{DB}$ to $Cust_\psi$. However, the authentication chain path for the return is based on the reply message $Ticket'_\psi$, which is different from $Ticket_\psi$.

Assumption 9: For purposes of the present illustrative discussion, assume that any attack $Ticket_\psi$ falls into one of two categories: a) contains incorrect $\overline{OTP_\psi}$, or $\overline{PID_\psi}$, or b) contains correct $\overline{OTP_\psi}$ and $\overline{PID_\psi}$, but is attempting to access data or service that the originating $Cust_\psi$ does not have permissions to access.

These assumptions are provided to facilitate a description of the IDACS network's advantages. The scope of the present disclosure is not limited solely to networks satisfying these assumptions.

Based on these assumptions, certain capabilities about the attack detection and prevention capability of IDACS can be set forth. These capabilities help to illustrate the advantages and improvements of the systems, components, and methodologies in accordance with the present disclosure. Recall that N is the Authentication Chain Length; there are N SAs and N SSAs in the approach authentication chain and N SAs and N SSAs in the return authentication path.

Capability 1: A $Ticket_\psi$ with incorrect $\overline{OTP_\psi}$ will be detected with up to 2N traitor SSAs and (2N−1) traitor SAs in the approach and return authentication chain paths if the authentication chain path is not manipulated.

Justification for Capability 1: According to Assumption 5, if any $SA_\chi$ or $SSA_\kappa$ is a traitor, then the attacker will have access to the $Seed_\sigma$ necessary to calculate $\overline{PID_\psi}$ correctly. Thus, $\overline{PID_\psi}$ checks will pass at each $SA_\chi$ or $SSA_\kappa$ even if they are not traitors.

Figure 26:
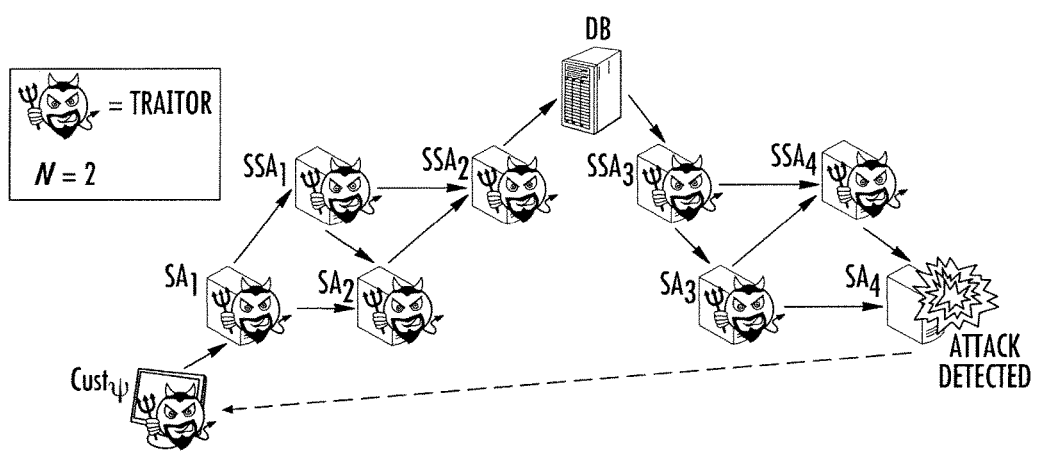
FIG. 26 shows that if there is even one loyal $SA_\chi$ in the authentication chain of an exemplary IDACS network implementation, the attacker does not have access to the $Seed_\sigma$ needed to calculate $OTP_\chi$ in accordance with the disclosure.

FIG. 26 shows that if there is even one loyal $SA_\chi$ in the authentication chain of an exemplary IDACS network implementation, the attacker does not have access to the $Seed_\sigma$ needed to calculate $OTP_\chi$. This incorrect $OTP_\chi$ is detected by the loyal $SA_\chi$, and the attack is detected and prevented.

However, the strength of IDACS illustrated above is qualified by the limitation set forth in Capability 2.

Capability 2: A $Ticket_\psi$ with incorrect $\overline{OTP_\psi}$ or $\overline{PID_\psi}$ is not guaranteed to be detected with one traitor SA and two traitor SSAs in IDACS if the authentication chain path is manipulated.

Justification for Capability 2: Under certain circumstances, IDACS cannot guarantee detection of an attack $Ticket_\psi$ with one traitor SA and two traitor SSAs in IDACS if authentication chain path manipulation is allowed. The attacker is allowed to choose the first SA in the authentication chain, so he chooses a traitor SA. Since this SA is a Byzantine actor, it calculates the authentication chain path based on $Ticket_\psi$ and checks to see whether the last SSA in the authentication chain is also a traitor.

Figure 27:
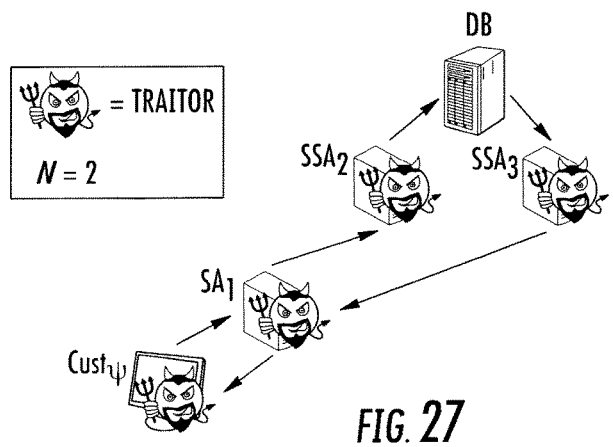
FIG. 27 shows the situation in which the last SSA in an authentication chain is also a traitor in accordance with the disclosure.

FIG. 27 shows the situation in which the last SSA in an authentication chain is also a traitor. In such a situation, the SA passes $Ticket_\psi$ to this $SSA_\kappa$ which then passes $Ticket_\psi$ to a $DB_\gamma$. This action bypasses the $\overline{OTP_\psi}$ and $\overline{PID_\psi}$ checks that would be performed by (potentially) loyal SAs and SSAs in the authentication chain. It is necessary for the last SSA in the authentication chain to be a traitor, because according to Assumption 7, $DB_\gamma$ will also validate the authentication chain for the sending SSA. When $DB_\gamma$ forms the return ticket $Ticket'_\psi$, it will calculate a return authentication chain where the first SSA in the path cannot (by the rules) be the same as the last SSA in the approach path. If this SSA happens to be a traitor also, then it sends $Ticket'_\psi$ directly to the first traitor SA, which sends it to the attacker's $Cust_\psi$.

Capability 1 and Capability 2 address a) in Assumption 9; similar capabilities can be offered to address b) in Assumption 9.

Capability 3: A $Ticket_\psi$ with correct $\overline{OTP_\psi}$ and $\overline{PID_\psi}$ but seeking to access data/services for which $Cust_\psi$ is not granted permissions is detected with up to (4N−1) traitor SAs and SSAs in the approach and return authentication chains if the authentication chain is not manipulated.

Justification for Capability 3: Since $Ticket_\psi$ contains correct $\overline{OTP_\psi}$ and $\overline{PID_\psi}$, the attack will not be detected on those grounds. However, each SA and SSA also checks the data/service targeted by $Ticket_\psi$ to see if $Cust_\psi$ has permissions on it.

Figure 28:
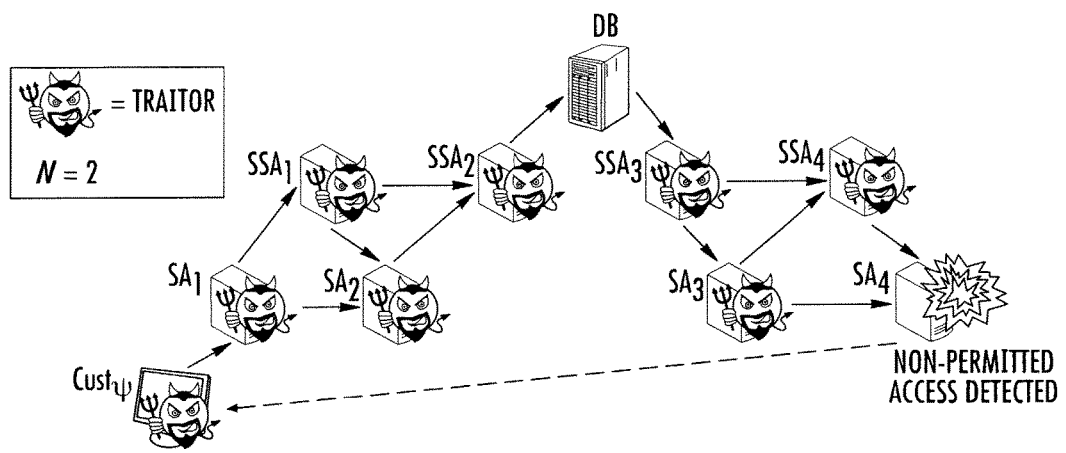
FIG. 28 shows a situation in which only one SA or SSA in the approach or return authentication chain is loyal, and that an attack is prevented in accordance with the disclosure.

FIG. 28 shows a situation in which only one SA or SSA in the approach or return authentication chain is loyal, and that an attack is prevented. In such a situation, a non-permitted $Ticket_\psi$ is detected, and the attack is prevented.

Capability 4: A $Ticket_\psi$ with correct $\overline{OTP_\psi}$ and $\overline{PID_\psi}$ but seeking to access data/services for which $Cust_\psi$ is not granted permissions is not guaranteed to be detected with 1 traitor SA and 2 traitor SSAs in IDACS if the authentication chain is manipulated.

Justification for Capability 4: The justification for Capability 4 is similar to the justification for Capability 2.

There is also one final Capability that can be made regarding spoofed IDACS machines.

Capability 4: A spoofed $SA_\chi$ or $SSA_\kappa$ is detected as soon as it communicates with a loyal $SA_\chi$ or $SSA_\kappa$.

Justification for Capability 4: According to Assumption 6, a spoofed $SA_\chi$ or $SSA_\kappa$ does not have access to the $\overline{Seed}_\sigma$ of the machine it is spoofing, including the $Seed_\sigma$ needed to calculate XV when communicating with other $SA_\chi$ or $SSA_\kappa$. Therefore, it is unable to correctly calculate the requisite XV; this situation is detected by a loyal $SA_\chi$ or $SSA_\kappa$.

When an attack is detected by IDACS, it may fall into one of several categories, with each category having corresponding root causes. If an attack is detected based on a $OTP_\chi$ or $\overline{PID_\psi}$ failure, this is because the attacker possesses an incomplete subset of the set $\{Client_\rho, Badge_\xi, Pwd_\theta, PIN_\lambda\}$; additionally, if prior SAs or SSAs correctly authenticated the attack packet based on $OTP_\chi$ and $\overline{PID_\psi}$, they may be controlled or spoofed by the attacker. If the attack is detected base on an XV failure, this is because the attacker is spoofing one or more of the SA/SSAs. Each of these situations is handled differently by IDACS.

When an attack is detected in Algoritihm 4, the function report_and_trace_attack( ) (Algorithm 6) is called to invoke the IDACS real-time digital forensics suite. The inputs to Algorithm 6 are $\overline{reasons}$, $\overline{which\_PID\_faded}$, TK_A, TK_B, and current_location. $\overline{reasons}$ indicates the reason the attack was detected; it may contain one or more of the following values: OTP_fail, PID_fail, and XV_fail. $\overline{which\_P\_faded}$ contains a list of which (if any) of the $PID_\epsilon$ failed. TK_A and TK_B are the two TKs received by the detecting SA or SSA (if applicable). "current_location" indicates the identity of the SA or SSA detecting the attack. When "report_and_trace_attack( )" is called, these inputs are packaged into an attack report (3). If the attack was detected by an SA (1), the report is sent to an SSA for processing (2 and 3). If the attack is detected at an SSA (4), then the attack is processed by that SSA (5). To process the attack, the SSA calls different forensics subroutines based on the reasons for the attack detection. If the attack failed due to $OTP_\chi$ or $\overline{PID_\psi}$ (6), then "trace_attack( )" is called to identify the root attacker, the bot chain used in the attack, and any suspicious packet types that may have been used by the attacker to compromise other bots (7); "identify_bots( )" is called to identify possibilities for traitor $Client_\rho$ controlled by the attacker (8); "identify_compromised_items( )" is called to determine which members of $\{Client_\rho, Badge_\xi, Pwd_\theta, PIN_\lambda\}$ have been stolen by the attacker based on correlation with $\overline{which\_PID\_faded}$ (9). If an attack was detected by a failed $OTP_\chi$, $\overline{PID_\psi}$, or XV (10), then "identify_bad_SA_SSA( )" is called to determine which SAs or SSAs (if any) are traitor or spoofed. All of these subroutines are discussed in more detail herein.

---

Algorithm 6. report_and_trace_attack( )

--- inputs : $\overline{reasons}$, $\overline{which\_PID\_failed}$, TK_A, TK_B, current_location
outputs : none
1  if ( current_location ∈ $\overline{SA}$)
2    dest_SSA = random SSA
3    current_location → dest_SSA: {$\overline{reasons}$, $\overline{which\_PID\_failed}$, TK_A, TK_B, PID(current_location) }
4  else if ( current_location ∈ $\overline{SSA}$)
5    dest_SSA = current_location
    End
      at dest_SSA:
6  if (OTP_fail ∈ $\overline{reasons}$) or (PID_fail ∈ $\overline{reasons}$)
7    {sourceTraitorCust, $\overline{bot\_chain}$, $\overline{suspicious\_pkt\_type}$} = trace_attack (TK_A)
8    traitorCustBotnet = identify_bots(sourceTraitorCust, $\overline{suspicious\_pkt\_type}$, $\overline{SA}$, $\overline{SSA}$)
9    traitorCustItems = identify_compromised_items($\overline{which\_PID\_failed}$, TK_A)
    End
10 if (XV_fail ∈ $\overline{reasons}$) or (OTP_fail ∈ $\overline{reasons}$) or (PID_fail ∈ $\overline{reasons}$)
11    traitorSAsSSAs = identify_bad_SA_SSA($\overline{reasons}$, TK_A, TK_B)
    End

---

Figures 29, 30:
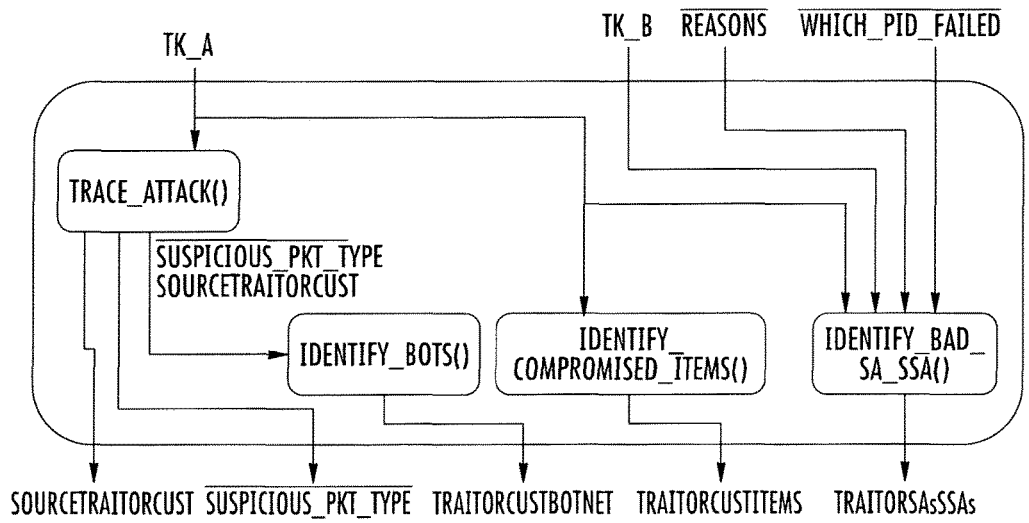
FIG. 29 presents a block diagram representation of an algorithm that invokes the IDACS real-time digital forensics suite in accordance with the disclosure.
FIG. 30 shows the format of exemplary log records in accordance with the disclosure.

FIG. 29 presents a block diagram representation of an algorithm that invokes the IDACS real-time digital forensics suite. Particularly, the block diagram of FIG. 29 is in accordance with Algorithm, showing the relationship between inputs, outputs and different functions that are called within the algorithm. Table 7 provides an overview of traceback algorithms provided by the IDACS real-time digital forensics suite and what types of attacks they are able to detect:

TABLE 7

| Traceback function | What it detects |
| --- | --- |
| trace_attack( ) | Root traitor $Cust_\psi$ and other bot $Cust_\psi$ used in attack chain |
| identify_bots( ) | Attacker's controlled botnet of traitor $Cust_\psi$ |
| identify_compromised_items( ) | Which cryptographic seeds have been leaked, and by whom {$Client_\rho$, $Badge_\xi$, $Pwd_\theta$, $PIN_\lambda$} |
| identify_bad_SA_SSA( ) | Which SAs and SSAs are spoofed bad XV), or traitors (clearing packets with incorrect $\overline{OTP_\psi}$ or $\overline{PID_\psi}$) |

In connection with the following description about the different digital forensics functions used by IDACS, the following Property informs the disclosure:

Property 7: The different design elements of IDACS (the distribution of PID seeds, the design of Xchain values, the design of security log records, etc.) are carefully crafted to facilitate the real-time digital forensics capabilities of IDACS. Therefore, IDACS is able to provide high-speed forensic services in real-time with minimal overhead.

When an attack is detected by IDACS, the real-time digital forensics suite is able to trace the attack to the root attacker by correlating the security log records on IDACS machines. In a fully-realized IDACS system, all data packets (including Client-Client packets such as are used in attack chains) may be required to pass through the SA barrier. Even in a less-complete IDACS system, the $Client_\rho$ may still maintain security logs for all of the data packets they send and receive. These security logs are a key component to the attacker traceback capability.

In illustrative embodiments, every time an SA, SSA, or client receives a packet of any type, a record of information related to that packet is saved in a log. The log record contains some basic information about that packet, such as origin, destination, packet type (i.e. Remote Terminal, HTML, FTP, etc.), and content PID of the information on the Database that the packet was seeking to access (if applicable). In certain implementations, all packets (even those not directly accessing the database) may pass through the SA/SSA layer, so all packets may leave records in their logs. In other implementations, client-to-client communications will not pass through any SAs or SSAs. In such cases, client logs may also be used to gain a more complete picture of all network communications. When an attack is detected, the SSA may search through these logs to identify the origin of the attack.

Maintaining a log with records for each packet received over an unduly long period of time may be prohibitively expensive and time-consuming. Therefore, each SA and SSA may maintain log records based on a sliding time window of length t, e.g. t=15 minutes. Logs may be maintained for the most recent t time of traffic for fast availability, while older logs can be stored on a backup server.

FIG. 30 shows the format of exemplary log records. The record may contain standard packet data such as source and destination IP address, packet sequence number, and packet arrival time. The record may also contain the current and parent application PIDs, which can indicate if a client besides the one at the source IP address initiated this packet. The record may also contain the packet type, the Content PID associated with the packet (if the packet is accessing data on the database), and other PIDs. Finally, the record may contain the network path which specifies the IP addresses of all the machines (clients, routers, SAs, etc.) the packet has touched on its route. Each packet record may protected by several HMACs generated by hashing the packet record together with a key shared between that SA and an SSA. This can allow the SSA in question to verify the authenticity of the packet record and detect/prevent log tampering by an attacker.

As mentioned, systems in accordance with the present disclosure may provide attack traceback capability. This capability can accomplish multiple purposes. For example, it can identify the origin attacker of a detected attack. As another example, it can detect all slave clients (i.e. botnet members) controlled by an attacker. IDACS can also provide partial tracebacks that provide leads and clues for human investigators to pursue in the identification of attacker locations.

One example of the type of traceback that IDACS can provide is through log correlation. As mentioned, SAs and SSAs may maintain log records of all packets that pass through them. Client machines may also maintain logs of sent and received packets. In certain implementations, client-to-client communication may all pass through the SA-SSA barrier. Thus, all packets being sent by an attacker to compromise clients may leave records in the SA and SSA logs. In this case, it may be possible for IDACS to identify the origin of an attack and provide this information in a real-time forensics report.

Figure 31A:
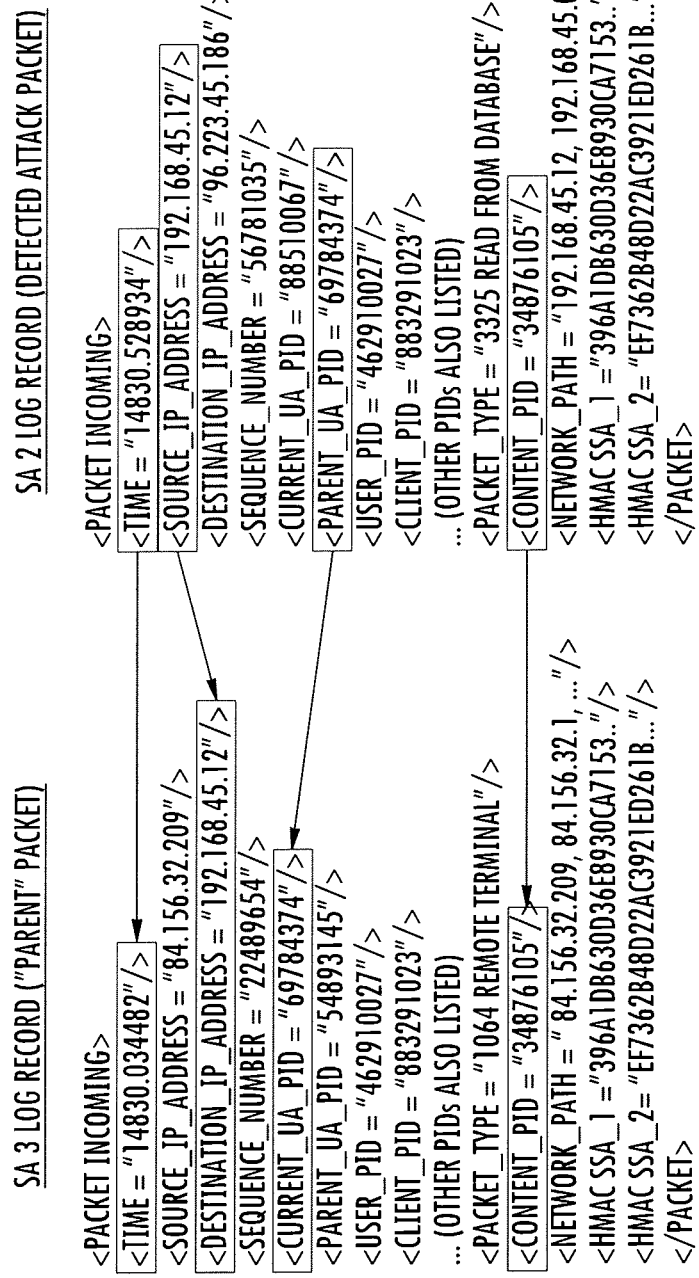
FIG. 31(a) shows an exemplary detected attack packet log record in accordance with the disclosure.

FIG. 31(a) shows an exemplary detected attack packet log record generated for a data packet that was detected to be an attack due to $OTP_\chi$ or $PID_\varepsilon$ failure. When a client initiates a secure session with IDACS, packets transmitted may contain two fields, "Current Application PID" (also referred to herein as CURRENT_UA_PID) and "Parent Application PID" (also referred to herein as PARENT_UA_PID). The "Current Application PID" field may contain the PID of the user agent that sent the packet. If the packet was created in response to an earlier packet received from another client (but the later packet is not a "reply" message), then the "Parent Application PID" field may contain the "Current Application PID" of the original packet. Otherwise, the "Parent Application PID" field may contain the same value as the "Current Application PID" field. For example, if Client A sends a message to Client B instructing Client B to send a different message to Client C, then the packet from Client A contains Client A's Application PID in both the "Current Application PID" and "Parent Application PID" fields. The packet sent from Client B to Client C will contain Client B's Application PID in the "Current Application ID" field and Client A's Application PID in the "Parent Application ID" field.

IDACS processing may begin from the assumption that a given packet was part of an attack chain (see FIG. 25), and begins to trace the attack chain back to the root attacker. The trace may be based on the log record items TIME, SOURCE/DESTINATION_IP_ADDRESS, PARENT/CURRENT_UA_PID, and CONTENT_PID. The SSA running the trace searches its own logs as well as the logs of other SSAs, SAs, and Clients (if necessary) for the "parent" packet that directly precedes the detected packet in the attack chain. The trace searches for a packet that was logged before the attack was logged (TIME<14830.528934) where the IP Address of the machine that sent the attack packet is the same as the destination IP address of the "parent" packet (SOURCE_IP_ADDRESS for the attack packet=DESTINATION_IP_ADDRESS for the "parent" packet); the DB-side data targeted by the Content($PID_\varepsilon$) in the "parent" packet is the same as in the attack packet (CONTENT_PID=34876105); and the parent UA for the detected attack packet is the same as the current UA for the "parent" packet (PARENT_UA_PID for the attack packet=CURRENT_UA_PID for the "parent" packet). Such a "parent" attack packet is detected (left side of FIG. 31). The investigating SSA then compares the CURRENT_UA_PID and PARENT_UA_PID in the "parent" packet record. If they are the same, then the machine at SOURCE_IP_ADDRESS is flagged as the root attacker; if they are different, the machine at SOURCE_IP_ADDRESS is flagged as a traitor $Client_\rho$, and the traceback continues.

The details of this traceback are show in the "trace_attack( )" function set forth in Algorithm 7. The SSA executing the traceback receives the log record \TK\ of the detected attack packet as input. The critical trace parameters are extracted from this record: the $Cust_\psi$ who sent TK is marked as the candidate for the attacker (1), and the time (2), Parent UA($PID_\varepsilon$) (3), and Content($PID_\varepsilon$) (4) are isolated. Additionally, the $\overline{bot\_chain}$ and $\overline{suspicious\_pkt\_types}$ outputs are initialized (5 and 6). Until the source attacker has been identified (7 and 8), the SSA initiates a search of all $SSA_\kappa$, SA, and Client logs (10) searching for a "parent" packet logged before the current attack packet with parameters on the Destination IP address, Current UA($PID_\varepsilon$), and Content ($PID_\varepsilon$) (9). If the F-box( ℞ trv) transform (10) returns no hits on the "parent" packet (11), the traceback has failed to detect the root attacker; however, a partial list of bots used in the attack chain can be returned (12). If a "parent" packet with matching Current UA($PID_\varepsilon$) and Parent UA($PID_\varepsilon$) is discovered (13), then the $Cust_\psi$ that sent this packet is identified as the root attacker (15). Additionally, since this packet was used in an attack chain, this packet's type is flagged as suspicious (16) and is used in Algorithm 8 to identify candidate members of the attacker's controlled botnet. Otherwise, the Client that sent the "parent" packet is marked as one of the bots controlled by an attacker (17), the search parameters are reset based on the "parent" packet (18 to 21), this packet's type is flagged as suspicious (16), and the search continues (8). Once the root attacker has been identified, the function returns the identity of the root attacker, the bots that were identified in the attack chain, and the suspicious packet types (23).

---

Algorithm 7. trace_attack( )

--- inputs: \TK\
outputs: sourceAttacker, $\overline{bot\_chain}$, $\overline{suspicious\_pkt\_type}$
1  sourceAttacker = $Cust_\psi$ ◊ \TK\
2  sourceTme = current time
3  sourceParentUAPID = Parent_UA($PID_\varepsilon$) ◊ \TK\
4  sourceContentPID = Content($PID_\varepsilon$) ◊ \TK\
5  $\overline{bot\_chain}$ = null -continued Algorithm 7. trace_attack( )

```
 6  suspicious_pkt_types = null
 7  sourceFound = false
 8  while (sourceFound == false)
 9    parameters = {time ◇ \Ticket_ψ\ < sourceTime,
         destination_IP ◇ \Ticket_ψ\ = = sourceAttacker,
         Current_UA(PID_ε) ◇ \Ticket_ψ\ == sourceParentUAPID,
         Content(PID_ε) ◇ \Ticket_ψ\ == sourceContentID}
10    source\Ticket_ψ\ = F-box(℞ trv, ♫ SA, ♫ SSA, parameters)
11    if(source\Ticket_ψ\ == null)
12      fail; return {null, bot_chain}
13    else if((Parent_UA(PID_ε) ◇ source\Ticket_ψ\) == (Current_UA
       (PID_ε) ◇
       source\Ticket_ψ\))
14      sourceFound = true
15      sourceAttacker = Cust_ψ ◇ source\Ticket_ψ\
16      suspicious_pkt_types = F-box(ℭ oncat, suspicious_pkt_types,
         packet_type(source\Ticket_ψ\))
      Else
17      bot_chain = F-box(ℭ oncat, bot_chain, Cust_ψ ◇ source\Ticket_ψ\)
18      sourceAttacker = Cust_ψ ◇ source\Ticket_ψ\
19      sourceTime = time ◇ source\Ticket_ψ\
20      sourceParentUAPID = Parent_UA(PID_ε) ◇ source\Ticket_ψ\
21      sourceContentID = Content(PID_ε) ◇ source\Ticket_ψ\
22      suspicious_pkt_types = F-box(ℭ oncat, suspicious_pkt_types,
         packet_type(source\Ticket_ψ\))
      End
    End
23  return { sourceAttacker, bot_chain, suspicious_pkt_types }
```

Immediately following the call of "trace_attack( )" to identify the root traitor Client and the traitor Client bots in the attack chain, the SSA running the real-time digital forensics suite may run the "identify_bots( )" function to identify all traitor Client bots controlled by the attacker, even those in a dormant state. In the example shown in FIG. 31, it was seen that the root traitor Client and other traitor Clients in the attack chain used "Remote Terminal" packets to carry out attack activities. Therefore, the digital forensics suite designates "Remote Terminal" packets, especially those sent by the root Traitor Client, to be suspicious. The SSA running the real-time digital forensics suite searches through the security log records of all SAs, SSAs, and Clients to identify suspicious network traffic.

Figure 31B:
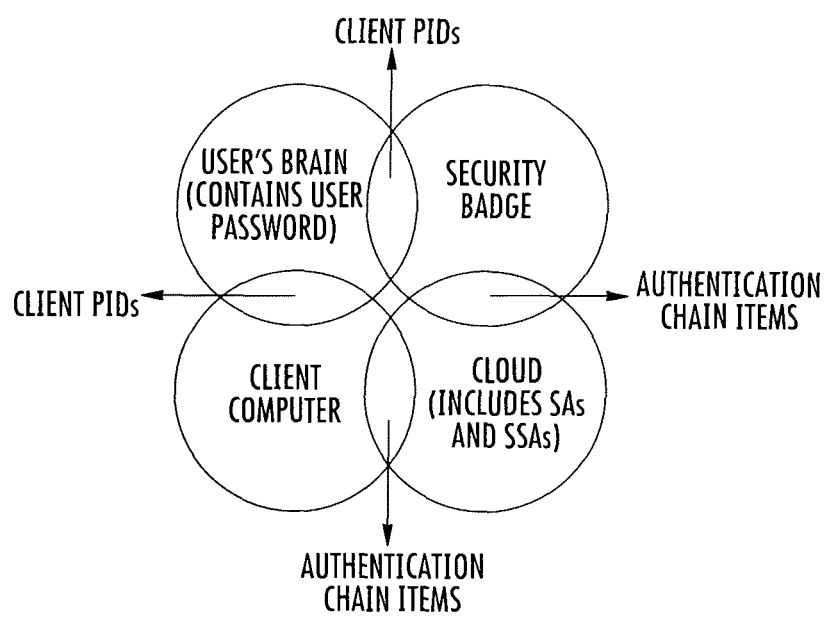
FIG. 31(b) illustrates how distributed storage may assist in attack traceback in accordance with the disclosure.

Other methods can be used to expand the traceback analysis. For example, FIG. 31(b) illustrates how distributed storage may assist in attack traceback. The seeds used to generate PIDs, Authentication Chain items, and other security parameters in IDACS may be stored in physically different locations, which provides another space-separation aspect to IDACS. These seeds may be stored and combined in such a way such that incorrect formation of the security parameters will provide some indication of which areas have been compromised by an attacker. For example, the correct formation of certain PIDs and Authentication Chain items and the incorrect formation of others could indicate that the Client computer and the Security Badge had been compromised, but that the User password and the SAs and SSAs were still intact.

FIG. 32 shows an exemplary log record in which the digital forensics suite searches for "Remote Terminal" packets in the security logs that were sent by the root traitor Client. Here, the SOURCE_IP_ADDRESS=75.128.32.146. This search yields a number of Clients that are strong candidates for being Traitors. This list of potential Traitor Clients is added to those identified in the attack chain in "trace_attack( )"; these Clients may be quarantined and examined in-depth until they can be healed and returned to service. It should be noted that this algorithm is capable of detecting dormant traitor Clients even beyond those that were used in the attack.

Algorithm 8 details the "identify_bots( )" algorithm. The function receives the identity of the root Traitor Client, any suspicious packet types as determined by the "trace_attack( )" algorithm, and $\overline{SA}$ and $\overline{SSA}$ as inputs. It creates a set of parameters (1) to be the input to the F-box(℞ trv) transform; the packets sought by the F-box(℞ trv) transform must be among the suspicious packet types and must have originated from the attacker detected by "trace_attack( )". The function then loops through every SA (2) and every SSA (5), searching for log records that meet the search parameters (3 and 6). For any security log records that match the conditions, the $Cust_ψ$ that were targeted by those packets are added to the list of possible traitor Clients controlled by the attacker (4 and 7).

Algorithm 8. identify_bots( )

```
inputs: attacker-Cust_ψ, suspicious_pkt_type, SA , SSA
outputs: possible_traitors
1   parameters = { packet type(\Ticket_ψ\) ∈ suspicious_pkt_type,
       source IP(\Ticket_ψ\) == source IP(attacker-Cust_ψ)}
2   for index=1 to χ
3     temp = F-box(℞ trv, ♫ SA_χ, parameters)
4     possible_traitors = F-box(ℭ oncat, possible_traitors, destination_
         IP ◇ temp)
    End
5   for index=1 to κ
6     temp = F-box(℞ trv, ♫ SSA_κ, parameters)
7     possible_traitors = F-box(ℭ oncat, possible_traitors,
         destination_IP ◇ temp)
    End
8   return possible_traitors
```

The space-time separated and jointly evolving relationship built into IDACS can be used to assist the real-time digital forensics capabilities. The elements of $\overline{PID_ψ}$ are calculated based on seeds drawn from $Client_ρ$, $Badge_ξ$, $Pwd_θ$, and $PIN_λ$. However, not every $PID_ε$ needs to draw seeds from each of these sources; the locations of seeds used to calculate individual $PID_ε$ can be tailored to meet the security requirements of the system. In addition to the distributed storage of the seeds, certain bits are removed from the seeds themselves and stored in a physically different location. These bits are called Xbits; they are discussed in more detail herein. The Xbits are stored on the SAs in the IDACS Network, and they must be recombined with the cryptographic seeds to correctly calculate the elements of $\overline{PID_ψ}$.

Figure 33:
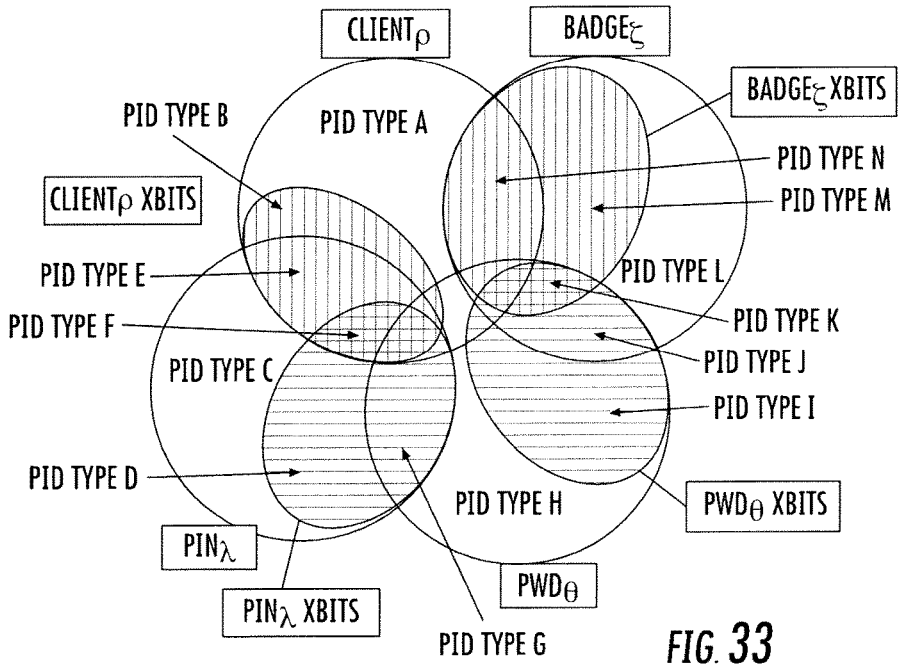
FIG. 33 demonstrates how different $PID_\varepsilon$ can be calculated using different combinations of cryptographic seeds and xbits in accordance with the disclosure.

FIG. 33 demonstrates how different $PID_ε$ can be calculated using different combinations of cryptographic seeds and xbits. Type A $PID_ε$ are calculated using only seeds from $Client_ρ$, Type B $PID_ε$ are calculated using only seeds from $Client_ρ$ and the associated Xbits, Type F $PID_ε$ are calculated using seeds and associated Xbits from both $Client_ρ$ and $PIN_λ$, etc. This division accomplishes two purposes. First, separating the seeds across different locations increases the complexity for an attacker to correctly construct $\overline{PID_ψ}$, as discussed previously. Second, a seed separation and combination such as indicated in FIG. 33 can be used as a forensics tool. If an attack is detected by an SA or SSA due to $\overline{PID_ψ}$ failure, an analysis of which $PID_ε$ failed and which $PID_ε$ were formed correctly can indicate which Client-side items and Network-side SAs or SSAs are Traitors or have had their memory compromised. For example, if a Type D $PID_ε$ was formed correctly, it may be assumed that the attacker owns the seeds derived from $PIN_\lambda$ as well as the associated Xbits; if a Type F $PID_\epsilon$ was formed correctly, it may be assumed that the seeds stored on $Client_\rho$ and derived from $PIN_\lambda$ as well as the associated Xbits are owned by the attacker.

An example of the "identify_compromised_items( )" algorithm corresponding to FIG. 33 is shown in Algorithm 9. The $Cust_\psi$ that sent the detected attack packet $TK_1$ is marked as a Traitor (1), with the $Client_\rho$, $Badge_\zeta$, $Pwd_\theta$, and $PIN_\lambda$ contained in $Cust_\psi$, and the SAs storing their corresponding Xbits all possibly controlled/cloned by an attacker. Based on what type of $PID_\epsilon$ were formed correctly in the attack packet $TK_1$, certain elements of $Cust_\psi$ and $\overline{SA}$ are marked as Traitor (4-11). The following properties hold true for forensics capabilities in accordance with this exemplary implementation:

Property 8: Due to the seed distribution and $PID_\epsilon$ formation (as discussed generically in Property 7), the checks performed in "identify_compromised_items( )" are performed very quickly with very little overhead.

Property 9: The seed distribution shown in FIG. 33 is very flexible, and can be adjusted on a per-Client basis to meet the security needs of the particular Client or IDACS implementation.

---

Algorithm 9. identify_compromised_items( )

--- inputs: $\overline{\text{which\_PIDs\_failed}}$, TK_A
outputs: traitor_items
1   traitor_C = $Cust_\psi$ ◊ TK_A
2   traitor_items = null
3   switch ($PID_\epsilon \notin \overline{\text{which\_PIDs\_failed}}$)
4       case Type A, B, E, F, or N: traitor_items = F-box(ℭ oncat, traitor_items, Z ◊ compromised_C)
5       case Type C, D, E, F, or G: traitor_items = F-box(ℭ oncat, traitor_items, X ◊ compromised_C)
6       case Type G, H, I, J, or K: traitor_items = F-box(ℭ oncat, traitor_items, W ◊ compromised_C)
7       case Type J, K, L, M, or N: traitor_items = F-box(ℭ oncat, traitor_items, Y ◊ compromised_C)
8       case B, E, or F: traitor_items = F-box(ℭ oncat, traitor_items, SA storing xbits for Z ◊ traitor_C)
9       case D, F, or G: traitor_items = F-box(ℭ oncat, traitor_items, SA storing xbits for X ◊ traitor_C)
10      case I, J, or K: traitor_items = F-box(ℭ oncat, traitor_items, SA storing xbits for W ◊ traitor_C)
11      case K, M, or N: traitor_items = F-box(ℭ oncat, traitor_items, SA storing xbits for Y ◊ traitor_C)
        End
12  return traitor_items

---

Figure 34:
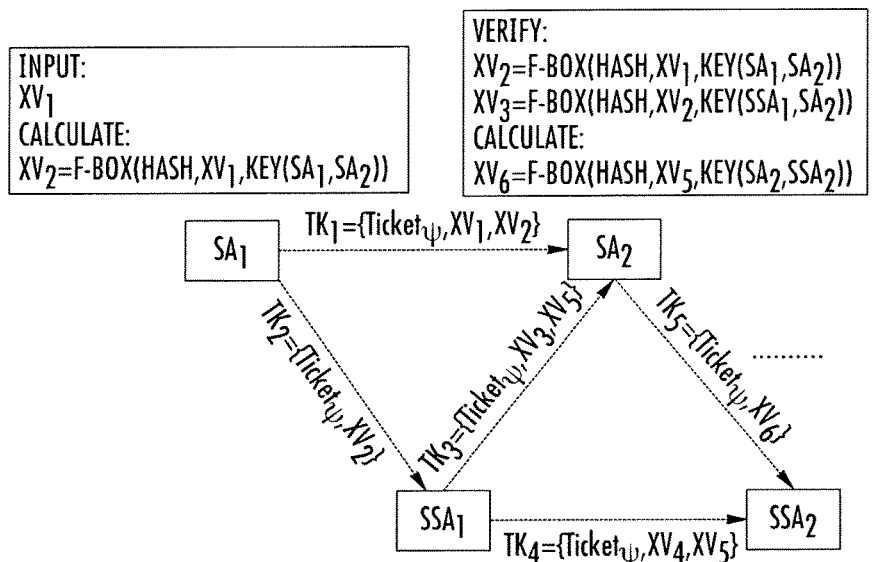
FIG. 34 graphically illustrates the handling of the XV used a network-side authentication and authorization process in accordance with the disclosure.

FIG. 34 graphically illustrates the handling of the XV used a network-side authentication and authorization process. Particularly, FIG. 34 illustrates the handling of the XV in the "run_auth_chain( )" algorithm outlined in Algorithm 4.

Figure 35:
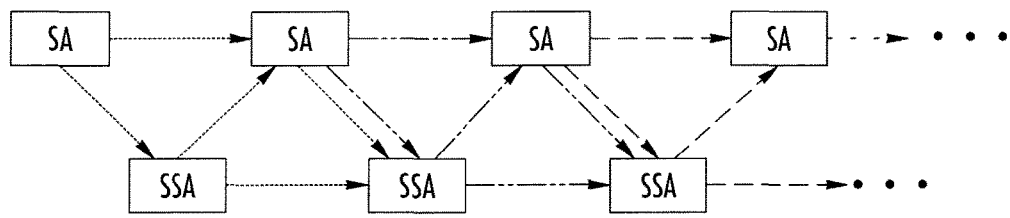
FIG. 35 shows that multiple iterations of a network-side authentication and authorization process are called to form a complete authentication chain in accordance with the disclosure.

FIG. 35 shows that multiple iterations of a network-side authentication and authorization process are called to form a complete authentication chain. Particularly, multiple iterations of Algorithm 4 are called by Algorithm 1 (7 and 8) in order to form the complete authentication chain of SAs and SSAs. The iterations are linked, with the $SA_2$ and $SSA_2$ of one iteration becoming the $SA_1$ and $SSA_1$ of the next iteration (FIG. 34 and FIG. 35). In a given iteration, $SA_1$ and $SSA_1$ perform $OTP_\chi$ and $\overline{PID_\psi}$ checks and generate XV, while $SA_2$ and $SSA_2$ verify the XV to verify the identity of $SA_1$ and $SSA_1$. At $SA_2$, if the $XV_2$ verification fails, it indicates that $SA_1$ is being by an attacker; if the $XV_3$ verification fails, this indicates that $SSA_1$ is being spoofed by an attacker. In the same way, at $SSA_2$ if the $XV_5$ verification fails, it indicates that $SSA_1$ is being spoofed; if $XV_6$ fails, it indicates that $SA_2$ is being spoofed. These relationships are discussed more extensively herein.

Additionally, each $SA_2$ and $SSA_2$ in a given iteration of Algorithm 4 are the $SA_1$ and $SSA_1$ for the next iteration, and will also be performing $OTP_\chi$ and $\overline{PID_\psi}$ checks in the next iteration. If an SA or SSA finds that the $\overline{PID_\psi}$ fails the check, but a previous SA or SSA indicated that the $\overline{PID_\psi}$ had passed the check (by passing $Ticket_\psi$ along the authentication chain), then this is highly indicative that the previous SA or SSA is a traitor (having passed verifiably bad $\overline{PID_\psi}$). In the same way, if an $SA_\chi$ finds that $OTP_\chi$ fails the check, but a previous SA passed $Ticket_\psi$ along the authentication chain, this may be indicative that the previous SA is a traitor. This cannot be directly verified, since only the previous SA possesses the seeds to verify his OTP; however, the forensics engine can be configured on the assumption that it is statistically unlikely that the seeds to correctly calculate a given OTP could be obtained without obtaining the seeds for all OTPs.

Due to the design of $\overline{OTP_\psi}$, $\overline{PID_\psi}$, and the XV relationships, traitor or spoofed SAs or SSAs can be detected and isolated very quickly.

Algorithm 10 illustrates how the digital forensics suite performs this detection.

Property 10: The relationships between the XV values (as discussed generically in Property 7) and also $\overline{OTP_\psi}$ and $\overline{PID_\psi}$ are carefully designed to allow traitor or cloned SAs/SSAs to be detected quickly in real time with very little overhead.

---

Algorithm 10. identify_bad_SA_SSA( )

--- inputs: $\overline{\text{reasons}}$, TK_A, TK_B
outputs: compromised_machines
1 traitor_spoofed_machines = null
2 sourceA = origin of TK_A
3 sourceB = origin of TK_B
4 if (TK_A_XV_fail ∈ $\overline{\text{reasons}}$) OR (TK_A_PID_fail ∈ $\overline{\text{reasons}}$) OR (TK_A_OTP_fail ∈ $\overline{\text{reasons}}$)
5   traitor_spoofed_machines = F-box(ℭ oncat, traitor_spoofed_machines, sourceA)
    end
6 if (TK_B_XV_fail ∈ $\overline{\text{reasons}}$) OR (TK_B_PID_fail ∈ $\overline{\text{reasons}}$) OR (TK_B_OTP_fail ∈ $\overline{\text{reasons}}$)
7   traitor_spoofed_machines = F-box(ℭ oncat, traitor_spoofed_machines, sourceB)
    End
8 return traitor_spoofed_machines

---

The above-described may also be used to simulate the attack traceback time for the illustrative IDACS network. When an attack was detected (i.e. (4), (11), (17), or (23) in Algorithm 4), this point in time was recorded as T1. After the attack had been reported to an SSA and the traceback to identify the root attacker was completed (i.e the "trace_attack( )" algorithm called at (7) of Algorithm 6 completes), this point in time was recorded as T2. After the attacker's botnet was identified (i.e. the "identify_bots( )" function called at (8) of Algorithm 6 completes), this point in time was recorded as T3. The statistics of interest in this situation were the (T2−T1) time and the (T3−T1) time. The (T2−T1) time is termed the "Attack Traceback Time", since it represents the time it takes for the root attacker to be identified after the attack is detected. The (T3−T1) time is termed the "Botnet Detection Time", since it represents the time it takes for the root attacker's botnet to be detected after the attack is detected. It should be noted here that the "Botnet Detection Time" will always be greater than the "Attack Traceback Time", since (T3−T1)=(T2−T1)+(T3−T2).

Figure 36:
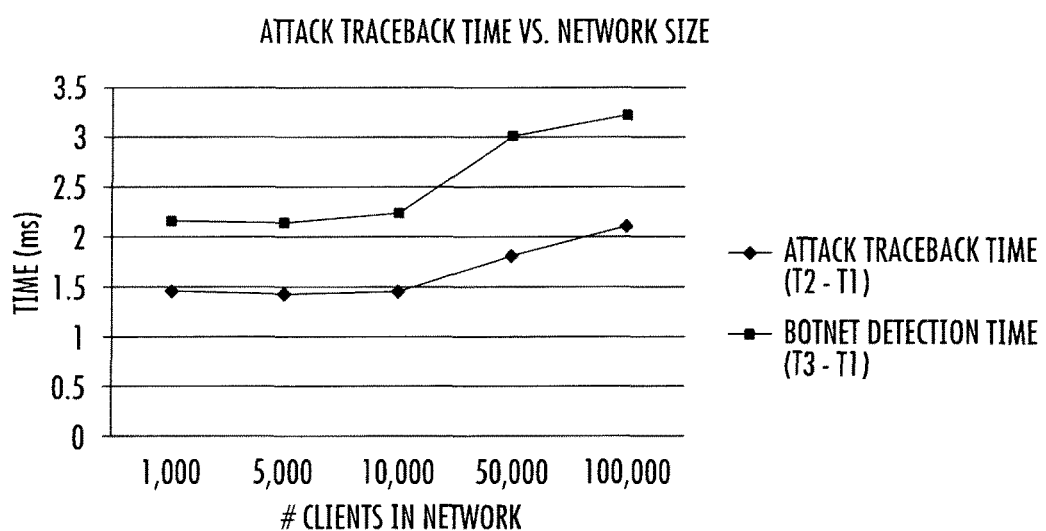
FIG. 36 shows the average attack traceback time for an IDACS network with 1 SSA in accordance with the disclosure.
Figure 37:
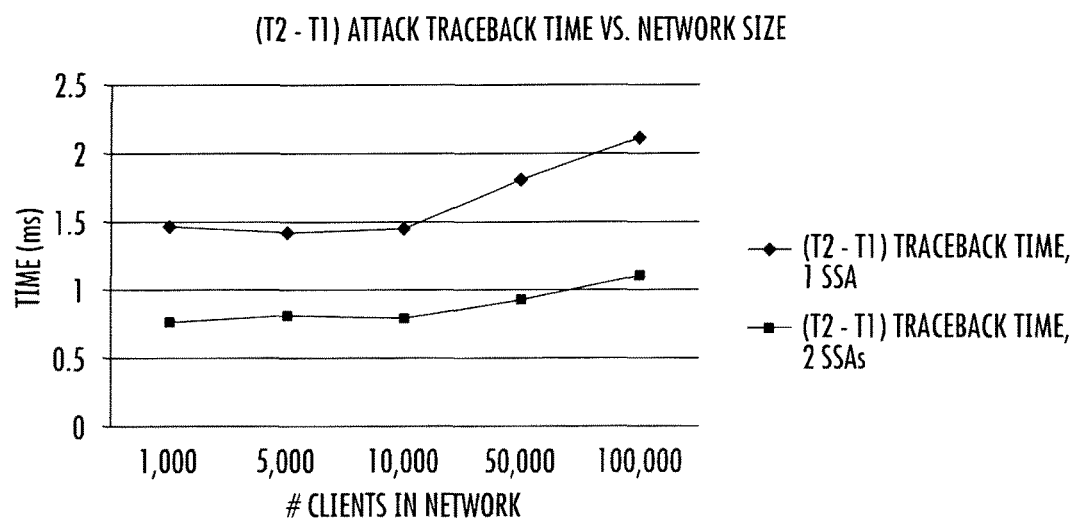
FIG. 37 and FIG. 38 show the Attack Traceback Time and Botnet Detection Time for an IDACS network, one with 1 SSA, and one with 2 SSAs in accordance with the disclosure.
Figure 38:
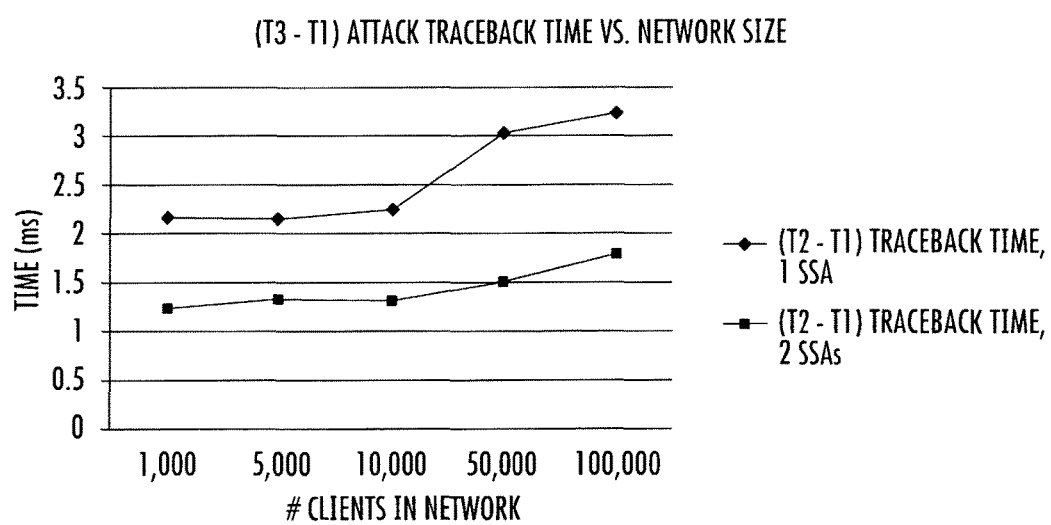

FIGS. 36-38 show simulation results for the IDACS Network consisting of 4 "partially compromised" SAs and either 1 or 2 "partially compromised" SSAs. FIG. 36 shows the average attack traceback time for an IDACS network with 1 SSA. FIG. 36 shows that the attack traceback for this simulated IDACS network is extremely fast, with both the root attacker and its botnet identified in less than 3.5 milliseconds even for a network of 100,000 Client Devices. Additionally, the attack traceback time grows logarithmically with the network size; this is because the simulation uses $\log_2(x)$ to calculate security log search times, since there currently exist search algorithms that are better than $\log_2(x)$. Because the attack traceback time is so short, an IDACS Network can alert a system administrator and begin network healing procedures before the attacker even realizes that the attack has been detected.

An additional benefit of the IDACS system is that attack traceback time can be improved by scaling the network. FIG. 37 and FIG. 38 show the Attack Traceback Time and Botnet Detection Time for an IDACS network, one with 1 SSA, and one with 2 SSAs. These figures show that the traceback times can be dramatically improved by expanding the network side of the IDACS system; this is because the traceback duties are spread across multiple SSAs, resulting in a lighter workload for each machine. These findings provide significant incentive to expand fielded IDACS systems.

In addition to the above-described simulations, a second simulation suite performed for this research addresses the effects of the attack traceback combined with quarantine and healing for Byzantine traitor agents. Given an exemplary IDACS network under attack by parties that are able to steal Client authentication items and turn SAs and SSAs into traitors, how well will the attack traceback protect the IDACS datacenter from illegal (no permission) access? The simulation results presented here attempt to answer that question.

To fully test the capabilities of the illustrative IDACS network of the present disclosure against real-world threats and attacks, attack scenarios were constructed based on the latest and most lethal real-world attack vectors. Therefore, these simulations were carried out under the assumption that all attempts to hack SAs and SSAs and turn them into traitors would be accomplished using zero-day attacks. Since zero-day attacks have not been previously observed, it is difficult to defend against them. Additionally, through the use of metamorphic evolution techniques, it is possible to generate endless variants of these zero-day turn-traitor-attacks, each of which has a unique signature. This method can be used to defeat security systems that use signature-based scans to detect known turn-traitor-attacks. Since both of these attack methods are widely in use today, they will both be considered in this simulation.

This simulation is based on a number of assumptions, each of which approximates real-world conditions. The first assumptions on which this simulation is based are as follows:

Assumption 10: Previously unobserved zero-day turn-traitor-attacks used to gain control over network machines will require a relatively long time (weeks) for a patch that successfully secures that attack's entry point to be issued.

Assumption 11: A zero-day attack used to gain control over network machines, once detected and analyzed, can be blacklisted with a signature-scanning security system very quickly. A zero-day turn-traitor-attack or a metamorphic variation thereof, once detected and blacklisted, are detected and blocked thereafter.

Assumption 10 is seen to be true across almost all computer security vulnerabilities that are being discovered today. Assumption 11 reflects the strengths of signature-based scanners, although their strength may be slightly overstated to simplify this simulation. Based on Assumption 11, it follows that attacker behavior will reflect this reality.

Assumption 12: A zero-day turn-traitor-attack or a metamorphic variation thereof, once detected and blocked, will not be reused by the attacker.

Based on the relative importance of $Cust_\psi$, $\overline{SA}$, and $\overline{SSA}$ in IDACS, they are accorded different levels of protection against theft ($Cust_{104}$) or outside zero-day turn-traitor-attacks ($\overline{SA}$ and $\overline{SSA}$). $Cust_\psi$ are used by human users in the field, so the elements of $Cust_\psi$ (Client$\rho$, Badge$\zeta$; Pwd$\theta$, and PIN$\lambda$) are (relatively) easy to steal, although it may be difficult to steal a complete set. On the other hand, $\overline{SA}$ and $\overline{SSA}$ reside inside protected network datacenters, so they are relatively more difficult to gain control over. Thus, the assumptions:

Assumption 13: Completely turning a Client into a traitor (with access to Client$_\rho$, Badge$_\zeta$, Pwd$_\theta$, and PIN$_\lambda$) through theft or coercion is difficult. An exception would be in an active battlefield scenario, where a number of human users (soldiers) could be captured and coerced into turning over all of the elements of $Cust_\psi$.

Assumption 14: $Cust_\psi$ are easier to turn into traitor bots than SAs, and SAs are easier to turn into traitor bots than SSAs.

Finally, any attacker, being intelligent and wishing to maximize his chances of success, will not launch attempts to access the IDACS datacenter until he has a certain chance of success. Thus, Assumption 15: An attacker will not launch access-DB-attacks against the IDACS datacenter until he controls a certain number of traitor $Cust_\psi$, $SA_\chi$ and $SSA_\kappa$.

These assumptions are provided to facilitate a description of the IDACS network's advantages. The scope of the present disclosure is not limited solely to networks satisfying these assumptions.

This simulation was implemented in MATLAB, and examined an exemplary IDACS network consisting of 500 $Cust_\psi$, 40 SAs, 20 SSAs, and 10 DB (see FIG. 4). Unlike the first simulation, this simulation did not consider the details of network transmission speeds or packet processing times. All packets are considered to be transmitted from one machine to another in one clock cycle, and all packets are processed in one clock cycle, with one clock cycle per queued packet.

The simulation consists of two phases. In Phase 1, the attacker uses turn-traitor-attacks to build a botnet of traitor $Cust_\psi$, SAs, and SSAs for use in IDACS access-DB-attacks. According to Assumption 15, the attacker builds a botnet consisting of traitor SAs equaling 60% of all SAs in IDACS, and traitor SSAs equaling 60% of all SSAs in IDACS (15% of the traitor SAs and SSAs were spoofed machines). Additionally, the attacker builds a botnet consisting of four traitor $Cust_\psi$ for each traitor SA and SSA (this number was experimentally determined to provide a sufficient number of traitor $Cust_\psi$ to launch a sufficient number of access-DB-attacks for the duration of the simulation). In accordance with Assumption 13, this simulation is assumed to represent an active battlefield situation, so 15% of the traitor $Cust_\psi$ have full access to their authentication credentials (Client$_\rho$, Badge$_\xi$, Pwd$_\theta$, and PIN$_\lambda$). Once a sufficient number of bots have been obtained, the attacker launches Phase 2.

In Phase 2, the attacker sends a burst of a high number of access-DB-attacks. The logic behind the burst is that an attacker maximizes his chance of successful datacenter accesses if he sends them quickly; detected and prevented access-DB-attacks will result in the detection and quarantine of traitor Cust$_\psi$, SAs, and SSAs. By sending a burst of access-DB-attacks, the attacker makes full use of these bots before they are detected and quarantined, and the advantage gained from Assumption 15 begins to slip away. During Phase 2, access-DB-attacks are launched at an average rate of one attempt per 15 clock cycles (the actual start times of the access-DB-attacks are randomized using a normal distribution over the complete period of Phase 2). If an illegal data center access is detected and traced to one or more traitor machines based on the methods discussed herein, that machine is quarantined (removed from the IDACS network) and healed over a period of 100 clock cycles, and then returned to IDACS as a loyal Cust$_\psi$, SA$_\chi$ or SSA$_\kappa$. During Phase 2, the attacker continues to attack Cust$_\psi$, SA$_\chi$ and SSA$_\kappa$ and turn them into traitors, thus replenishing the botnet even as bots are detected and quarantined. In accordance with Assumption 14, one new Cust$_\psi$ is turned traitor every 150 clock cycles, one new SA$_\chi$ is turned traitor every 300 clock cycles, and one new SSA is turned traitor every 600 clock cycles (this is on average; the actual times the machines turn traitor are randomized over the period of Phase 2 using a normal distribution). In accordance with Assumption 15, if the percentage of traitor SAs or SSAs in IDACS fell below 10%, the attacker stopped launching access-DB-attacks until both of those numbers rose above 10%. As long as there was any traitor Cust$_\psi$ available, access-DB-attacks would continue. All traitor Cust$_\psi$ without access to complete authentication credentials (Client$_\rho$, Badge$_\xi$, Pwd$_\theta$, and PIN$_\lambda$) launched access-DB-attacks against data/services that particular Cust$_\psi$ had permissions to access (the access-DB-attack was illegal due to incorrect $\overline{OTP_\psi}$ or $\overline{PID_\psi}$), but all traitor Cust$_\psi$ with access to complete authentication credentials launched access-DB-attacks against data/services that particular Cust$_\psi$ did not have permissions to access (since a traitor Cust$_\psi$ with access to complete authentication credentials is indistinguishable from a loyal Cust$_\psi$, access of data/services for which that Cust$_\psi$ has correct permissions cannot be detected; therefore, this situation was not addressed in this simulation).

In this simulation, the botnet-building activity of Phase 1 was compressed into a period of 100 clock cycles (in reality, this botnet building could occur in a "low-and-slow" turn-traitor-attack strategy over the course of weeks or months). Phase 2 activity was simulated over a period of 4000 clock cycles. The length of both the approach and return authentication chains was 4 (N=4), as would be expected in a fielded IDACS implementation.

To address the question of zero-day turn-traitor-attacks with metamorphic variants, the simulation was divided into three scenarios. In Scenario 1, whenever an access-DB-attack is detected and prevented, one or more traitor Cust$_\psi$, SA$_\chi$ or SSA$_\kappa$ is identified. This traitor is quarantined and healed, but no attempt is made to analyze the zero-day attack used to turn that machine into a traitor. Therefore, the same zero-day turn-traitor-attack can be used again to turn other machines into traitors during Phase 2. In Scenario 2, there are 20 different zero-day turn-traitor-attacks used to turn machines into traitors. When a traitor machine is identified, the IDACS forensics suite analyzes the zero-day turn-traitor-attack that was used to turn this machine into a traitor. A signature for the zero-day turn-traitor-attack is identified and added to each Cust$_\psi$, SA$_\chi$ and SSA$_\kappa$'s blacklist in accordance with Assumption 11, and will not be successful in turning any more machines into traitors during Phase 2. Therefore, the attacker will stop using that zero-day turn-traitor-attack according to Assumption 12. In Scenario 3, the attacker begins with 20 different zero-day turn-traitor-attacks and 20 metamorphic variants of each zero-day attack. Each analyzed and blacklisted metamorphic turn-traitor-attack variant will no longer be used, but many other metamorphic variants are available. In short, Scenario 1 represents the "simplified case" situation, Scenario 2 represents the "best case" situation, and Scenario 3 represents the "realistic case" situation. Results from these three Scenarios are presented herein.

Each of these three scenarios was simulated 10 times, and the results averaged together. This was done to gain a better view of broad trends and mask random variations in different simulation runs.

The purpose of this simulation was to demonstrate how well IDACS could protect the datacenter from illegal access. This can be measured in two ways. First, the number of successful illegal accesses over the period of the simulation indicates the success of the IDACS defense. Second, the number of undetected traitor Cust$_\psi$, SAs, and SSAs remaining in IDACS over the course of the simulation demonstrate how effectively IDACS is detecting, quarantining, and healing traitor machines.

Figure 39:
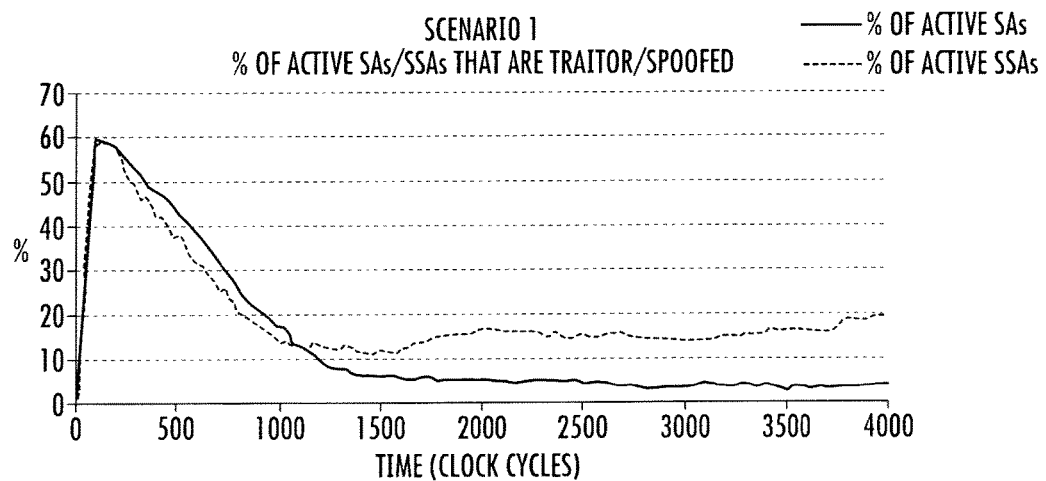
FIG. 39 shows the percentage of the active SAs and SSAs in IDACS that are traitors for a scenario in which whenever an access-DB-attack is detected and prevented, one or more traitor $Cust_\psi$, $SA_\chi$ or $SSA_\kappa$ is identified in accordance with the disclosure.

FIG. 39 shows the percentage of the active SAs and SSAs in IDACS that are traitors for a scenario in which whenever an access-DB-attack is detected and prevented, one or more traitor Cust$_\psi$, SA$_\chi$ or SSA$_\kappa$ is identified. As mentioned, this is scenario 1, or the "simplified case" situation (because there is no attack analysis or blocking in this scenario). Note that this graph counts only SAs and SSAs that are "active", i.e. not under quarantine; this measurement was chosen to reflect the network situation faced by an attacker trying to pass an illegal datacenter access through IDACS. After the botnet-building period represented by the first 100 clock cycles of the simulation, access-DB-attacks commence, leading to the discovery and quarantine of traitor SAs and SSAs. Initially both traitor SAs and SSAs are detected at a high rate, leading to the increased "sanitation" of the IDACS Network. When the percentage of traitor SAs in the system drops below the 10% mark, access-DB-attacks are no longer launched until additional SAs are turned into traitors; since fewer access-DB-attacks are being launched, it leads to traitor SSAs being identified at a lower rate (since the "first line" of SAs will trigger illegal access detection, leading to fewer SSAs having the opportunity to be detected), and with the slow addition of new traitor SSAs, the percentage of traitor SSAs rises to a slightly higher level. The percentage of both traitor SAs and SSAs stabilizes to a relatively low equilibrium point.

Figure 40:
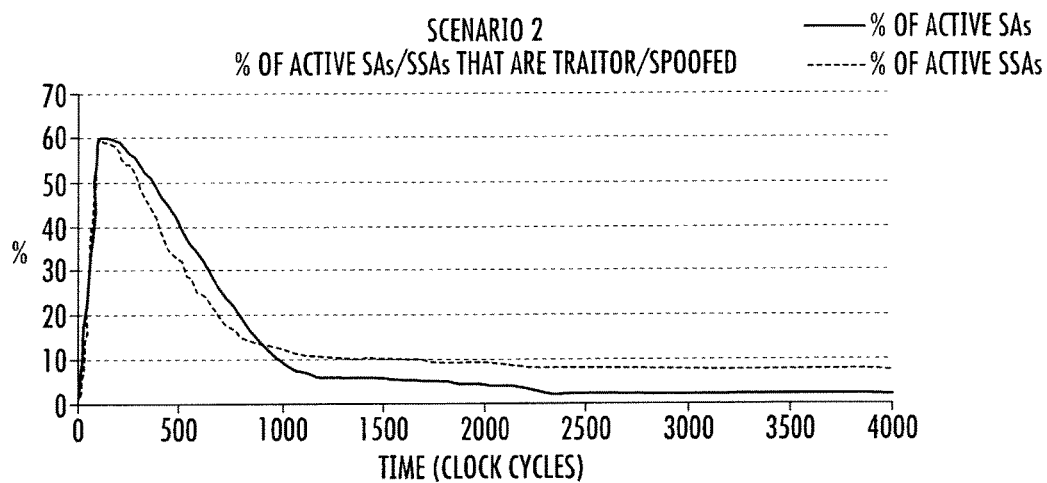
FIG. 40 shows the percentage of active SAs and SSAs that are traitors for a scenario in which there are 20 different zero-day turn-traitor-attacks used to turn machines into traitors in accordance with the disclosure.

FIG. 40 shows the percentage of active SAs and SSAs that are traitors for a scenario in which there are 20 different zero-day turn-traitor-attacks used to turn machines into traitors. As explained, this is scenario 2, or the "best case" situation (because there is attack analysis and blocking with a limited number of unique zero-day turn-traitor-attacks, so eventually no more new SAs or SSAs can be turned into traitors). As in Scenario 1, the percentage of traitor SAs and SSAs both drop as traitors are identified and quarantined. Once all 20 unique zero-day turn-traitor-attacks have been analyzed and blocked, no new SAs or SSAs can be turned into traitors; therefore the percentage of traitor SAs and SSAs both drop to levels below the 10% cutoff, and remain level as no new traitors are added and no more traitors are identified (since access-DB-attacks are not launched below the 10% cutoff). Scenario 2 demonstrates better performance than Scenario 1; however, the scenario most reflective of a real-world situation is Scenario 3.

Figure 41:
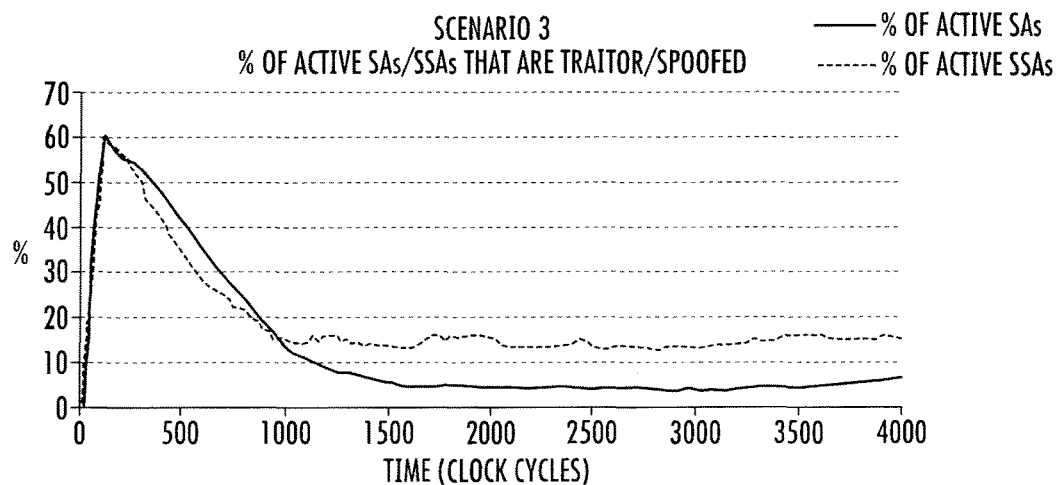
FIG. 41 shows the percentage of active SAs and SSAs that are traitors for a scenario in which the attacker begins with 20 different zero-day turn-traitor-attacks and 20 metamorphic variants of each zero-day attack in accordance with the disclosure.

FIG. 41 shows the percentage of active SAs and SSAs that are traitors for a scenario in which the attacker begins with 20 different zero-day turn-traitor-attacks and 20 metamorphic variants of each zero-day attack. As mentioned, this is scenario 3, or the "realistic case" situation (because there is attack analysis and blocking, but with metamorphic turn-traitor-attack variants, there is a large supply of new, unidentified turn-traitor-attack variants). Since this scenario gives the attacker a large number of attack variants, the performance of Scenario 3 in FIG. 41 is similar to the performance of Scenario 1 in FIG. 39. However, some detected zero-day turn-traitor-attack variants are re-used before the attacker realizes they have been detected and blocked, and are subsequently blocked by IDACS; therefore, the performance in Scenario 3 is somewhat better than Scenario 1. This can be observed in the lower equilibrium point of percentage of traitor SSAs towards the end of the simulation period. Since Scenario 3 most closely reflects the "real-world" situation faced by a fielded IDACS system, FIG. 41 demonstrates that IDACS will provide an exceptional defense against an attacker with a botnet of Byzantine SAs and SSAs at his disposal.

Figure 42:
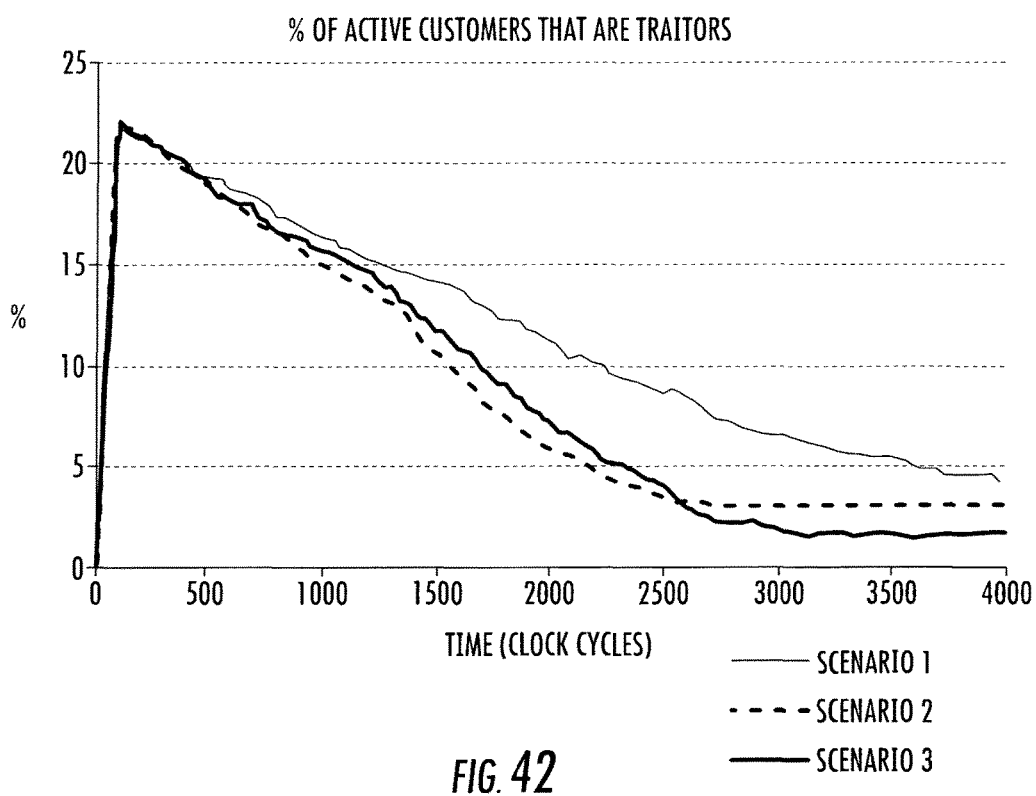
FIG. 42 shows the percentage of active $Cust_\psi$ that are controlled by the attacker across the simulation for the different above-mentioned scenarios in accordance with the disclosure.

FIG. 42 shows the percentage of active $Cust_\psi$ that are controlled by the attacker across the simulation for the different above-mentioned scenarios. This graph shows that Scenario 3 performs better than Scenario 1 for "sanitizing" the set of $Cust_\psi$; this is because as zero-day turn-traitor-attack variants are detected and blocked, but still re-used before the attacker is aware they have been blocked, fewer new $Cust_\psi$ are being tuned into traitors. Additionally, since more traitor SAs and SSAs are added in Scenario 3 than in Scenario 2, more access-DB-attacks are launched, allowing more traitor $Cust_\psi$ to be detected in the end. This graph also demonstrates that a real-world IDACS system will have excellent performance in identifying and sanitizing traitor $Cust_\psi$.

Figure 43:
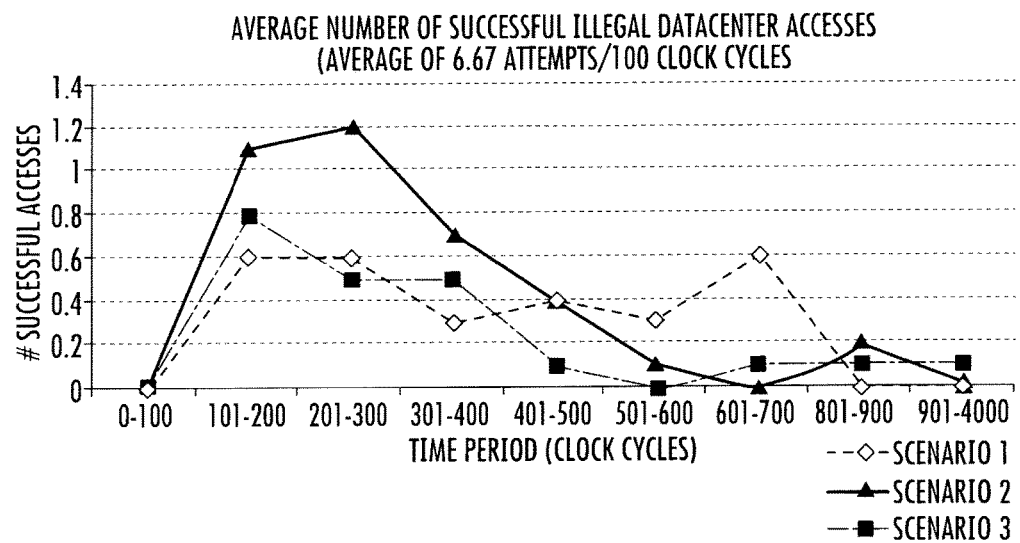
FIG. 43 shows an average number of access-DB-attacks that were successfully passed through IDACS with the help of traitor SAs and SSAs in accordance with simulation runs in accordance with the disclosure.

FIG. 43 shows an average number of access-DB-attacks that were successfully passed through IDACS with the help of traitor SAs and SSAs in accordance with simulation runs. This chart shows that the most successful time period for the attacker is when he has the maximum number of traitor SAs and SSAs at his disposal (as expected), but that the success rate drops to almost zero as more traitor SAs and SSAs are identified and quarantined. Since Scenario 3 is most representative of a real-world fielded IDACS system, the performance results shown in this graph are encouraging. Additional simulations demonstrating how confidential data stored in IDACS can be protected even in the presence of a low number of successful illegal datacenter accesses is provided herein.

Characterization 23 pertains to the concept of cryptographic seeds $Seed_\sigma$ and explains that $Seed_\sigma$ are spread across different locations (i.e. $Seed_\sigma \diamond Client_\rho$, $\overline{Seed} \diamond Client_\rho$, etc.). Algorithms 2 and demonstrate how these $Seed_\sigma$ are collected from across these locations and combined to calculate $\overline{OTP_\psi}$ and $\overline{PID_{104}}$. The cryptographic keys used to encrypt data residing on $Client_\rho$, similarly to these $Seed_\sigma$, are split into pieces and spread across different locations. However, these cryptographic keys have an additional space-separation protection; certain bits are removed from these cryptographic keys and stored on the SAs in the IDACS Network. To decrypt data residing on $Client_\rho$, these bits must be retrieved and reassembled with the cryptographic keys. These bits may be characterized:

Characterization 35: The cryptographic keys used to encrypt data residing on $Client_\rho$ have a certain number of bits removed and stored in a different location. These bits are termed Xbits, corresponding to the relevant $Cust_\psi$.

Figure 44:
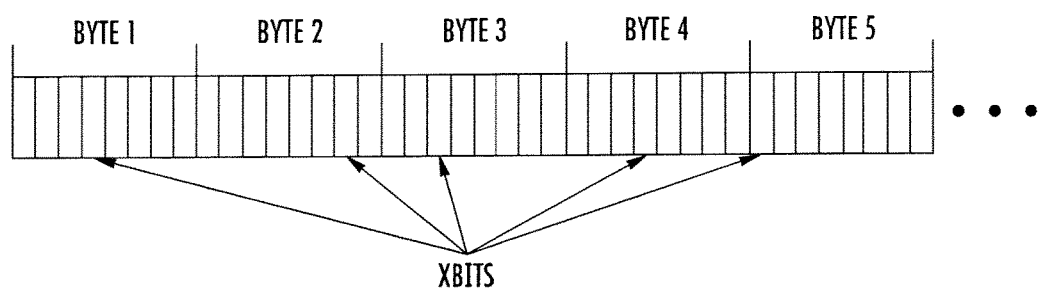
FIG. 44 illustrates a mechanism by which Xbits are removed from the cryptographic keys in accordance with the disclosure.

FIG. 44 illustrates a mechanism by which Xbits are removed from the cryptographic keys. In particular, one bit is removed from each byte of the cryptographic key. These bits are removed from pseudo-random locations in each byte; the locations from which bits are removed (and conversely, the locations where the Xbits should be reinserted when the cryptographic key is being reassembled) are calculated based on the value of $\mathcal{S}Cust_\psi$; the locations of the removed Xbits are different for each cryptographic key. As a consequence of this arrangement, an attacker who manages to steal the contents of $Cust_\psi$ will still be unable to decrypt data residing on $Client_\rho$ without retrieving the corresponding Xbits from the IDACS Network side.

Each time the cryptographic key is used for encryption or decryption, $Client_\rho$ reforms the cryptographic keys and calculates new Xbit locations base on the updated version of $\mathcal{S}Cust_\psi$. As such, an attacker who manages to derive the Xbit insertion locations for a given cryptographic key at time t will not possess the correct Xbit insertion points at a later time t' after $\mathcal{S}Cust_\psi$ has been adjusted. Thus, the space-separated time-evolving relationship is used to protect the integrity of cryptographic keys. This difficulty faced by the attacker is summarized in the following Theorem, which is proved herein below.

Theorem 3: An attacker who possesses a cryptographic key and the corresponding Xbits, but does not possess the $\mathcal{S}Cust_\psi$ necessary to determine the Xbit insertion points, faces an NP-complete problem to determine the Xbit insertion points.

In accordance with at least one disclosed embodiment, the IDACS system may be designed to store and protect data or services in the IDACS datacenter. However, this design can also be used to help protect data stored on Client devices. Data stored on $Client_\rho$ is encrypted using encryption keys stored across multiple locations ($Client_\rho$, $Badge_\xi$, $Pwd_\theta$, and $PIN_\lambda$); this guarantees that an attacker must have access to all of these items to decrypt the data.

Figure 45:
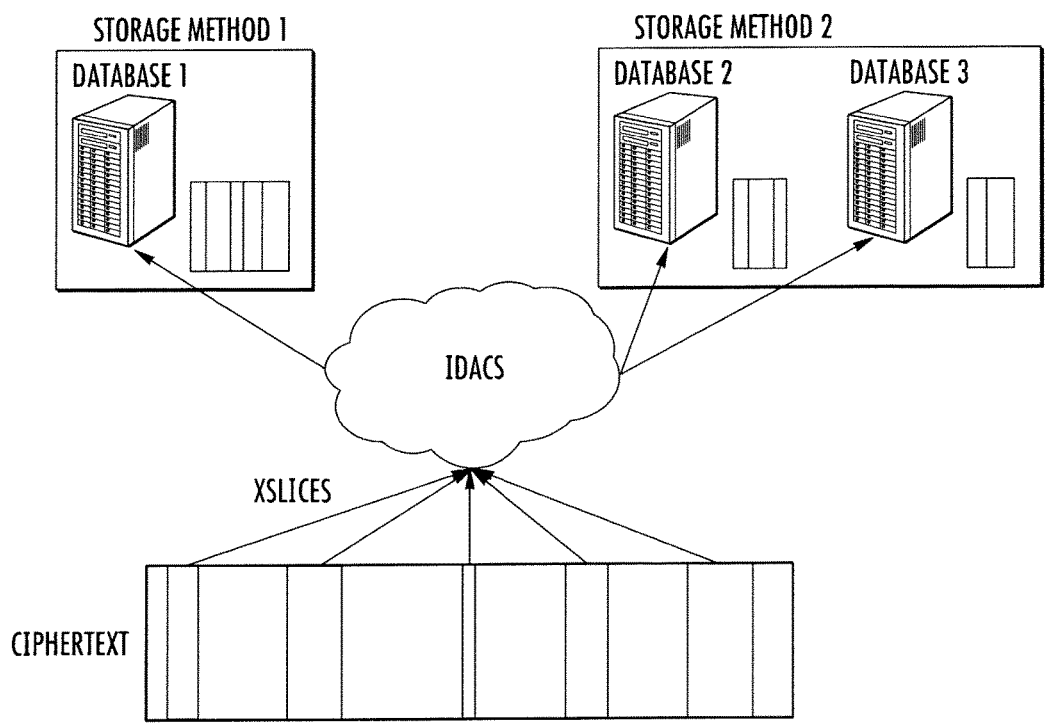
FIG. 45 shows that pieces of the ciphertext are removed and stored in the IDACS datacenter in accordance with the disclosure.

FIG. 45 shows that pieces of the ciphertext are removed and stored in the IDACS datacenter. These pieces must be retrieved from the datacenter to correctly decrypt the data stored on $Client_\rho$.

Characterization 36: When encrypted data is stored on $Client_\rho$, segments of data are removed from the ciphertext and stored in a physically different location. These removed segments are called Xslices.

All of the Xslices that are removed from a Client-side ciphertext are stored in the IDACS datacenter (FIG. 45). The Xslices may be stored in a single contiguous block (Storage Method 1), or they may be split and stored across multiple locations (Storage Method 2).

To decrypt data stored on $Client_\rho$, one must have access to the ciphertext stored on $Client_\rho$; all of the locations storing pieces of the encryption keys ($Client_\rho$, $Badge_\xi$, $Pwd_\theta$, and $PIN_\lambda$); the Xbits for the encryption keys, which are stored across multiple SAs in IDACS; and the Xslices that are stored across multiple DB in the IDACS datacenter. Additionally, each time the data stored on $Client_\rho$ is decrypted to be viewed, the value of $\mathcal{S}Cust_\psi$ is updated, and the data is re-encrypted with new cryptographic keys that have new Xbits, and new Xslices are removed from the ciphertext and stored at new locations in the datacenter. By combining space-separation and time-evolving characteristics, this IDACS encryption scheme can achieve a much higher level of security than simple encryption.

Figure 46:
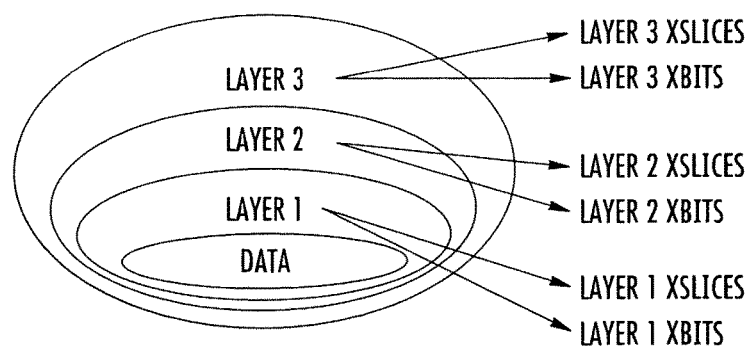
FIG. 46 shows an additional security measure, in which the encryption/Xbits/Xslices can be applied in multiple layers to protect high-sensitivity data in accordance with the disclosure.

FIG. 46 shows an additional security measure, in which the encryption/Xbits/Xslices can be applied in multiple layers to protect high-sensitivity data. In addition to providing more complex security, this provides additional options for space-time evolving protections. At certain time intervals, the top level of encryption can be re-processed with new encryption keys/Xbits/Xslices, while the lower levels are left untouched; in this way, the security is time-evolving with a minimum of effort.

The location and length of the Xslices in the ciphertext are pseudorandom; they are calculated based on $\mathcal{S}\text{Cust}_\psi$, according to Characterization 37 and Characterization 38. This pseudorandomness contributes to the strength of the IDACS encryption, as addressed in above.

Characterization 37: Given $\mathcal{S}\text{Cust}_\psi$, a block of ciphertext to have Xslices removed, and the PID of that data block, the F-box(data-block-offset) transform returns the length between the beginning of the block of data or the end of the previous xslice, and the beginning of the next xslice. This transform also updates $\mathcal{S}\text{Cust}_\psi$ so that the next call to the transform will return the length of the next sub-block. This transform must produce the same sequence of lengths for consecutive transform calls for a given data block PID after $\mathcal{S}\text{Cust}_\psi$ has been reinitialized, so that data blocks may be disassembled and reassembled. The sub-block lengths are determined based on the cryptographic hash of secret seeds stored in $\mathcal{S}\text{Cust}_\psi$. This transform is represented by $$\text{local\_data\_block\_length} = F\text{-box}(\mathbf{O}\text{ffset}, \mathcal{S}\text{Cust}_\psi)$$

Characterization 38: Given $\mathcal{S}\text{Cust}_\psi$, a block of data to have xslices removed, and the PID of that data block, the F-box(xslice-length) transform returns the length of the next xslice to be removed from the data block. This transform also updates $\mathcal{S}\text{Cust}_\psi$ so that the next call to the transform will return the length of the next xslice. This transform must produce the same sequence of lengths for consecutive transform calls for a given data block PID after $\mathcal{S}\text{Cust}_\psi$ has been reinitialized, so that data blocks may be disassembled and reassembled. The xslice lengths are determined based on the cryptographic hash of secret seeds stored in $\mathcal{S}\text{Cust}_\psi$. This transform is represented by $$\text{local\_xslice\_length} = F\text{-box}(\mathbf{X}\text{Lth}, \mathcal{S}\text{Cust}_\psi)$$

Figure 47:
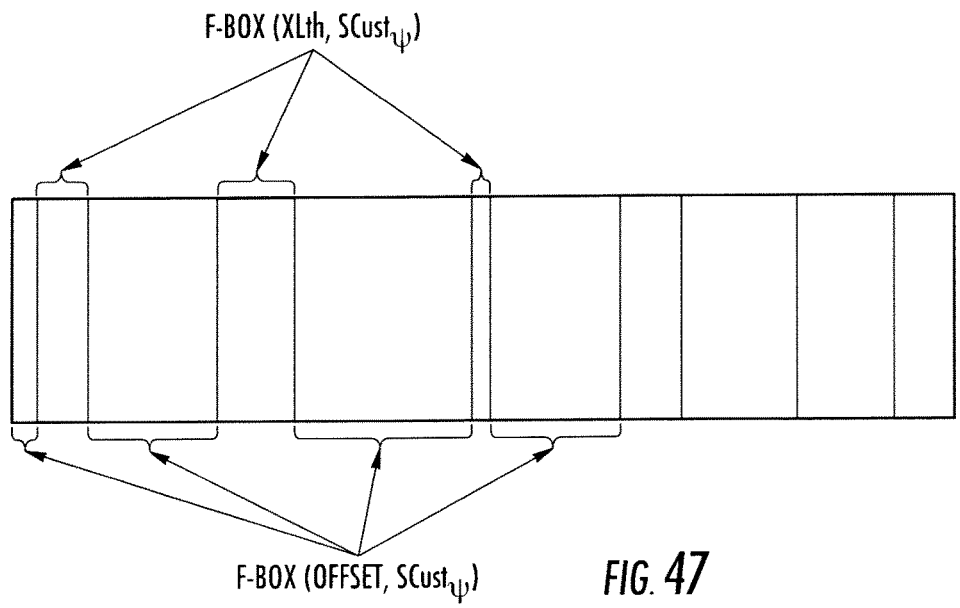
FIG. 47 demonstrates how transforms are used to divide the ciphertext into a block of Xslices and a block of ciphertext in accordance with the disclosure.

FIG. 47 demonstrates how transforms are used to divide the ciphertext into a block of Xslices and a block of ciphertext. An exemplary process is set forth in Algorithm 11, with the addition of another F-box transform characterized in Characterization 39. Finally, the entire multiple-layer encryption process illustrated in FIG. 46 is formalized in Algorithm 12, which also references Characterization 40.

Characterization 39: Given an input string or byte array, the F-box(substring) transform returns a substring or sub-array based on specified indices. The transform is represented by $$\text{local\_xslice} = F\text{-box}(\mathbf{SS}\text{tring, data\_block, offset, length})$$

The "data_block" parameter is the input string or byte array, the "offset" parameter is the index indicating where in "data_block" the desired substring begins, and the "length" parameter indicates the length of the desired substring.

Characterization 40: Given a block of data and $\mathcal{S}\text{Cust}_\psi$, the F-box(encrypt) transform encrypts the block of data using encryption keys provided by $\mathcal{S}\text{Cust}_\psi$ and returns the ciphertext along with the updated version of $\mathcal{S}\text{Cust}_\psi$. This transform is represented by $$\{\mathcal{S}\text{Cust}_\psi, \text{ciphertext}\} = F\text{-box}(\mathbf{E}\text{ncrypt}, \mathcal{S}\text{Cust}_\psi, \text{data\_block})$$

| Algorithm 11. remove_xslices( ) |
|---|
| inputs : $\mathcal{S}\text{Cust}_\psi$, data_block |
| outputs : $\mathcal{S}\text{Cust}_\psi$, data_block', xslices |
| 1    pointer = index of 1$^{st}$ byte of data_block |
| 2    xslices = empty string |
| 3    data_block' = empty string |
| 4    while (pointer < data_blocklength) do |
| 5    local_data_block_length = F-box($\mathbf{O}$ffset, $\mathcal{S}\text{Cust}_\psi$) |
| 6    local_xslice_length = F-box($\mathbf{X}$Lth, $\mathcal{S}\text{Cust}_\psi$) |
| 7    local_data_block = F-box($\mathbf{SS}$tring, data_block, pointer, local_data_block_length) |
| 8    local_xslice = F-box($\mathbf{SS}$tring, data_block, [pointer + local_data_block_length], local_xslice_length) |
| 9    xslices = F-box($\mathbf{C}$oncat, xslices, local_xslice) |
| 10  data_block' = F-box($\mathbf{C}$oncat, data_block', local_data_block) |
| 11  pointer = pointer + local_data_block_length + local_xslice_length |
|     end |

| Algorithm 12. encrypt_data( ) |
|---|
| inputs : $\mathcal{S}\text{Cust}_\psi$, data_block, num_layers |
| outputs : $\mathcal{S}\text{Cust}_\psi$, ciphertext, xslices |
| 1  ciphertext = data_block |
| 2  xslices = empty string |
| 3  for index = 1 to num_layers |
| 4  { $\mathcal{S}\text{Cust}_\psi$, ciphertext } = F-box($\mathbf{E}$ncrypt, $\mathcal{S}\text{Cust}_\psi$, ciphertext) |
| 5  { $\mathcal{S}\text{Cust}_\psi$, ciphertext, temp_xslices } = remove_xslices($\mathcal{S}\text{Cust}_\psi$, ciphertext) |
| 6  xslices = F-box($\mathbf{C}$oncat, xslices, temp_xslices) |
|    End |

The use of Xslices in the IDACS Client-side data encryption scheme leads to several theoretical implications which demonstrate the security of this encryption scheme. First, consider the situation where the Xslices extracted from a given piece of data's ciphertext are stored in a contiguous block in a single location (Storage Method 1 in FIG. 45). Alternatively, when $\text{Cust}_\psi$ requests these Xslices from the IDACS datacenter, they are returned to $\text{Cust}_\psi$ in a single block of data. An attacker who manages to retrieve the ciphertext and the block of corresponding Xslices, but does not possess $\mathcal{S}\text{Cust}_\psi$ and thus cannot perform the F-box($\mathbf{O}$ffset) or F-box($\mathbf{X}$Lth) transforms in Algorithm 11, is faced with the problem of determining 1) where the ciphertext splits for the insertion of Xslices, and 2) where the contiguous block of Xslices splits into individual Xslices. The difficulty of 1) is addressed in Theorem 4, and the difficulty of 2) is addressed in Theorem 5.

Theorem 4: An attacker who possesses a ciphertext block requiring Xslice insertion, but does not possess the SCust$_\psi$ necessary to determine the Xslice insertion points, faces an NP-complete problem to determine the Xslice insertion points.

Theorem 5: An attacker who possesses a block of concatenated Xslices extracted from a ciphertext, but does not possess the $SCust_\psi$ necessary to determine the lengths of and separated individual Xslices, faces an NP-complete problem to separate the individual Xslices.

A second situation, where individual Xslices are stored across multiple DB in the IDACS datacenter (Storage Method 2 in FIG. 45), presents a similar problem. Consider an attacker who is able to retrieve all the individual Xslices associated with a certain piece of Client-side data's ciphertext. However, without access to $\mathcal{S}Cust_\psi$, the attacker is unable to determine the correct order in which these Xslices should be arranged for reinsertion into the ciphertext. This problem is addressed in the following Theorem.

Theorem 6: An attacker who possesses all Xslices extracted from a ciphertext, but does not possess the $\mathcal{S}Cust_\psi$ necessary to determine the order in which these Xslices should be re-inserted into the ciphertext, faces an NP-complete problem to correctly order the individual Xslices.

The preceding Theorems are proved herein.

As explained above, Xslices may be used to protect the confidentiality of encrypted Client-side data. Additionally, distributed Xslices can be combined with data segmentation gain additional security by minimizing the level of decrypted data exposure and minimize the damage caused by an attacker who is able to successfully pass several illegal IDACS datacenter access requests.

The standard approach to file encryption and decryption is to decrypt an entire protected file at the time of access. Unfortunately, this exposes the entire contents of the protected file to an attacker who can steal a $Client_p$ on which a currently decrypted file is being viewed. The concept of the space-time evolving relationship can be used to minimize this risk.

Figure 48:
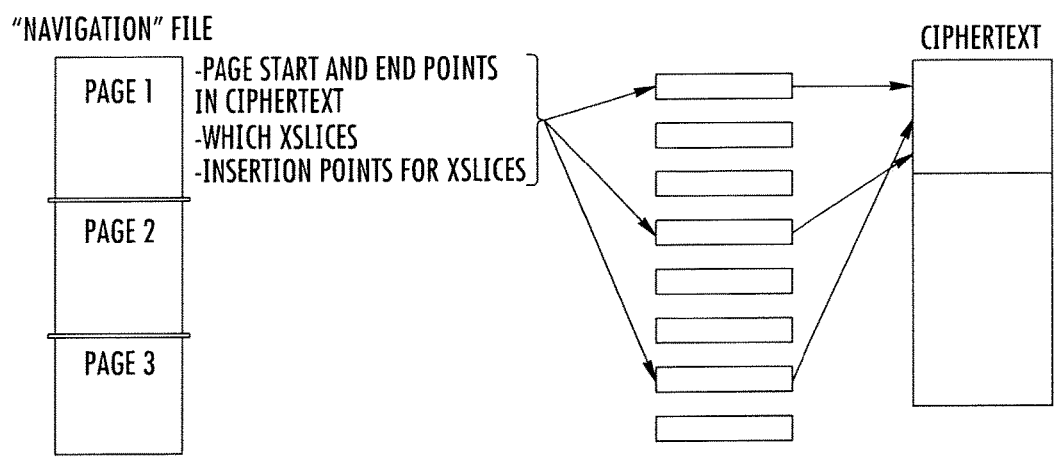
FIG. 48 shows an exemplary method of data segmentation of a single file. Rather than encrypting a file in a single "block", the file can be divided into multiple "segments" (e.g. one page of the file equates to one segment) in accordance with the disclosure.

FIG. 48 shows an exemplary method of data segmentation of a single file. Rather than encrypting a file in a single "block", the file can be divided into multiple "segments" (e.g., one page of the file equates to one segment). A "navigation" file associated with the encrypted data file is formed; this navigation file contains metadata regarding each segment in the data file, such as where each segment begins and ends in the ciphertext, which Xslices are used in that segment, and where those Xslices are inserted into the ciphertext. When a user wants to view part of the encrypted file, the contents of the navigation file are presented as a "Table of Contents". The user selects the segment he wishes to view, and $Cust_\psi$ requests the Xslices for the specified segment, inserts them into the ciphertext, and decrypts that particular segment. The remaining segments in the file are not decrypted unless they are specifically accessed later.

Segmenting an encrypted data file in this manner enhances data security in several ways. First, in the event that a $Client_p$ being used to decrypt and view data is stolen, the amount of decrypted data residing on $Client_p$ is limited. Additionally, if an attacker is able to force a few illegal IDACS datacenter access requests through IDACS, the encrypted data that attacker can recover is limited to a few file segments rather than the same number of files.

Segmenting data on the single file-level provides benefits in terms of both security and performance, which are summarized in Table 8. If a single segment of a file is decrypted, the number of Xslices retrieved from the datacenter as well as the amount of decrypted plaintext exposed is less than if the encrypted file were non-segmented. Additionally, the time required to complete this operation is constant ($O(1)$) rather than linear ($O(x)$). If all segments of the file are decrypted, then there is no relative advantage over a non-segmented approach. Table 8 provides a comparison of segmented vs. non-segmented data encryption for file of length X.

TABLE 8

| | Non-segmented file | Segmented file (decrypting one segment) | Segmented file (decrypting entire file) |
|---|---|---|---|
| Performance | | | |
| Time to retrieve Xslices | Request Xslices: $O(1)$<br>Send XSlices: $O(x)$<br>Insert Xslices: $O(x)$ | Request Xslices: $O(1)$<br>Send XSlices: $O(1)$<br>Insert Xslices: $O(1)$ | Request Xslices: $O(x)$<br>Send XSlices: $O(x)$<br>Insert Xslices: $O(x)$ |
| | Total: $O(x)$ | Total: $O(1)$ | Total: $O(x)$ |
| Time to decrypt | $O(x)$ | $O(1)$ | $O(x)$ |
| Total time | $O(x)$ | $O(1)$ | $O(x)$ |
| Security | | | |
| Xslices exposed | $O(x)$ | $O(1)$ | $O(x)$ |
| Decrypted plaintext exposed | $O(x)$ | $O(1)$ | $O(x)$ |

The results shown in Table 8 may be used as justification for the following:

Claim 5: Segmenting encrypted files and decrypting and issuing Xslices one segment at a time increases security and performance if one or a few pages are decrypted, but has no effect on security or performance if an entire file is decrypted.

Figure 49:
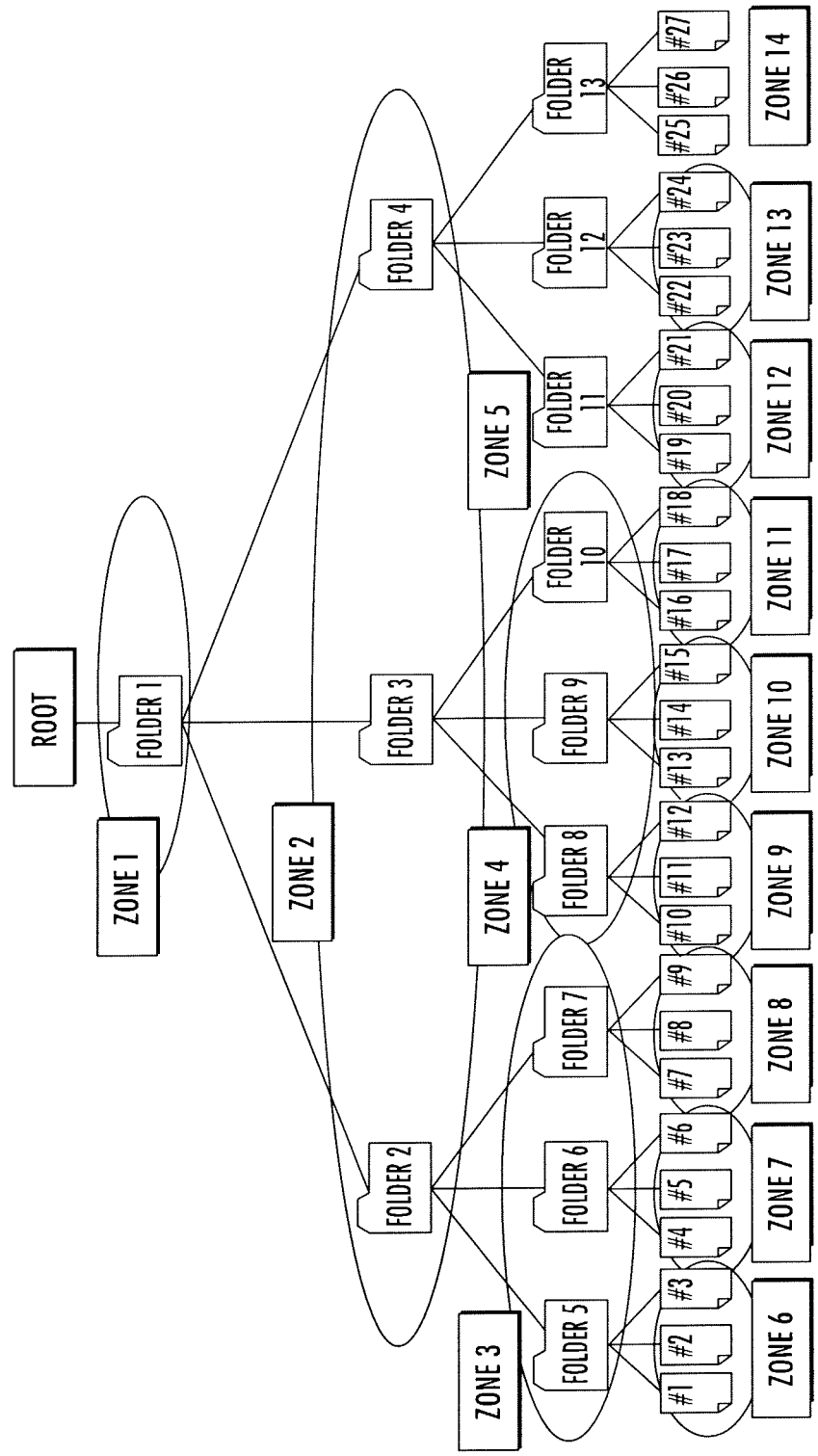
FIG. 49 shows a file directory tree in which different levels of folders correspond to the "navigation" file in FIG. 48 in accordance with the disclosure.

As explained above, data segmentation can be used to protect a single encrypted data file; the same concept can also be used to protect and encrypt a file directory tree. FIG. 49 shows a file directory tree in which different levels of folders correspond to the "navigation" file in FIG. 48. They are files that do not contain actual data, but only pointers to the actual data files. The actual data files that are the leaf nodes of this tree correspond to the ciphertext segments in FIG. 48. In FIG. 49, each Zone is a separate file with its own Xbits and Xslices residing in the IDACS datacenter, and each leaf node data file also contains its own Xbits and Xslices. Using this tiered encrypted File Directory Tree is ideal for a situation where encrypted data is maintained on the Client-side with Xbits and Xslices stored on IDACS Databases. Decrypting the File Directory Tree requires that Xbits and Xslices be retrieved to decrypt each successive Zone. If an attacker is able to pass a few access-DB-attacks, he may be able to gather some information on the structure of the File Directory Tree, but it may not be enough to recover any of the actual data files. Additionally, this structure obfuscates information regarding the size, quantity, and organization of the data files in the File Directory Tree by minimizing the amount of file pointers and file data that are exposed during a single file access, as seen in the following example. Obfuscating this information also minimizes the number of targets an attacker can address.

Figure 50:
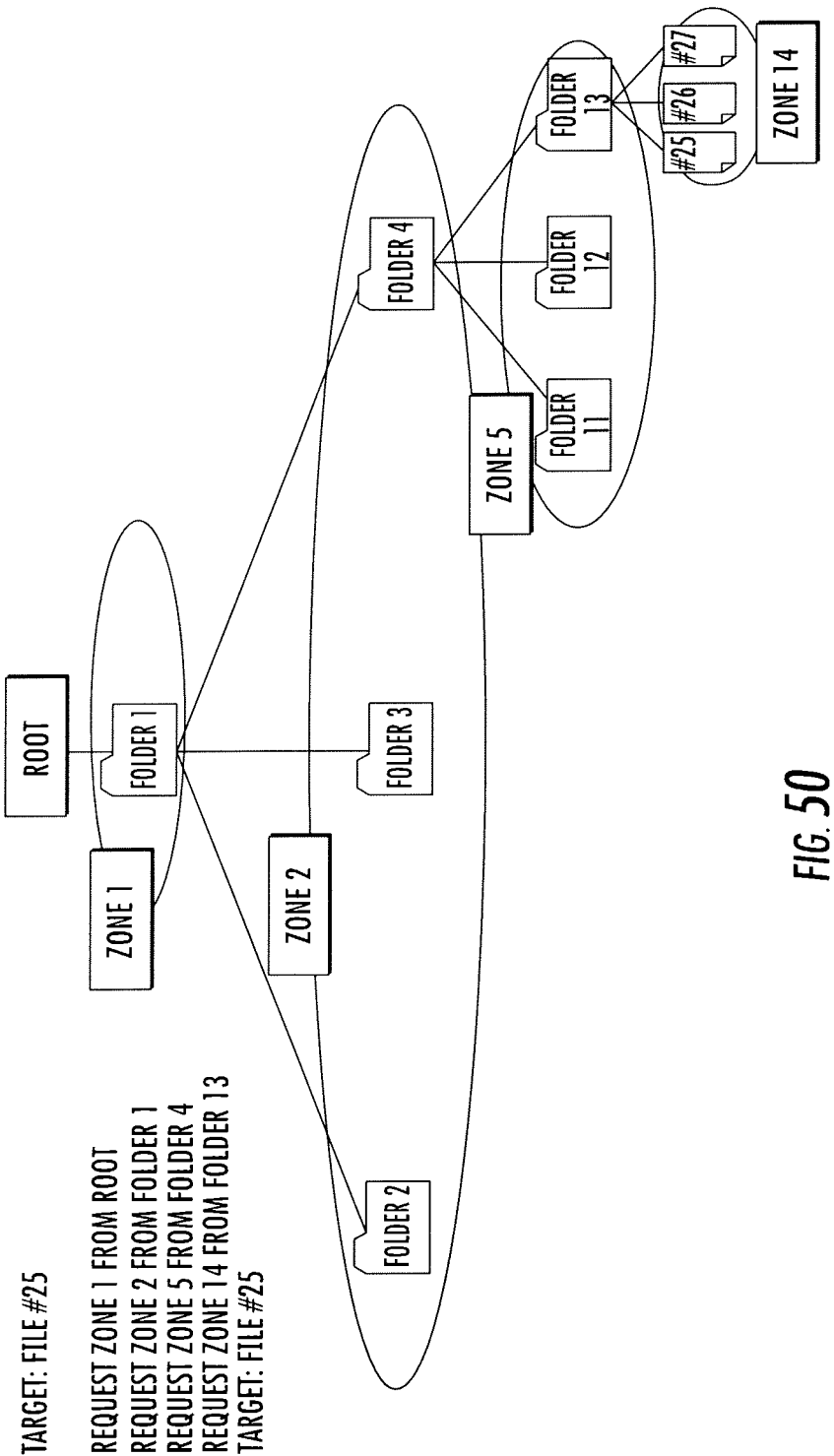
FIG. 50 shows a user retrieving a single data file from a File Directory Tree in accordance with the disclosure.

Navigating through the encrypted File Directory Tree is similar to navigating through any file explorer program on a PC. FIG. 50 shows a user retrieving a single data file from a File Directory Tree. The user initially possesses encrypted pointer information regarding the "root" of the File Directory Tree. The user requests the Xbits and Xslices to decrypt the "root" file residing on $Cust_\psi$, revealing the contents of Zone 1 (Folder 1). The user then requests the Xbits and Xslices to decrypt the Folder 1 pointer file (Zone 2), revealing the children folders of Folder 1 (Folders 2, 3, and 4). The user proceeds through Zone 5 and Zone 14 to reach the target File 25. Through this process, only information regarding folders and their children along the direct path to the target (File 25) are revealed; information regarding unexplored folders is not revealed to the user.

Table 9 illustrates the performance of a non-segmented File Directory Tree compared to the segmented version. Table 9 provides a comparison of performance of segmented vs. non-segmented File Directory Trees containing x data files. The performance of the segmented version exceeds that of the non-segmented version if a single file is retrieved; however, the performance of the segmented version drops if all of the files in the Directory Tree are retrieved. For its application in IDACS, this tradeoff in performance is considered acceptable in return for the corresponding increase in security, which is demonstrated in Table 9.

TABLE 9

|  | Non-segmented File Directory Tree | Segmented File Directory Tree |
| --- | --- | --- |
| Time to locate a single file | Request File Directory Tree: O(1) Send File Directory Tree: O(x) Decrypt File Directory Tree: O(x) | Request Zone: O(1) Send Zone: O(1) Decrypt Zone: O(1) Repeat for the depth of the File Directory Tree: O(log x) |
|  | Total: O(x) | Total: O(log x) |
| Time to decrypt a single file | O(1) | O(1) |
| Total for a single file | O(x) | O(log x) |
| Total for all files in File Directory Tree | O(x) (because File Directory Tree only needs to be retrieved once) | O(x log x) (because potentially entire depth of File Directory Tree must be retrieved for each file) |

Table 10 compares the security provided (in terms of how much file data and pointers are exposed) for non-segmented and segmented File Directory Trees. Table 10 provides a comparison of security of segmented vs. non-segmented File Directory Trees containing x data files. If a single file is accessed, the segmented version provides higher security by not exposing the file data and pointers for non-accessed files; of course, this advantage is lost if all of the files in the directory tree are accessed. In either case, the segmented version provides a higher level of security by forcing more authentication and permissions checks by a factor of log x. Since the user must potentially navigate the depth of the File Directory Tree for each file accessed, retrieving Xbits and Xslices from the IDACS datacenter for each zone accessed, the segmented version forces more $\overline{OTP_\psi}$ and $\overline{PID_\psi}$ checks, making a traitor $Cust_\psi$ controlled by an attacker more likely to be detected.

Theorem 3: An attacker who possesses a cryptographic key and the corresponding Xbits, but does not possess the $SCust_\psi$ necessary to determine the Xbit insertion points, faces an NP-complete problem to determine the Xbit insertion points.

Theorem 4: An attacker who possesses a ciphertext block requiring Xslice insertion, but does not possess the $SCust_\psi$ necessary to determine the Xslice insertion points, faces an NP-complete problem to determine the Xslice insertion points.

Theorem 5: An attacker who possesses a block of concatenated Xslices extracted from a ciphertext, but does not possess the $SCust_\psi$ necessary to determine the lengths of and separated individual Xslices, faces an NP-complete problem to separate the individual Xslices.

All three cases represent a "splitting" problem, where a block of data must be split at certain points to re-insert extracted information (Theorem 3 and Theorem 4) or to

TABLE 10

|  | Non-segmented File Directory Tree | Segmented File Directory Tree |
|---|---|---|
| For a single file access | | |
| How many files exposed | O(1) | O(1) |
| How many file pointers (leaf nodes) exposed | O(x) (all file pointers exposed) | O(1) (only files in folder containing target file) |
| How many folder pointers exposed (by decrypting zones) | O(x) (all folder pointers exposed) | O(log x) |
| How many authentication/permissions checks | O(1) | O(log x) |
| For all files in Directory Tree accessed | | |
| How many files exposed | O(x) | O(x) |
| How many file pointers (leaf nodes) exposed | O(x) (all file pointers exposed) | O(x) (all file pointers exposed) |
| How many folder pointers exposed (by decrypting zones) | O(x) (all folder pointers exposed) | O(x) (all folder pointers exposed) |
| How many authentication/permissions checks | O(x) | O(x log x) |

The results displayed in Tables 9 and 10 may be taken as justification for the following claims.

Claim 6: Segmenting the File Directory Tree and allowing a user to decrypt one zone at a time, as compared to a File Directory Tree system that provides the entire directory tree at once, for a single file access in a tree containing $\chi$ files:
  a) Improves the efficiency of retrieving a single file from $O(\chi)$ to $O(\log \chi)$
  b) Improves security by reducing the number of exposed file pointers from $O(\chi)$ to $O(1)$; and
  c) Improves security by increasing the number of required authentication/permissions checks from $O(1)$ to $O(\log \chi)$.

Claim 7: Segmenting the File Directory Tree and allowing a user to decrypt one zone at a time, as compared to a File Directory Tree system that provides the entire directory tree at once, for accessing every file in a tree containing $\chi$ files:
  a) Reduces the efficiency of retrieving all files from $O(\chi)$ to $O(\chi \log \chi)$
  b) Improves security by increasing the number of required authentication checks from $O(x)$ to $O(x \log x)$.

Mathematical proofs for Theorems 3-6 are now provided. However, first, a short review of the Theorems to be proved is provided.

separate the extracted information into pieces for re-insertion (Theorem 5). In essence, the problem requires the attacker to recreate the sequence of outputs from repeated calls to the F-box($\mathbf{X}$Lth) or F-box($\mathbf{O}$ffset) transforms, as demonstrated in FIG. 47. Although the outputs of these transforms are calculated based on the value of $SCust_\psi$, in a fielded IDACS system, the lengths of individual Xslices or the data blocks in the ciphertext between Xslices are chosen from a finitely long list of known possible lengths. In the case of Xbit insertion, there are a finite number of possible insertion points in each byte for the corresponding Xbit (8 possible positions). Therefore, solving these problems requires recreating a sequence of numbers (lengths) drawn from a known, finite list.

Figures 51, 52:
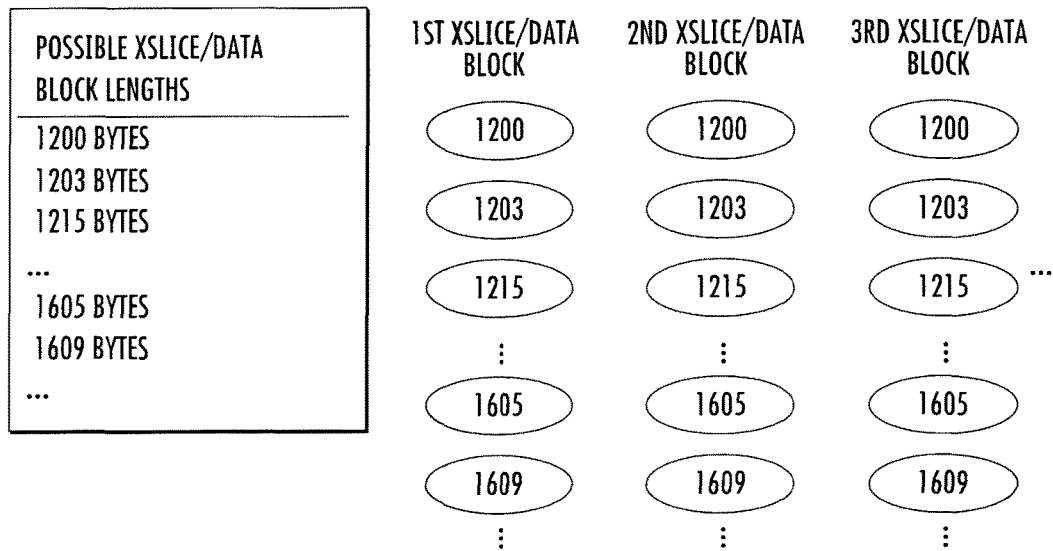
FIG. 51 and FIG. 52 demonstrate "splitting" problems, used to visualize aspects of proofs showing advantages of the illustrative IDACS network in accordance with the disclosure.

FIG. 51 and FIG. 52 demonstrate "splitting" problems, used to visualize aspects of proofs showing advantages of the illustrative IDACS network. Particularly, FIG. 51 and FIG. 52 show where a block of data must be split at certain points to re-insert extracted information or to separate the extracted information into pieces for re-insertion. To solve these problems, one member from each column must be selected, with the final sequence of selections representing the actual division of Xslices/Data Blocks or insertion points for Xbits. These problems can be represented in terms of graph theory. Let the options in each column be represented by a set of vertices $\mathbf{V}$.

Figure 53:
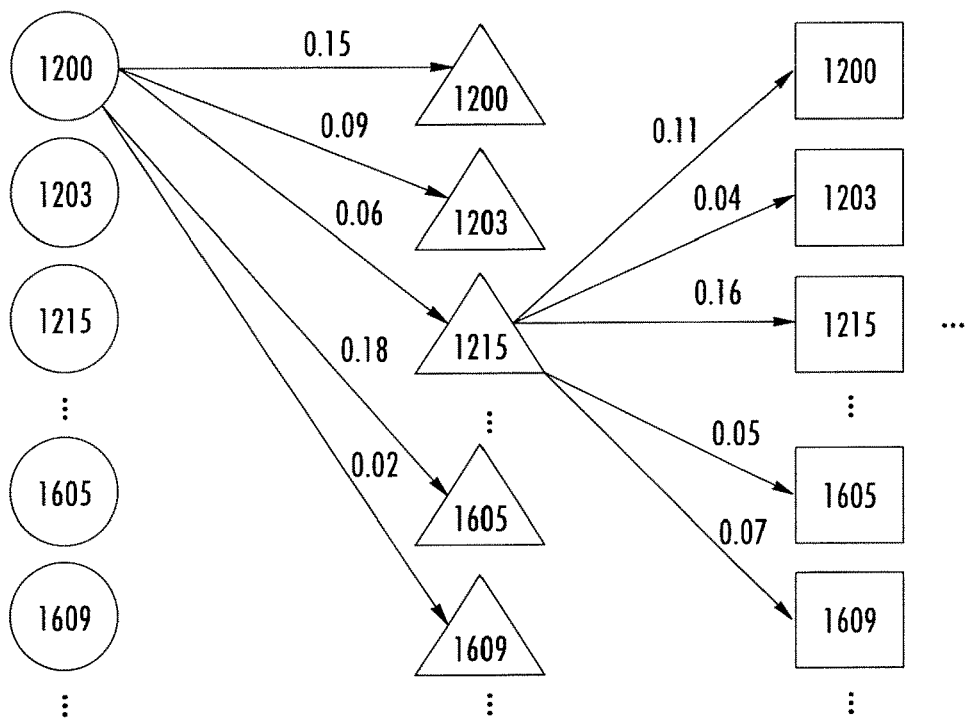
FIG. 53 shows the splitting problem represented in terms of graph theory, used to visualize aspects of proofs showing advantages of the illustrative IDACS network in accordance with the disclosure.

FIG. 53 shows the splitting problem represented in terms of graph theory, used to visualize aspects of proofs showing advantages of the illustrative IDACS network. Consistent with the concept of "graph coloring", each vertex in the same column is assigned the same color, with different colors assigned to each column (represented by shapes in FIG. 53). Each $v \in \mathbf{V}$ is connected by an directed edge e, $e \in E$, to every other v in an adjacent column (in FIG. 53, only a few e are shown for the sake of simplicity). Each $e \in E$ has an associated edge weight $W(e)$, $0 \leq W(e) \leq 1$, where $W(e)$ represents the probability that the $\{v1, v2\}$ connected by e, with their respective values and colors, are both present in a path which contains one v of each color that represents the correct sequence Xslice lengths etc. (the method for determining these weights are discussed herein)

Figure 54:
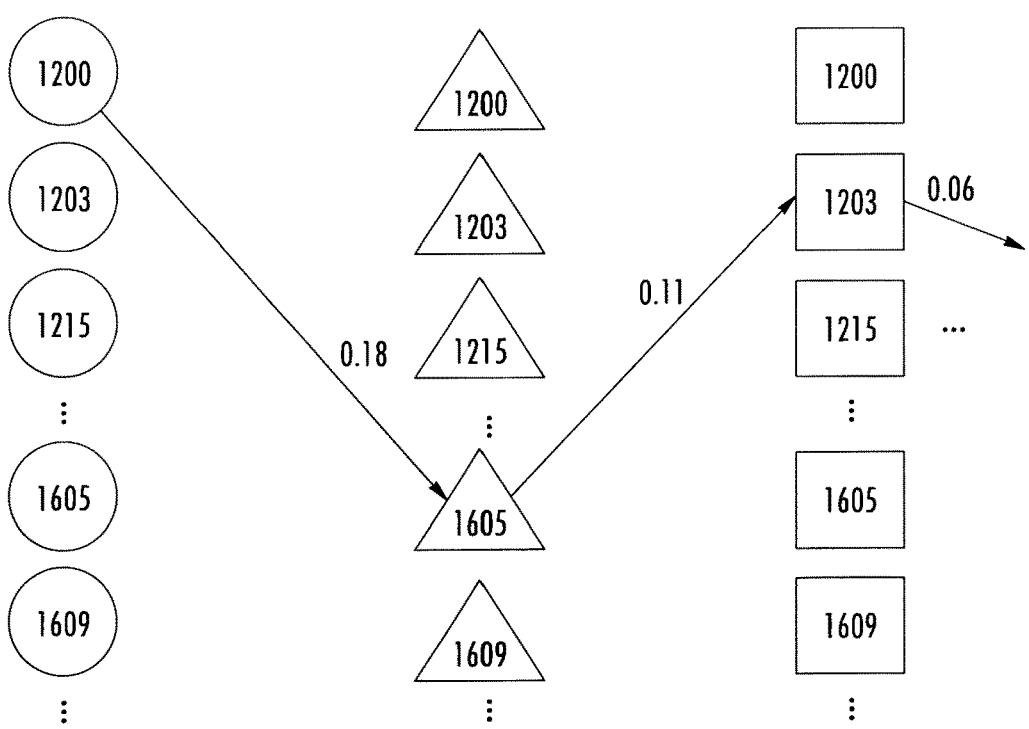
FIG. 54 shows a maximum weight path, used to visualize aspects of proofs showing advantages of the illustrative IDACS network in accordance with the disclosure.

FIG. 54 shows a maximum weight path, used to visualize aspects of proofs showing advantages of the illustrative IDACS network. Particularly, FIG. 54 shows the path containing one v of each color that has the highest sum $W(e)$ of all such paths (i.e the Maximum Weight Path), which should represent the correct sequence of Xslice lengths etc.

Now, solving the problem posed in Theorem 3, Theorem 4, or Theorem 5 is equivalent to solving this Maximum Weight Path problem. This problem may be formalized by specifying that a path of length Z (where Z is the number of columns) must be found. This is now the Maximum Weight Directed Path of Specified Length (MWDPSL) problem, which is proved NP-Complete herein. Thus, the NP-Completeness of Theorem 3, Theorem 4, and Theorem 5 is proved.

Theorem 6: An attacker who possesses all Xslices extracted from a ciphertext, but does not possess the $SCust_{u_i}$ necessary to determine the order in which these Xslices should be re-inserted into the ciphertext, faces an NP-complete problem to correctly order the individual Xslices.

The proof for Theorem 6 is identical to the proof for Theorem 1, with the Seed$\sigma$ in Theorem 1 replaced by the Xslices in Theorem 6. The Xslice ordering problem in Theorem 6 may also be represented by the Maximum Weight Path of Specified Length (MWPSL) problem, which is proved NP-Complete herein. Thus, the NP-Completeness of Theorem 6 is proved.

While Theorem 3, Theorem 4, Theorem 5, and Theorem 6 have been proved NP-complete, the value of this proof must be qualified. NP-completeness speaks only to the worst-case complexity of a given decision problem (which is that the complexity grows exponentially with the problem size); there may be other factors that can significantly reduce the complexity of a problem.

Figure 55:
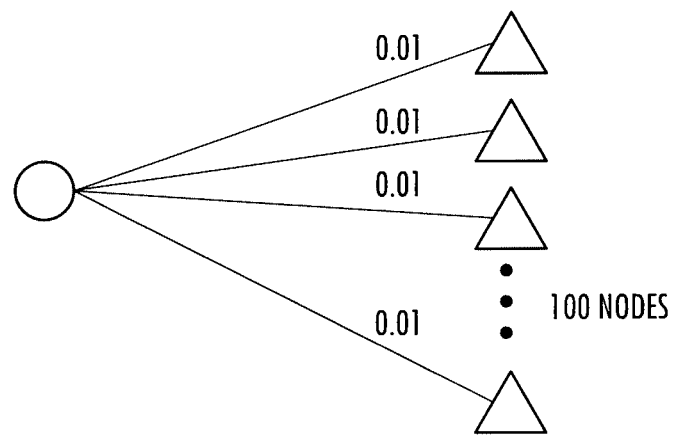
FIG. 55 shows the situation in which the edge weights in the graph are relatively uniform, where the complexity of finding the Maximum Weight Path is close to the worst-case scenario, to visualize aspects of proofs showing properties of the exemplary IDACS network security procedures in accordance with the disclosure.
Figure 56:
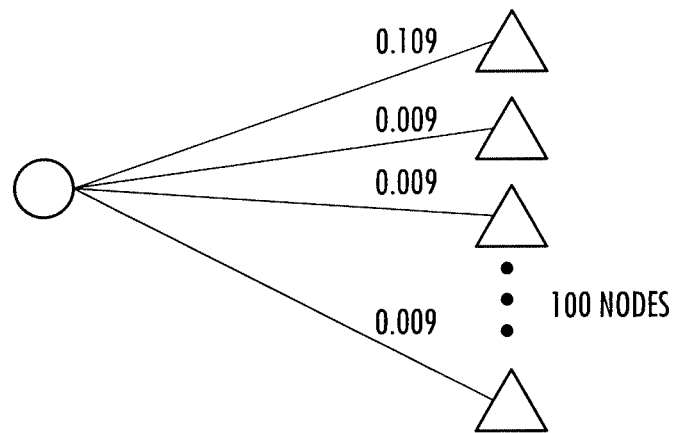
FIG. 56 shows the situation where the edge weights are not relatively uniform, where an algorithm (or a human analyst) can significantly reduce the complexity of finding the Maximum Weight Path by picking out the high-weight edges that are more likely to be part of the solution, to visualize aspects of proofs showing properties of the exemplary IDACS network security procedures in accordance with the disclosure.

FIG. 55 shows the situation in which the edge weights in the graph are relatively uniform, where the complexity of finding the Maximum Weight Path is close to the worst-case scenario, to visualize aspects of proofs showing properties of the exemplary IDACS network security procedures. FIG. 56 shows the situation where the edge weights are not relatively uniform, where an algorithm (or a human analyst) can significantly reduce the complexity of finding the Maximum Weight Path by picking out the high-weight edges that are more likely to be part of the solution, to visualize aspects of proofs showing properties of the exemplary IDACS network security procedures.

Consider the example of reassembling fragmented data. Generally, highly-patterned data will result in stronger pattern recognition, which will result in a graph with a few high-weight edges. Therefore, highly-patterned data will result in a Maximum Weight Path reassembly problem that has a complexity significantly less than the worst-case exponential. It has been reported that highly-patterned data does indeed lead to faster and more accurate file reassembly. Thus, a relevant inquiry is whether the fragmented, distributed ciphertext (Xslices and their associated ciphertext) that is present in IDACS produce a uniform or non-uniform edge weight distribution in the graph.

To address this issue, one may analyze the "randomness" of the type of ciphertext fragments that are present in IDACS to judge what type of edge weight distribution a Maximum Weight Path model applied to these fragments would generate. This analysis was performed using a software package created by the National Institute of Standards and Technology (NIST), which provides a battery of tests (referenced above) that analyzes the outputs of Random Number Generators (RNGs) to measure their "randomness" by looking for patterns in the outputs. The battery consists of 15 individual tests, each of which measures different aspects of "randomness" in the data. Each of these tests ask the question: "If the algorithm that generated this data sample was truly random, what is the probability that this specific data sample could have been generated?" The individual tests respond with a p-score in the probability range [0, 1]. The NIST standard recommends using a passing score, or "significance level", of 0.01. Some truly random data samples will fail the tests and generate a "false positive" for randomness due to weaknesses in the test; therefore, two types of statistics are recommended for analyzing the test p-scores.

The first statistic looks at the proportion, or percentage, of tests with passing p-scores According to the parameters in A. R. et al., "A Statistical Test Suite for Random and Pseudorandom Number Generators for Cryptographic Applications," Gaithersburg, Md., 2010, for a set of tests run with 1000 data samples, a truly random RNG will have a minimal proportion of 0.9805068, i.e. a minimum pass rate of 98.05%. The second statistic looks at the distribution of the p-scores. For a set of truly random data samples, it is expected that the p-scores should be evenly distributed. The evenness of the distribution can be measured by calculating the P-value$_T$ for each test based on the chi-square statistic; if each test has a P-valueT$\geq$0.0001, then the p-scores are considered to be evenly distributed.

To measure the randomness of ciphertext blocks, the NIST battery was applied to two sets of data. The first set of data consisted of samples of normal AES ciphertext blocks (representing a segment of AES ciphertext with the correct Xslice re-inserted), and the second set consisted of samples of two normal AES ciphertext blocks encrypted with two different AES keys back-to-back with each other (representing a segment of AES ciphertext with an incorrect Xslice re-inserted). This test was designed to determine whether there was any discernible difference between the "pattern" (or randomness) of a correctly- and incorrectly- re-inserted Xslice. Both data sets consisted of 1000 samples, each of which was $10^6$ bits ($1.25*10^5$ bytes) long. The samples in the first data set consisted of plaintext encrypted using AES in CBC mode, using a unique key for each sample. The samples in the second data set consisted of the same plaintext encrypted using AES in CBC mode, but each sample was split into two halves, each of which was encrypted using a unique key).

The NIST battery of tests consists of 15 individual tests. Two of these tests are run twice during the course of the battery; results for both of the tests are reported here. Three of the tests are run a number of times; results for two randomly selected instances of those tests are reported here. All other tests were run once; the results are reported here. In total, 20 separate test results are reported.

Figure 57A:
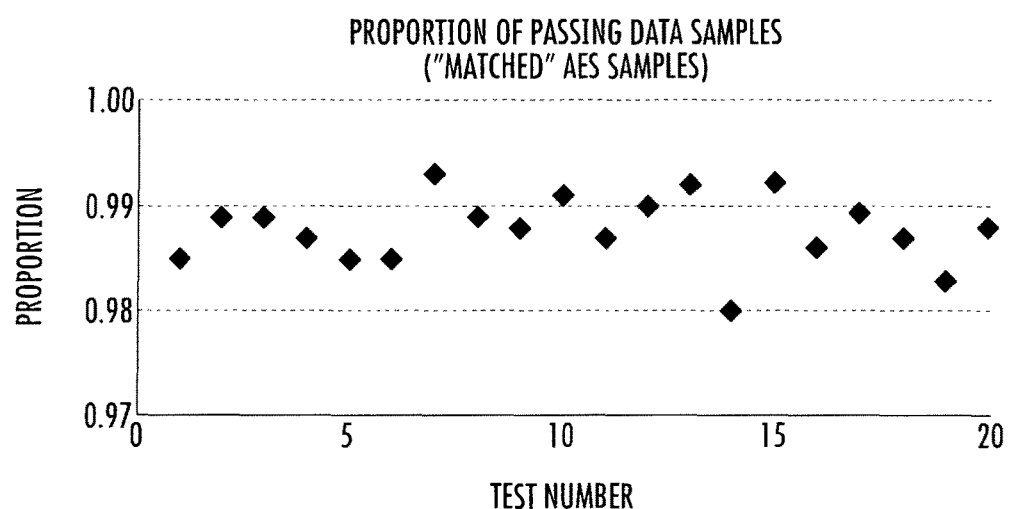
FIG. 57(a) shows the proportion of passing NIST tests for an exemplary IDACS network for a first data set, which represents a "matched" Xslice and ciphertext in accordance with the disclosure.
Figure 57B:
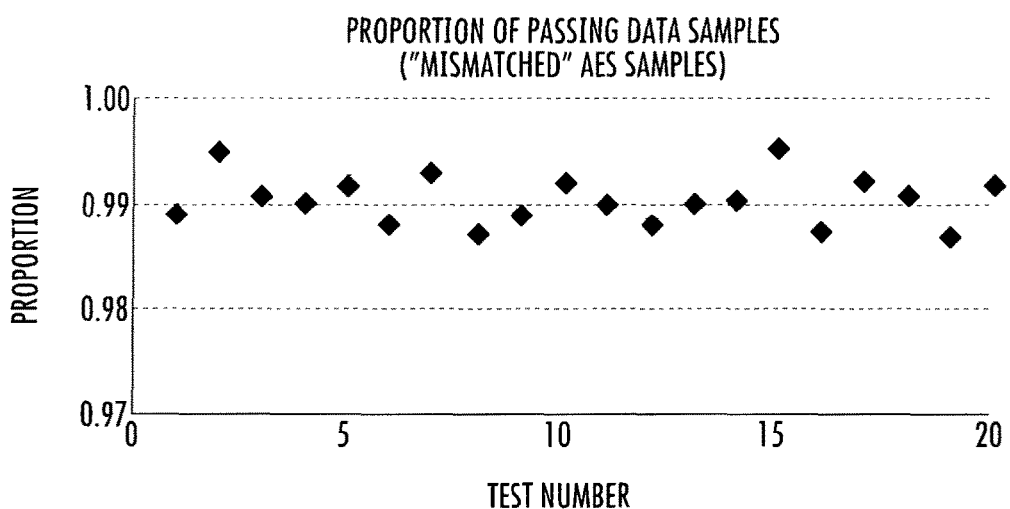
FIG. 57(b) shows the proportion of passing NIST tests for an exemplary IDACS network for a second data set, which represents a "mismatched" Xslice and ciphertext (or two concatentated Xslices or ciphertext segments that were not adjacent in the original ciphertext) in accordance with the disclosure.

FIG. 57(a) shows the proportion of passing NIST tests for an exemplary IDACS network for a first data set, which represents a "matched" Xslice and ciphertext. FIG. 57(b) shows the proportion of passing NIST tests for an exemplary IDACS network for a second data set, which represents a "mismatched" Xslice and ciphertext (or two concatentated Xslices or ciphertext segments that were not adjacent in the original ciphertext). It can be seen that all but one test result pass the minimum proportion requirements; more importantly, both data sets are demonstrated to be "random", and there is no distinguishable difference between the proportions for the two data sets.

Table 11 lists the P-value$_T$ for all of the NIST tests for both the "matched" and "mismatched" ciphertext fragments. It can be seen that all tests for both data sets pass the minimum score of 0.0001. Thus, the two data sets may be considered equally "random". Therefore, it can be concluded that both matching and mismatching ciphertext fragments would generate uniform edge weights in a weighted graph. This indicates that there is no discernible difference (pattern-wise) between adjacent ciphertext blocks (ciphertext joined with associated Xslices) and non-adjacent blocks (concatentated Xslices or ciphertext with Xslices removed), and that the graphs generated to solve Theorem 3 through Theorem 6 would have uniform edge weights, maximizing the effect of the NP-complete property.

Table 11 provides a comparison of the P-value$_T$ for NIST tests for "matched" ciphertext fragments and "mismatched" ciphertext fragments.

TABLE 11

| Test # | Matched Ciphertext | Mismatched Ciphertext |
|---|---|---|
| 1 | 0.147815 | 0.514124 |
| 2 | 0.173770 | 0.325206 |
| 3 | 0.528111 | 0.605916 |
| 4 | 0.340858 | 0.689019 |
| 5 | 0.196920 | 0.626709 |
| 6 | 0.875539 | 0.500279 |
| 7 | 0.727851 | 0.039073 |
| 8 | 0.162606 | 0.570792 |
| 9 | 0.174728 | 0.647530 |
| 10 | 0.323668 | 0.153763 |
| 11 | 0.867692 | 0.574903 |
| 12 | 0.649612 | 0.794391 |
| 13 | 0.522100 | 0.344048 |
| 14 | 0.437274 | 0.974555 |
| 15 | 0.243466 | 0.291249 |
| 16 | 0.888892 | 0.356948 |
| 17 | 0.105377 | 0.148760 |
| 18 | 0.504219 | 0.948298 |
| 19 | 0.156373 | 0.081013 |
| 20 | 0.257004 | 0.705466 |

The simulations used to examine the effect of Xbits, Xslices, Single File Data Segmentation, and File Directory Tree Segmentation on increasing IDACS security used the same simulation suite discussed above. To simulate the use of Xbits, Xslices, and Data Segmentation, the simulation was expanded to make the access-DB-attacks directed towards accessing the contents of a Segmented File Directory Tree and the data files it stores.

Figure 58:
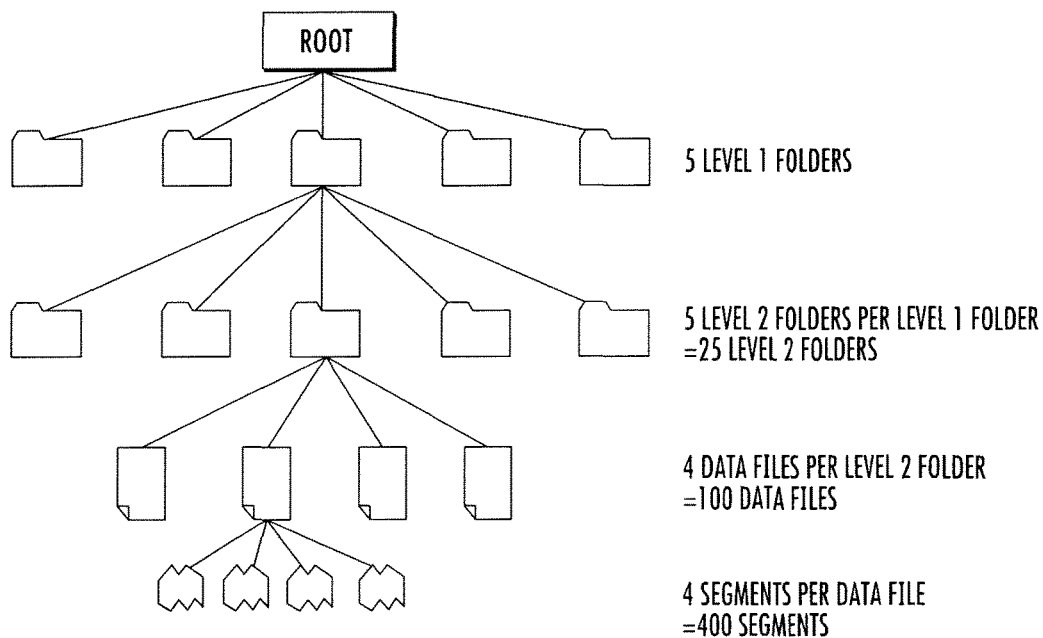
FIG. 58 illustrates the Segmented File Directory Tree used in simulations of the illustrative IDACS network in accordance with the disclosure.

FIG. 58 illustrates the Segmented File Directory Tree used in simulations of the illustrative IDACS network. Each Traitor Cust$_\psi$ in the simulation had legal access (permissions) to access 3 random data files in the File Directory Tree; however, no Traitor Cust$_\psi$ had access to the full set of authentication tokens (Client$_\rho$, Badge$_\xi$, Pwd$_\theta$, and PIN$_\lambda$). Because of this, all access-DB-attacks were illegal. Each Traitor Cust$_\psi$ began with the contents of the File Directory Tree (minus Xslices) encrypted on his Client$_\rho$, with the Xbits and Xslices necessary for decryption residing in the IDACS datacenter. Each Traitor Cust$_\psi$ began with a pointer to the "root" of the File Directory Tree; he would need to retrieve the Xbits and Xslices necessary to decrypt the "root" from the IDACS datacenter to access the "root's" contents (the pointers for the Level 1 Folders). He would then need to retrieve the Xbits and Xslices to decrypt a given Level 1 Folder from the IDACS datacenter to access that Level 1 Folder's contents (the pointers to the children Level 2 Folders). A Traitor Cust$_\psi$ would need to repeat this process until he was able to retrieve all four Segments of a target Data File.

Each Traitor Cust$_\psi$ in IDACS possessed the same encrypted File Directory Tree; however, each Traitor Cust$_\psi$'s File Directory Tree was encrypted using different encryption keys, different Xslices, and different Content (PID$_\varepsilon$) associated with the store Xbits and Xslices. Therefore, Traitor Cust$_\psi$ were not able to collaborate with each other by sharing Content (PID$_\varepsilon$) and thus "skipping over" the retrieval of a given folder; all Traitor Cust$_\psi$ were forced to completely decrypt their own File Directory Trees. Additionally, each Traitor Cust$_\psi$ contained only the portions of the File Directory Tree that were "ancestors" of the Data Files that particular Cust$_\psi$ had permissions to access; in this simulation, Traitor Cust$_\psi$ were unable to access files for which they did not have permissions. However, the group of Traitor Cust$_\psi$ was able to collaborate with each other in a limited way; if one Traitor Cust$_\psi$ had retrieved a particular Data File Segment, all other Traitor Cust$_\psi$ would seek to retrieve other Data File Segments, rather than pursue data that had already been successfully recovered. Additionally, the group of Traitor Cust$_\psi$ would give priority for retrieval attempts to the Traitor Cust$_\psi$ with the deepest exploration into the File Directory Tree, thus focusing the resources of Traitor SAs and SSAs towards the Traitor Cust$_\psi$ with the highest likelihood of successfully accessing Data File Segments.

During this simulation, two separate IDACS datacenter accesses were completed to decrypt a single folder/data file pointer/data file segment; one access to retrieve the Xbits, and one access to retrieve the Xslices. The length of the approach and return authentication chains was 2 (N=2); this parameter was shortened from the previous value of 4 to allow more access-DB-attacks to succeed during this simulation. This simulation used the turn-traitor-attack vectors and metamorphic variations defined for Scenario 3 herein, with 40 attack vectors and 100 variations per attack vector (these parameters were increased to mask the limiting effects of these parameters from the results of this simulation). Phase 2 of the simulation began after a threshold of 90% of the SAs and SSAs had been turned into traitors, with a single Traitor Cust$_\psi$ for each Traitor SA or SSA. This 90% threshold is much higher than what we would expect to see in a real-world situation; however, it was set at that level for two purposes. First, the 90% threshold represents a catastrophic scenario; if IDACS is capable of defending against this type of scenario, then the real-world performance is expected to be much higher. Second, it was necessary to raise the threshold to 90% for an appreciable number of access-DB-attacks to succeed so that the effect on the Segmented File Directory Tree could be observed. Access-DB-attacks would cease if the percentage of active SAs or SSAs that were traitors fell below 15%. Additionally, no SAs or SSAs in this simulation were spoofed; all traitor SAs or SSAs were completely functional traitors.

During Phase 2 of this simulation, if a Traitor $Cust_\psi$ was identified, it would be quarantined and the entire File Directory Tree residing on that $Cust_\psi$ would be "re-encrypted". Therefore, if that $Cust_\psi$ was later turned into a Traitor, he would have none of the File Directory Tree decrypted, and would have to start again from the "root". However, once a Data File segment was retrieved, it was considered to be owned by the attacker regardless of whether that $Cust_\psi$ was detected in the future or not, and that data was added to the pool of data that had been successfully retrieved by the collaborating Traitor $Cust_\psi$.

Because the threshold of 90% of SAs and SSAs turned traitor before Phase 2 of the simulation began, a unique situation presented itself. In most cases, the percentage of Traitor SAs and SSAs in IDACS would drop quickly after the start of Phase 2 of the simulation (FIG. 59), similar to the results in with a 60% threshold. However, with a 90% threshold, in about 1 in 10 simulation runs, new Traitor SAs and SSAs would be turned more quickly than they were detected and quarantined at the beginning of Phase 2. If 100% of the SAs and SSAs in IDACS were turned Traitor, there were no loyal SAs or SSAs remaining to detect, identify, and quarantine the Traitors. In that case, IDACS was completely controlled by the attacker, and the IDACS defenses were completely nullified. In this discussion, a simulation that results in 100% Traitor SAs and SSAs is termed a "Runaway Botnet", while a simulation that reduces the percentage of Traitor SAs and SSAs over time is referred to as a "Contained Botnet".

Figure 59:
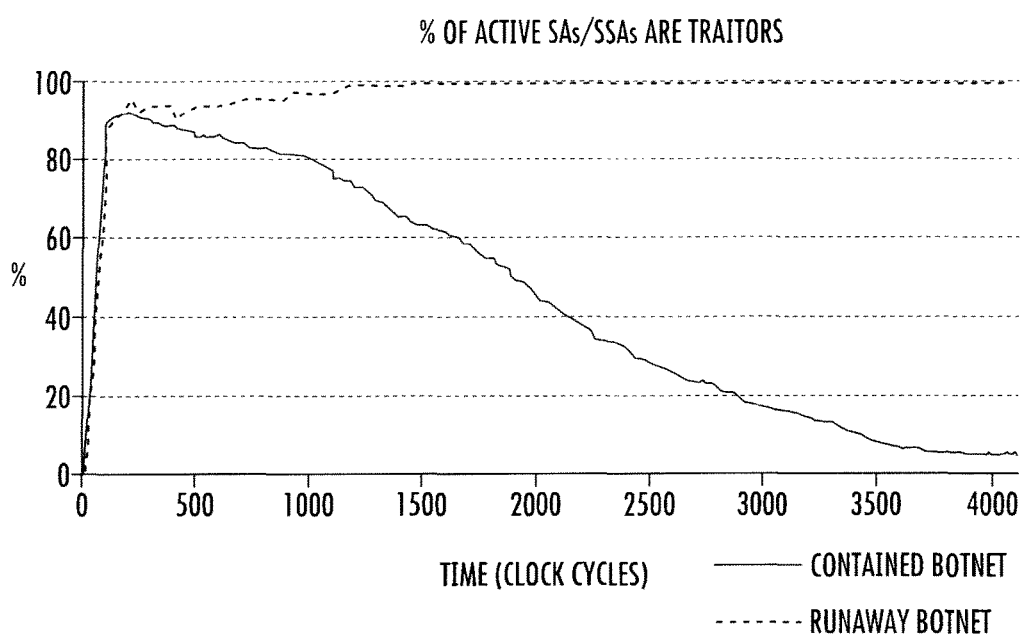
FIG. 59 shows a comparison of the results of IDACS Network loyalty for a given Contained Network simulation run and a given Runaway Network simulation run in accordance with the disclosure.

FIG. 59 shows a comparison of the results of IDACS Network loyalty for a given Contained Network simulation run and a given Runaway Network simulation run.

It should be noted that Runaway Botnet simulations occurred in only 1 out of 10 simulation runs with an SA/SSA Traitor threshold of 90%; Runaway Botnets were not observed in simulations with a threshold of 80% or less. Therefore, a Runaway Botnet represents a highly unlikely, but very catastrophic situation. For the sake of completeness, the results for Runaway Botnet simulations are included in discussions herein.

The results of this simulation were analyzed to discover the effectiveness of the protection provided by the Segmented File Tree Directory against illegal access of the Client-side encrypted data.

Figure 60:
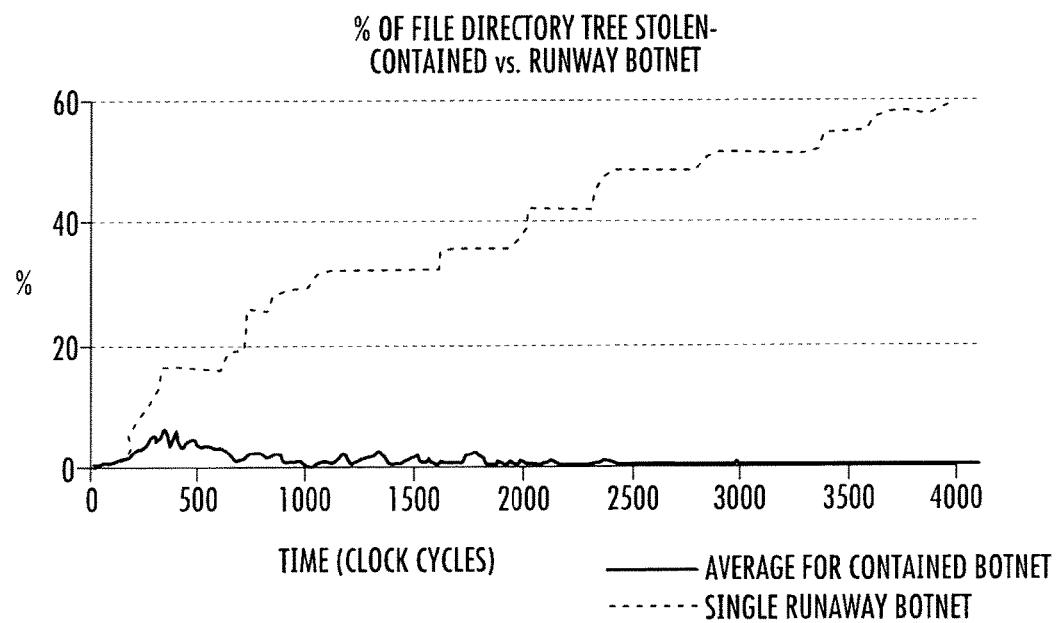
FIG. 60 shows the percentage of the File Directory Tree stolen by the attacker averaged across 9 Contained Botnet simulation runs, compared to the same data for a single Runaway Botnet simulation in accordance with the disclosure.

FIG. 60 shows the percentage of the File Directory Tree stolen by the attacker averaged across 9 Contained Botnet simulation runs, compared to the same data for a single Runaway Botnet simulation. For the Contained Botnet, a small percentage of the File Directory Tree is initially retrieved, riding on the initial high percentage of Traitor SAs and SSAs (FIG. 59). However, as Traitor SAs and SSAs are identified and quarantined, more Traitor $Cust_\psi$ are also identified and quarantined; as their individually encrypted File Directory Trees are re-encrypted, those previously retrieved Folders are lost, and the percentage drops. Eventually, when fewer access-DB-attacks are being made and even fewer are successful, due to a low percentage of Traitor SAs and SSAs in IDACS (compare to FIG. 41 and FIG. 43), the percentage of the File Directory Tree that is retrieved will drop to zero. This simulation demonstrates that even under extremely adverse situations, IDACS will contain and eliminate the results of an initial burst of successful illegal IDACS database accesses. However, FIG. 60 also demonstrates that in the rare, catastrophic situation of a Runaway Botnet, the Traitor $Cust_\psi$ become functionally equal to Loyal $Cust_\psi$, and the entire File Directory Tree can be retrieved with sufficient time.

Figure 61:
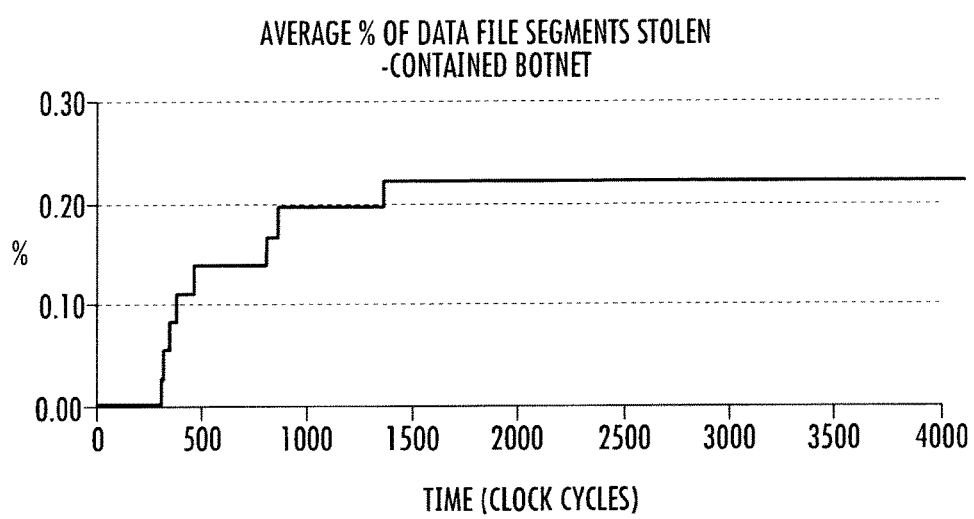
FIG. 61 and FIG. 62 show the percentage of the total Data File Segments in IDACS that were successfully stolen by Contained Botnets and Runaway Botnets in accordance with the disclosure.
Figure 62:
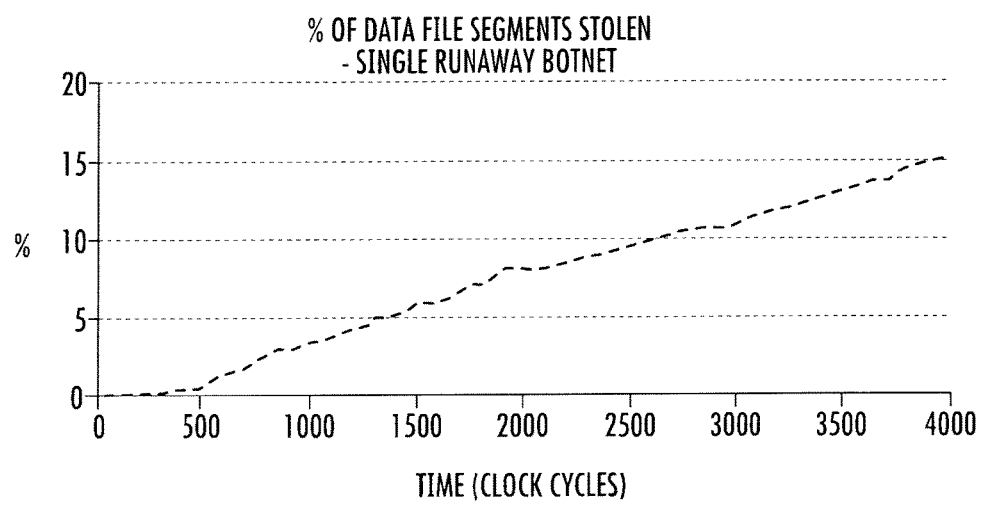

FIG. 61 and FIG. 62 show the percentage of the total Data File Segments in IDACS that were successfully stolen by Contained Botnets and Runaway Botnets. For a Contained Botnet (which is the more realistic situation), the Traitor $Cust_\psi$ meet with some initial success in retrieving Data File Segments (compare to the percentage of the retrieved Data File Tree in FIG. 60). However, after IDACS becomes more successful at blocking access-DB-attacks, no more Data File Fragments are retrieved. Because a Data File Fragment, once stolen, is permanently stolen (re-encryption of a Data File Tree does not nullify the theft of a given Data File Fragment), quarantine of Traitor $Cust_\psi$ does not reduce the percentage of Data File Segments stolen; however, IDACS is able to limit the damage to an average of about 0.22%, or slightly less than one complete Data File Segment. Once again, however, if an attacker manages to accomplish a Runaway Botnet (the rare, less realistic situation), there is a virtual open door for the Traitor $Cust_\psi$ to retrieve all of the Data File Segments, limited only by time.

One of the advantages of the IDACS Segmented File Directory Tree approach is that it allows previous illegal IDACS datacenter accesses to be detected. When a Traitor $Cust_\psi$ is detected, the IDACS forensics engine reports to the System Administrator that all Data File Segments previously retrieved by that $Cust_\psi$ have been stolen. It is very useful, in the aftermath of a network breach, to know where data leakages occurred, and what data was leaked.

Figure 63:
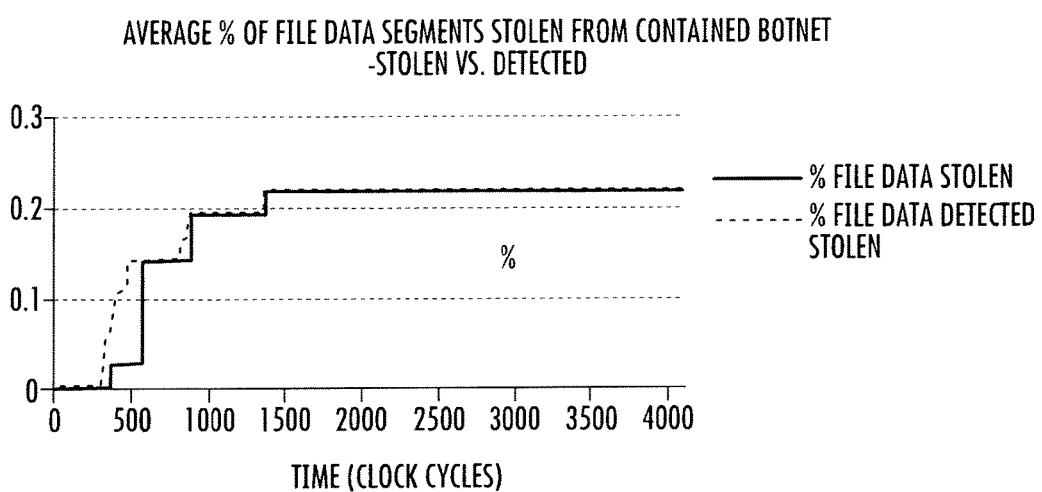
FIG. 63 and FIG. 64 show when File Data Segments were retrieved during the simulation, and when they were detected as having been stolen in accordance with the disclosure.
Figure 64:
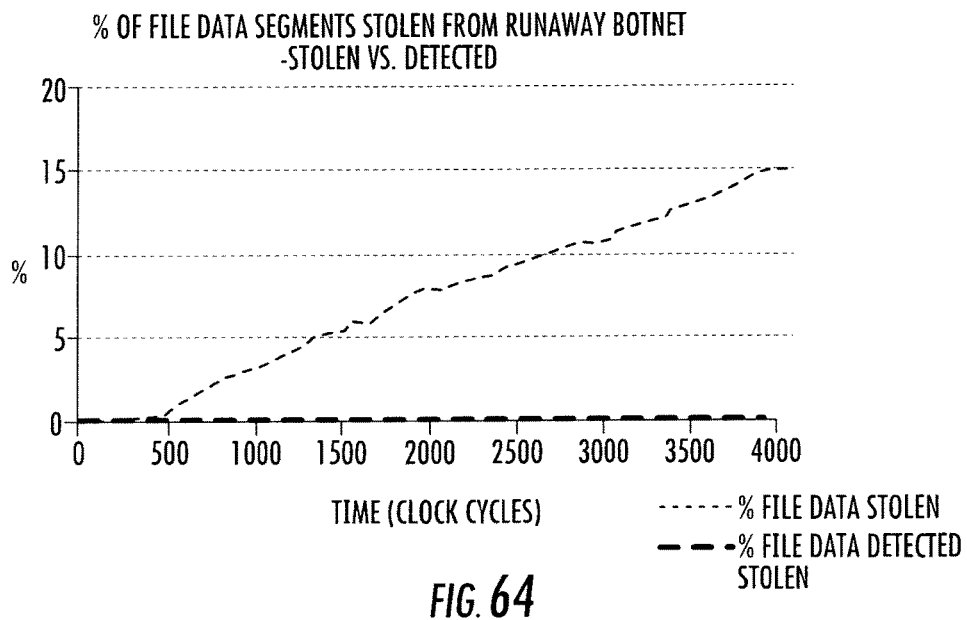

FIG. 63 and FIG. 64 show when File Data Segments were retrieved during the simulation, and when they were detected as having been stolen. FIG. 63 shows that File Data Segments stolen during the Contained Botnet simulation were detected as stolen soon after the theft. This demonstrates the strength of data leakage capabilities of IDACS. However, when the Runaway Botnet gains control of all of the SAs and SSAs in IDACS (FIG. 64), none of the stolen data is detected as such.

When a Traitor $Cust_\psi$ is detected to be a Traitor, this allows IDACS to hold that $Cust_\psi$ accountable for stealing files.

Figure 65:
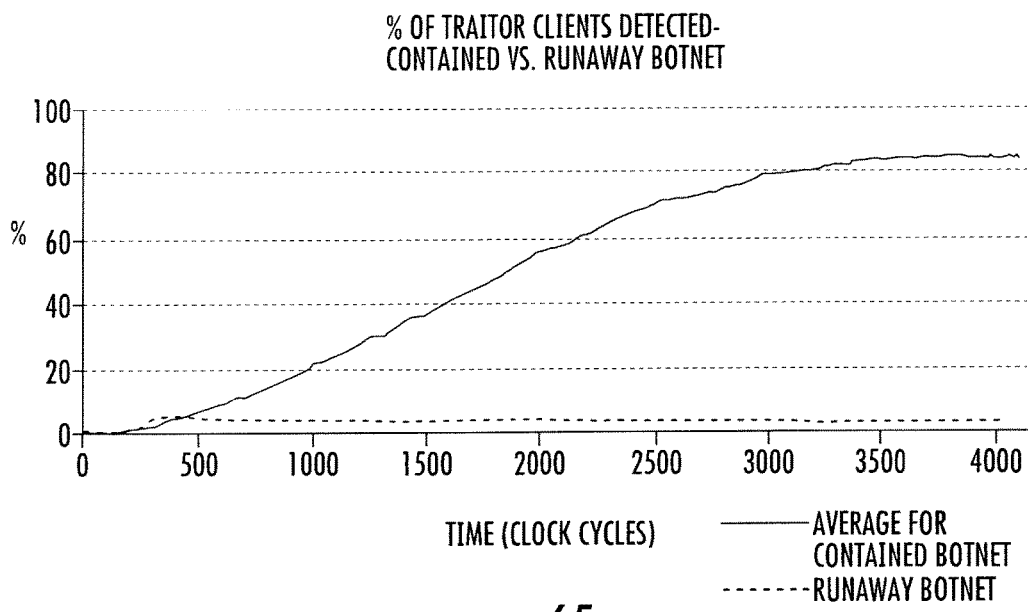
FIG. 65 shows the success rate for identifying every $Cust_\psi$ that was ever turned Traitor for Contained and Runaway Botnet simulations in accordance with the disclosure.

FIG. 65 shows the success rate for identifying every $Cust_\psi$ that was ever turned Traitor for Contained and Runaway Botnet simulations. In the common real-world case (Contained Botnet), IDACS is able to identify and quarantine a large percentage of the Traitor $Cust_\psi$, only failing to identify them once the percentage of Traitor SAs and SSAs drops below the threshold below which access-DB-attacks s are no longer launched (compare to FIG. 59). Thus, IDACS provides strong capabilities for identifying and holding accountable Byzantine agents in the system. For the rare case (Runaway Botnet), several Traitor $Cust_\psi$ are identified, but once 100% of the SAs and SSAs in IDACS are turned Traitor, there are no new detections of Traitor $Cust_\psi$.

Figure 66:
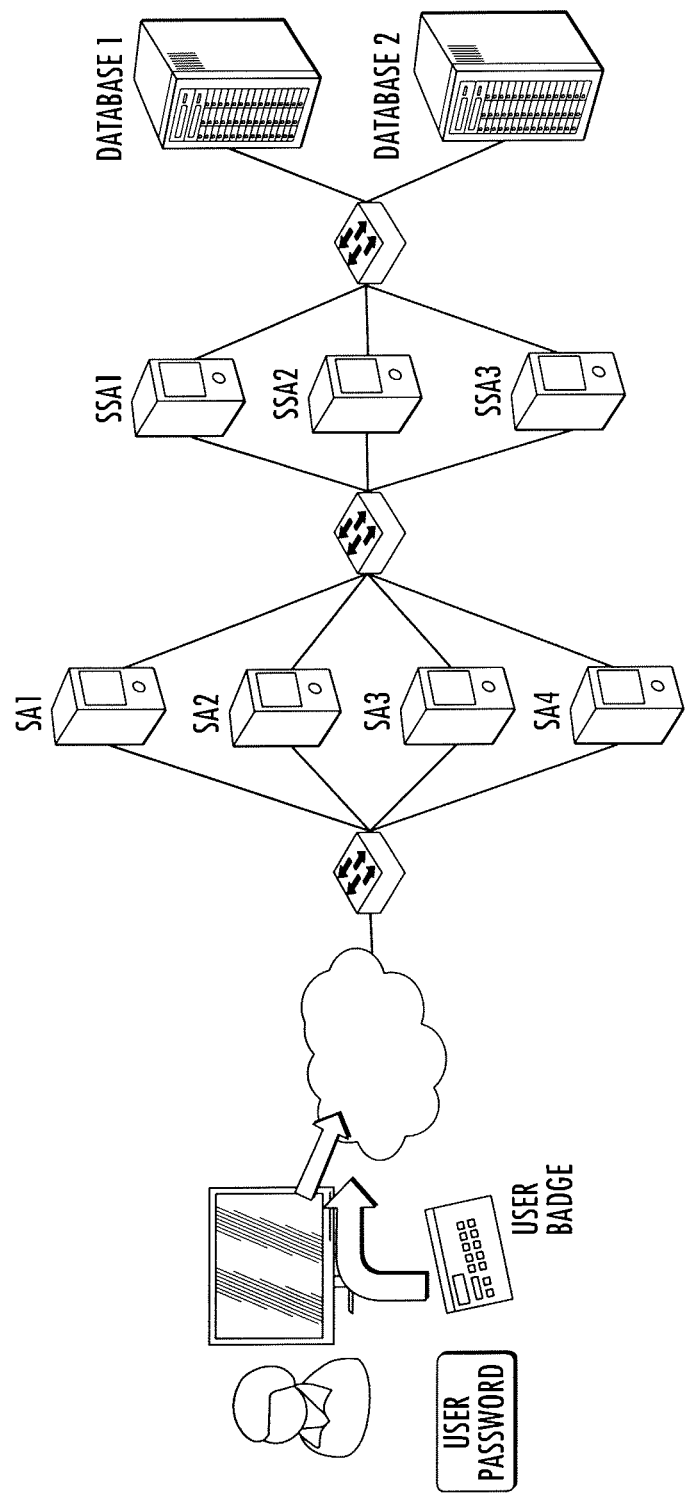
FIG. 66 shows an exemplary IDACS implementation setup that has been tested. However, the IDACS network can be scaled to any size desired (though preferably, 1 SSA, 2 SAs, and 1 DB minimum are provided) in accordance with the disclosure.

FIG. 66 shows an exemplary IDACS implementation setup that has been tested. However, the IDACS network can be scaled to any size desired (though preferably, 1 SSA, 2 SAs, and 1 DB minimum are provided). The space separation of the Client Device ($Client_\rho$) and User Badge ($Badge_\zeta$) is simulated by storing their respective cryptographic seeds on different Java Virtual Machines.

FIG. 67(*a*) through (*d*) show exemplary Command Line Interface (CLI) programs implemented in Java, which can be used for various software components, such as all IDACS Network elements (SAs, SSAs, and Databases) and the User Badge (Badge$_\zeta$).

The Client Device (Client$_\rho$) may be implemented in a number of ways. FIG. 69 (e), as one example, shows that it may be implemented as a CLI program. This Client Device implementation performs simple Read and Write operations to store and retrieve blocks of data on the IDACS Database; the purpose of this implementation is to test the IDACS reaction to incorrectly formed PIDs (PID$_\varepsilon$) and also compromise of the Client Device (Client$_\rho$), User Badge (Badge$_\zeta$), User Password (Pwd$_\theta$), or Badge PIN (PIN$_\lambda$).

Figure 67C:
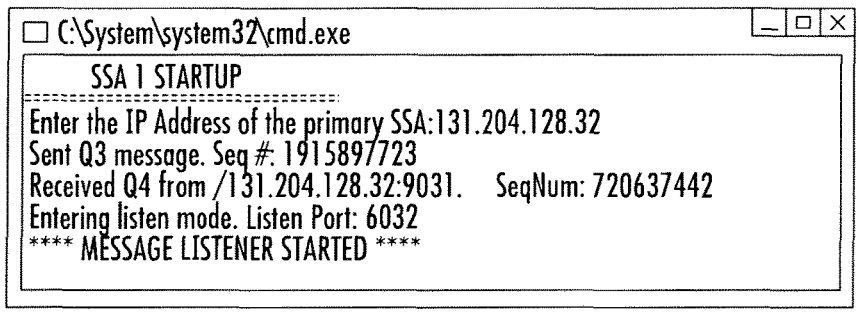
Figure 67D:
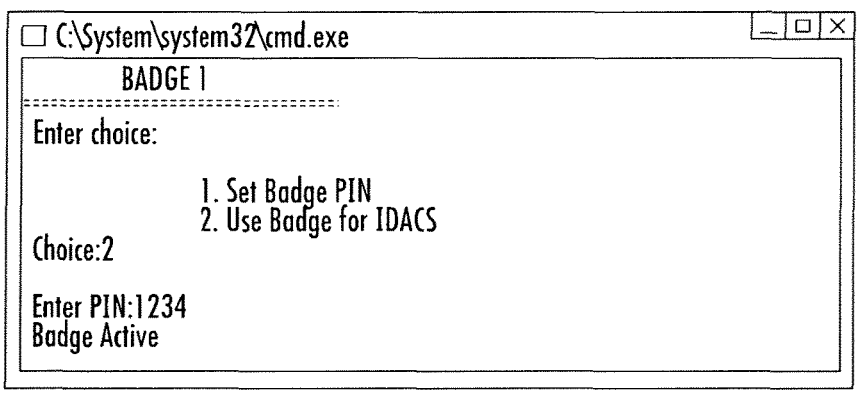
Figure 67E:
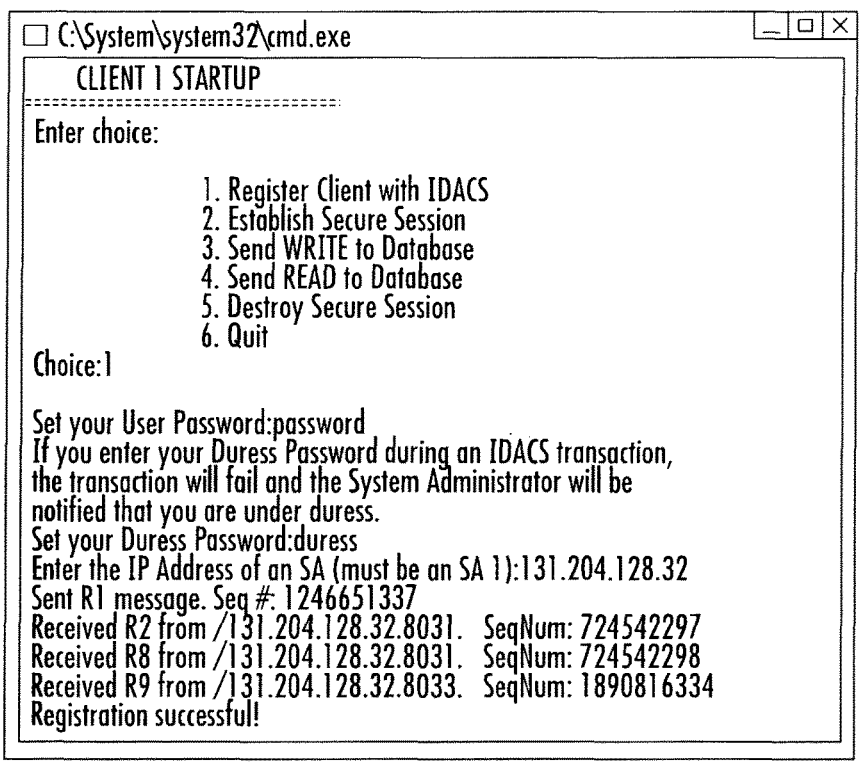
FIG. 67(e) shows an exemplary client implementation implemented as a CLI program in accordance with the disclosure.
Figure 67F:
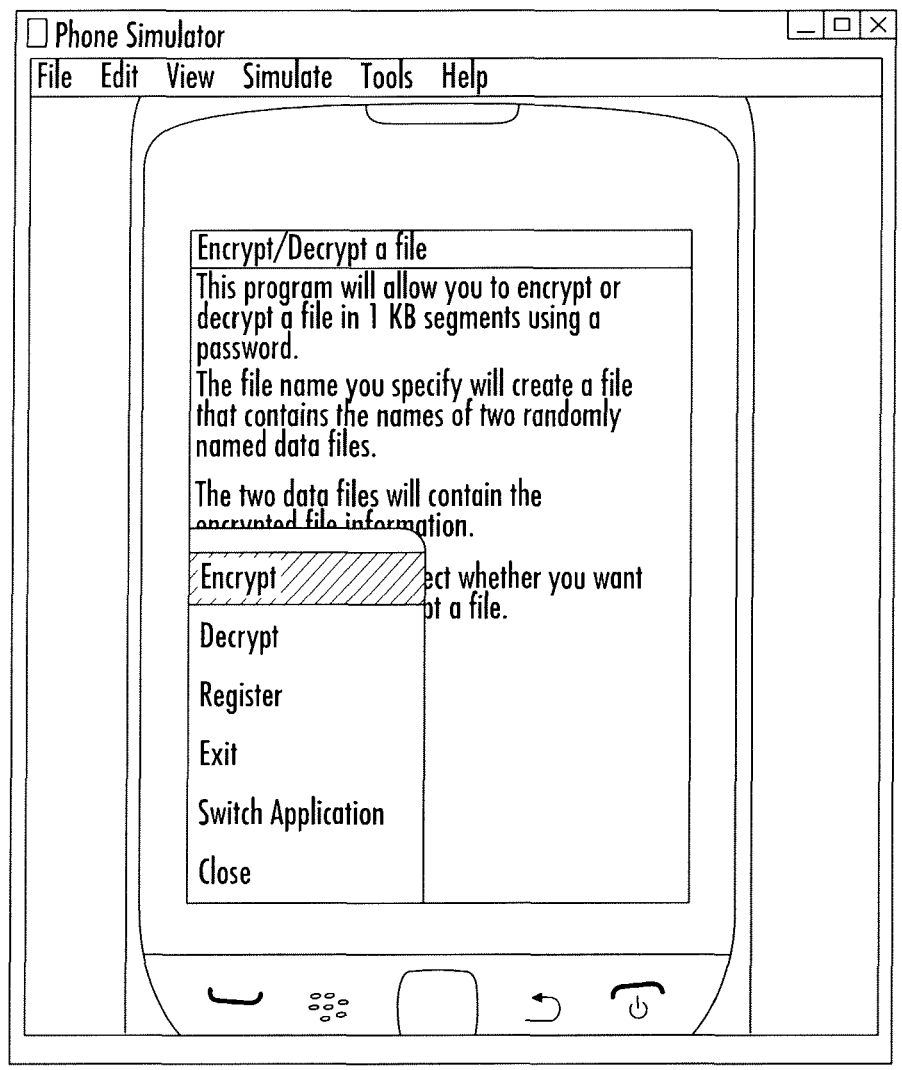
FIG. 67(f) shows a second exemplary Client Device implementation, in the form of an app that runs on a BlackBerry 9800 simulator available from RIM in accordance with the disclosure.

FIG. 67(f) shows a second exemplary Client Device implementation, in the form of an app that runs on a BlackBerry 9800 simulator available from RIM. This app encrypts a file and stores Xslices and Xbits on the DB in a distributed manner.

In addition to being scalable, this implementation of IDACS uses a network communications protocol that achieves reliable delivery over UDP. Given the particulars of the IDACS algorithm and the per-message overhead $\overline{OTP_\psi}$, $\overline{PID_\psi}$, and XV, it should be noted that combining IDACS with TCP might present inefficiencies. It may be more efficient to build a proprietary IDACS protocol on top of UDP. Therefore, the current implementation of IDACS is built on top of UDP; to compensate for the reliable delivery problem, IDACS contains built-in reliable delivery capabilities based on the concept of TCP SACKs. Using this method, IDACS is able to reliably transfer large numbers of packets.

Figure 68A:
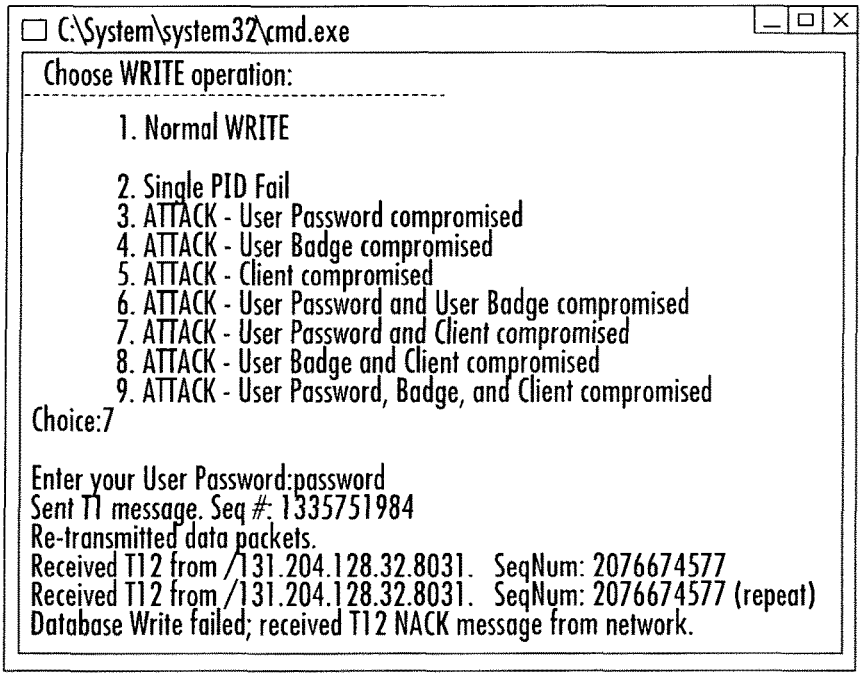
FIG. 68(a) shows a simulated attacker attempts a Data Write operation, having stolen the User Password and the Client Device, but not the User Badge (the Badge PIN is bundled with the User Badge in this particular implementation).
Figure 68B:
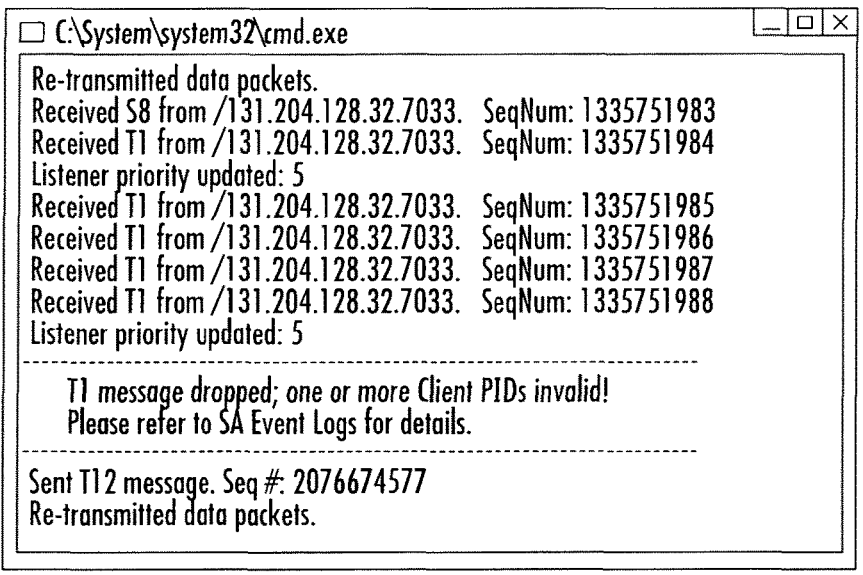
FIG. 68(b) shows that due to the missing cryptographic seeds residing on the User Badge, several of the PIDs (PID$_\varepsilon$) cannot be formed correctly; these incorrect PIDs are detected by an SA, and the attack is flagged.
Figure 68C:
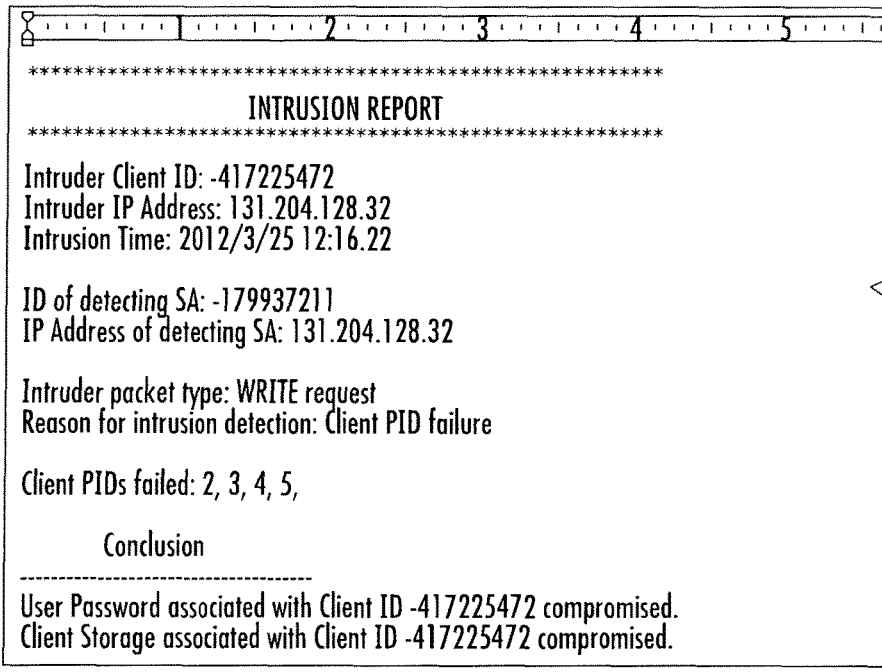
FIG. 68(c) shows that based on the cryptographic seed space separation and PID formation in this particular IDACS implementation, the digital forensics suite is able to determine correctly that the User Password and Client device were stolen or cloned in accordance with the disclosure.

FIG. 68 shows a demonstration of the real-time digital forensics capabilities of this exemplary IDACS implementation. FIG. 68(a) shows a simulated attacker attempts a Data Write operation, having stolen the User Password and the Client Device, but not the User Badge (the Badge PIN is bundled with the User Badge in this particular implementation). FIG. 68(b) shows that due to the missing cryptographic seeds residing on the User Badge, several of the PIDs (PID$_\varepsilon$) cannot be formed correctly; these incorrect PIDs are detected by an SA, and the attack is flagged. FIG. 68(c) shows that based on the cryptographic seed space separation and PID formation in this particular IDACS implementation, the digital forensics suite is able to determine correctly that the User Password and Client device were stolen or cloned.

The BlackBerry application implements the concepts of space/time-separation and also Xbits and Xslices to protect encrypted data. When the BlackBerry application is run, it is given a file to encrypt. The application begins with a few randomly-generated cryptographic seeds that are the basis for all following actions. These cryptographic seeds are used to seed a pseudo-random process which divides the file data into pseudo-random-sized blocks and encrypts each block with a unique pseudo-random AES key. Next, the resulting ciphertext is divided into pseudo-random-sized blocks, and a certain percentage of those blocks are removed as Xslices. Xbits are also pseudo-randomly removed from these cryptographic seeds (using the User Password as a seed for the pseudo-randomness). The post-Xslice ciphertext is then divided into 1 KB blocks, which are stored in alternating data files (FIG. 68(a)) that have random file names and random file extensions (FIG. 68(b)). A "pointer" file is formed which contains the names of the data files as well as the cryptographic seeds (minus the Xbits). All of this information is mixed randomly with garbage data, encrypted with the User Password, and stored in the "pointer" file (FIG. 68(c)). The Xslices and Xbits are sent to IDACS to be stored on a random database. Only the SSAs are able to link the User with the stored Xslices and Xbits; the Databases store no information regarding the type of the data or the owner of this data. The Database stores all data simply as data; there is no indication as to whether the data is Xslices, Xbits, or another type of data. In this way, an Attacker would be forced to compromise both an SSA and the correct Database to recover the Xbits or Xslices and relate them to the correct Client Device and User. To decrypt the file, the User must possess the Client Device and provide the correct User Password to extract and retrieve all the relevant data to complete reassembly and decryption. In this implementation, the space separation of the storage of authentication items is simulated by storing Client and User Badge data in different text files; however, due to the difficulty of integrating a stand-alone User Badge program with the BlackBerry simulator, the User Badge interface and the User Badge PIN are only used in conjunction with the CLI Client, not the BlackBerry application.

Figure 69A:
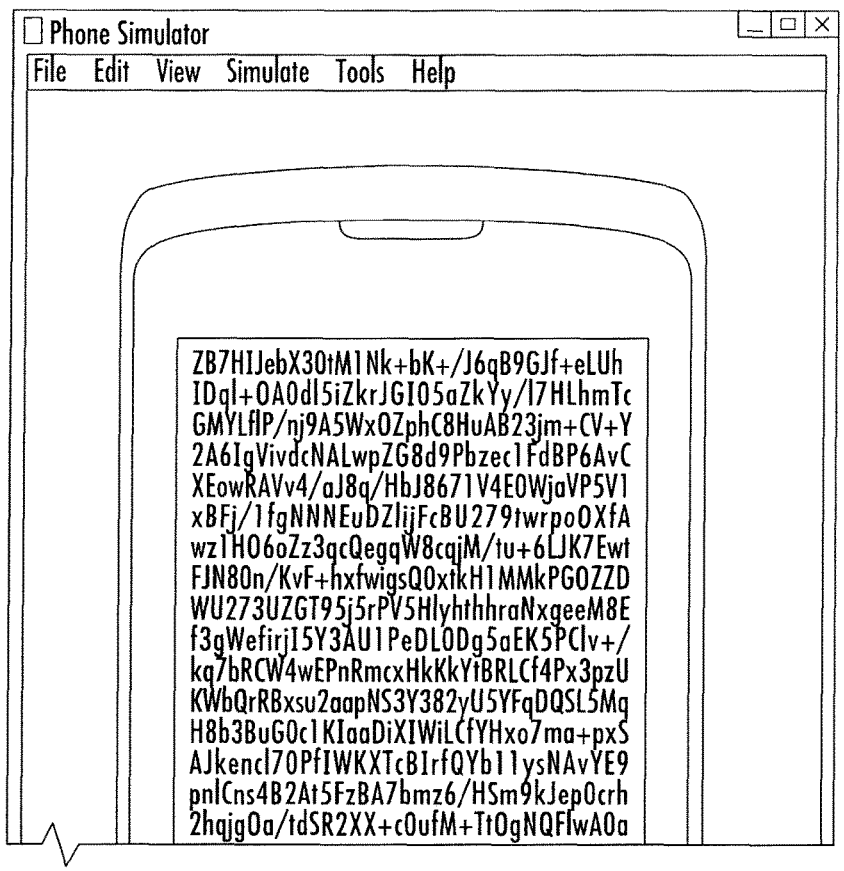
Figure 69B:
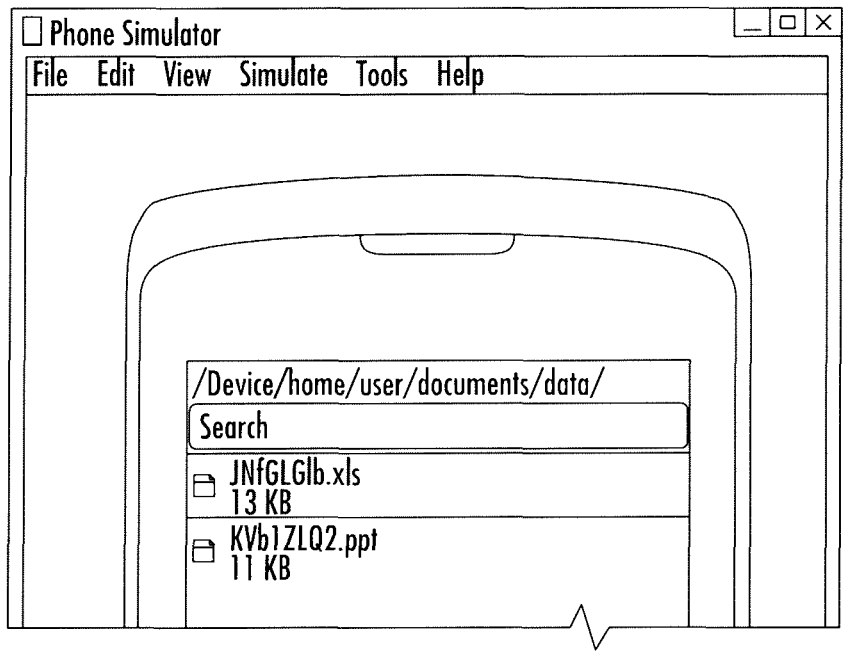
Figure 69C:
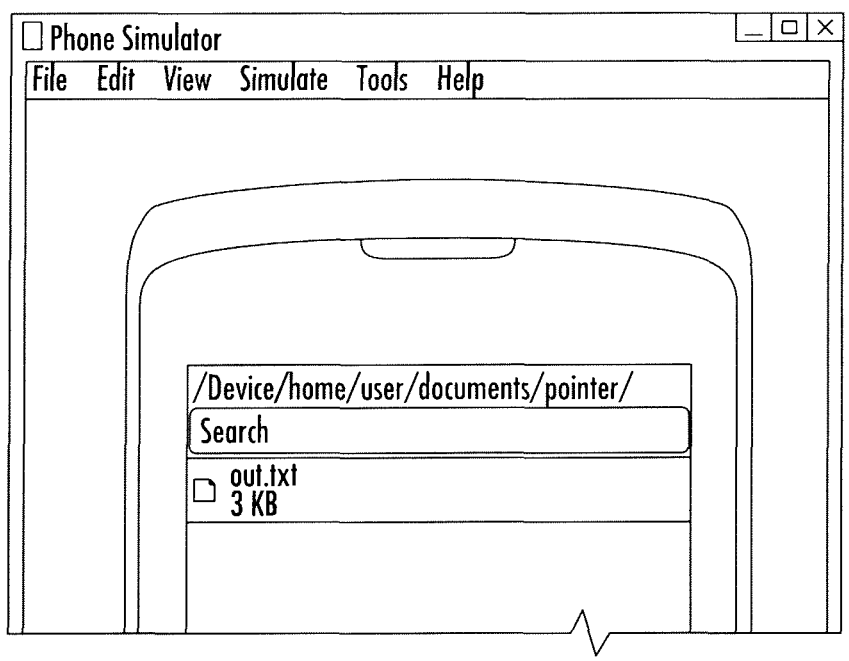
Figure 69E:
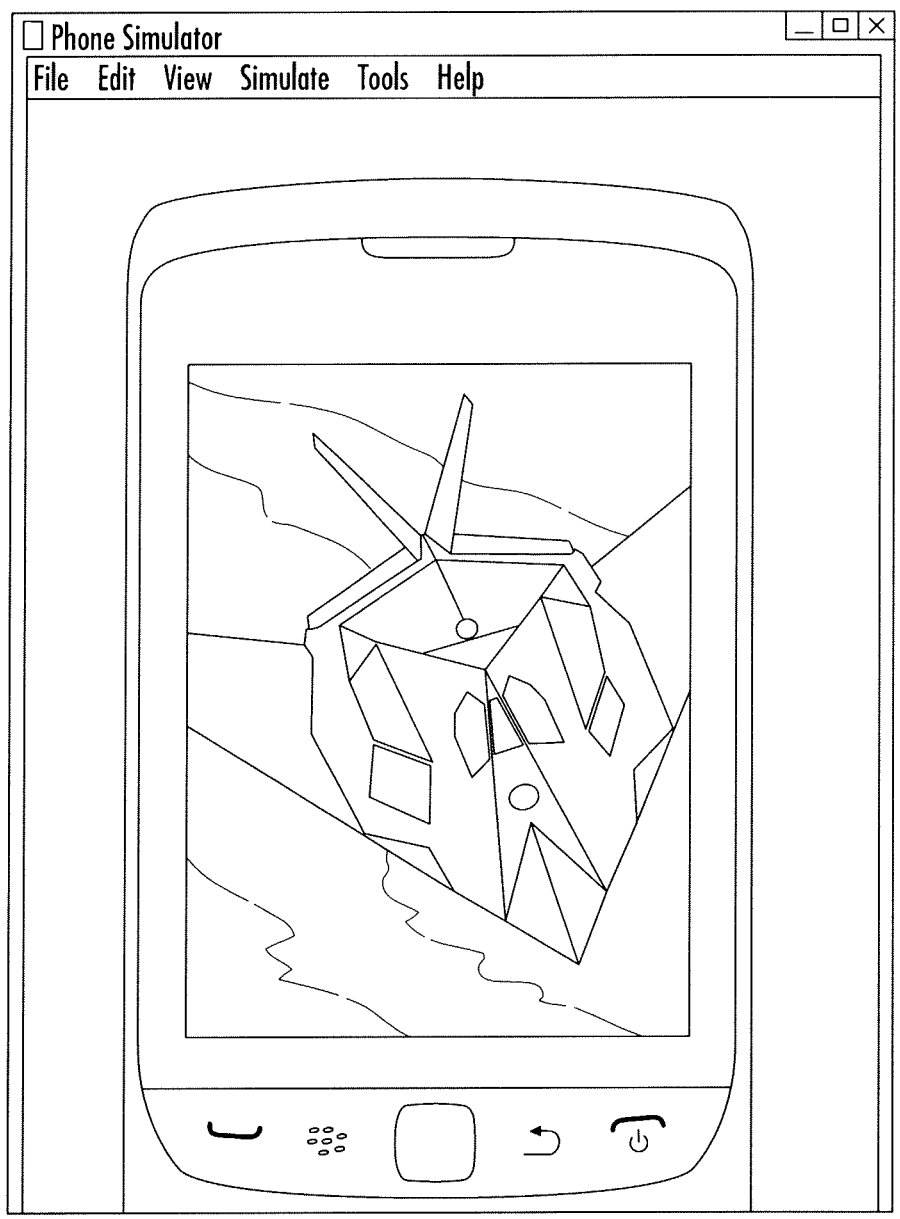
Figure 69F:
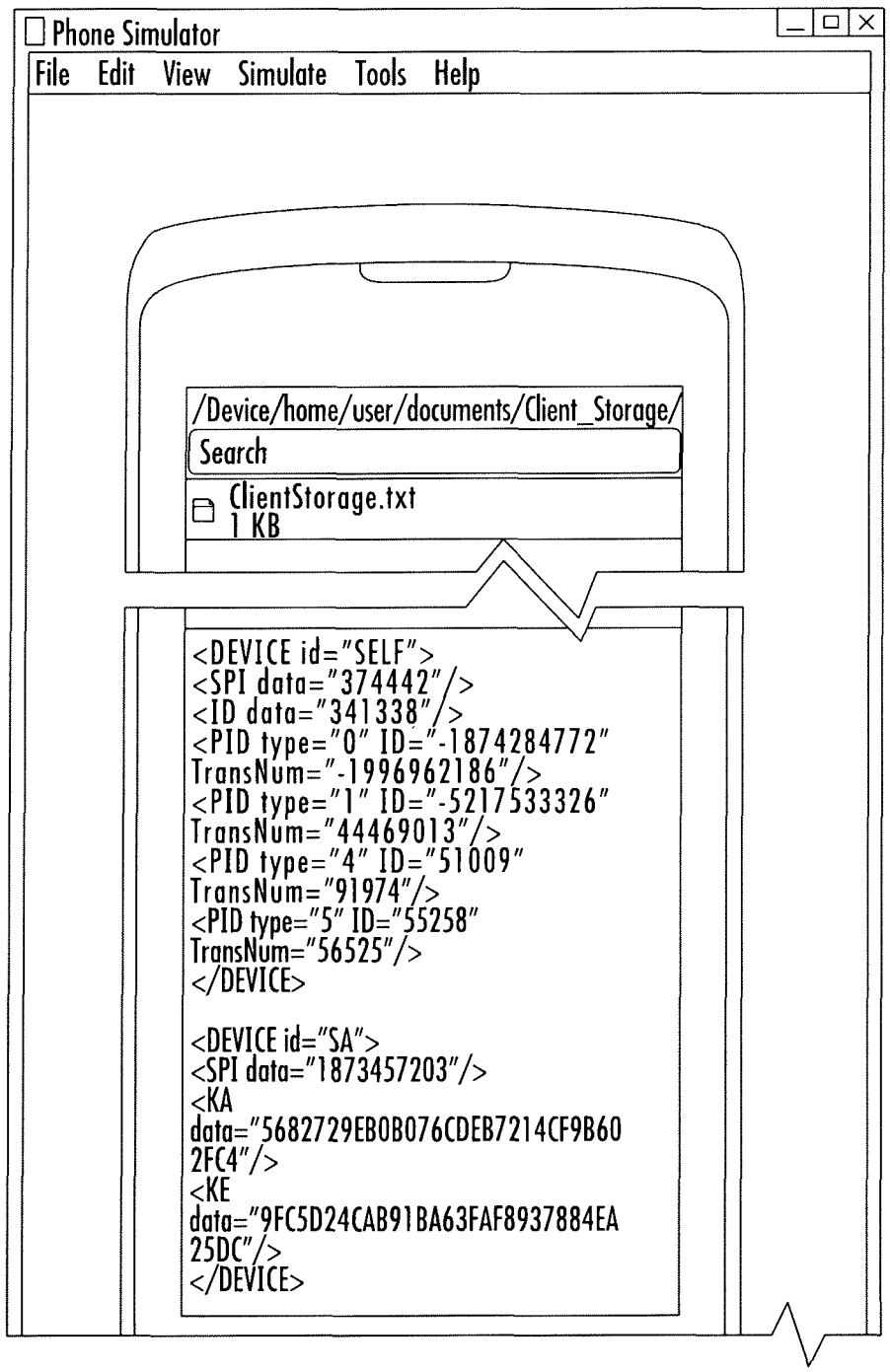

FIGS. 69(a) through (f) show a BlackBerry implementation of IDACS encryption and distributed storage. FIG. 69(a) shows file ciphertext with Xslices removed and (as shown in FIG. 69(b)) divided and stored in multiple data files. FIG. 69(c) shows names of data files encrypted and stored in a pointer file. FIG. 69(d) shows Xslices and Xbits are stored on IDACS Database as pure data; no information saved on Database indicating the identity of this data. FIG. 69(e) shows correctly reassembling all distributed and mutated pieces results in correct file decryption. FIG. 69(f) shows distributed storage between Client and User Badge simulated using separate text files.

As explained above, disclosed embodiments may provide an illustrative integrated security system IDACS that utilizes the space-time separated and jointly evolving relationship to provide multiple layers of constantly-changing barriers that are mathematically infeasible for attackers to predict. The implementation of these ideas can successfully detect and defeat different types of network attacks, including zero-day attacks. Table 12 details several common network attacks that systems, components, and methodologies in accordance with the present disclosure can address. Mathematical analysis demonstrates that it is generally infeasible to recreate the IDACS authentication protocol, and simulations also reinforce the strength of these space-time relationships. Table 12 lists the types of network attacks defeated by IDACS

TABLE 12

| Attack defeated | Reason |
|---|---|
| Zero-day attack | Network access control is mathematically defined by a space-time separated and jointly evolving relationship; zero-day attacks which can compromise hosts cannot forge such a relationship when accessing protected data; furthermore, the zero-day attack method can be captured and analyzed |
| Denial-of Service (DoS) attack | Quick stateless OTP checking allows attack packets to be quickly discarded |
| Replay attack | Time-evolution means OTPs and PIDs are true one-use items tied to packet sequence number |
| Client-side device loss | Cryptographic seeds for calculating authentication parameters are space-separated; loss of one or more devices does not allow attacker to reconstruct the space-time separated and evolving relationship |
| SA and/or SSA hijacking | Mutual support in authentication chain detects a hijacked SA or SSA |
| SA and/or SSA memory leakage | Space-time separation and evolution of cryptographic seeds means memory leakage at one or more SAs does not leak all OTP/PID seeds |
| System downtime while waiting for network healing | Space-time evolving determination of network-side authentication chain path allows real-time network healing with no network downtime by using available system migration |

In addition to detecting and preventing attacks, systems, components, and methodologies in accordance with the present disclosure provide real-time forensics capabilities, allowing traitorous network actors to be identified quickly and accurately. Simulations demonstrate that forensics are efficient and effective. Also, systems, components, and methodologies in accordance with the present disclosure use the space-time separated and jointly-evolving relationship to protect at-rest mutated encrypted data. Space-time-changing Xbits and Xslices, providing mutation to ciphertext, stored across multiple locations and data segmentation provide greater security for encrypted data. Once again, mathematical analysis demonstrates the theoretical strength of this system, and simulation provides a more concrete expression of this security.

Thus, systems, components, and methodologies in accordance with the present disclosure implements the space-time separated and jointly-evolving relationship across multiple aspects of the system to provide a complete end-to-end network and data protection system that has strong mathematical properties.

As explained above, the problem of finding the highest sum W(e) path is defined as the Maximum Weight Directed Path of Specified Length (MWDPSL) problem; this problem will now be proven NP-complete. The process of proving a given decision problem C to be NP-complete has two operations: 1) Show that C is in NP; 2) Show that every problem in NP is reducible to C in polynomial time.

The first operation can be shown by demonstrating that a candidate solution to C can be checked for correctness in polynomial (or better) time. The second operation can be shown by demonstrating that any one known NP-complete problem B is reducible to C. If one NP-complete problem B can be reduced to C, then all other NP-complete problems can be reduced to C. A problem B is reducible to problem C if there is a polynomial-time, many-one reduction from B to C; that is, there is a reduction that can transform any instance of B into an instance of C. Any algorithm that can be used to solve all instances of problem C can be used to solve all instances of problem B.

Figure 70:
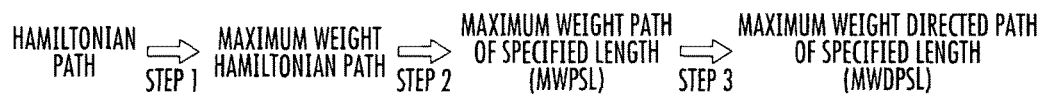
FIG. 70 shows an NP-complete reduction path to visualize a proof showing properties of exemplary IDACS networks in accordance with the disclosure.

The process of proving that the MWPSL and MWDPSL problems (C) are NP-complete begins with a proven NP-complete problem, the Hamiltonian Path problem (B). FIG. 70 shows an NP-complete reduction path to visualize a proof showing properties of exemplary IDACS networks. Particularly, FIG. 70 shows the reduction path between the Hamiltonian Path problem (B) and the MWPSL and MWDPSL (C) problems is shown in.

As explained herein, each of the reductions is composed of a series of indicated operations. Subsequently, the MWPSL and MWDPSL (C) problems are proven to be NP-complete.

Starting Point: The Hamiltonian Path is NP-Complete

Hamiltonian Path: Given an undirected graph G=($\mathbf{V}$, E) where $\mathbf{V}$ is a set of vertices $\{v_1, v_2, \ldots\}$ and every e∈E is an unordered set of vertices $\{v_1, v_2\}$ called edges. Does G contain a Hamiltonian path, which is a sequence $<v_1, v_2, \ldots, v_\eta>$ of distinct vertices from $\mathbf{V}$ such that $\{v_i, v_{i+1}\}$ ∈E for $1 \leq i < \eta$ and every member of $\mathbf{V}$ appears once and only once in the sequence?

The Hamiltonian Path problem has been proven NP-complete.

Operation 1: Show that the Maximum Weight Hamiltonian Path problem is NP-complete.

Maximum Weight Hamiltonian Path: Given an undirected graph G=($\mathbf{V}$,E) where every e ∈ E is an unordered set of vertices $\{v_1, v_2\}$ called edges and has a weight W(e) ∈ $Q^+$, and there is a number R ∈ $Q^+$. Is there a Hamiltonian path $<v_1, v_2, \ldots, v_i, \ldots, v_\eta>$ in G where $\eta = |\mathbf{V}|$ such that $\Sigma_{i=1}^{\eta-1} W(v_i, v_{i+1}) \geq R$, where $\{v_i, v_{i+1}\}$ ∈ E?

Operation 1.1: Show that the Maximum Weight Hamiltonian Path is in NP.

A candidate solution to this problem can be checked by tracing the path, verifying that each vertex is touched once and only once, and summing the weights of the edges in the path and checking the final sum. The candidate solution is checked in linear time.

Operation 1.2: Show that the Hamiltonian Path problem is reducible to the Maximum Weight Hamiltonian Path problem in polynomial time.

The Hamiltonian Path problem is a special case of the Maximum Weight Hamiltonian Path problem, so the first can be reduced to the second. Create an instance of the Maximum Weight Hamiltonian Path problem. Set all W(e)=1 for all e∈E and set R=($|\mathbf{V}|-1$). This is now an instance of the Hamiltonian Path problem, and the reduction is accomplished in linear time.

Result: The Maximum Weight Hamiltonian Path problem is NP-complete.

Operation 2: Show that the Maximum Weight Path of Specified Length (MWPSL) problem is NP-complete.

Maximum Weight Path of Specified Length (MWPSL): Given an undirected graph G=($\mathbf{V}$, E) where every e∈E is an unordered set of vertices $\{v_1, v_2\}$ called edges and has a weight W(e) ∈ $Q^+$, there is a number R ∈ $Q^+$ and an integer N≤|$\mathbf{V}$|. Is there a path P=<$v_1, v_2, \ldots, v_i, \ldots, v_N$> in G such that any v∈$\mathbf{V}$ appears at most once in P and $\Sigma_{i=1}^{N-1} W(v_i, v_{i+1}) \geq R$, where $\{v_i, v_{i+1}\} \in E$?

Operation 2.1: Show that the MWPSL problem is in NP.

A candidate solution that connects some or all of the vertices can be checked by tracing the path, verifying each vertex in the path is touched at most once, verifying that there are N vertices in the path, and summing the path edge weights and comparing the sum to R. This candidate solution is checked in linear time.

Operation 2.2: Show that the Maximum Weight Hamiltonian Path problem is reducible to the MWPSL problem.

The Maximum Weight Hamiltonian Path problem is a special case of the MWPSL problem, so the first can be reduced to the second. Create an instance of the MWPSL problem and set N=|$\mathbf{V}$|. This is now an instance of the Maximum Weight Hamiltonian Path problem; this reduction is accomplished in linear time.

Result: The Maximum Weight Path of Specified Length (MWPSL) problem is NP-complete.

Operation 3: Show that the Maximum Weight Directed Path of Specified Length (MWDPSL) problem is NP-complete.

Maximum Weight Directed Path of Specified Length (MWDPSL): Given a directed graph G=($\mathbf{V}$, E) where every e ∈ E is an ordered set of vertices $\{v_1, v_2\}$ called arcs and has a weight W(e) ∈ $Q^+$, there is a number R∈$Q^+$ and an integer N≤|$\mathbf{V}$|. Is there a path P=<$v_1, v_2, \ldots, v_N$> in G such that any v ∈ $\mathbf{V}$ appears at most once in P and $\Sigma_{i=1}^{N-1} W(v_i, v_{i+1}) \geq R$, where $\{v_i, v_{i+1}\} \in E$?

Operation 3.1: Show that the MWDPSL problem is in NP.

A candidate solution that connects some or all of the vertices can be checked by tracing the path, verifying each vertex in the path is touched at most once, verifying that there are N vertices in the path, and summing the path edge weights and comparing the sum to R. This candidate solution is checked in linear time.

Operation 3.2: Show that the MWPSL problem is reducible to the MWDPSL problem.

The MWPSL problem is a special case of the MWDPSL problem, so the first can be reduced to the second. Create an instance of the MWDPSL problem corresponding to an instance of the MWPSL problem where every e ∈ E with a given W(e) in the MWPSL problem is replaced by a pair of opposite-direction directed e ∈ E in the MWDPSL problem, both with the same W(e) as in the MWPSL problem. This now equates to an instance of the MWPSL problem; this reduction is accomplished in linear time.

Result: The Maximum Weight Directed Path of Specified Length (MWDPSL) problem is NP-complete.

The MWPSL and MWDPSL problems represent a reassembly-due-to-space-separation problem at a given instant in time. Thus, the space separation of IDACS provides the NP-completeness to the systems. However, due to the joint time-evolution of IDACS, the problem evolves into a completely new MWPSL or MWDPSL problem each time the system states change (which can occur every few seconds). Therefore, the time-evolution greatly increases the complexity of the problem.

In accordance with disclosed embodiments, systems, components, and methodologies also provide a security scheme that incorporates the cloud and mobile devices possessed by a user to give the user the required data confidentiality, integrity and user authentication at substantial security strength, e.g., more than 768-bit security strength, and an NP-complete problem without sacrificing performance. This is possible due to the randomness of wrapping, splitting, encrypting files, and storing the different pieces in different locations on the PC, mobile devices, and in the cloud.

More particularly, systems, components, and methodologies in accordance with the present disclosure provide security and authentication of encrypting files with more than a password and a simple location. They overcome problems such as password cracking, cloud storage, zero-day malware, Trojans, phishing, and information leakage that are drawbacks to alternative implementations. Generally, one way the disclosed systems, components, and methodologies solves these problems is by not only using "what a person knows", like a password, but also "what a person has". The present disclosure employs cloud storage and mobile devices together to provide the benefits and improvements described above.

The systems, components, and methodologies in accordance with the present disclosure provide authentication by authenticating the user with multiple devices and passwords. Also, by splitting and storing the encrypted data on multiple devices such as a server, an Android mobile device, a PC, and cloud servers, the user will have a higher degree of integrity and confidentiality because the attacker will have to have access to all encrypted pieces, devices, and passwords.

Factors behind the systems and methodologies described herein include: what the user knows, what the user owns, where the encrypted pieces are, and encryption, such as by way of example AES-GCM encryption.

Figure 71:
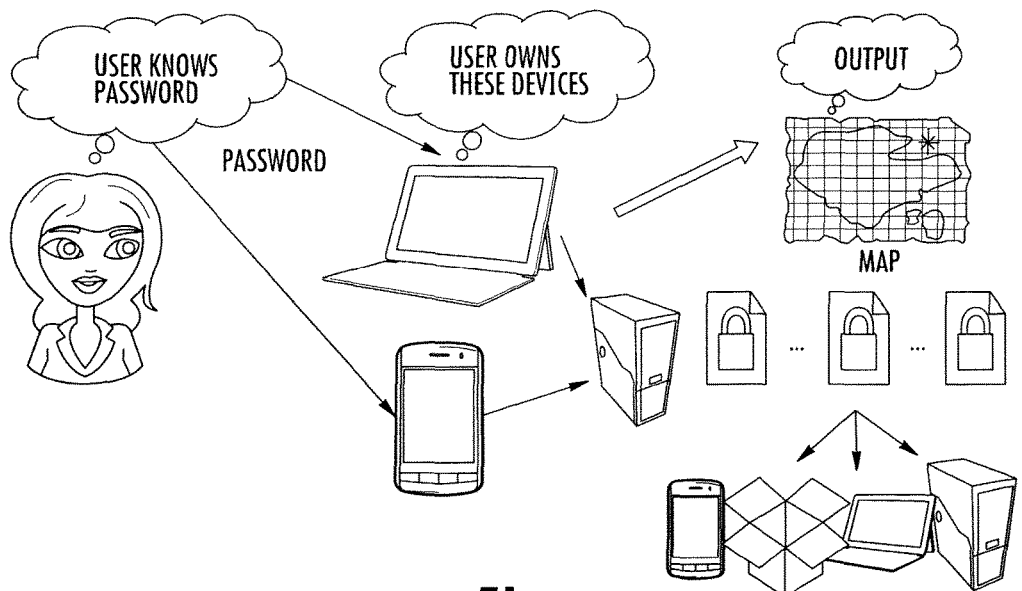
FIG. 71 shows an overview of factors incorporated into a network security design, including what the user knows, what the user owns, where the encrypted pieces are, and encryption in accordance with the disclosure.

FIG. 71 shows an overview of factors incorporated into a network security design, including what the user knows, what the user owns, where the encrypted pieces are, and encryption. What the user knows and owns gives authentication while the random locations of the splits and AES-GCM gives integrity and confidentiality. In this design, the user will know a password and own an Android mobile device, a PC, and a server.

With the user's password and devices, a key may be constructed as input to the AES-GCM encryption and the encrypted output is split up and randomly distributed among the devices including the cloud service DropBox. The location of these splits is stored in a list or map that will also be protected.

Figure 72:
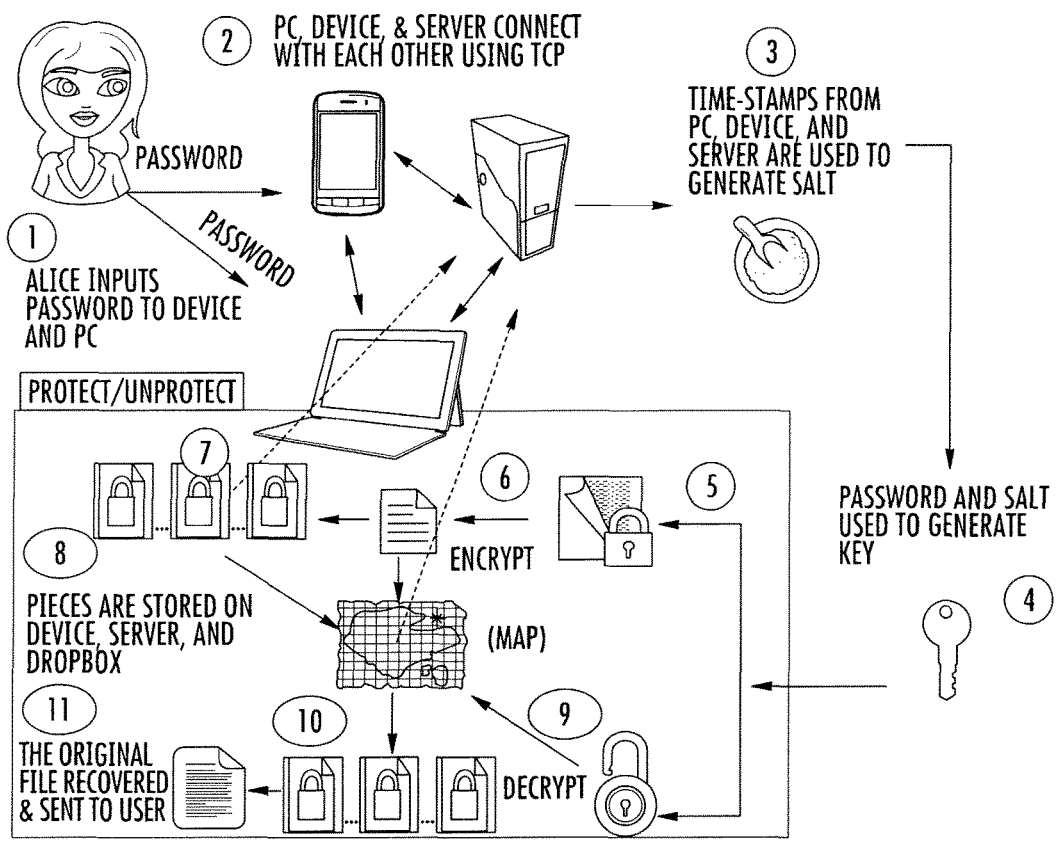
FIG. 72 shows a visual representation of an exemplary methodology by which a user can protect a folder through splitting in accordance with the disclosure.

FIG. 72 shows a visual representation of an exemplary methodology by which a user can protect a folder through splitting. According to this illustrative embodiment, to protect a folder, the user first inputs a password to the PC program and another password (which can be the same as the former) into the Android mobile device. TCP is used as the communication protocol between the PC, device, and server all connected via a LAN. A salt is then randomly generated and is used with the password to create a key. The folder that the user wants to protect is zipped and encrypted with AES-GCM 256-bit and broken into pieces, e.g., 4-9 random pieces called "splits". The splits are then randomly stored on the devices and DropBox while their locations are stored on the map. The map is then protected itself so that an attacker cannot find the locations of the encrypted splits. To unprotect, the passwords may be entered and the map, salt, and key may be recreated so that the splits can be merged, decrypted, and recovered.

According to one exemplary implementation, various tools may be used including: an Android 2.2-4.2 device, the Android SDK, a PC, the DropBox API, JAVA, Eclipse JUNO, and the RSA JAVA Share package for GCM. Software using JAVA was created for the PC, mobile device, and server. The software design may be broken into three sections, the salt/key generation, protection (encryption, splitting, and mapping), and unprotection (gathering, merging, and decryption).

Figure 73:
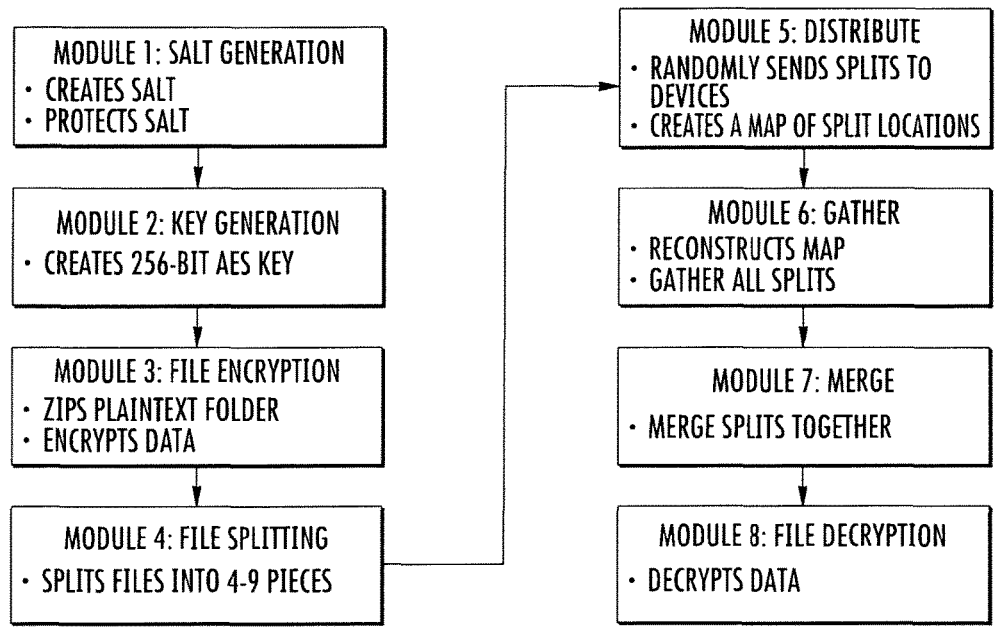
FIG. 73 shows the different modules that can be used to design this security scheme in accordance with the disclosure.

FIG. 73 shows the different modules (which can be implemented in hardware or software) that can be used to design this security scheme. Table 13 shows exemplary platforms that can use the disclosed software.

TABLE 13

| PC Program (JAVA) | Mobile Device | Server (JAVA) | Cloud |
|---|---|---|---|
| Windows (Used) | Any Device with | Windows (Used) | DropBox API |
| Linux | Android 2.2-4.2 | Linux | Google Drive |
| Mac | iOS | Mac | MS SkyDrive |
|  | BlackBerry |  | iCloud |
|  | Windows Phone |  |  |

If a user wants to protect a folder, a 256-bit key may be created for the AES-GCM encryption. This key may be made from a randomly generated 256-bit salt seeded with the time stamp of the PC. The salt is concatenated with the PC password and hashed using SHA-256 n-number of times.

Figure 74:
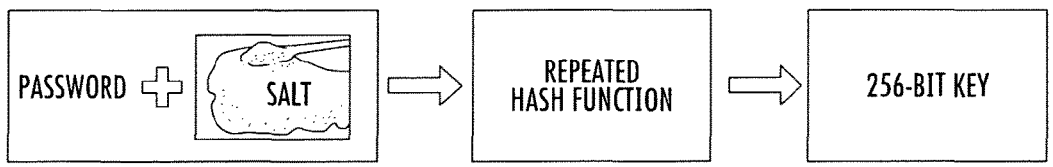
FIG. 74 visually depicts the process of generating a key in accordance with the disclosure.
Figure 76:
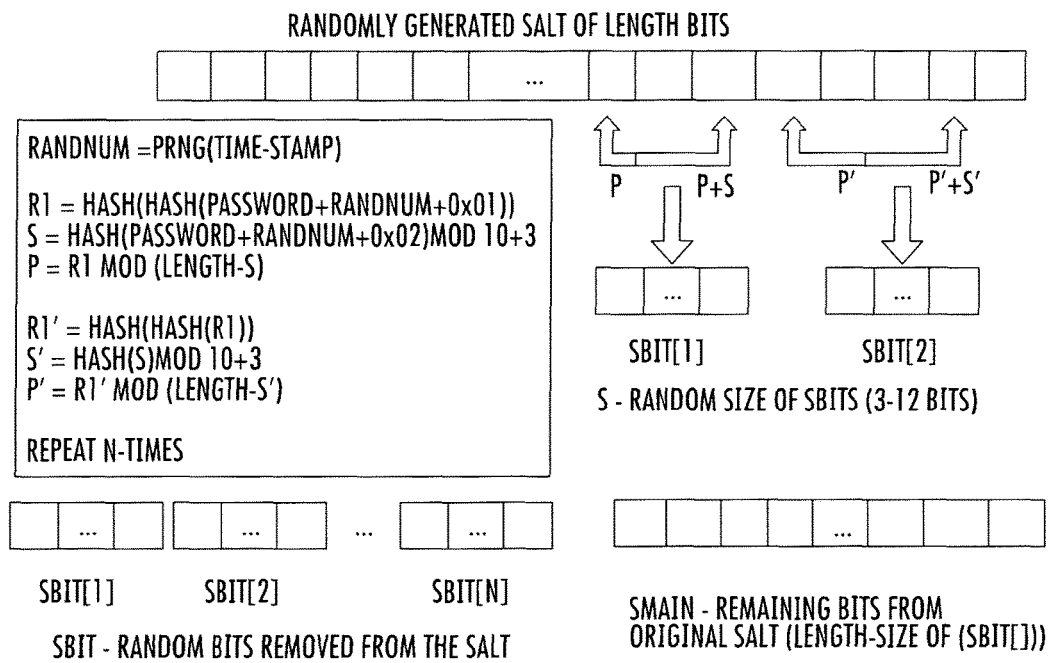
FIG. 76 depicts the process of protecting a salt in a visual form in accordance with the disclosure.

FIG. 74 visually depicts the process of generating a key. Since the salt is part of key creation, it may be protected from advisories. This is done by splitting the salt into "sbits" and the "smain." The sbits may be random bits removed from the salt of 3-12 bits long. The random positions and lengths of the sbits may be derived from an initial random number seed ed with the time-stamp. The remaining part of the salt left after n-rounds may be the smain. The outputs of the process are the sbits, smain, and an initial random number (rand#1). FIG. 75 shows the function of a SaltGen function. FIG. 76 depicts the process of protecting a salt.

Figure 77:
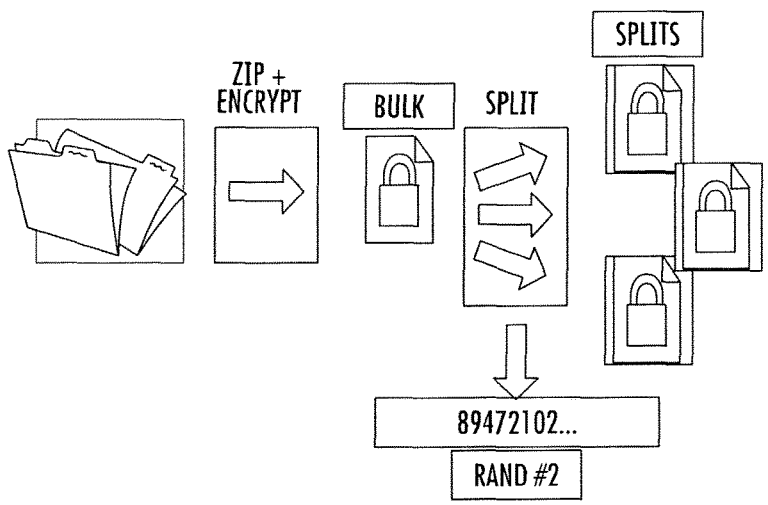
FIG. 77 shows an overview of the protection process in accordance with the disclosure.

FIG. 77 shows an overview of the protection process. After the 256-bit AES-GCM key is created, the selected folder is zipped and encrypted; the encrypted folder is called the "bulk". The bulk is then randomly split into pieces, e.g., 4-9 pieces, called "splits". Each split is again encrypted with keys derived from the password. The outputs after encryption are the splits and a random number that was created to split the bulk. The splits are then randomly distributed among the PC, server, mobile device, and DropBox. To protect the salt, the smain, sbits, and the random number (rand#1) salt are concatenated, encrypted, split, and distributed in a similar fashion as the folder.

Figure 78:
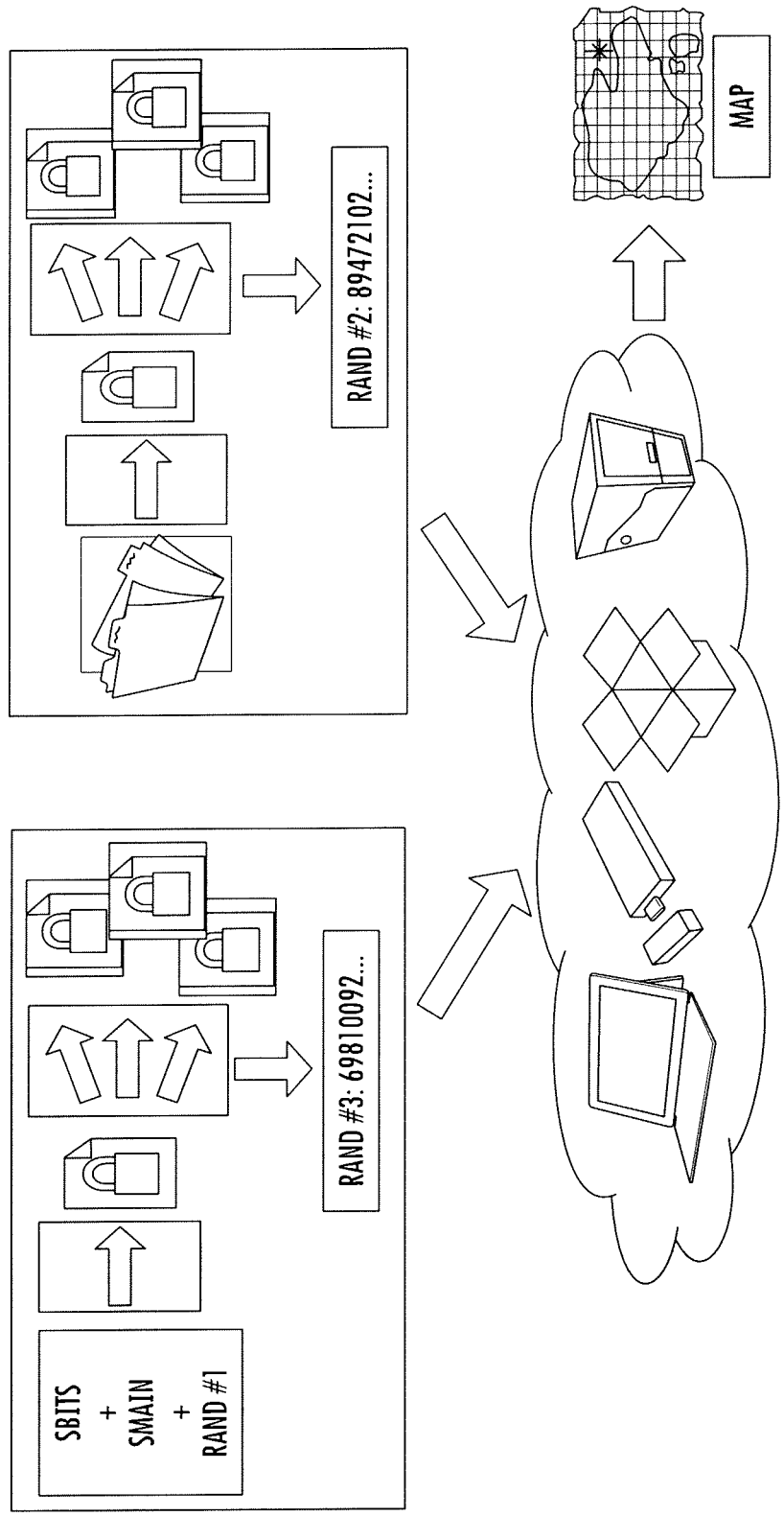
FIG. 78 depicts a map that is created with the location of each split so recovery is possible in accordance with the disclosure.

FIG. 78 depicts a map that is created with the location of each split so recovery is possible.

Details regarding encryption are now provided. AES with GCM (Galois/Counter Mode) is an advantageous option because of its efficiency, performance, and built-in authentication. Its high throughput makes it favorable for high-speed data transfer. GCM can take full advantage of instruction pipelining in contrast to alternatives, such as Counter Block Chaining (CBC) which incurs pipeline stalls. GCM improves on counter mode (CTR) by using finite field to add authentication to the encryption process. GCM belongs to a class of cipher modes called Authenticated Encrypted with Associated Data (AEAD). The RSA BSAFE Share library is used since the JAVA cipher class has not implemented GCM yet. However, it should be understood that the scope of the present disclosure is not limited solely to AES with GCM.

After encryption the bulk is split randomly into pieces, e.g., 4-9 pieces. This may be done with a randomly generated number of 512-bits created using the JAVA SecureRandom class. Each split is then encrypted with keys generated with the password and salt. The smain, sbits, and random number from the salt generation are concatenated, encrypted, and split as well.

Figure 79:
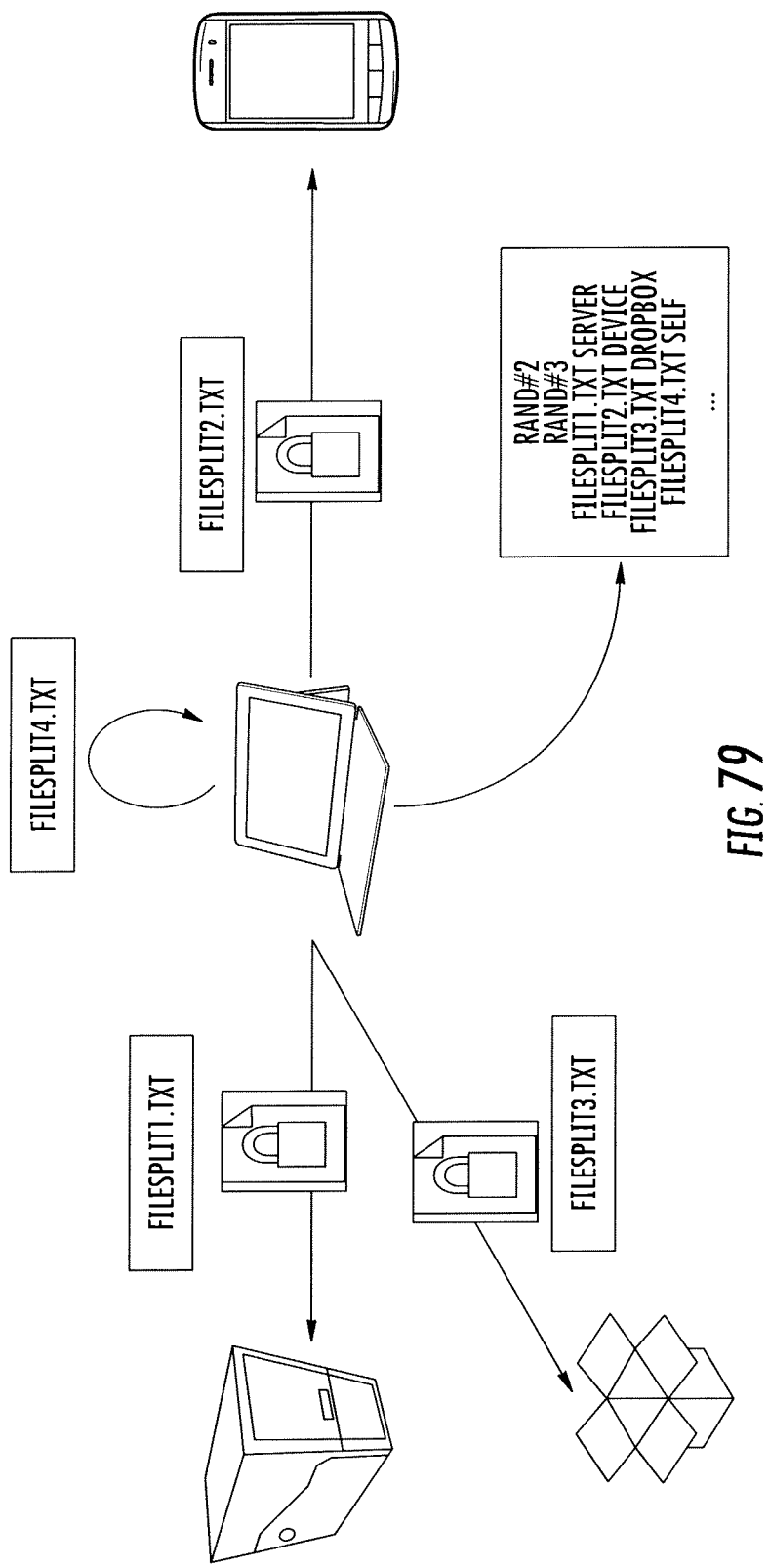
FIGS. 79-80 show a process by which the encrypted splits, once created, are randomly sent to different devices, and the location of each device is stored in a map in accordance with the disclosure.
Figures 80, 81:
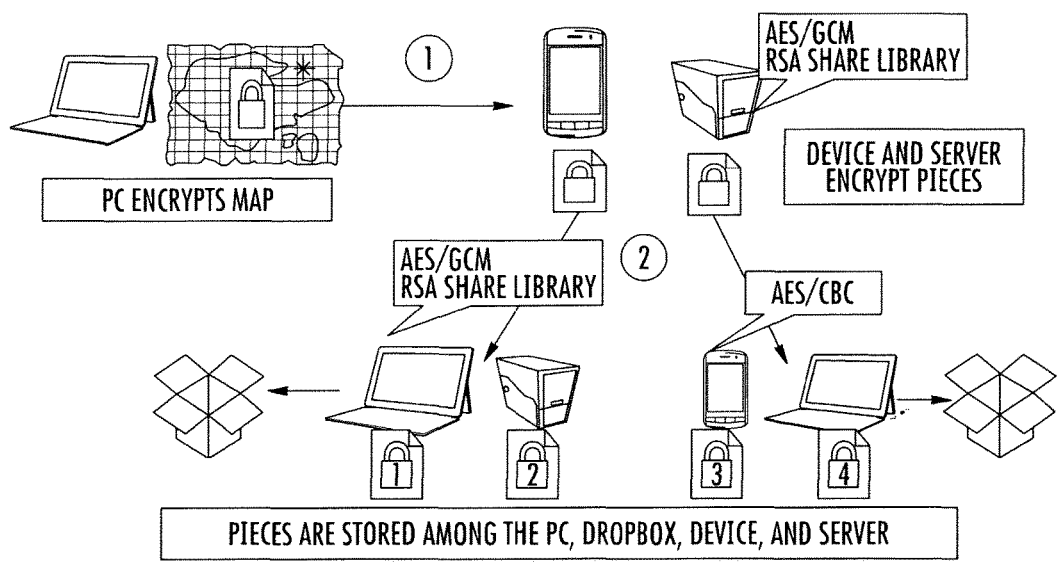
FIG. 81 shows a process by which the map is protected by systemically storing and encrypting parts of the map among the devices in accordance with the disclosure.

FIGS. 79-80 show a process by which the encrypted splits, once created, are randomly sent to different devices, and the location of each device is stored in a map.

FIG. 81 shows a process by which the map is protected by systemically storing and encrypting parts of the map among the devices. First, the PC encrypts the map and sends one-half to the mobile device, and the other half to the server. Secondly, the mobile device and server encrypts and sends their halves to the other two devices. Lastly, the all of the pieces are encrypted by their respective devices and stored. The PC stores its encrypted pieces on DropBox. The pieces of the index file are distributed in such a way that if 2 devices are compromised, the map will still be protected.

Figure 82:
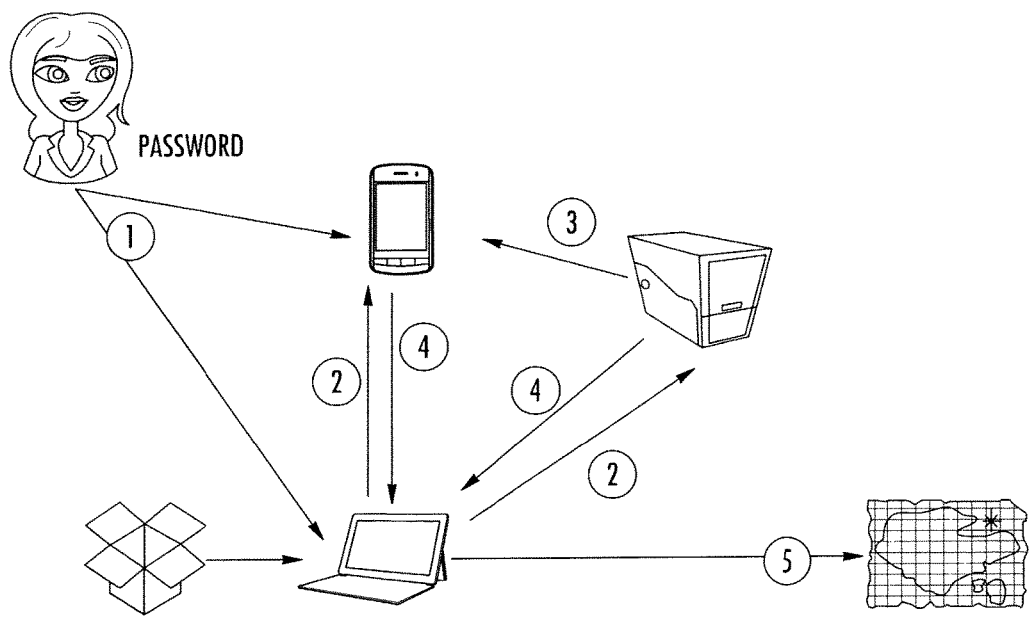
FIG. 82 shows how the map is reconstructed in accordance with the disclosure.

FIG. 82 shows how the map is reconstructed. When recovering data, the user inputs the passwords, and the map is reconstructed from the encrypted pieces among the devices. The map reconstruction is simply the reverse of the map protection process; after the user inputs the passwords in the mobile device and PC, then each device will decrypt and send its part to the other devices. From the map, the PC is able to request and obtain the splits from the different locations. The salt is first recreated from the smain, sbits, and the initial random number. Once the salt is reconstructed, the AES-GCM key is remade with the password and salt.

Figure 83:
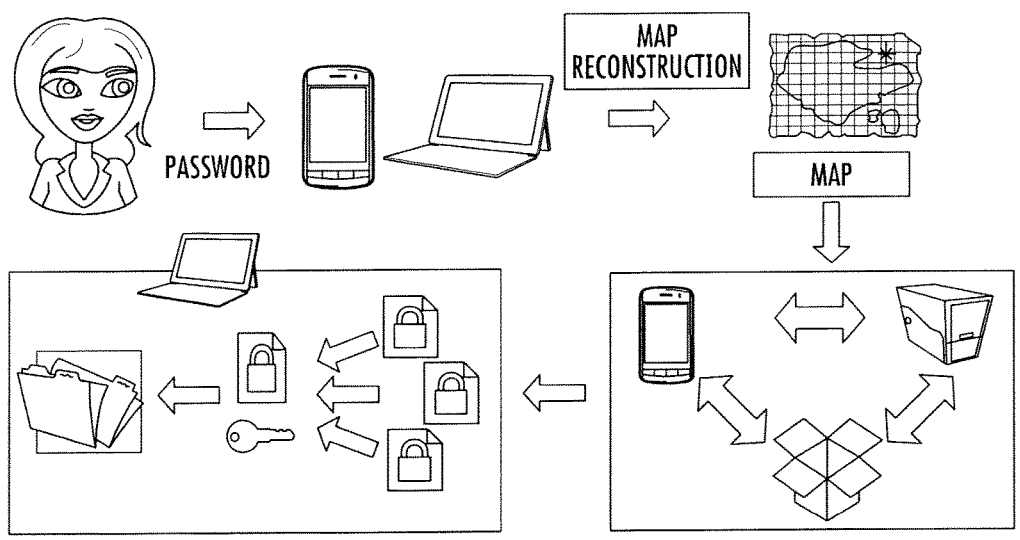
FIG. 83 shows how the key is used to decrypt the information after the splits are rejoined in accordance with the disclosure.

FIG. 83 shows how the key is used to decrypt the information after the splits are rejoined.

Figure 84:
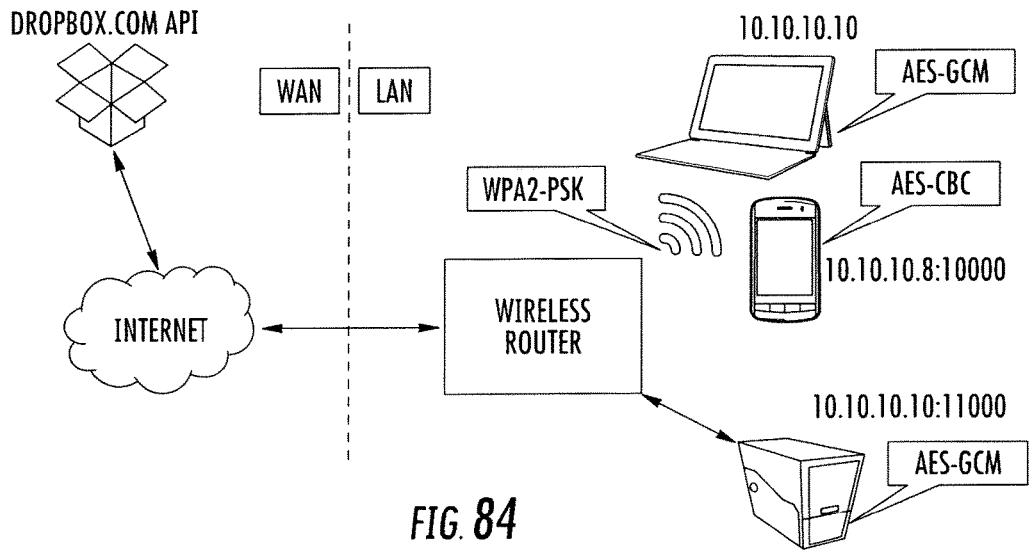
FIG. 84 shows a network diagram of the devices in accordance with an exemplary network setup used to test the performance of exemplary implementations in accordance with the present disclosure in accordance with the disclosure.

FIG. 84 shows a network diagram of the devices in accordance with an exemplary network setup used to test the performance of exemplary implementations in accordance with the present disclosure. To test the performance of the protection and unprotection process, three different sizes of data was protected and unprotected. The runs were done using an internet link of 30 Mbps downlink and 4 Mbps uplink with the wireless LAN was at 65 Mbps.

The tests were run with total file sizes of 36 KB, 1.08 MB, and 10.8 MB that contain various amounts of files and folders (Table 14 and 15). The average total running time and the average AES-GCM/splitting time were calculated. However, as the files became bigger, the total average time of the protection became nearly 28 seconds. This was due to the uploading of the larger splits to DropBox which is limited by the upload speed of the internet connection. To combat this problem, a second series of tests was done to see the effect of limiting the DropBox upload size to just 10 KB. This decreased the running time by nearly 300%. Nevertheless, the AES-GCM encryption and splitting of the group of files was very fast, even for larger file sizes.

TABLE 14

Protection Times – This was not done with 36 KB
because 36 KB/4 = 9 KB max split size

| Total Size of Files | Number of Files | Folders | Avg. Running Time (sec) (Protecting) | Avg. Running Time with 10 KB max split size to DropBox | Avg. GCM and Splitting Time (sec) |
|---|---|---|---|---|---|
| 36 KB | 9 | 6 | 4.765 s | — | .01343 s |
| 1.08 MB | 15 | 3 | 8.539 s | 5.460 s | .08548 s |
| 10.8 MB | 150 | 40 | 27.975 s (file transmission time in majority) | 8.728 s | .79765 s |

TABLE 15

Unprotection Times

| Total Size of Files | Number of Files | Folders | Avg. Running Time (sec) (Unprotecting) | Avg. Running Time with 10 KB max split size to DropBox | Avg. GCM and Merging Time (sec) |
|---|---|---|---|---|---|
| 36 KB | 9 | 6 | 4.1396 s | — | .00923 s |
| 1.08 MB | 15 | 3 | 5.5964 s | 4.117 s | .09017 s |
| 10.8 MB | 150 | 40 | 11.813 s | 8.533 s | .70084 |

With the data from the original timed runs, it was estimated that the speed of the encryption:

$$\approx \text{FileSize} * 3.80764 \times 10^{-8} \text{ sec}/1 \text{Byte}.$$

While the speed of the decryption is:

$$\approx (\text{FileSize} * 3.40814 \times 10^{-8} \text{ sec})/1 \text{Byte}.$$

The speeds of splitting and merging were also calculated at $\approx (\text{FileSize} * 3.6064 \times 10^{-8} \text{ sec})/1$ Byte and $\approx (\text{FileSize} * 3.47196 \times 10^{-8} \text{ sec})/1$ Byte, respectively.

With the speed and performance of AES-GCM, encrypting and decrypting large files is not a problem on orders of $10^{-8}$ seconds/byte. The same goes for splitting and merging files.

An objective of the systems, components, and methodologies in accordance with the present disclosure is to provide high security to the user's information without sacrificing performance. By having not only a password and being able to distribute the encrypted data among various devices and locations, retrieving protected information not only depends on "what the user knows", but also "what the user has".

When it comes to protecting the passwords, the password to the mobile device may be hashed and saved on the mobile device while the password to the PC is not saved at all. One reason for not saving the password on the PC is because if the same password is not entered when unprotecting as when protecting, the unprotecting process will fail due to the GCM built-in authentication with the improper key that would be created. Since the mobile device uses AES-CBC, built-in authentication is not available and the password must be saved. Since a password is used for both the PC and mobile device, two different passwords can be used. The password +salt combination makes dictionary attacks unreliable against the PC because the salt is protected by encryption and splitting.

A strength of the disclosed systems is the spreading of encrypted splits, smain, and sbits among various devices and locations. This addresses the situation that if some splits are found either by eavesdropping or device compromise, no plaintext data can be recovered. All of the splits from all locations are used to recover data.

Tables 16 and 17 show the different strengths of each part of the security scheme. The total cryptographic key strength is 768-bits because without the 768-bit protected map, then the splits cannot be located.

Figure 85:
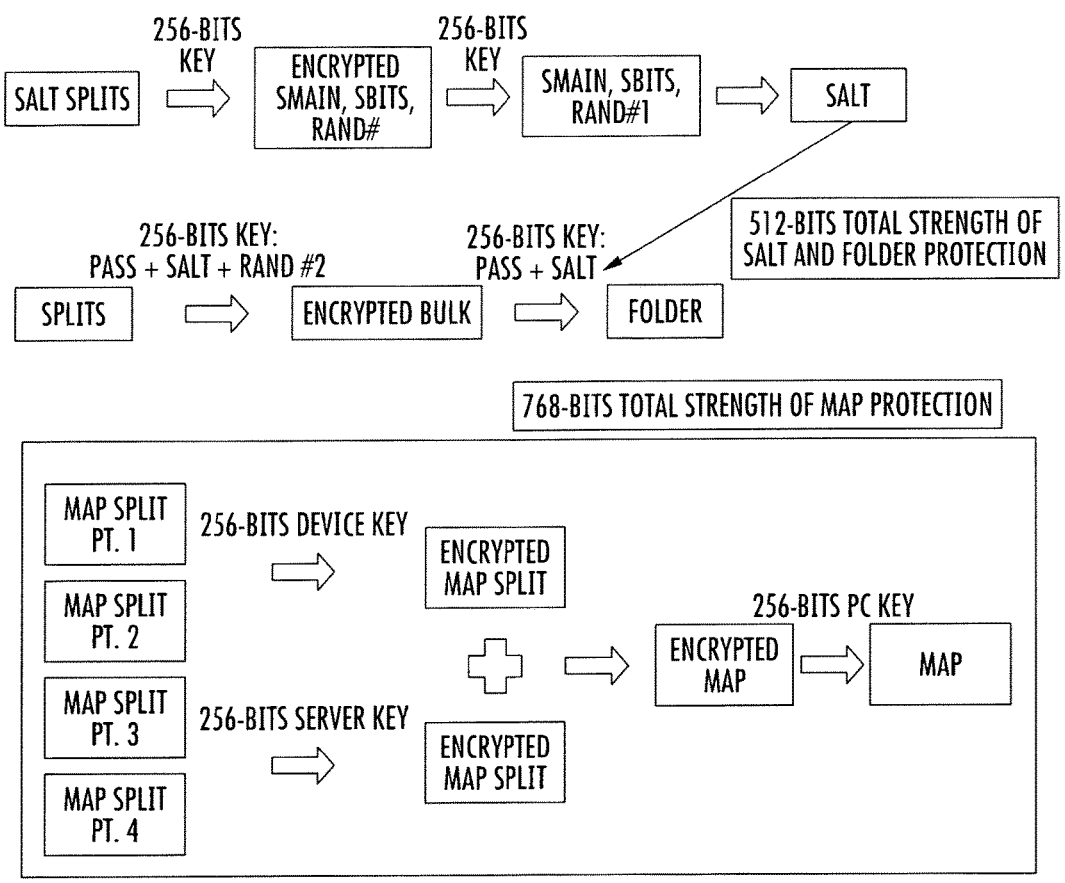
FIG. 85 shows how the salt, folder, and map protection strengths are found in accordance with the disclosure.

FIG. 85 shows how the salt, folder, and map protection strengths are found. There are two 256-bit keys used for the salt and map protection and three 256-bit keys used for the map protection (one from each device).

TABLE 16

Vulnerabilities vs. Countermeasures

| Possible Vulnerabilities | Countermeasures |
|---|---|
| Password Brute Force | Need to brute force two passwords (1 for the PC and other for mobile device) and strong passwords and the salt concatenation would make this task unfeasible |
| AES-GCM Key Brute Force | 256-bit key gives $2^{256}$ possibilities which is unreachable with today's and near future computers |
| Some Splits Found | Need ALL splits to unprotect and no useful data can be recovered. NP-complete problem to solve due to the random number of splits and sizes of splits |

TABLE 16-continued

Vulnerabilities vs. Countermeasures

| Possible Vulnerabilities | Countermeasures |
|---|---|
| Mobile Device, PC, or Server Compromised All devices compromised and passwords leaked | Still need ALL devices to unprotect data since each device has information to unprotect data No countermeasures for complete takeover |

TABLE 17

Strength of Aspects of the Project

| Password of 10-ASCII case-sensitive chars | Salt | AES-GCM Key Length | Splits | IV | Salt Protection | Folder Protection (AES Key Wrap) | Map Protection | Total Cryptographic Strength of Key |
|---|---|---|---|---|---|---|---|---|
| $Log_2(95^{10})$ 65-bits | 256-bits | 256-bits | NP-complete problem | 96-bits | 512-bits | 512-bits | 768-bits | 768-bits |

Figure 86:
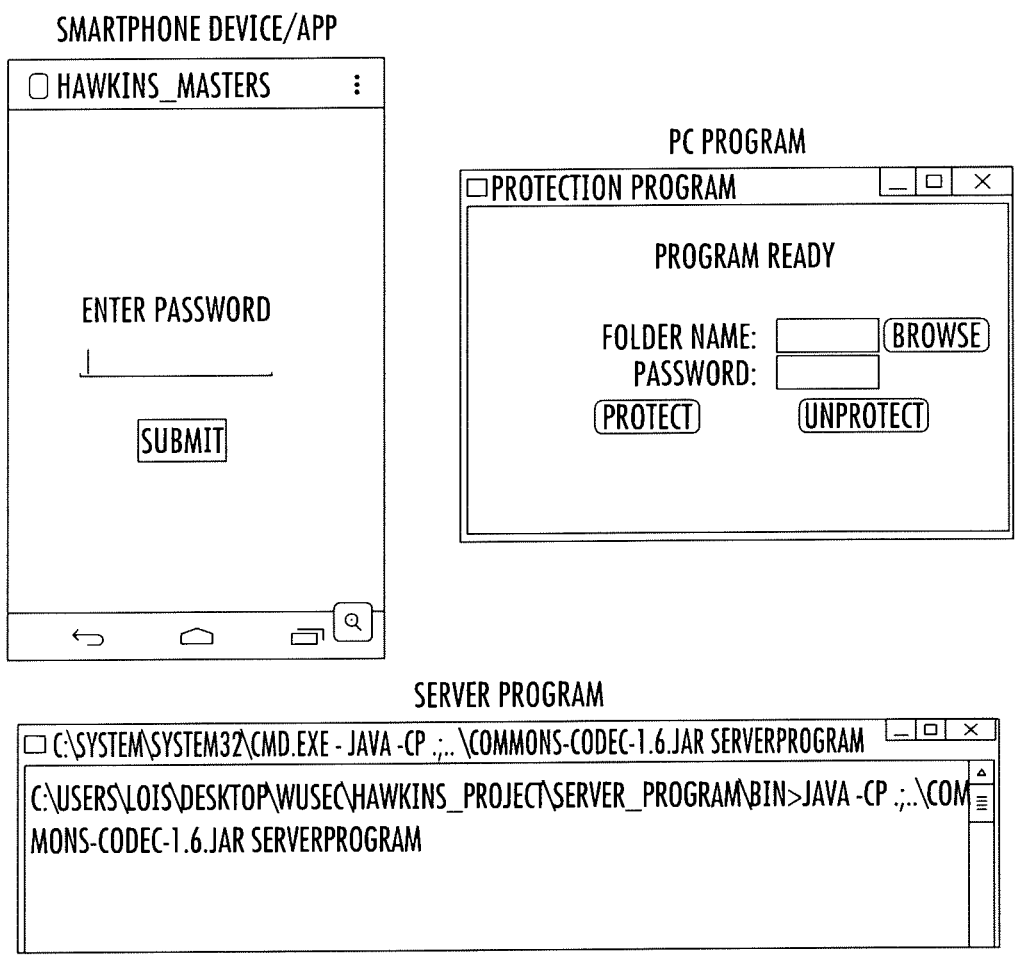
FIG. 86 shows that three devices, a PC, a server, and a mobile Android device, and their corresponding programs are started in accordance with the disclosure.

An explanation is now provided of an exemplary usage scenario of a system in accordance with the present disclosure. FIG. 86 shows that three devices, a personal computer, a server, and a mobile Android® device, and their corresponding programs are started. For the demonstration, the server program is being run on the personal computer; however, since JAVA is used, this can be easily run on any platform that supports JAVA.

According to this exemplary usage scenario, the folder that the user wants to protect is selected and a password is entered. After protecting, the encrypted data is split and stored in the different places. The "kf*.txt" files are the splits of the encrypted data.

Figure 87:
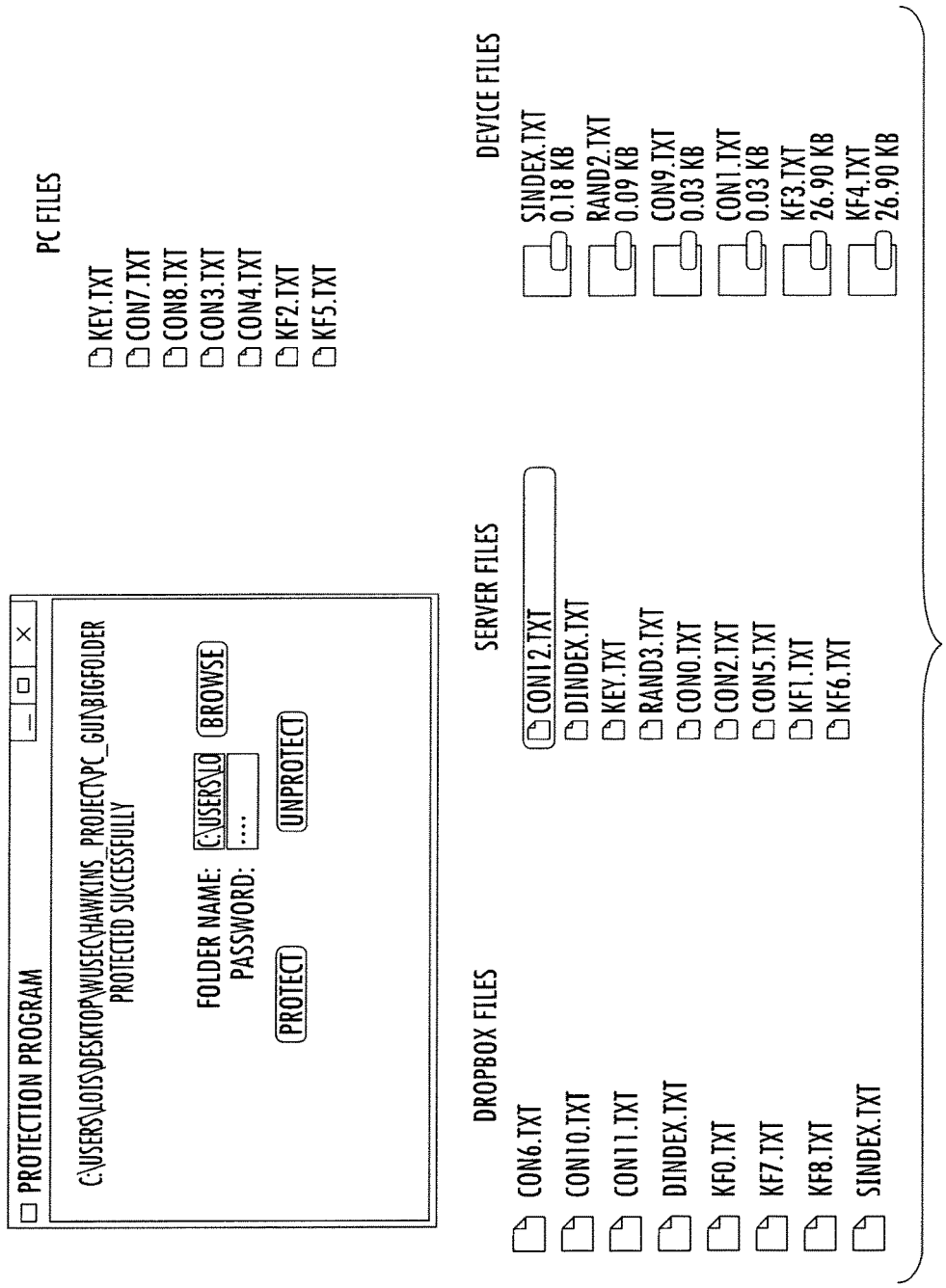
FIG. 87 shows the split files among its different locations in accordance with the disclosure.

FIG. 87 shows the split files among its different locations. The "Con*.txt" files are the smain, sbits, and initial random number that are concatenated, encrypted, and split. The "*Index.txt" files are the parts of the protected map. Unprotecting is just putting the folder name and password and pressing unprotect. The original folders and files may be restored and the original data can be retrieved by the user.

The performance versus security is excellent for the encryption, decryption, splitting, and merging. The performance can be improved for large files if the upload speed to the cloud is increased, though this can be achieved with better upload speed or a design change in which the split size to the cloud is limited; by doing this, the security is not hampered what so ever. The AES-GCM makes the 256-bit encryption and decryption process very efficient, even for large files sizes. With the multiple encryptions, the overall encryption strength of this scheme is 768-bits, which is unbreakable by technology today and in the near future. Security can be improved without hindering performance if the key size is increased and strong passwords are enforced.

The systems, components, and methodologies disclosed herein provide technical solutions to problems described earlier. Encrypted files being stored in multiple places protect against zero-day malware and Trojans on the PC; also, protection against insecure cloud storage is provided. Since all devices and the password plus protected salts are needed for unprotection, this will protect against password leakage, brute forcing, phishing against the user, and lost devices. Also, information leakage (via insecure networks or device compromise) is protected because if a few splits are found, no information about the plaintext can be recovered. These design properties makes this implementation very secure against outside attackers.

The systems, components, and methodologies disclosed herein make data protection more secure by providing greatly improved security and having an additional form of authentication and file protection by fully utilizing the available mobile devices possessed by a user—in this exemplary illustration, an Android mobile device. The high security strength and spreading parts of the encrypted file among multiple devices and cloud makes this scheme extremely difficult to break. An attacker must not only need to attack the password or keys, but also needs to possess all of the pieces from all locations. According to the above-described exemplary illustration, the scheme provides at least 768-bit security with an NP problem without sacrificing performance.

Figure 88:
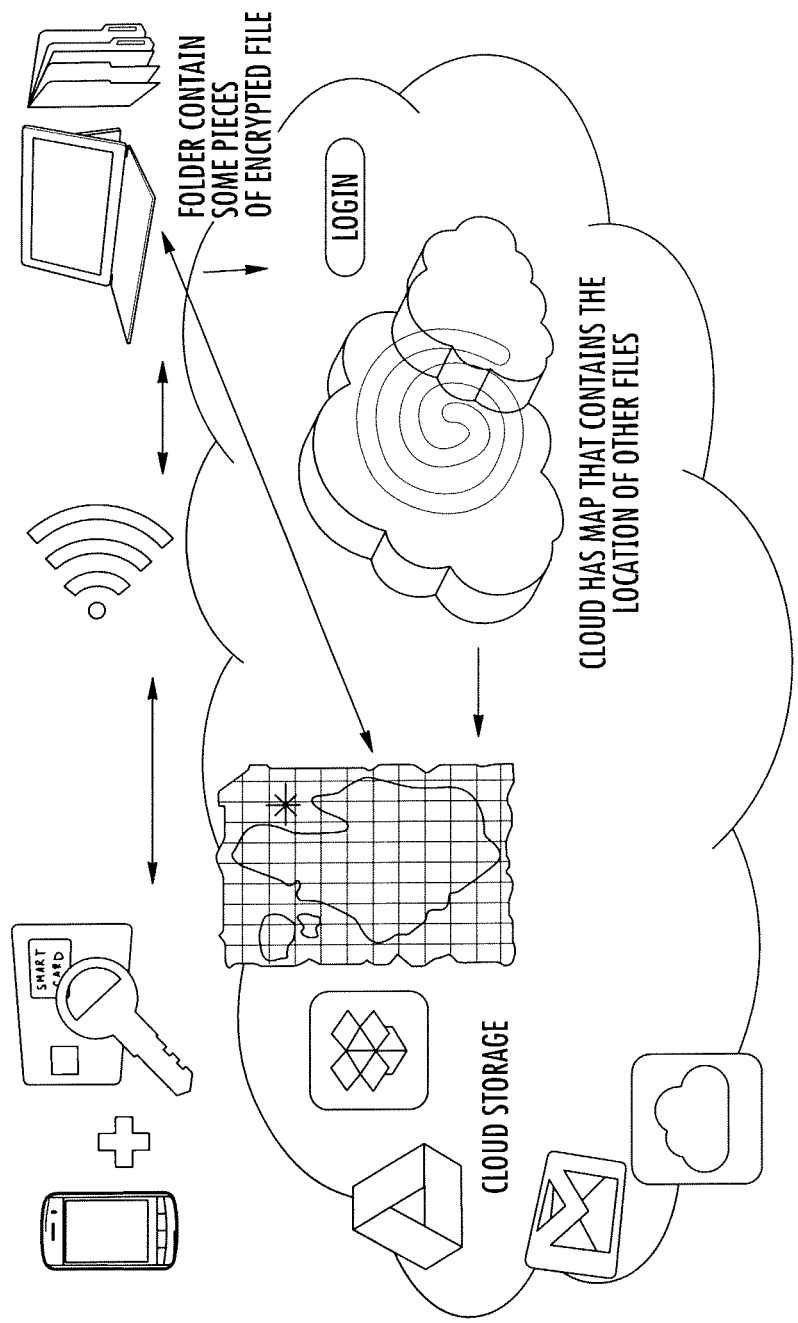
FIG. 88 shows other features contemplated within the scope of this disclosure, including more authentication methods such as biometrics or smart card, encrypted data stored on multiple cloud servers, and a mobile device to have the data available to users anywhere at any time in accordance with the disclosure.

FIG. 88 shows other features contemplated within the scope of this disclosure, including more authentication methods such as biometrics or smart card, encrypted data stored on multiple cloud servers, and a mobile device to have the data available to users anywhere at any time. This would give better flexibility and not have a dependency on a single PC. Different limits on split sizes being uploaded to cloud servers or larger upload speeds would increase the network performance of the system as well.

In accordance with at least one disclosed embodiment, systems, components, and methodologies may provide a TPM-enhanced cloud-based file protection system. Such systems, components, and methodologies address the need for better cloud computing system security. According to the present disclosure, file distribution design can be introduced into the information protection system to add another layer of security. Distributed file pieces could obfuscate and defeat the hackers from recovering the whole file.

The present disclosure addresses shortcomings of alternatives, including alternatives that rely solely on software applications, by introducing Trusted Computing design which utilizes the Trusted Platform Module (TPM) into this design. TPM is a security chip that can create and store cryptographic keys, generate random numbers, and so on. In one aspect in accordance with the present disclosure, TPM's security features are deliberately designed as part of the system implementations disclosed herein. TPM is first used to bind cryptographic key to provide root of trust. Then to provide support for cloud computing design, TPM provides identity attestation for client.

In accordance with illustrative embodiments, the file protection system, consisting of a server, a client and an Android mobile device, provides 5 layers security. First, in accordance with disclosed embodiments, the logon scheme is protected by obfuscated inputs on client and Android and is authenticated on server. In this exemplary implementation, no one device has a password or password hash, and as such, this scheme can effectively defeat the key logger and screenshot capturer. Second, in accordance with disclosed embodiments, AES-GCM scheme is used for file encryption and decryption. Third, in accordance with disclosed embodiments, encrypted file splitting and hiding scheme can be implemented in the cloud storage to avoid side channel attacks to encrypted files. Fourth, in accordance with disclosed embodiments, TPM is used to create 2048 bits RSA binding key to protect the encrypting key for the index file, which is the start point of the file unprotection. Fifth, in accordance with disclosed embodiments, the TPM is used to create 2048 bits RSA Attestation Identity Key to provide identity authentication for the client. Finally, the encrypted file and encrypted index file are distributed to server, Android and client. Only the authorized client with the original TPM which carries the RSA signing key and binding key can retrieve distributed file pieces and finally unprotect them. Possession of all of the devices cannot recover the information.

Figure 89:
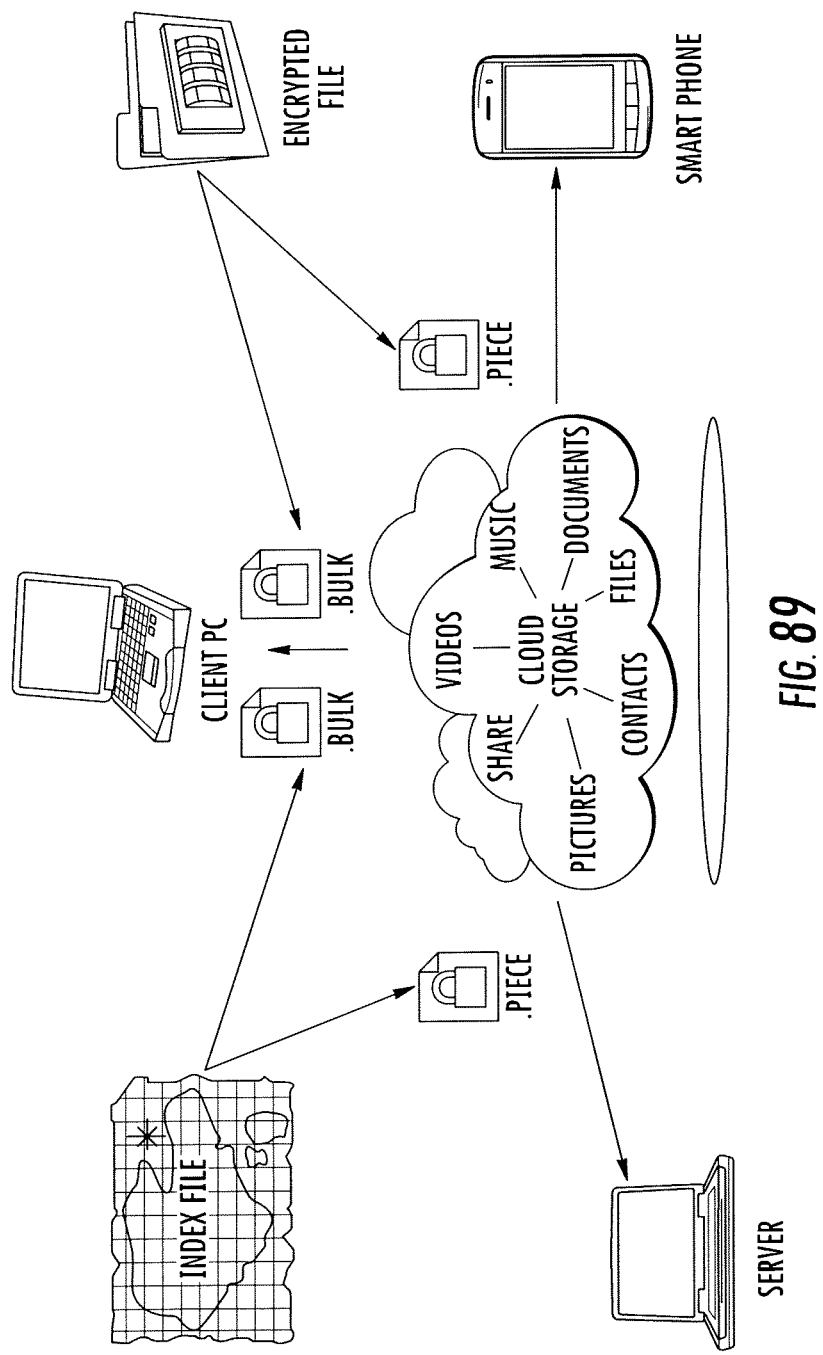
FIG. 89 shows an exemplary cloud storage system for use with personal devices. Trusted Computing utilizing TPM offers advantages not present in alternative network security implementations in accordance with the disclosure.

FIG. 89 shows an exemplary cloud storage system for use with personal devices. Trusted Computing utilizing TPM offers advantages not present in alternative network security implementations. For example, it can provide trustable cryptographic protection and identity authentication in cloud computing. Certain alternatives, including firewall, Intrusion Detect System (IDS) and anti-virus, are passive defense technologies. The systems, components, and methodologies described herein use trusted computing, which is an active defense technology.

Traditionally, for the security software that resides only on the software process, the cryptographic keys has to be stored plainly on the hard drive which means that running that whole security process in software is like leaving a spare front door key somewhere in the yard—one is relying on being able to think of a key-sized hiding place that a burglar won't find. That is the unavoidable weak point for software security. Incorporating TPM into the crypto system can finally resolve this trouble and escalate the file protection system to the hardware level. Trusted Platform Module can implement security features and can be used as a reference point to provide root of trust for cryptographic processes. Based on the key management infrastructure and root of trust features, TPM provides cryptographic ability to secure critical data and act as a reference point for the information protection which solves the weakness of solely-software cryptographic processing.

The cloud storage of information presents additional security concerns, including the identity proof of different parties. To ensure full access to the cloud storage information pieces, each party of the system should trust others to ensure the security of the information. Thus, the identity attestation ability of TPM provides advantages over alternative implementations. Certain alternative implementations use a Role Based Access Control Model as the security binding for the cloud storage. In systems, methods, and components in accordance with the present disclosure, the Identity Attestation Key inside TPM, according to the features of personal information protection, which is strongly protected by Storage Root Key, is generated and used as the identity proof of the specific TPM, and this will ensure the safety of the cloud storage data. Because the TCP is based on relatively independent hardware modules, the disclosed systems do not require significant CPU resources, and can improve the performance of cryptographic computation processing.

For the information security system, password protection is another important consideration. Passwords are often the primary source for protection. But passwords may be vulnerable for two reasons. The traditional input methods of passwords are so weak that it they may be easily captured by a key logger or screen capturer. Likewise, many passwords chosen by people can be cracked by dictionary attacks or social engineering.

There are different alternative models designed for password protection. Many rely on the complicated mathematical processing of user passwords and include biotic features and distributed computing features. In accordance with the present disclosure, a specific server, the client PC, and the Android Device multiple ends synchronous password logon scheme is designed based on the random number sequence projection and fully utilize the personal cloud computing powers. This scheme can effectively defeat key logger and off-line dictionary attacks.

Thus, to protect users, the present disclosure describes a highly secure, cloud based information storage infrastructure enhanced by TPM to meet the security demands that requires data confidentiality, integrity and User Authentication.

In certain implementations, Java is used to implement the disclosed systems because it is a suitable multi-platform environment that provides ease of software development with efficient applications. Moreover, Java is platform independent, offering another advantage. In accordance with certain implementations of the present disclosure, SHARE FOR RSA library is used to implement AES-GCM mode encryption of files under the Java environment. Java's robustness, ease of use, cross-platform capabilities and security features provides beneficial worldwide web solutions. The ability to run the same program on many different systems is beneficial to World Wide Web software and Java succeeds at this by being platform independent at both the source and binary levels. However, it should be understood that Java is merely an exemplary mode of implementation, and other suitable development environments may be used.

Figure 90:
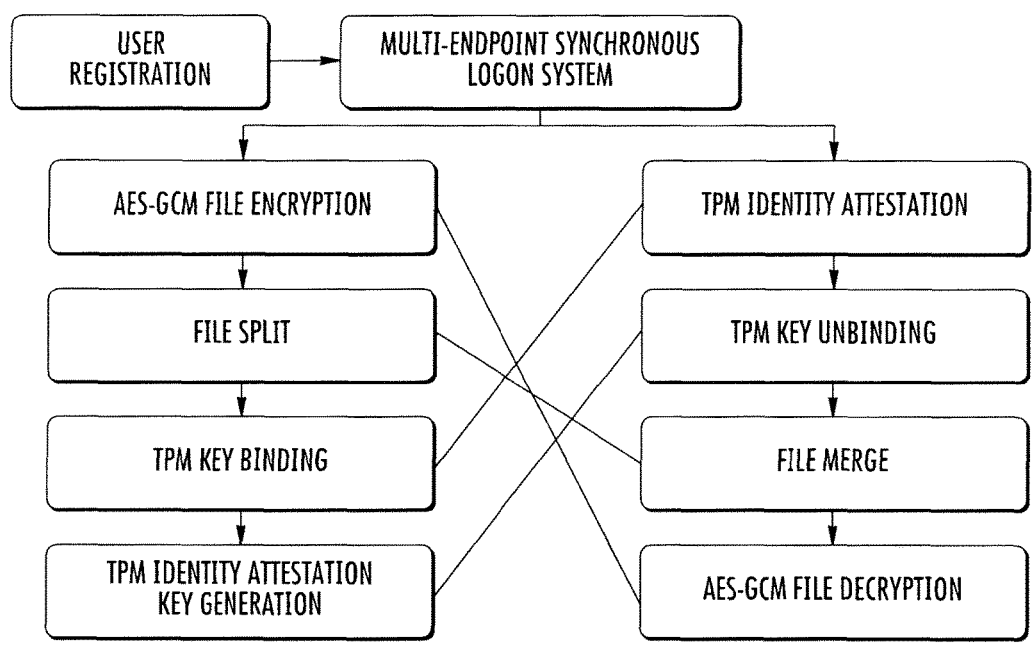
FIG. 90 shows a block diagram of a security system in accordance with the present disclosure.

FIG. 90 shows a block diagram of a security system in accordance with the present disclosure. Trusted computing design, which relies on Trusted Platform Module (TPM), is a beneficial part of this design. It provides the advantage of hardware security, overcoming weaknesses of solely-software processing information protection systems discussed above. It allows direct utilization of the TPM's cryptographic ability to encrypt the personal information.

According to an illustrative embodiment, the TPM design is based on public key infrastructure, and thus may utilize RSA 1024bits or 2048bits to encrypt files. A potential downside for RSA is the efficiency—when the file size gets large, RSA-based implementations may become clumsy. Thus, in accordance with illustrative embodiments, AES 256 bits is used as the encryption method which has the same security level as RSA 2048 bits but enhanced efficiency. Then, TPM is used to protect the AES keys. While improving performance, this approach also resolves the problem of storage of cryptographic keys, which is problematic in solely-software security design.

According to this illustrative embodiment, TPM is first used to create 2048-bits binding keys to wrap and store the index file encryption key. Because the private key can never come out of TPM and is protected by the storage root key which was stored in non-volatile RAM, the whole file system is well protected.

As discussed above, to ensure the safety of cloud storage, it is desirable that every access to information pieces in the cloud storage be fully authenticated. In accordance with this exemplary implementation, TPM Attestation Identity Key (AIK) is used to provide identity attestation to server for recovery of data pieces. In other alternatives, CA issued certificates and TPM signing keys are recommended to bind with data for authentication. The present system, in contrast, provides efficiency and features of personal use, as the AIK is used to provide identity proof to server. AIK is well protected by SRK inside TPM and also unique identifier UUID is used to refer to it and UUID is also a user identity to use specific AIK. Thus, this design offers security requirements for the cloud storage identity attestation.

According to another aspect of the present disclosure, splitting and spreading the encrypted files provides protection of sensitive information. Exemplary illustrative embodiments use a splitting-merging program that provides splitting and merging functionality of files. This may be accomplished by storing the paths and keys of the pieces to an index file. The index file is further used for merging the pieces back to the file. A system generated time stamp may provide a unique seed for the generation of AES keys.

Generally, a password is often the weakest point of security system. It may be easily captured by key logger or screen shot capturer and sometime even guessed by and dictionary attack and social engineering. To enhance the protection over the password, exemplary systems in accordance with the present disclosure use a multipart synchronous logon system in which the password may be split and input on both the Android device and PC separately and at the same time the input may be transferred into random number sequences and sent to the server. On the server side, when the server receives the random sequences, it will reorganize all the sequences based on their timestamp and generate the SHA-256 hash value of the combined random number sequence. Finally, the hash value may be compared to the correct one and verified. This design can effectively defeat key logger or screen shot capturer.

Random and varying salts may provide protection against brute force attacks, dictionary attacks, and birthday attacks. Protection can be given by encrypting, splitting and spreading the information to be offline for the rest of life. The salt is a sequence of bytes that is added to the password before being digested. This makes the digests different to what they would be if one encrypted the password alone, and as a result protects against dictionary attacks. Adding salt to the key or password can vastly extend the key range, which may make it more difficult for the exhaustive search of keys by brute force attack.

In accordance with at least one embodiment of the present disclosure, three devices may be used for the security consideration of file protection: a server, an Android® device, and a PC equipped with TPM. Thus, the overall system is easy to implement and applicable for practical and commercial use. In exemplary implementations, the only knowledge required by the system on the part of the user is the passwords and the input orders on the Android device and the PC. Then all the remaining jobs are implemented by those three devices. So the overall design is easy to use but can provide comparatively high level security.

Figure 91:
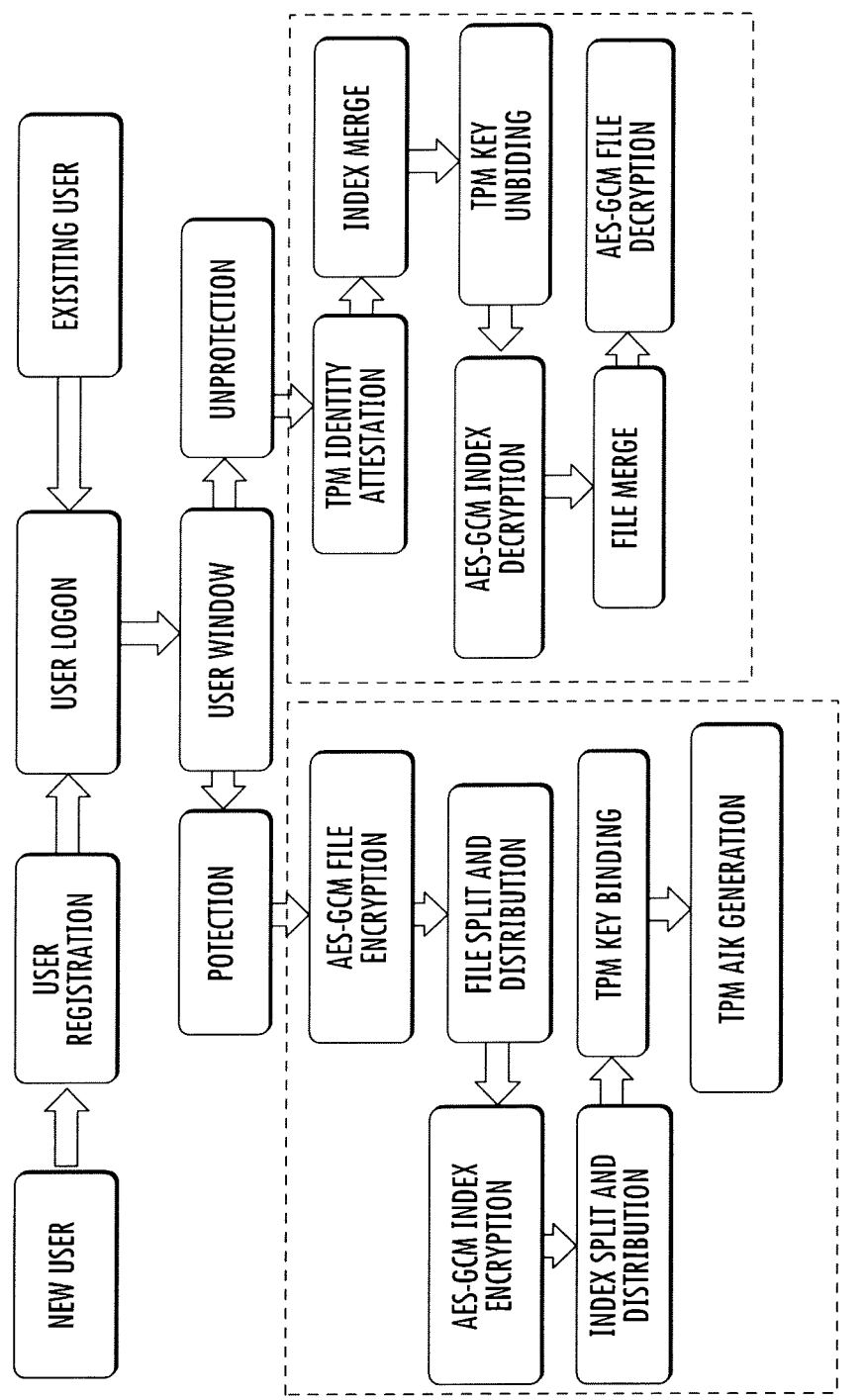
FIG. 91 shows an overview of the protection and unprotection processes in accordance with the present disclosure.

FIG. 91 shows an overview of the protection and unprotection processes in accordance with the present disclosure.

Figure 92:
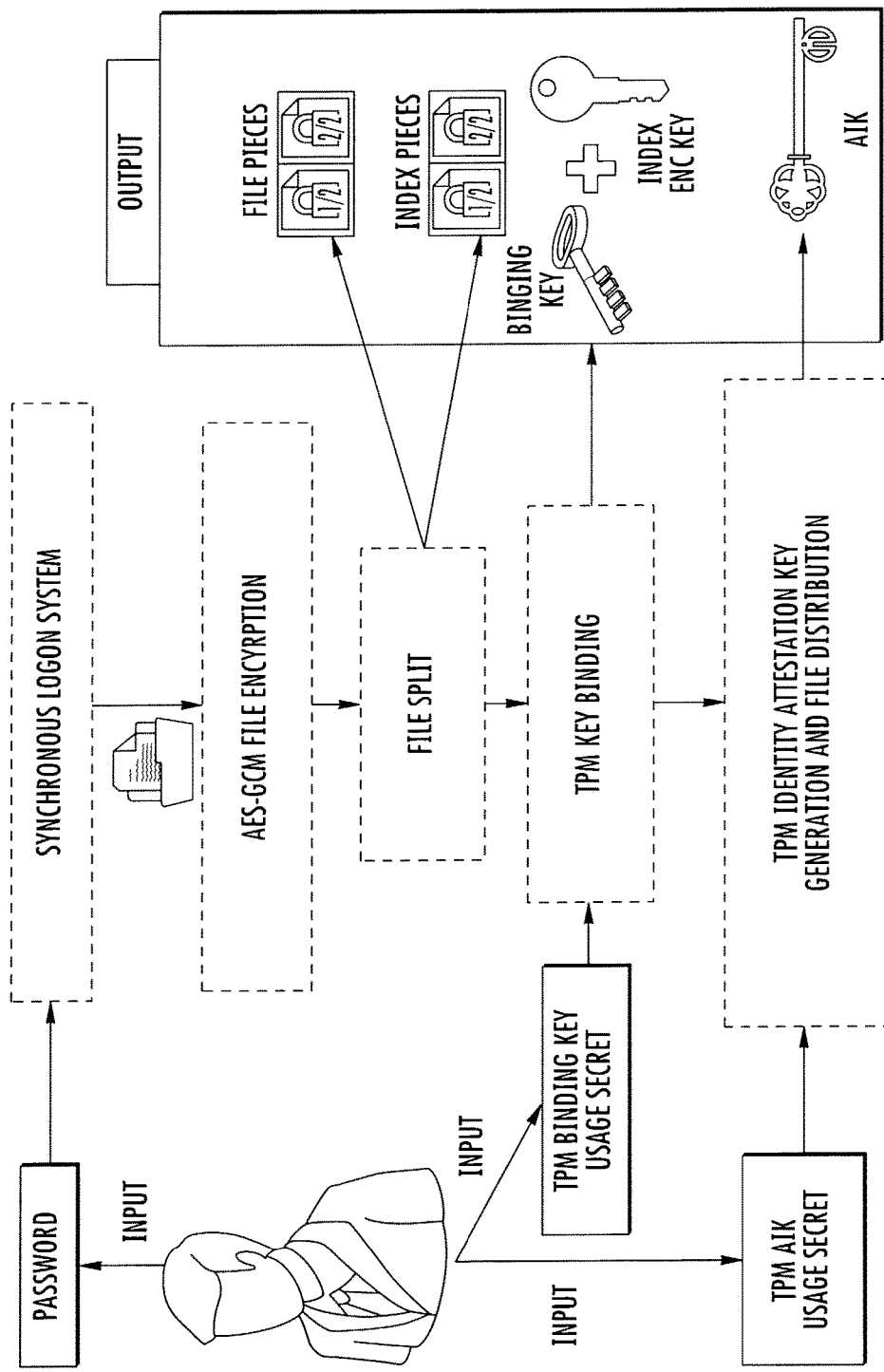
FIG. 92 illustrates the processes and I/O of Protection in accordance with the present disclosure.
Figure 93:
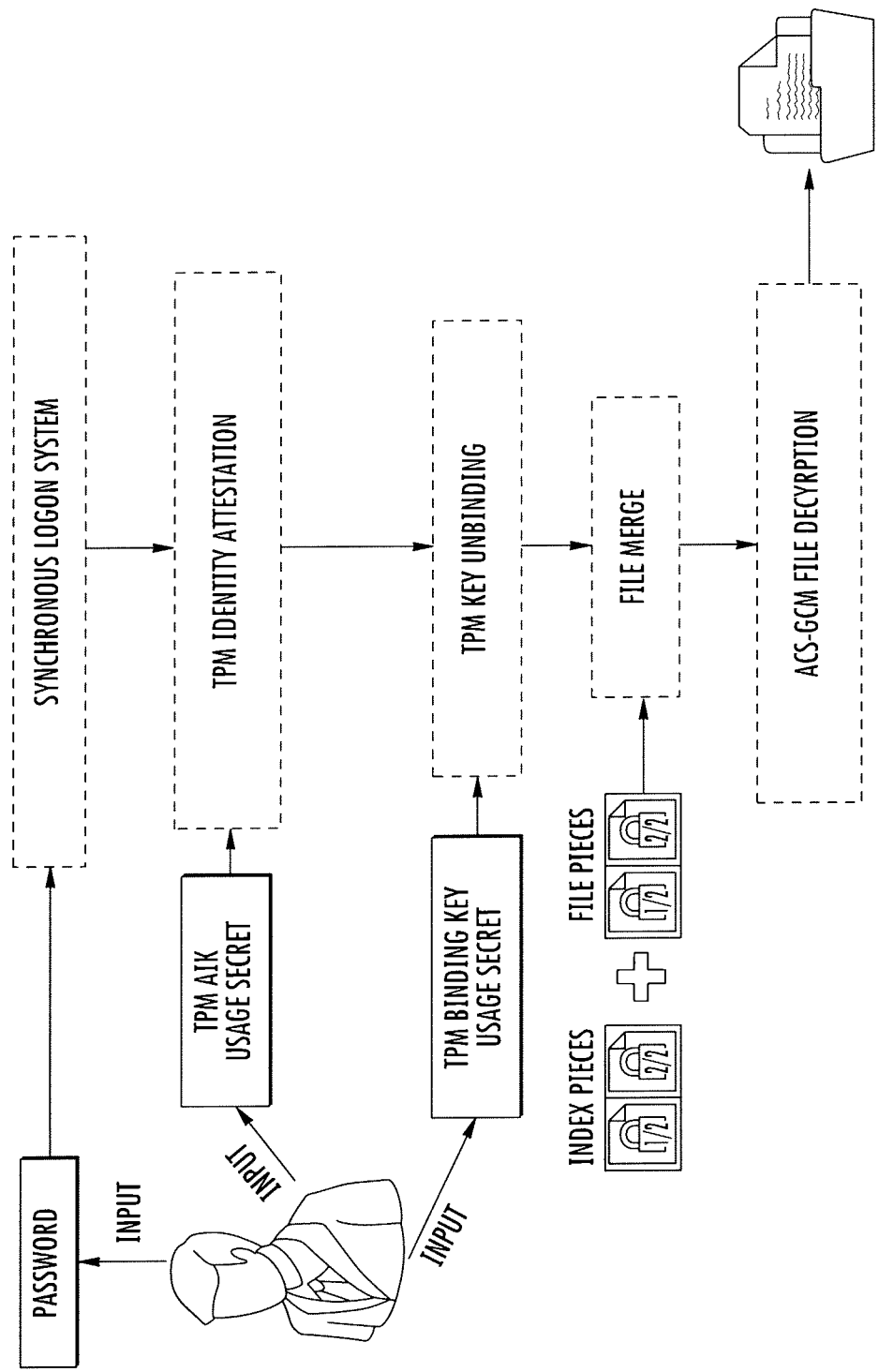
FIG. 93 illustrates the processes and I/O of Unprotection in accordance with the present disclosure.

After the user registers an account, the system operation may be divided into two parts based on user choice, Protection and Unprotection. FIG. 92 illustrates the processes and I/O of Protection. FIG. 93 illustrates the processes and I/O of Unprotection.

In total, the overall design can be split into 5 modules:

In a synchronous log on scheme module, an Android® phone and the client PC are the input devices and implement the input digits to random number mapping. Each digit of the password may be input alternately on the Android phone and the client PC, and at the same time each of the digits may be mapped into certain length random number sequence and sent to the server for verification. On the server side, the SHA-256 hash value of correct random number sequence, which the hash value of received random number sequence may be compared to, is stored. The result of the compare may be sent back to PC and Android for next operations.

An AES-GCM encryption-decryption scheme module uses the AES-256 encryption method, which is considered to be strong enough for exemplary security requirements. The AES keys are generated based on a unique seed which is based on system generated time stamp. To play against side channel attack and timing attack, a GCM mode is introduced into this design. The security of the GCM mode makes use of the fact that the underlying block cipher cannot be distinguished from a random permutation. Finally, a random generated salt is added to play against brute force attack.

For a file splitting-merging module, a specific program is written to split the encrypted files into pieces and bulks based on random numbers. Junk data are also injected into the split files. The paths and keys of the pieces are stored into an index file. The index file is further used for merging the pieces back to the original file. The index file may also be encrypted by AES-GCM and split by the splitting program. In the decryption process, the recovery of all the files will start from the index file.

A TPM key binding-unbinding module may provide binding and unbinding functionality. Binding generally includes the operation of encrypting a message using a public key. That is, the sender uses the public key of the intended recipient to encrypt the message. The message is recoverable by decryption using the recipient's private key. When the private key is managed by the TPM as a non-migratable key only the TPM that created the key may use it. Hence, a message encrypted with the public key is "bound" to a particular instance of a TPM. Keys may be considered communication endpoints and improperly managed keys can result in loss of security. Thus, the TPM in accordance with the present disclosure aids in improving security by providing key management. The final index file encryption key is the root of the cryptographic process, so it will be binding with TPM for concrete protection. In the decryption process, the index file encryption key may be recovered using the corresponding private key by providing correct identity to TPM.

Finally, a TPM signature authorization module may be utilized when, due to cloud storage features, only the authenticated users with unique AIK can access the data on the server and recover the whole file. TPM signature authorization scheme may defeat unauthorized recovery of distributed index file pieces from server. At the end of the encryption process, TPM will generate 2048 bits RSA Attestation Identity Key and the public key may be sent to the server for storage. In the first place of decryption process, the TPM has to provide the server the signature generated by previous generated key, after the signature is verified by server using stored public key, then the index file pieces can be sent back to the client for the next operation of the decryption process.

Figure 94:
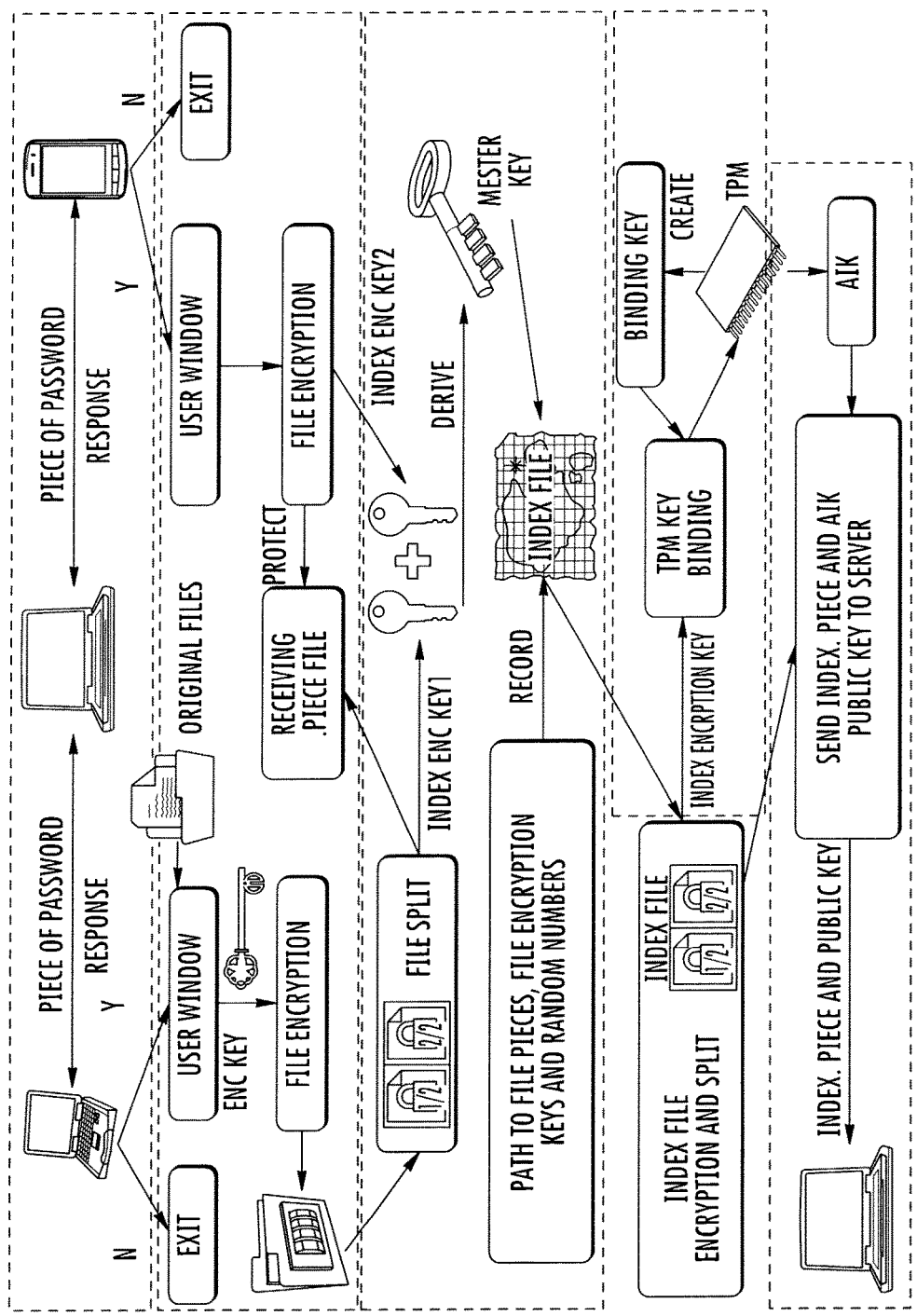
FIG. 94 is a flow diagram of protection process in accordance with the present disclosure.
Figure 95:
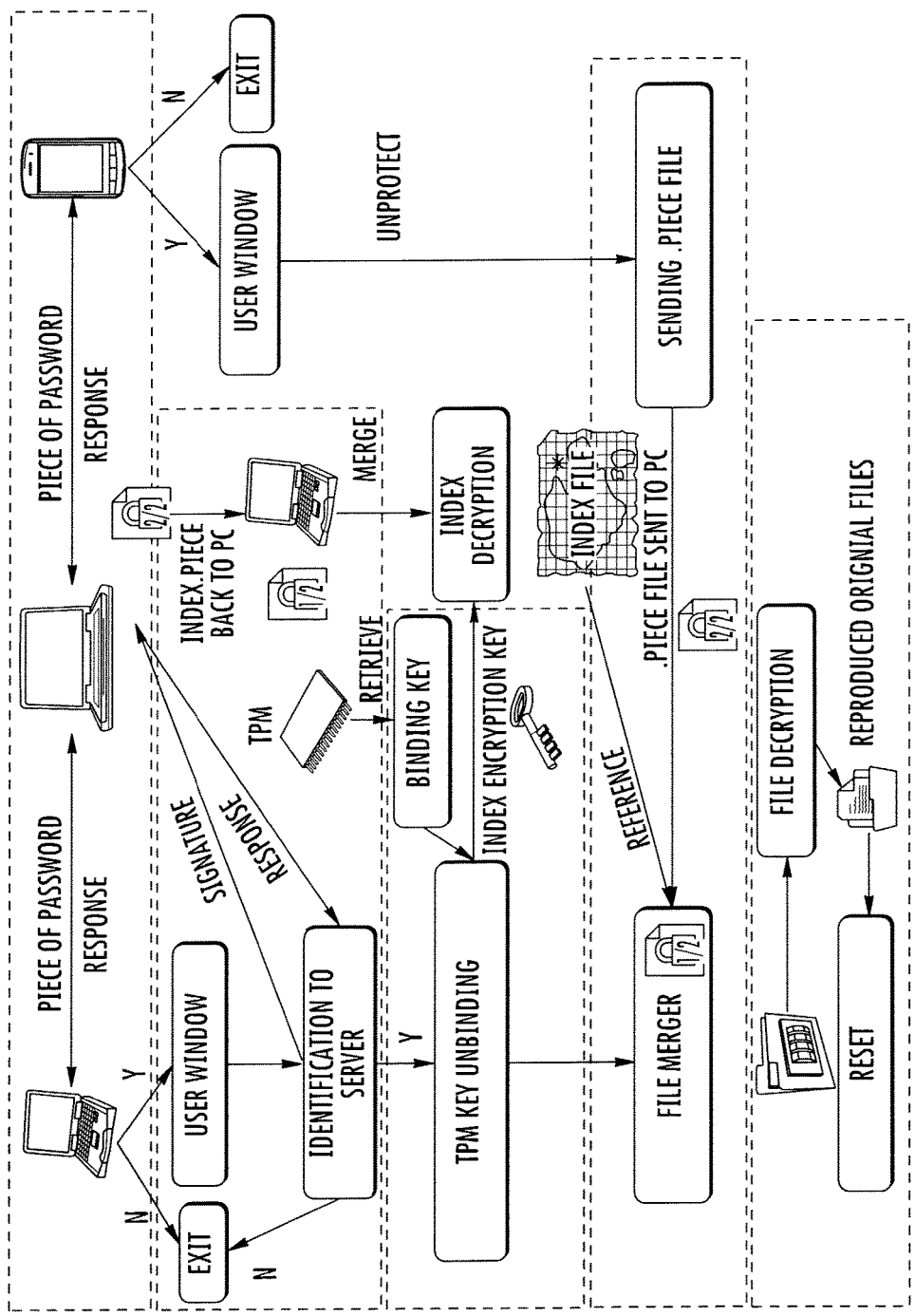
FIG. 95 is a flow diagram of the un-protection process corresponding to the protection process of FIG. 94 in accordance with the present disclosure.

FIG. 94 is a flow diagram of protection process. FIG. 95 is a flow diagram of the un-protection process corresponding to the protection process of FIG. 94. More details on these processes are provided herein.

According to exemplary implementations, to use the information system application, the first operation is user registration. User registration includes several parts, including password registration and cryptographic key registration. Table 18 lists exemplary user registration information.

TABLE 18

User Registration Information

| Name | Description |
|---|---|
| Attestation Identity Key(AIK) | TPM Identity Proof |
| AIK Usage Secret | AIK User Authentication |
| AIK Migration Secret | AIK Migration Verification |
| UUID | Key Registration and User Identity Proof |
| Logon Password | System Logon(mapped to Random # Sequence) |
| TPM Binding Key Usage Secret | Binding Key User Authentication |
| TPM Binding Key Migration Secret | Binding Key Migration Verification |

Figure 96:
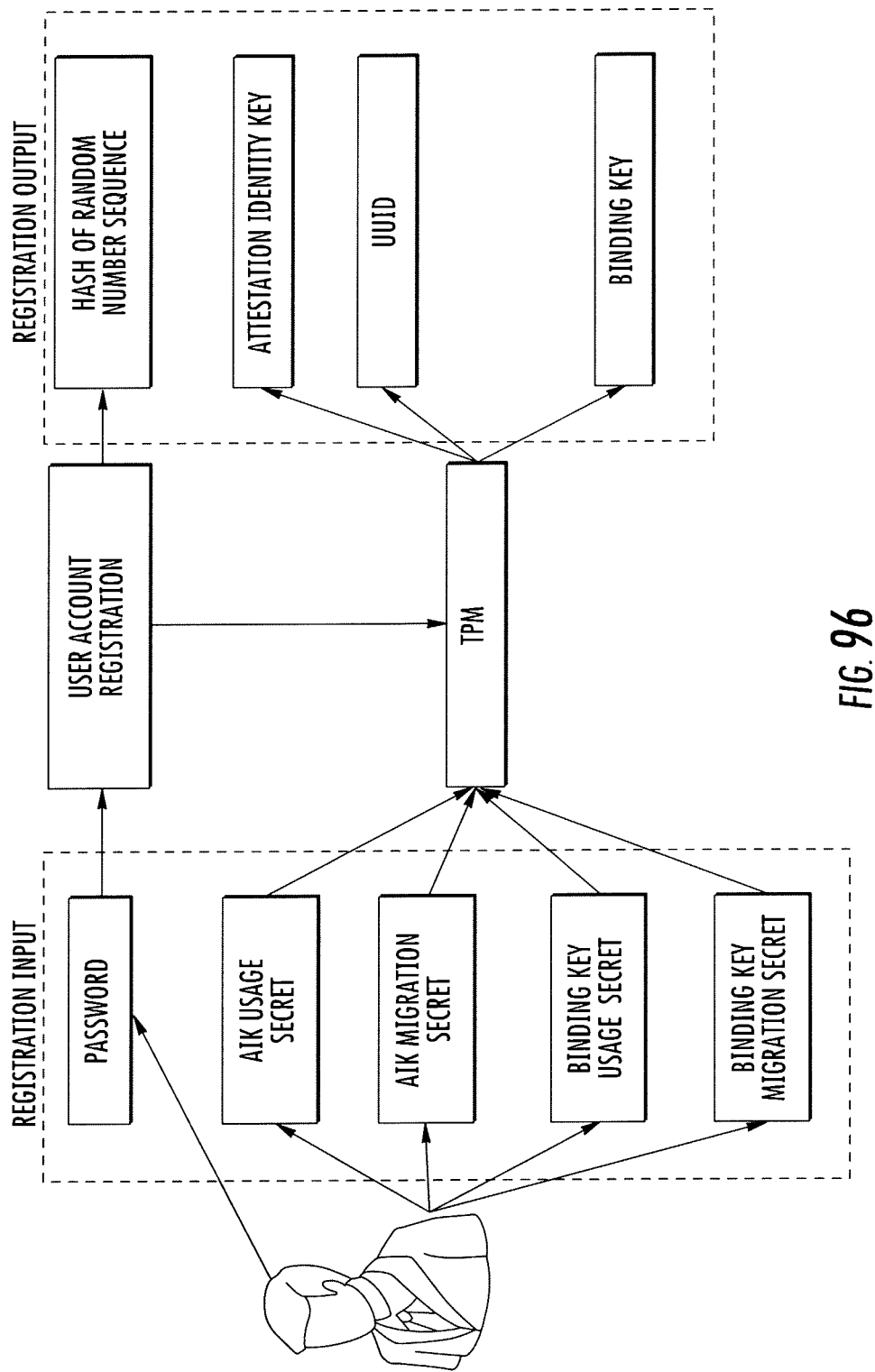
FIG. 96 shows a user registration I/O flow in accordance with the present disclosure.

FIG. 96 shows a user registration I/O flow.

Figure 97:
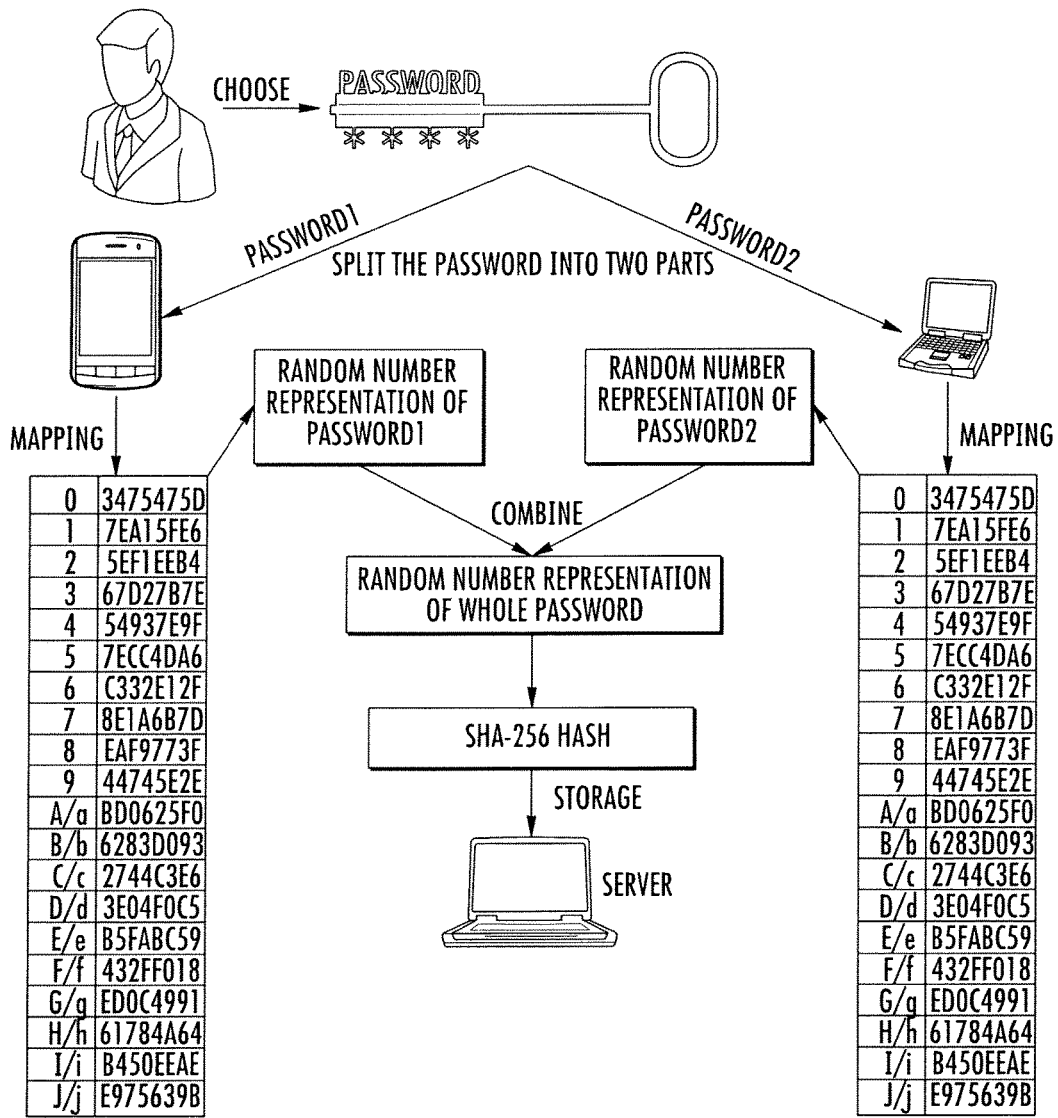
FIG. 97 shows a user account registration process, which generally refers to the user creating the logon password for authorized use of the application in accordance with the present disclosure.

FIG. 97 shows a user account registration process, which generally refers to the user creating the logon password for authorized use of the application. The synchronous password logon system may be considered the front line of the information protection. According to this design, the user utilizes the server, the client PC and the Android Device to perform obfuscated synchronous logon verification. For the logon scheme design, one aspect is the password digits to random number sequence mapping. Thus, a primary function of the user registration is the user password digits to random number sequence mapping on both the client PC and the Android Device. Then, the transferred password may be sent to server to calculate the SHA-256 hash value which may be stored on server for user verification.

Figure 98:
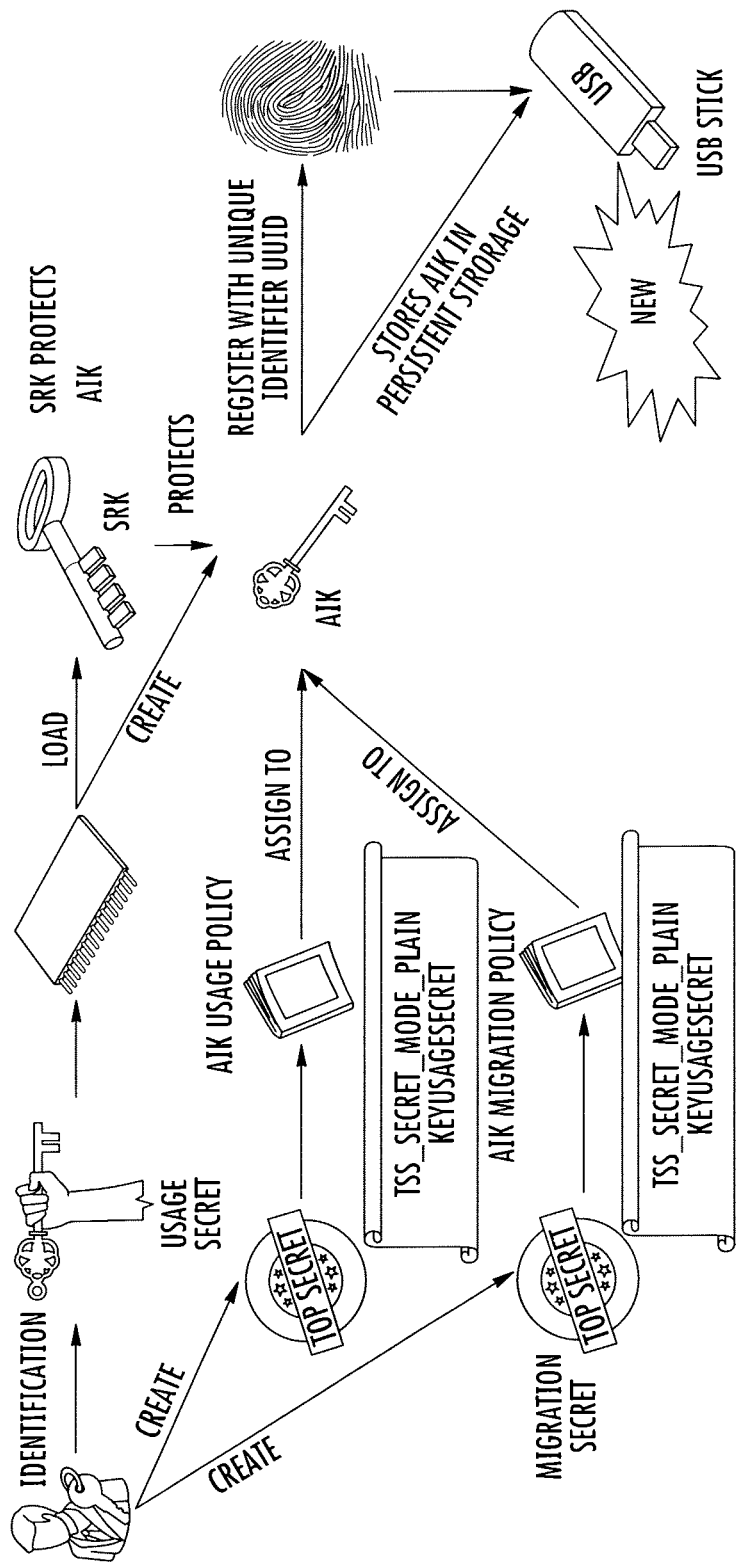
FIG. 98 and FIG. 99 show operations taking place after the user account registration in accordance with the present disclosure.
Figure 99:
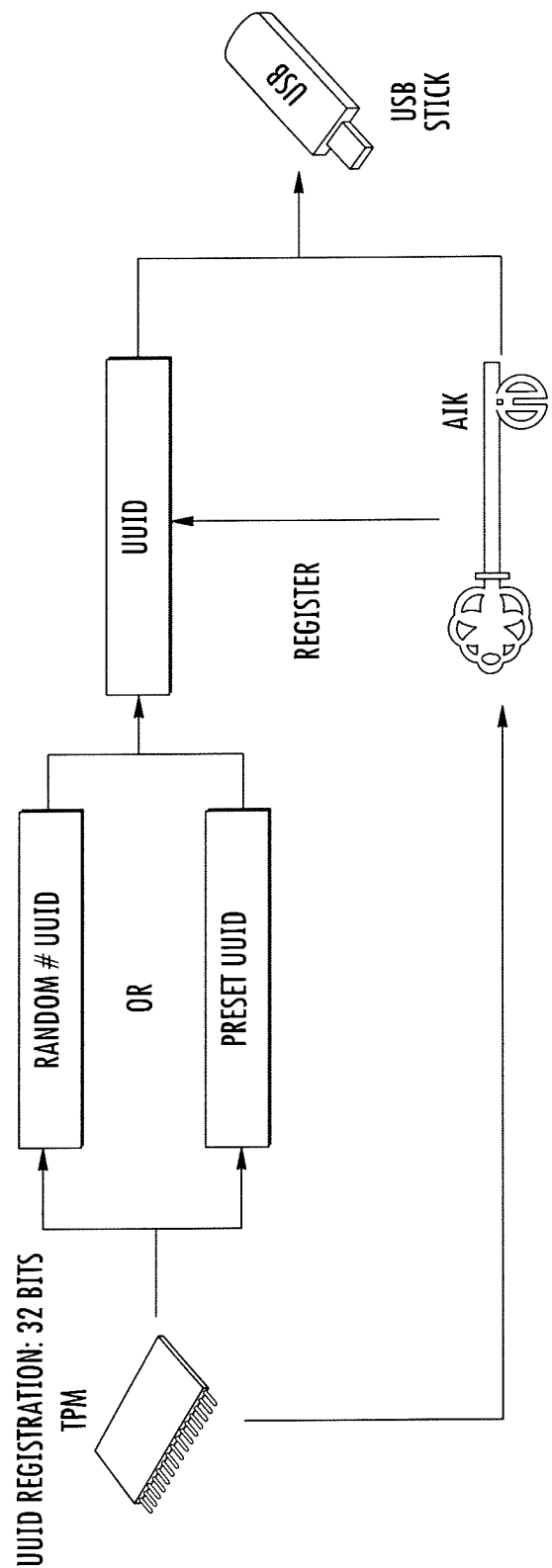

FIG. 98 and FIG. 99 show operations taking place after the user account registration. During the encryption process, there is AIK registration, Binding key registration and related authentication secret registration. AIK, which is the Attestation Identity Key, is used here as the identity proof of the specific TPM and the verified user. It is created as the unique identity authentication and is protected by the Storage Root Key which is strongly protected inside TPM in the non-volatile RAM. In the ideal situation, the AIK should be issued by the trusted CA by provide possession of a unique Endorsement Key, and till now this scheme is not widely used. For systems in accordance with the present disclosure, aiming at the personal information protection on personal computing devices, the CA certified AIK is not necessary. The unique AIK inside the TPM can be used to attest identity. Furthermore, the user may register a unique identifier UUID which is used as the reference to the unique AIK and also as the identity proof of the authorized user. It can be created randomly and also there may be an existing UUID inside TPM for use.

To register AIK, a user may assign proper usage and migration policies to it, and the policies are protected by a user created secret. After the AIK is created, the TPM binding key also has to be created for key binding. And the same as AIK, the user has to register a unique UUID to refer to binding key and also for the assigned usage and migration policies, the user has to register authentication secret for authorization of using and migrating the binding key.

Alternative methods of user password input may be vulnerable to a key logger or screen capturer. For example, the password can be stolen by a key logger, by phishing or by shoulder-surfing. For example, the key logger code may log all the key strokes at the operating system level so that such logs are delivered to some adversaries who analyze what the victim has keyed in their system, and then try to extract the user password. Such a key logger may be very effective if the user typed their password in an unsafe machine on which the key logger is installed.

In accordance with the present disclosure, a password protection scheme is designed which involves random number generation and server-client collaborative authentication. In this exemplary implementation, no single one of these machines possess the password, so this scheme can effectively guard against key loggers and screen capturers.

Figure 100:
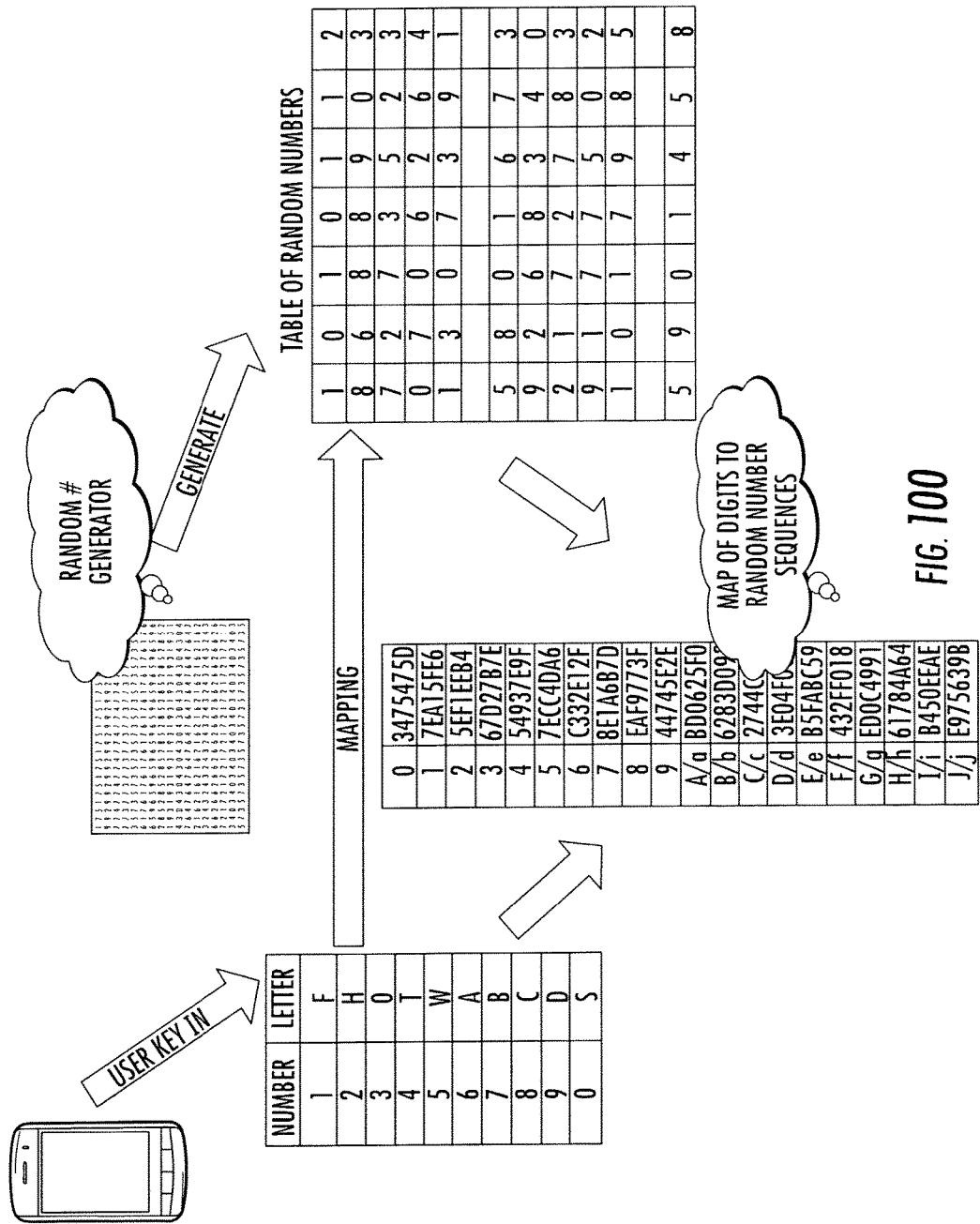
FIG. 100 shows a random number table generation diagram for use in an exemplary password protection scheme in accordance with the present disclosure.

FIG. 100 shows a random number table generation diagram for use in an exemplary password protection scheme. In the first operation in accordance with an exemplary methodology, a random number sequences table is generated and stored on both the client PC and android phone separately. Each of 26 letters and 10 number digits are mapped into a random number sequence.

Figure 101:
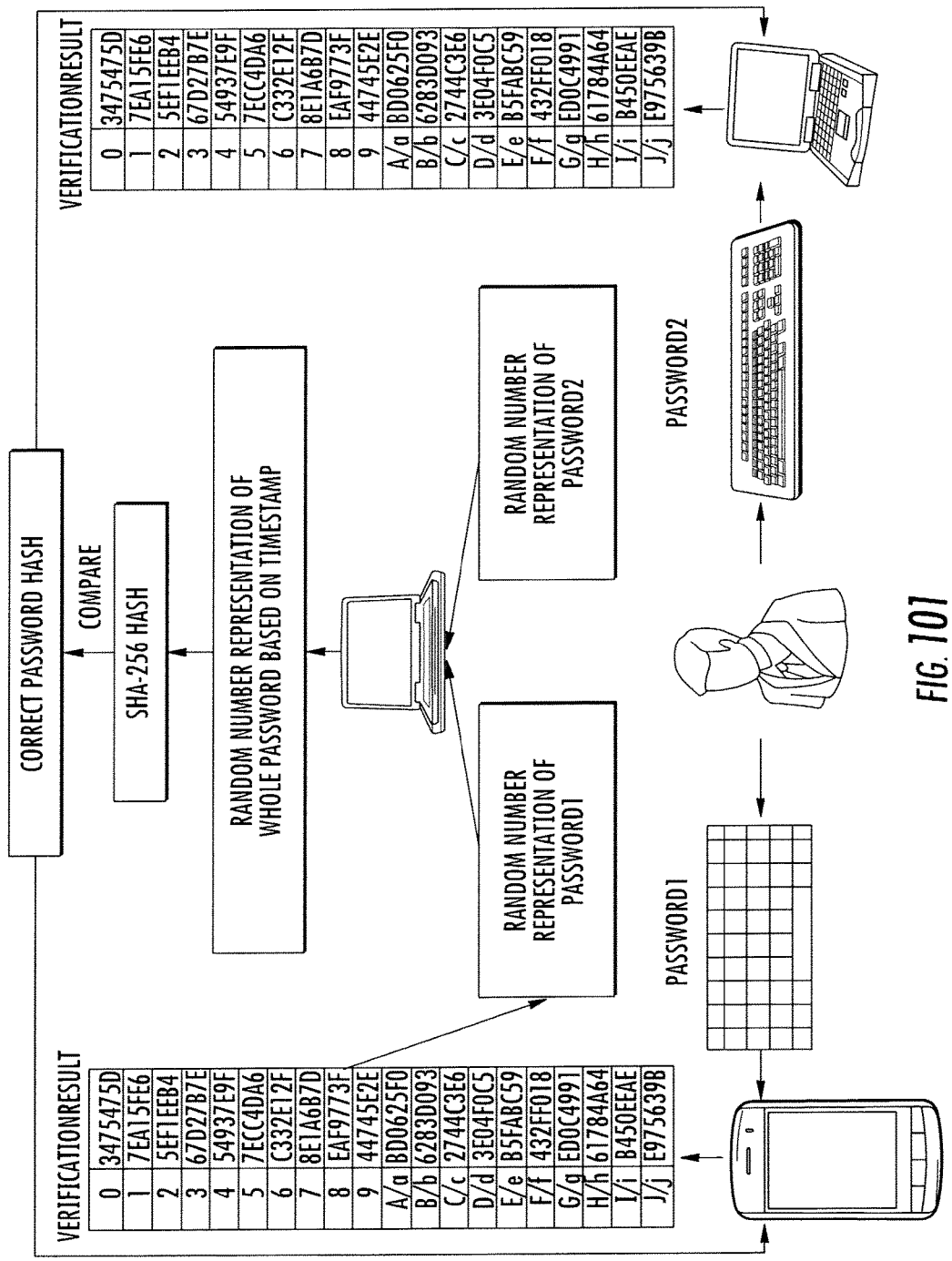
FIG. 101 depicts the overall logon system process in accordance with the present disclosure.

FIG. 101 depicts the overall logon system process. The random number sequence representation of a correct password is combined and the hash value is stored on the server. For example, if the password is "sun", the random number sequence representation of each digit may be s—"61784a64", u—"e975639b", n—"2744c3e8", and the random number representation of password is "61784a64e975639b2744c3e8" of which the SHA-256 hash value is stored on the server. Every time the user logs on, the input password may be transferred into random sequences representation which is sent to the server, and the hash value may be generated and compared to stored correct one.

Each digit of password may be input alternately on the Android phone and the client PC, and at the same time each of the digits may be mapped into a random number sequence of a certain length and sent to the server for verification. On the server side, the SHA-256 hash value of correct random number sequence is compared to the hash value of received random number sequence. The result of the comparison is sent back to the PC and Android for the next operation. If the result is correct, then the confirmation signal may be sent back to the PC and the Android device, and the cryptographic processing interface will may be displayed. If the result is wrong, then a system exit signal may be sent and the error message may be given.

In exemplary implementations in accordance with the present disclosure, enhanced security is provided by selecting Advanced Encryption Standard (AES) as the encryption-decryption scheme. AES provides a robust replacement for the Data Encryption Standard (DES) and to a lesser degree Triple DES. AES supports key sizes of 128, 192 and 256 bits. It is implementable in hardware and software, as well as in restricted environments (for example, in a smart card) and offers good defenses against various attack techniques. Until May 2009, the only successful published attacks against the full AES were side-channel attacks on some specific implementations. The design and strength of all key lengths of the AES algorithm (i.e., 128, 192 and 256) are sufficient to protect classified information up to the SECRET level. TOP SECRET information will require use of either the 192 or 256 key lengths.

Figure 102:
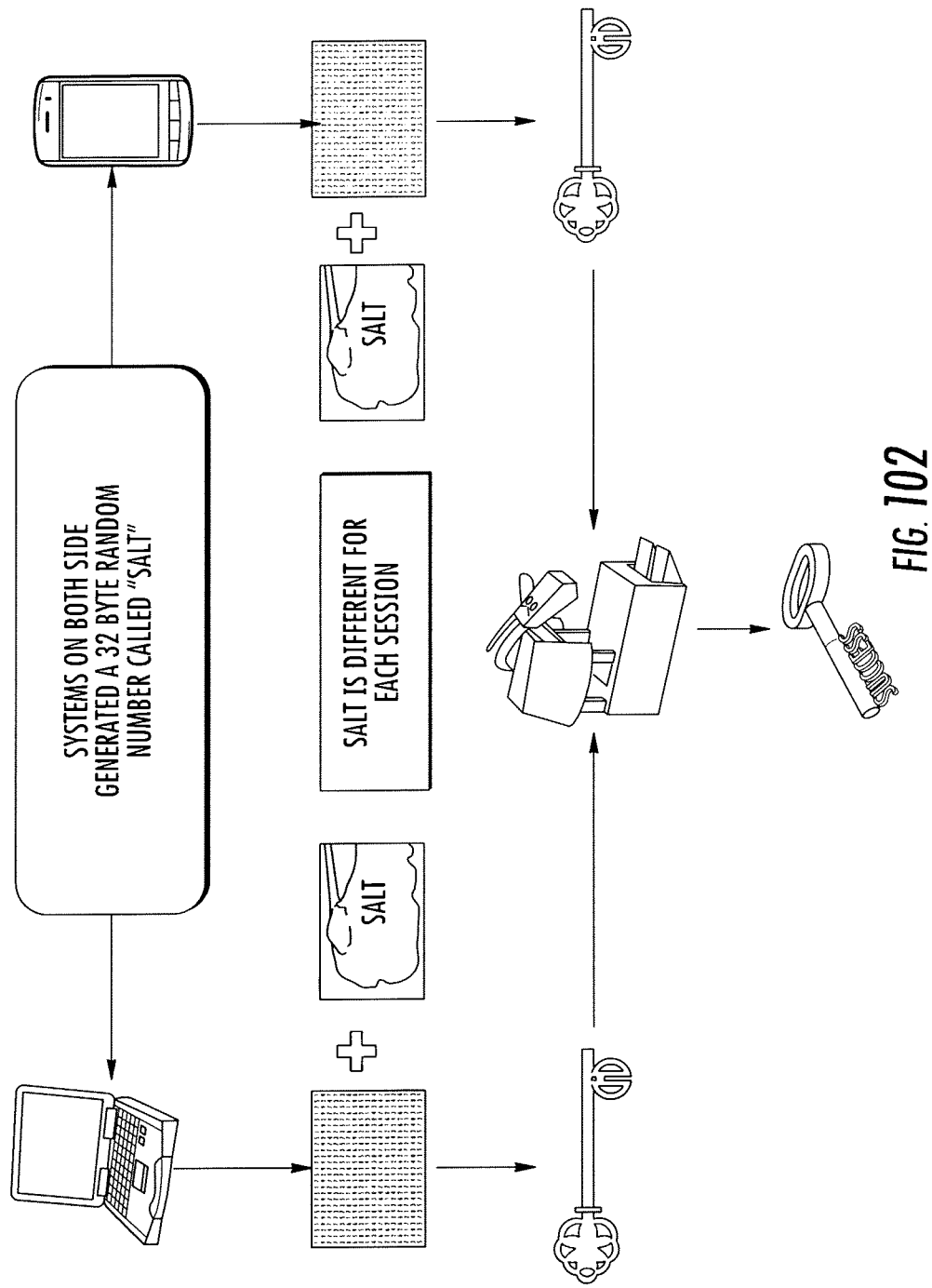
FIG. 102 shows an exemplary process for deriving a master key in accordance with the present disclosure.

FIG. 102 shows an exemplary process for deriving a master key. In accordance with this exemplary implementation, 256 key lengths are used to get better security. In addition, the random salt is added to play against brute force attack. To add more security, the generation of the index file encryption key, which is named the master key, is specially designed.

The generation of a master key has two operations in this illustrative embodiment. First, the Android phone and the client PC will both generate an AES key based on password and random salts. Then the Android phone generated AES key may be sent to the client PC and the two AES keys will derive a master key by an XORing operation.

After the master has been generated, the encryption process can take place. To offer protection from side channel attacks, disclosed embodiments use GCM mode operation. Galois/Counter Mode (GCM) is a block cipher mode of operation that uses universal hashing over a binary Galois field to provide authenticated encryption. GCM was designed originally as a way of supporting very high data rates, since it can take advantage of pipelining and parallel processing techniques to bypass the normal limits imposed by feedback MAC algorithms. This allows authenticated encryption at data rates of many tens of Gbps, permitting high grade encryption and authentication on systems which previously could not be fully protected. Software implementations can achieve enhanced performance by using table-driven field operations. AES-GCM is an authenticated encryption algorithm designed to provide both authentication and privacy. The AES-GCM mode has four inputs and two outputs: inputs: Secret Key, Initialization Vector IV, Plaintext and Additional Authenticated Data; and Outputs: Cipher text and Authentication Tag.

Figure 103:
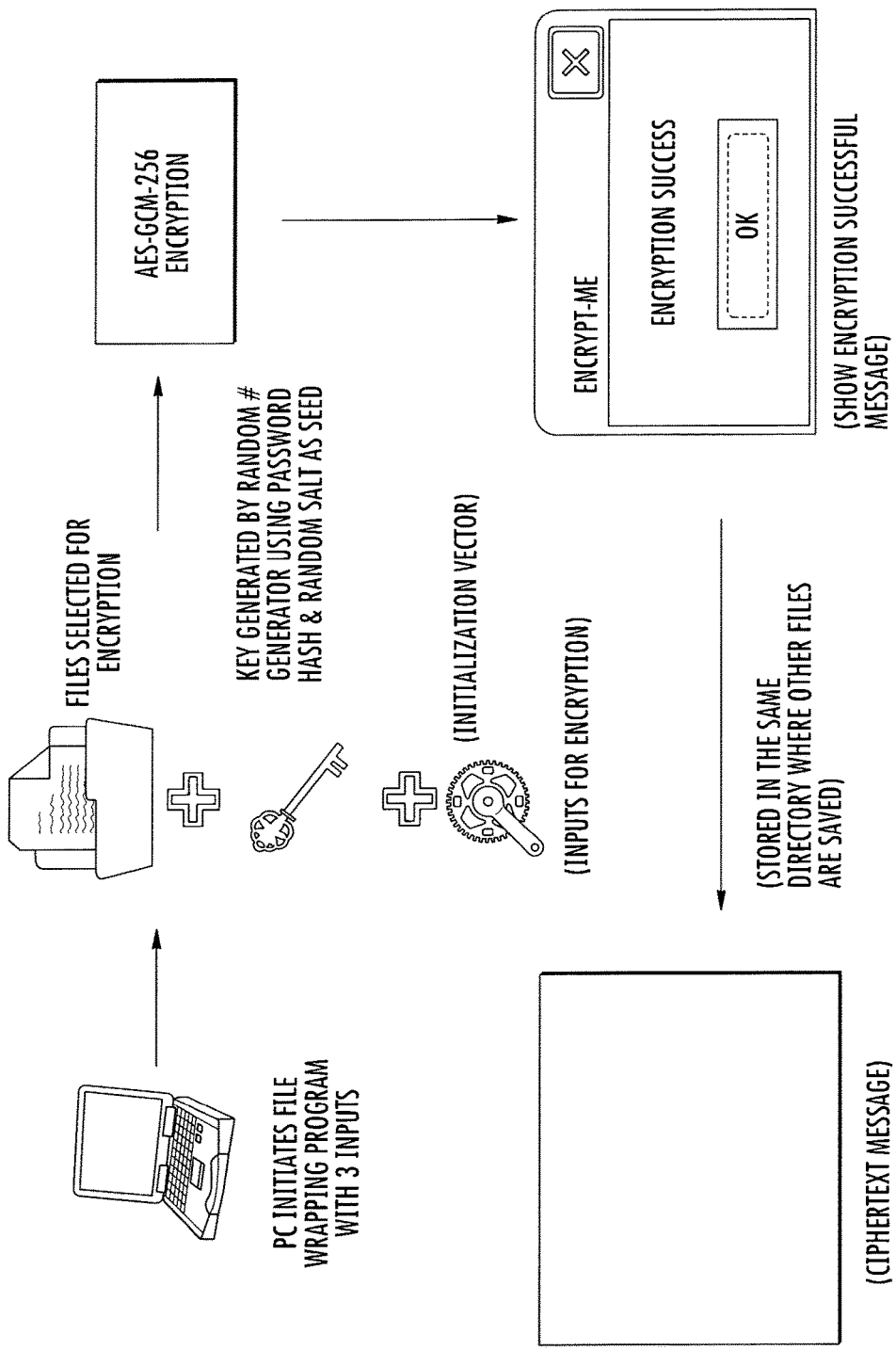
FIG. 103 shows an encryption process in accordance with the present disclosure in accordance with the present disclosure.

FIG. 103 shows an encryption process in accordance with the present disclosure.

According to exemplary implementations in accordance with the present disclosure, a file splitting and merging scheme can further defeat the attacker trying to access the full information. Only the owner of files knows where the pieces are and can recover them.

Figure 104:
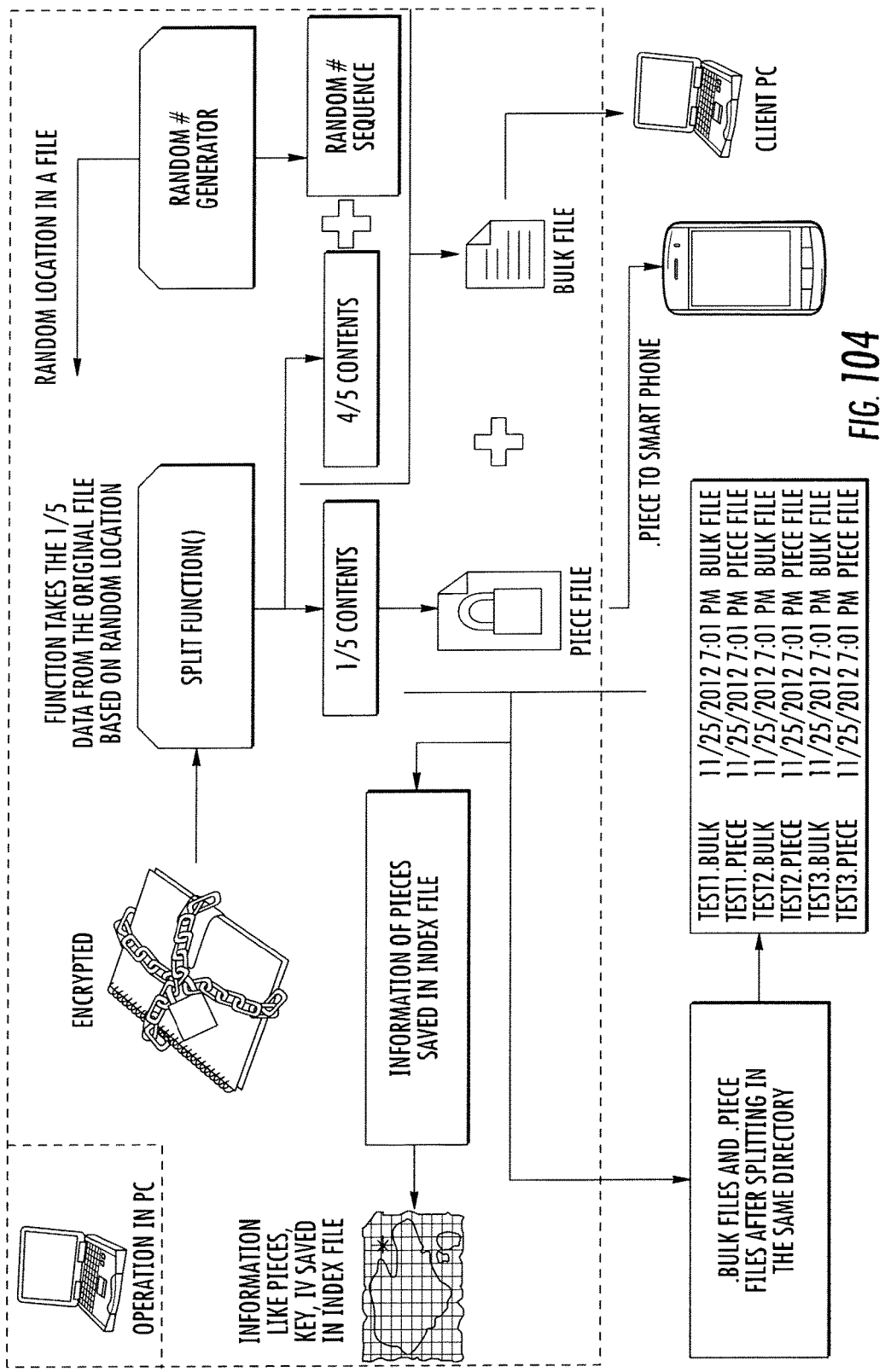
FIG. 104 shows a splitting process in accordance with the present disclosure.
Figure 105:
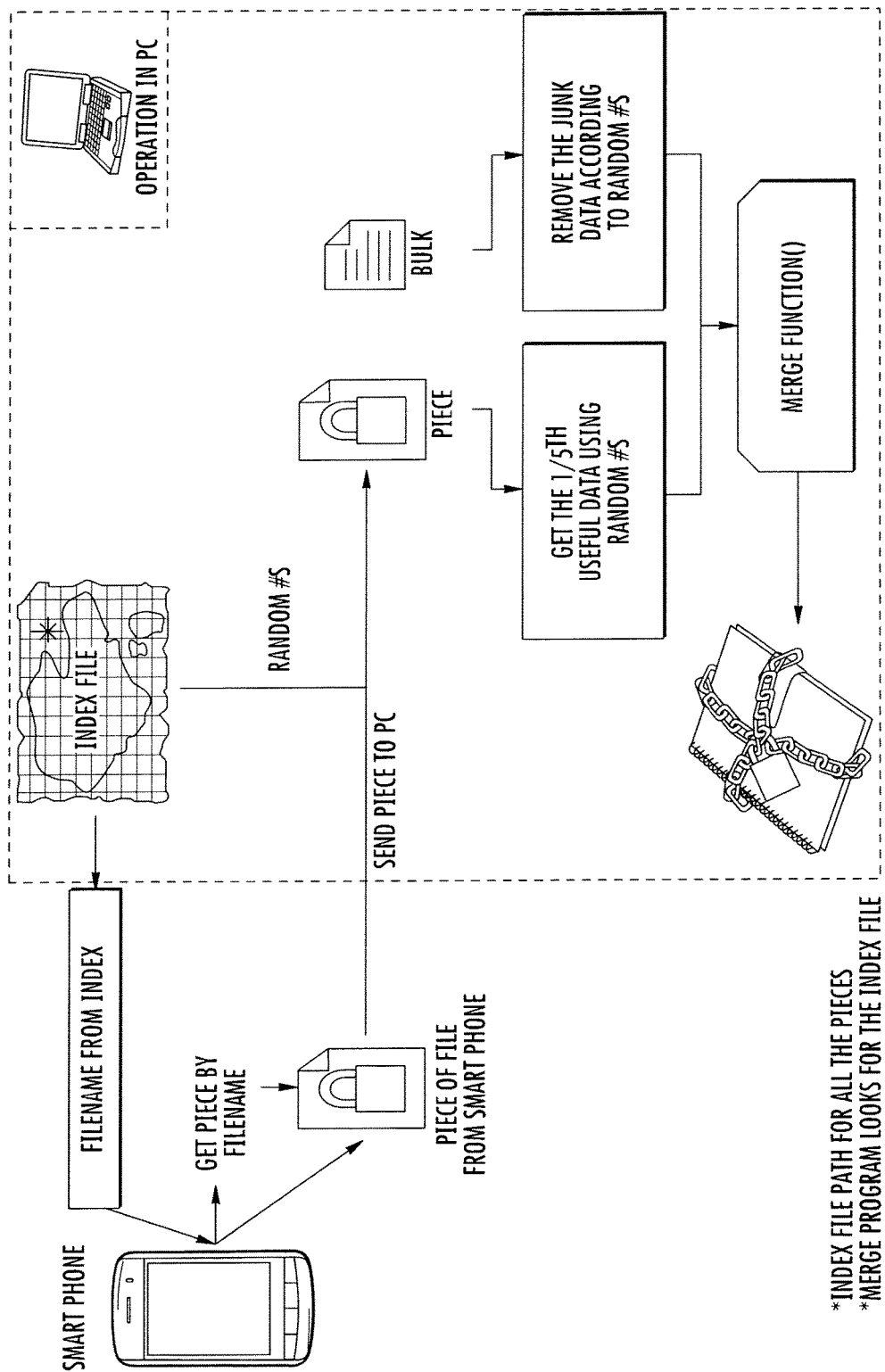
FIG. 105 shows a merging process in accordance with the present disclosure.

FIG. 104 shows a splitting process. FIG. 105 shows a merging process. In accordance with the present disclosure, the splitting-merging program is used twice. First, after the files are encrypted by AES-GCM, the encrypted file may be split into .piece file and .bulk file and then the .piece file may be sent to the Android phone for storage and the .bulk file may be saved on the client PC. The paths to the .piece and .bulk file and the key for encryption are recorded in index file. Then for the second time, the index file may be encrypted using a new AES key and the encrypted file may be split into .piece file and .bulk file. The new AES key may be bound to TPM. The .piece file may be sent to the server for storage and the .bulk file may be stored on the client PC. In the decryption process, the program will do the inverse operation. The index file may be merged first and then decrypted. After that, the file pieces can be merged together and decrypted according to the index file.

Figure 106:
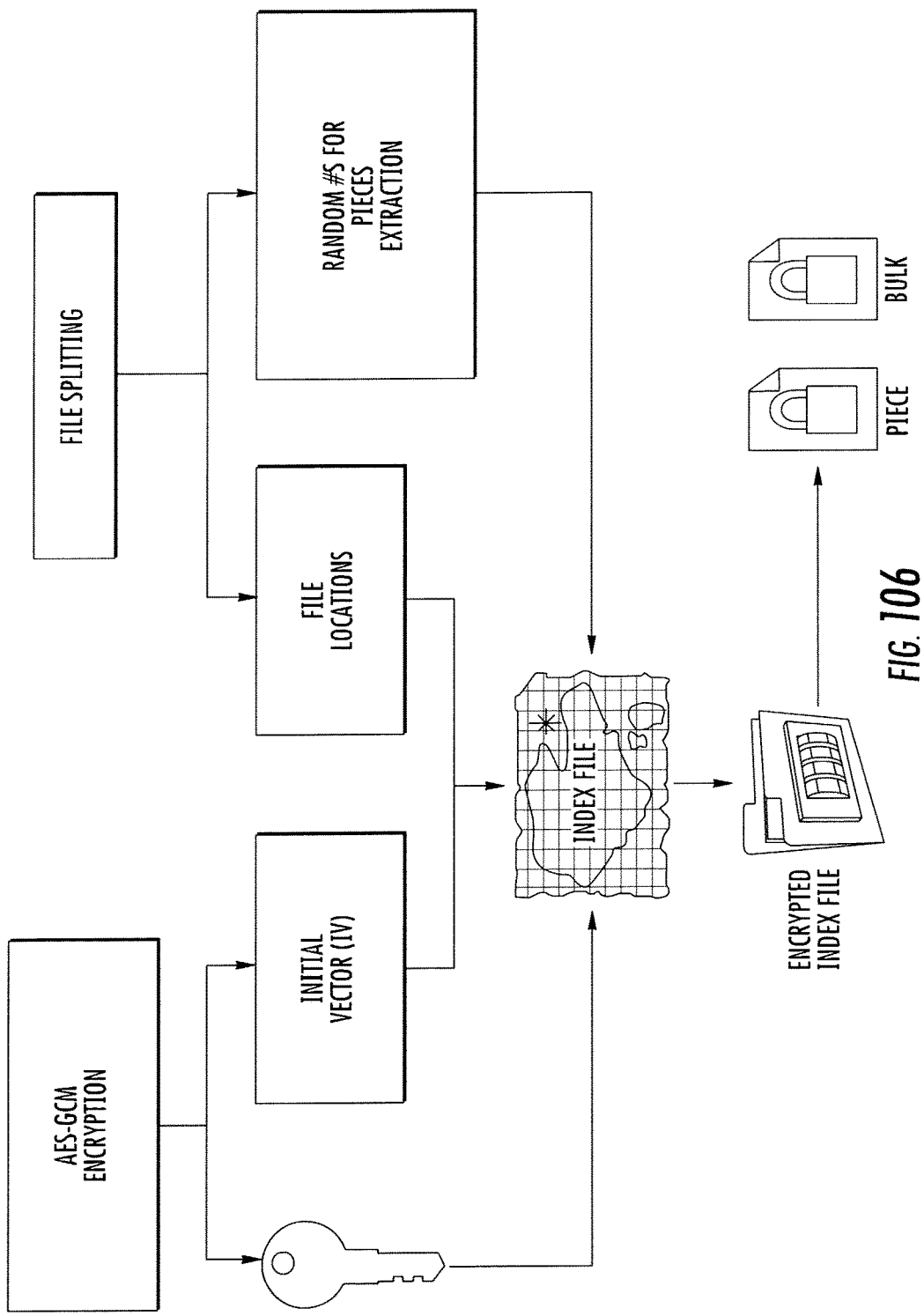
FIG. 106 shows the generation of an index file in accordance with the present disclosure.

FIG. 106 shows the generation of an index file. During the file encryption and split processes, the index file is created as a reference for future unprotection. The index file contains the location for files, file encryption keys, and IVs, random numbers for pieces extraction location. After the file encryption and split processes, the index file is also completed. Then the index file is encrypted by AES-GCM and finally split into pieces.

Figure 107:
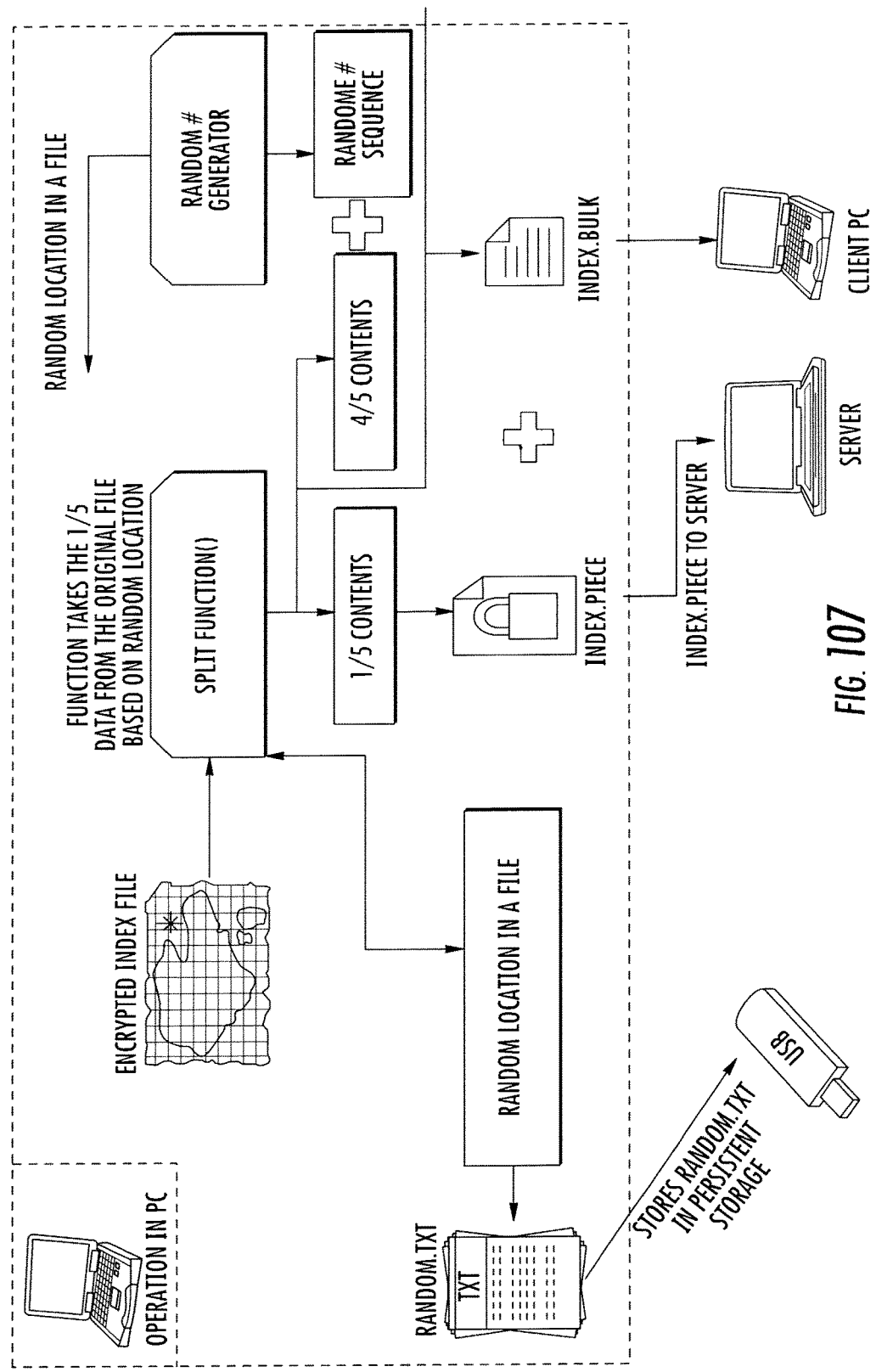
FIG. 107 shows index file splitting in accordance with the present disclosure.
Figure 108:
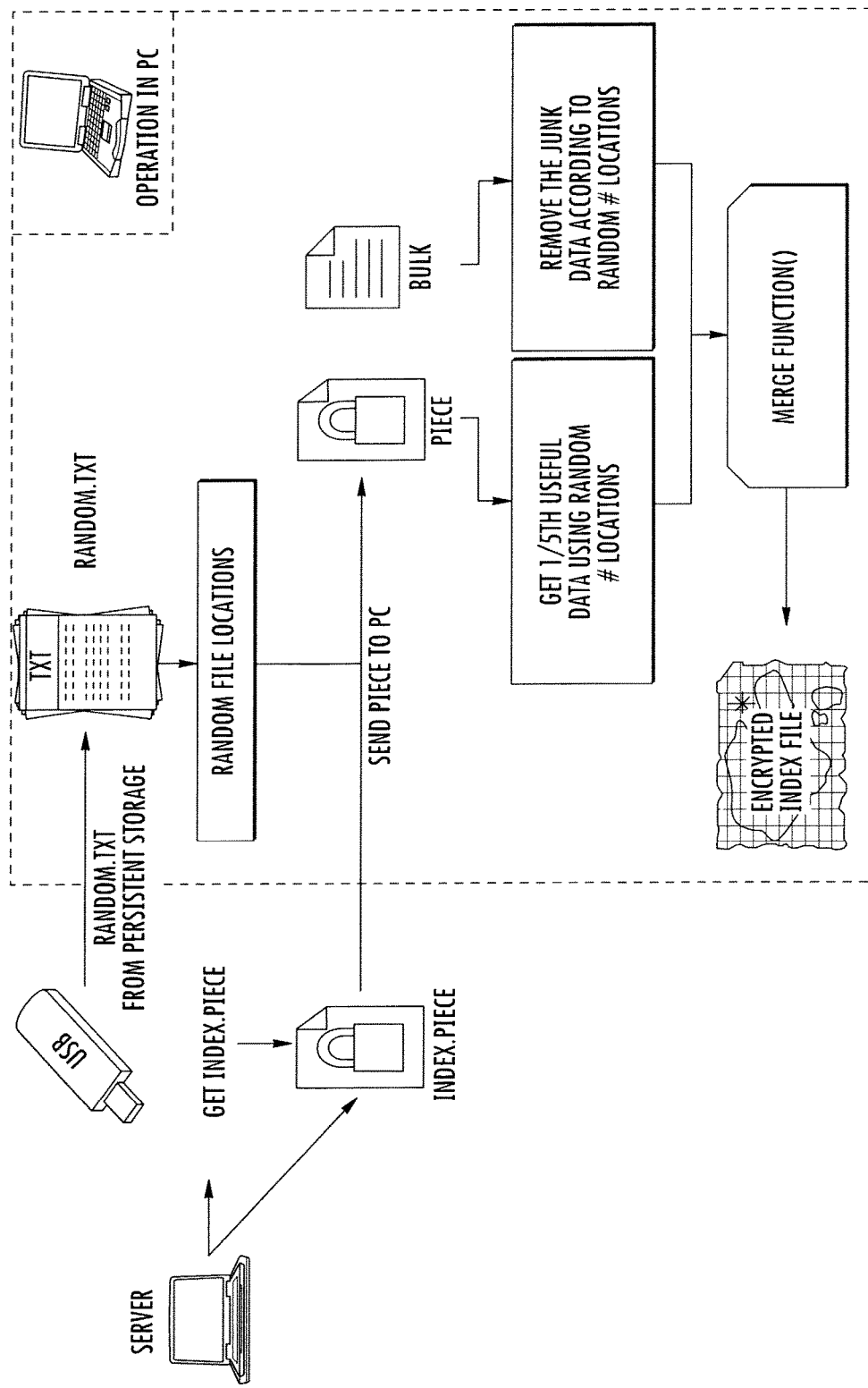
FIG. 108 shows index file merging in accordance with the present disclosure.
Figure 109:
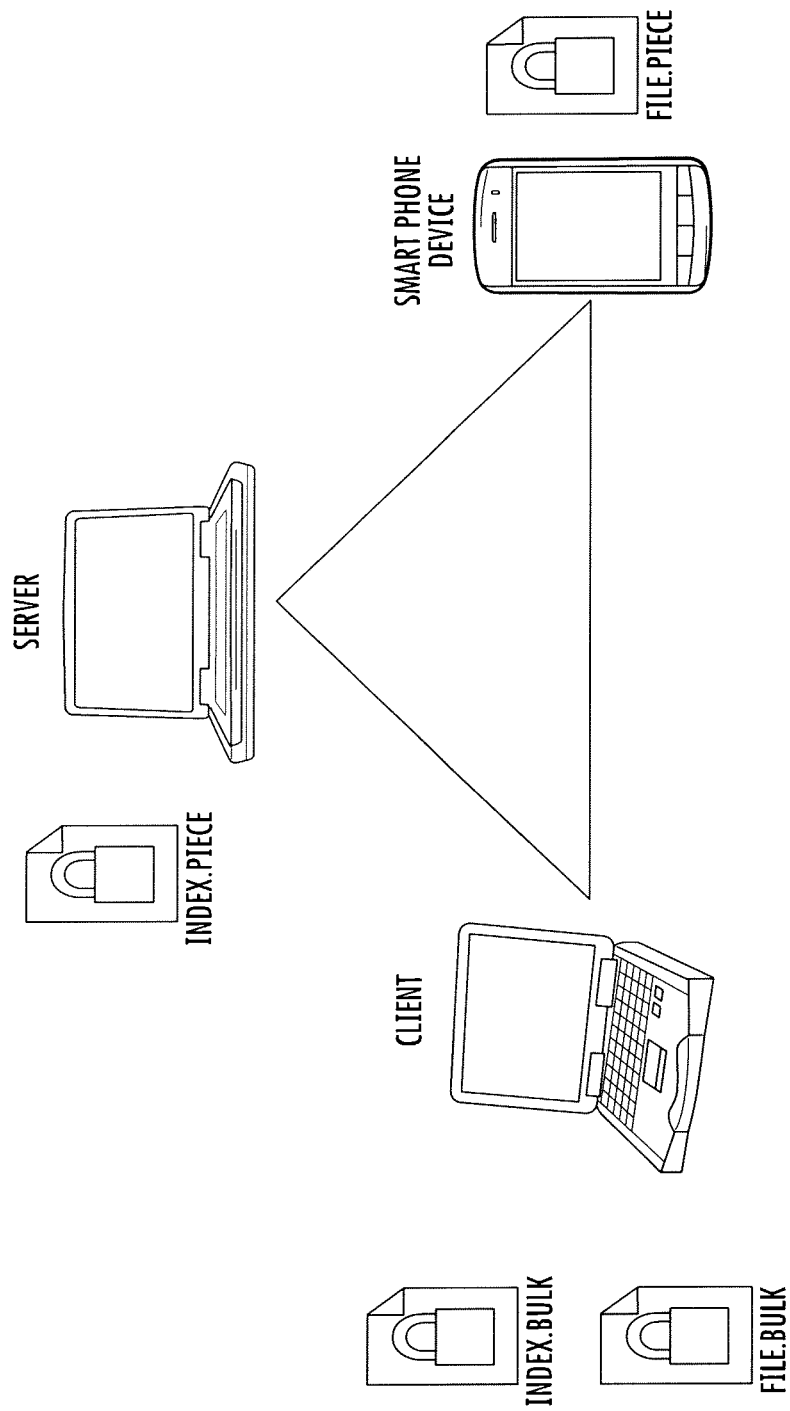
FIG. 109 shows that after the index file encryption and split processes, file pieces and index file pieces will be distributed on the server, the client PC and the Android Device in accordance with the present disclosure.

FIG. 107 shows index file splitting.
FIG. 108 shows index file merging.
FIG. 109 shows that after the index file encryption and split processes, file pieces and index file pieces are distributed on the server, the client PC and the Android Device.

Figure 110:
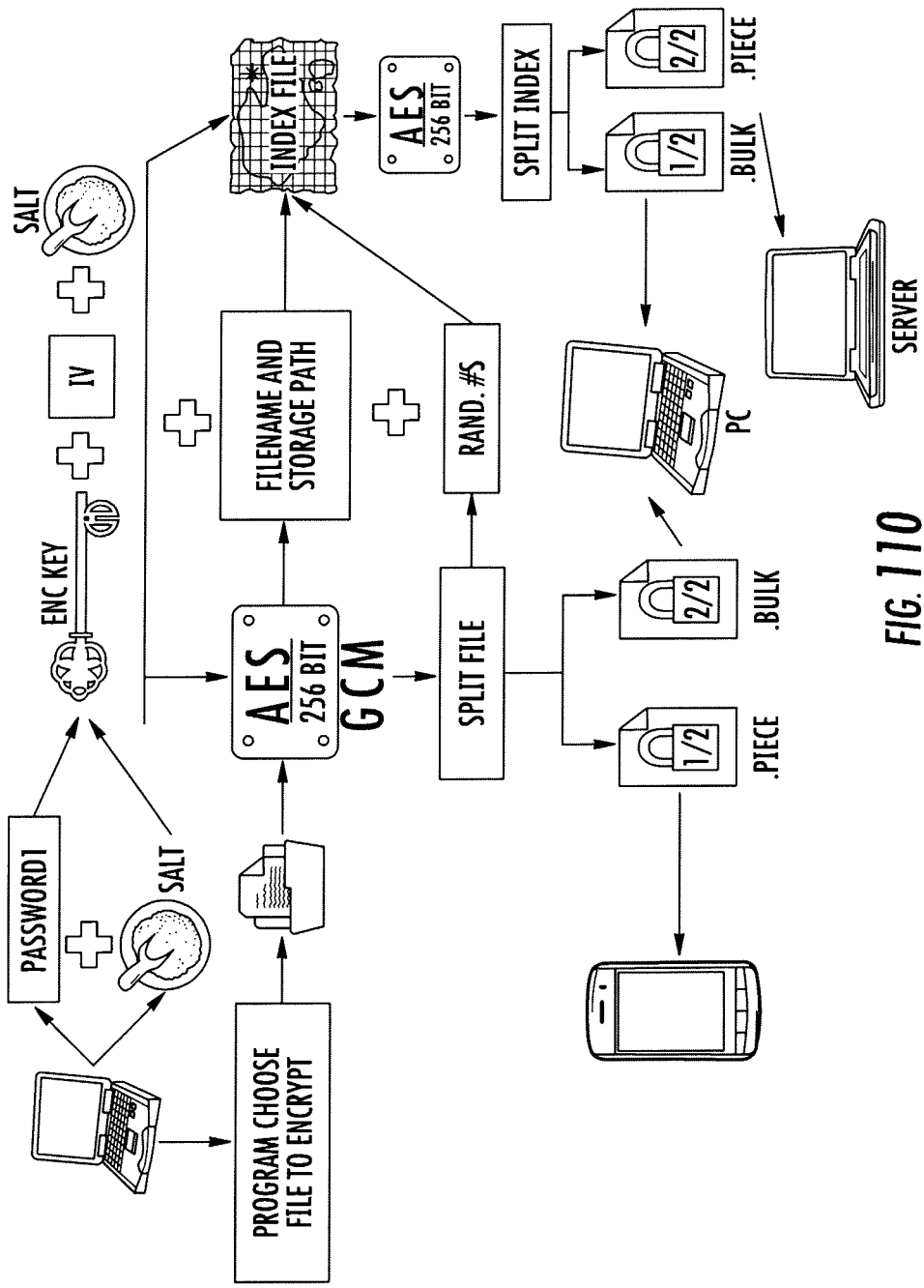
FIG. 110 shows a depiction of the encryption-splitting process in accordance with the present disclosure.
Figure 111:
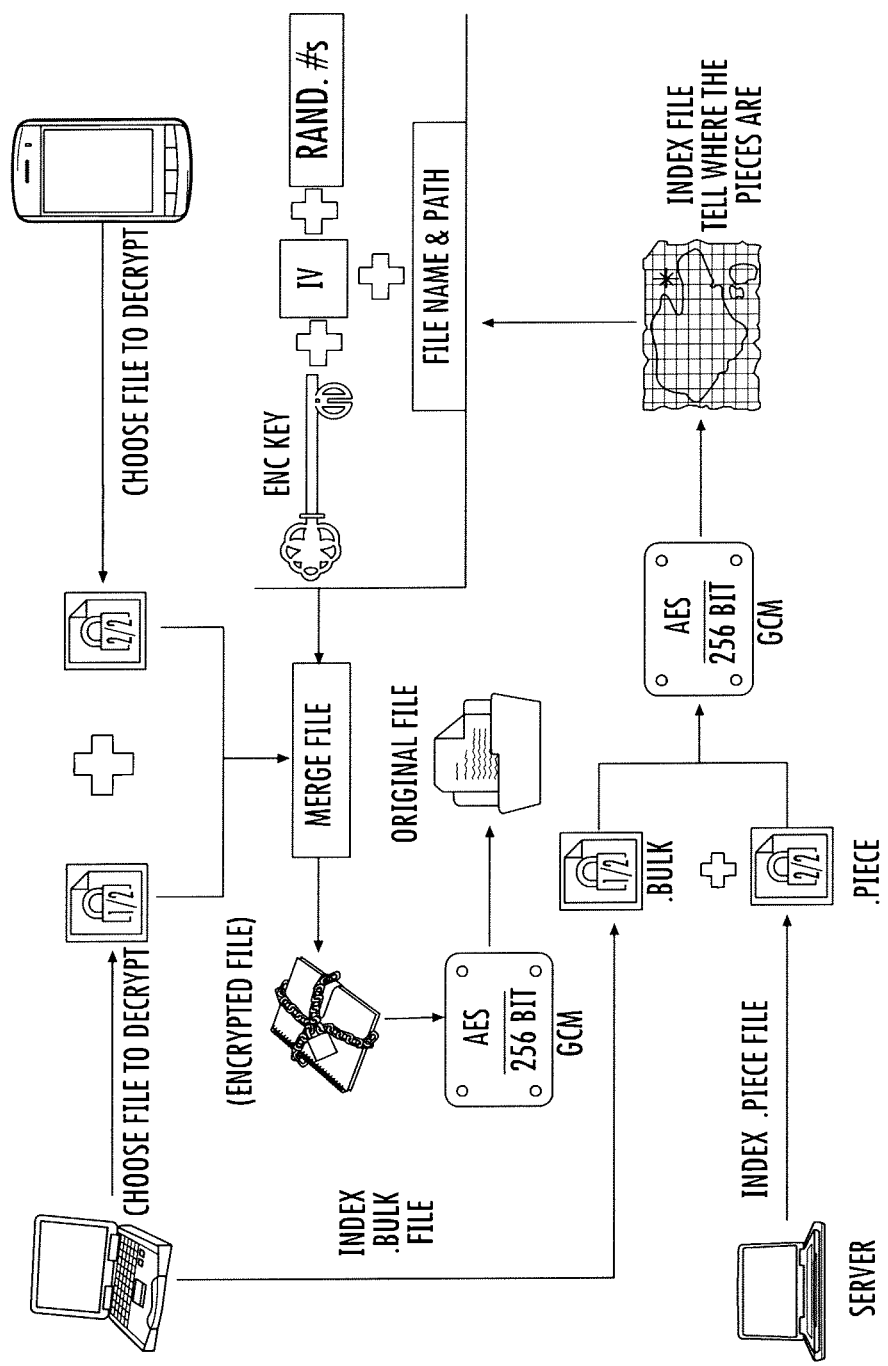
FIG. 111 shows a depiction of the merging-decryption process in accordance with the present disclosure.

FIG. 110 shows a depiction of the encryption-splitting process. FIG. 111 shows a depiction of the merging-decryption process. The AES-GCM program and the file splitting-merging program work mutually with each other. They both are used twice. First, after the targeted files are encrypted by AES-GCM program, then the encrypted file is split and the file pieces are distributed to the Android Device and PC as well as datacenter servers. Then, the index file will be encrypted and split into pieces and then distributed to server and the client PC as well as datacenter servers. The decryption-merging process is generally an inverse process. The mutated ciphertext is resistant to crypto side-channel attacks.

After the index file is encrypted and split, the index file encryption key may be left relatively unprotected. The storage and protection of the key is potentially problematic for the security software that resides only on the software process, the cryptographic keys can only be stored on the hard drive which means that running that whole security process in software is akin to leaving a spare front door key somewhere in the yard—one is relying on being able to think of a key-sized hiding place that a burglar won't find. Thus, a hardware security feature is introduced in systems in accordance with the present disclosure.

A Trusted Platform (TP) may include a computing platform that has a trusted component, which is used to create a foundation of trust for software processes. TPM provides the root of trust for identity based on the endorsement key inside which was created uniquely by manufacturer and can never be read or modified. Based on the root of trust, a tree of trust, which is the name for key infrastructure inside TPM, can be created inside TPM which was protected from the vicious attack from any software outside. At the root of the trust tree is the Storage Root Key (SRK), and any new created keys can be protected by SRK or previous created key, all the keys can only be used inside TPM by authenticated user based on the settings. That means the TPM provide a reference point for protection.

Figure 112:
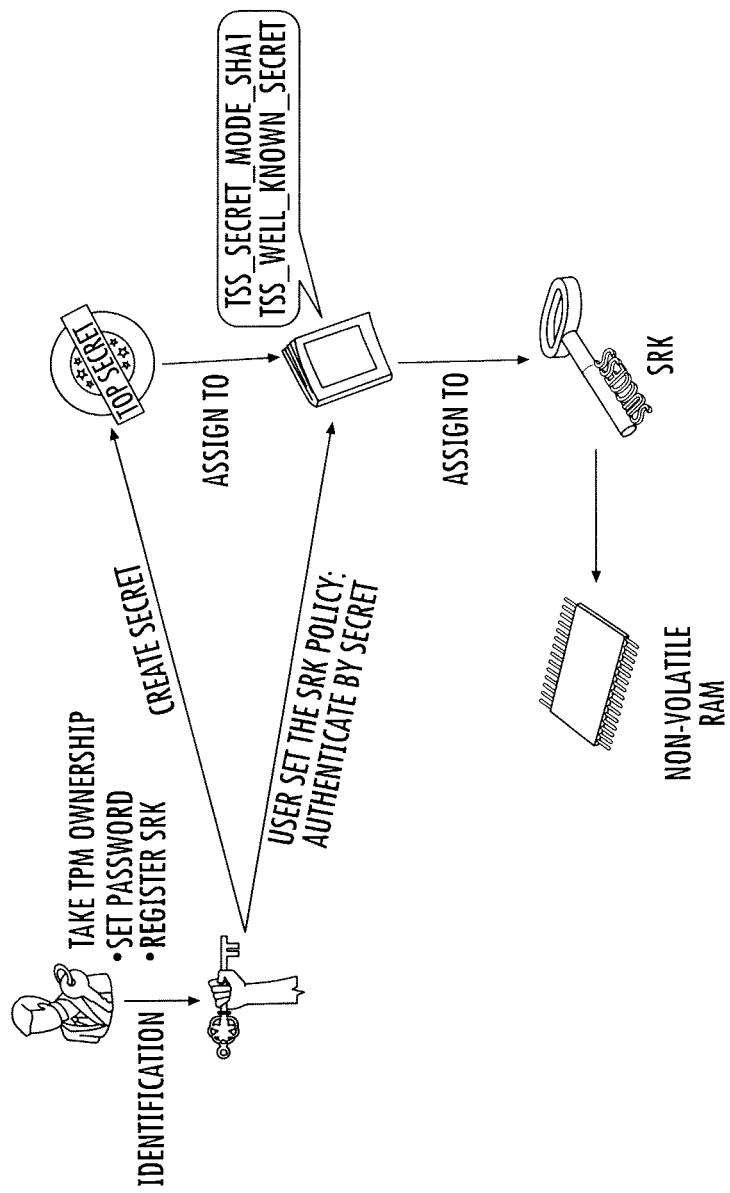
FIG. 112 shows the protection of the Storage Root Key in accordance with the present disclosure.

FIG. 112 shows the protection of the Storage Root Key. As the root of the trust tree, the Storage Root Key should be well protected. First, it is stored inside TPM in the NVRAM and not taken out of TPM. Second, to use it, a user will identify the ownership and insert the usage secret.

In accordance with the present disclosures, based on these features of TPM, the disclosed systems utilize the binding function of TPM. Binding generally includes the operation of encrypting a message using a public key. That is, the sender uses the public key of the intended recipient to encrypt the message. The message is only recoverable by decryption using the recipient's private key. When the private key is managed by the TPM as a non-migratable key only the TPM that created the key may use it. Hence, a message is encrypted with the public key, "bound" to a particular instance of a TPM. In accordance with the present disclosure, after the index file was encrypted, the index file encryption key is finally bound to TPM by using TPM generated 2048 bits RSA binding key, and this binding key is further protected by SRK inside TPM.

The TPM generates cryptographic keys but due to the low cost nature the internal memory (i.e. number of key slots) is limited. Nevertheless applications might need to store keys permanently. With the key management component of the TSS it is possible to store keys in a persistent storage (file system) outside the TPM encrypted under a parent key. To do so the user must provide this parent key before the TPM can create a new key pair. Before the TPM writes to the persistent storage it encrypts the new private key under its parent key to ensure that no unencrypted key leaves the TPM.

The root of the key hierarchy is the storage root key (SRK) which is generated at taking ownership and then stored inside the TPM permanently.

In the creation of binding key, disclosed systems may assign a (possibly globally) unique identifier called UUID to the key and register the key with the UUID. Then the key blobs are stored in the persistent storage in the OS file system. Later the program can use this UUID as reference to the requested key. The disclosed systems may also assign an unmigratable policy to the key object which means the key can never been migrated and can only be used by this specific TPM.

Figure 113:
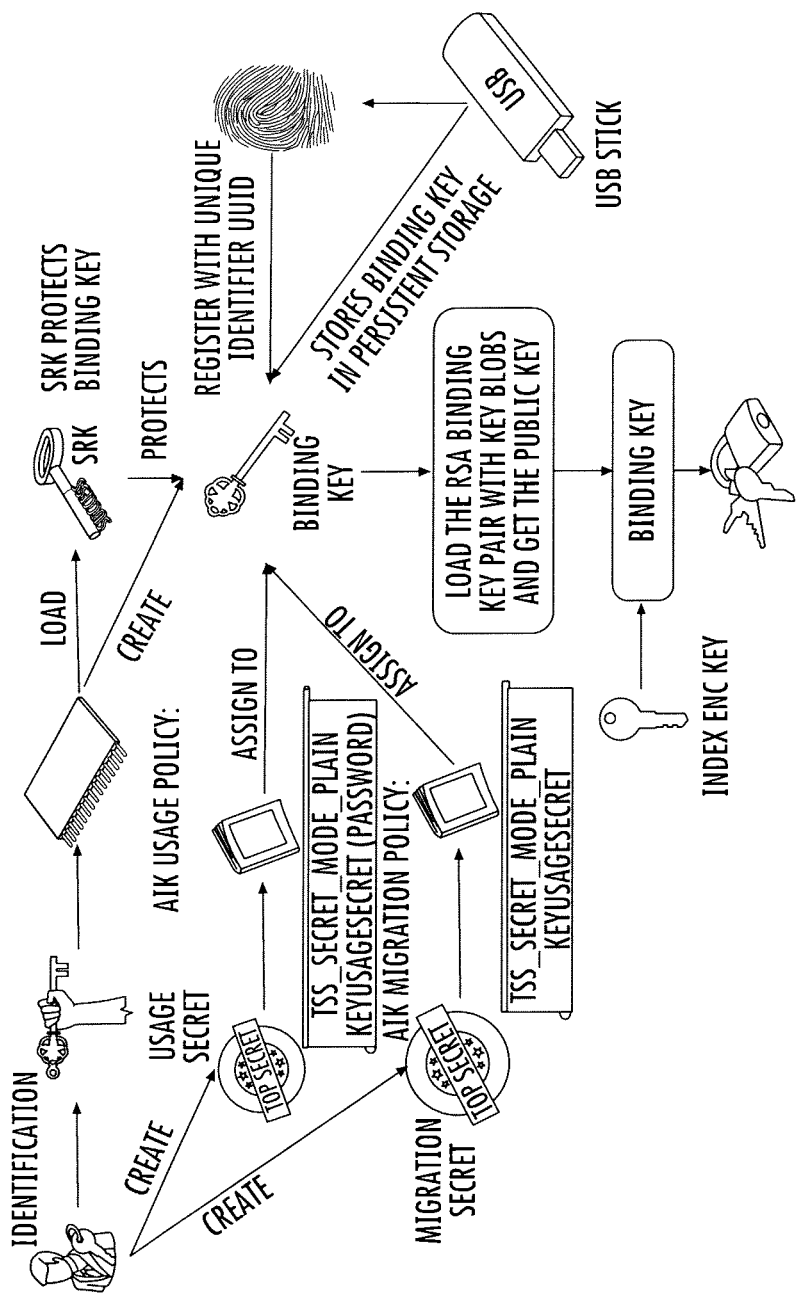
FIG. 113 shows the operations of binding key creation and key binding process inside TPM in accordance with the present disclosure.

FIG. 113 shows the operations of binding key creation and key binding process inside TPM.

Figure 114:
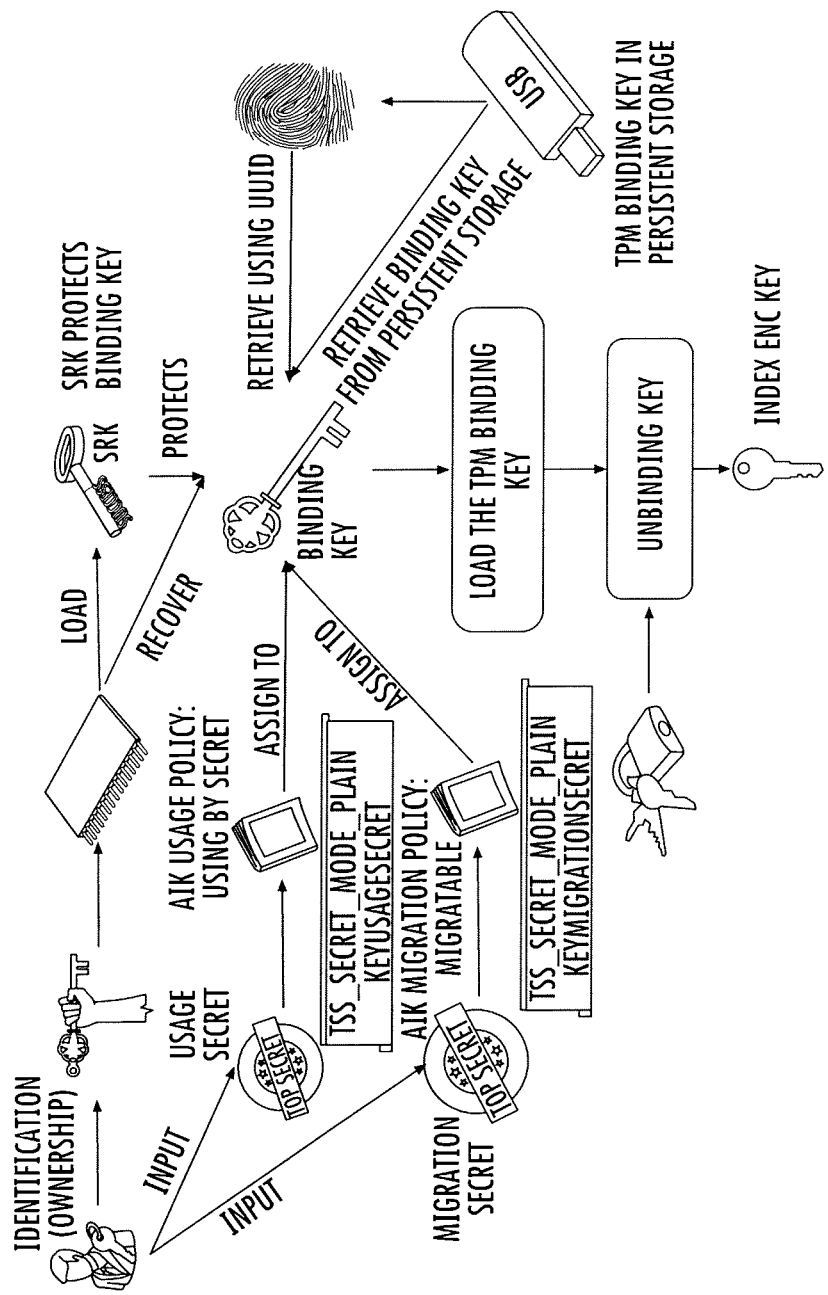
FIG. 114 shows TPM key unbinding process in the unprotection process in accordance with the present disclosure.

FIG. 114 shows TPM key unbinding process in the unprotection process.

As explained above, TPM is based on root of trust. That is, much of the value (or trust) associated with the TPM comes from the fact that the EK is unique and that it is protected within the TPM at all times. This property is certified by the Endorsement Certificate (Cert).

The Endorsement Key (EK) is a public/private key-pair. The size of the key-pair will generally have a modulus (a.k.a. key size) of 2048 bits. The private component of the key-pair is generated within the TPM by manufacturer and is never exposed outside the TPM. TPM manufacturers will provide the endorsement key pair and store this in tamper resistant non-volatile memory before shipping the TPM. A certificate, or endorsement credential, can then be created which contains the public EK and information about the security properties of the TPM. The EK is unique to the particular TPM and therefore the particular platform which supports for the root of trust. Based on these features, TPM can be used to provide identity authentication.

To add another layer of security to the disclosed systems, a specific server-client authentication scheme may be used utilizing the client PC equipped TPM. Generally, in the decryption process, the server stored index .piece file will not be sent back to client unless the TPM identity has been authenticated. Implementations in accordance with the present disclosure can prevent the attacker trying to bypass the protection of TPM and recover the index file. The exemplary features providing for such a design discussed below.

Figure 115:
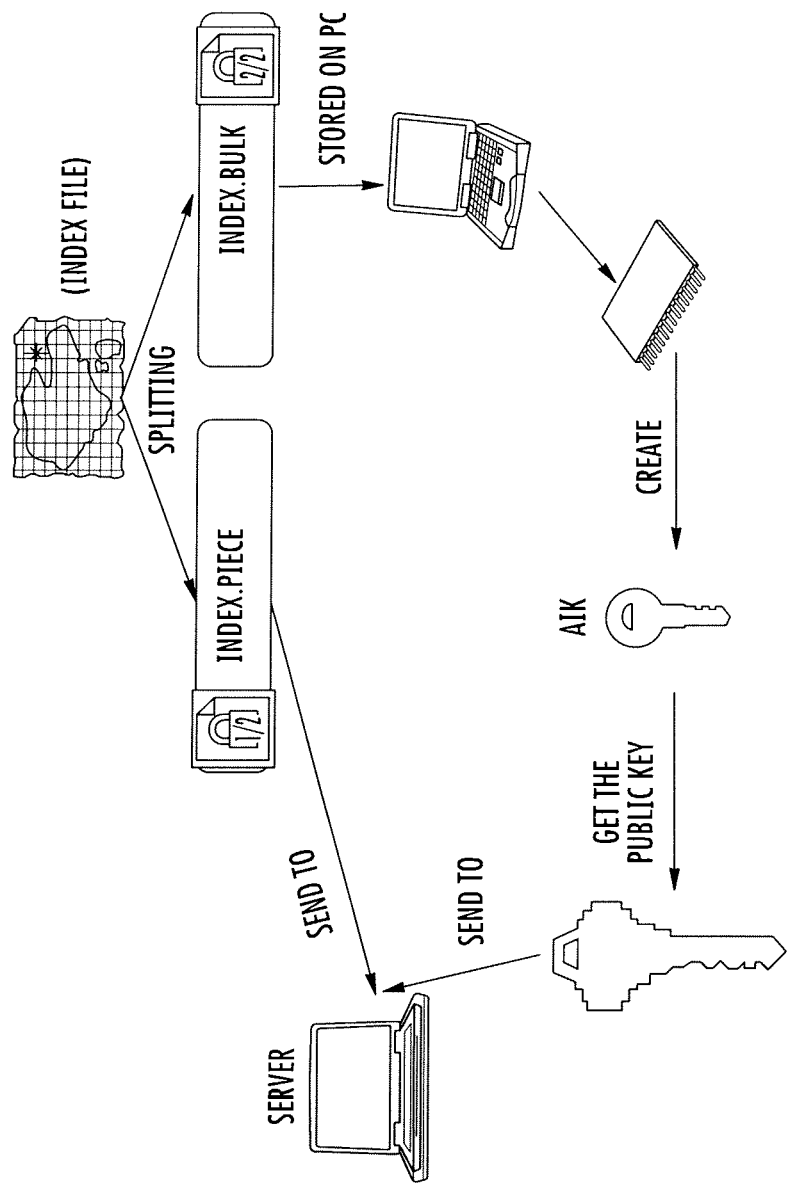
FIG. 115 shows an AIK generation and broadcast methodology in accordance with the present disclosure.

FIG. 115 shows an AIK generation and broadcast methodology. In the encryption process, after the index file was encrypted and split into .piece and .bulk file, the .piece file would be send to the server for storage. Then an Attestation Identity Key (AIK) pair is generated by TPM and the public key is broadcast to the server.

In certain implementations, the AIK is kept in secret and unique to represent the user and TPM. First, it is created as the 2048 bits RSA key. Second, it is protected by the SRK which is the root of the trust tree. Third, it is registered with a unique identifier UUID and both the UUID and AIK is saved on persistent storage, e.g., a USB stick or a Hard Drive, so only the user possesses them. Finally, the usage policy with secret and migration policy is assigned to AIK. As illustrated above, FIG. 98 depicts how AIK is protected.

In the decryption process, the identity authentication may take place first between server and client before the index .piece file can be sent back to the client PC, according to the following operations.

a) Server uses the random number generator program, which use the system time as seed, to generate a new nonce. At the same time, TPM utilizes the inside random number generator to generate a new nonce.

b) Server and client both send the new generated nonce to each other.

c) Both the server and client use the self-generated nonce to XOR the received nonce to get new XORed nonce, and then generate the SHA-1 hash value of it on both server and client.

d) TPM retrieves the AIK based on the UUID and signs on the hash value using the private part of AIK, and then sends the signature to server for verification.

e) Server receives the signature, and then uses the saved public key and generated hash value to verify the signature, and the result is sent back to client for next operations.

Figure 116:
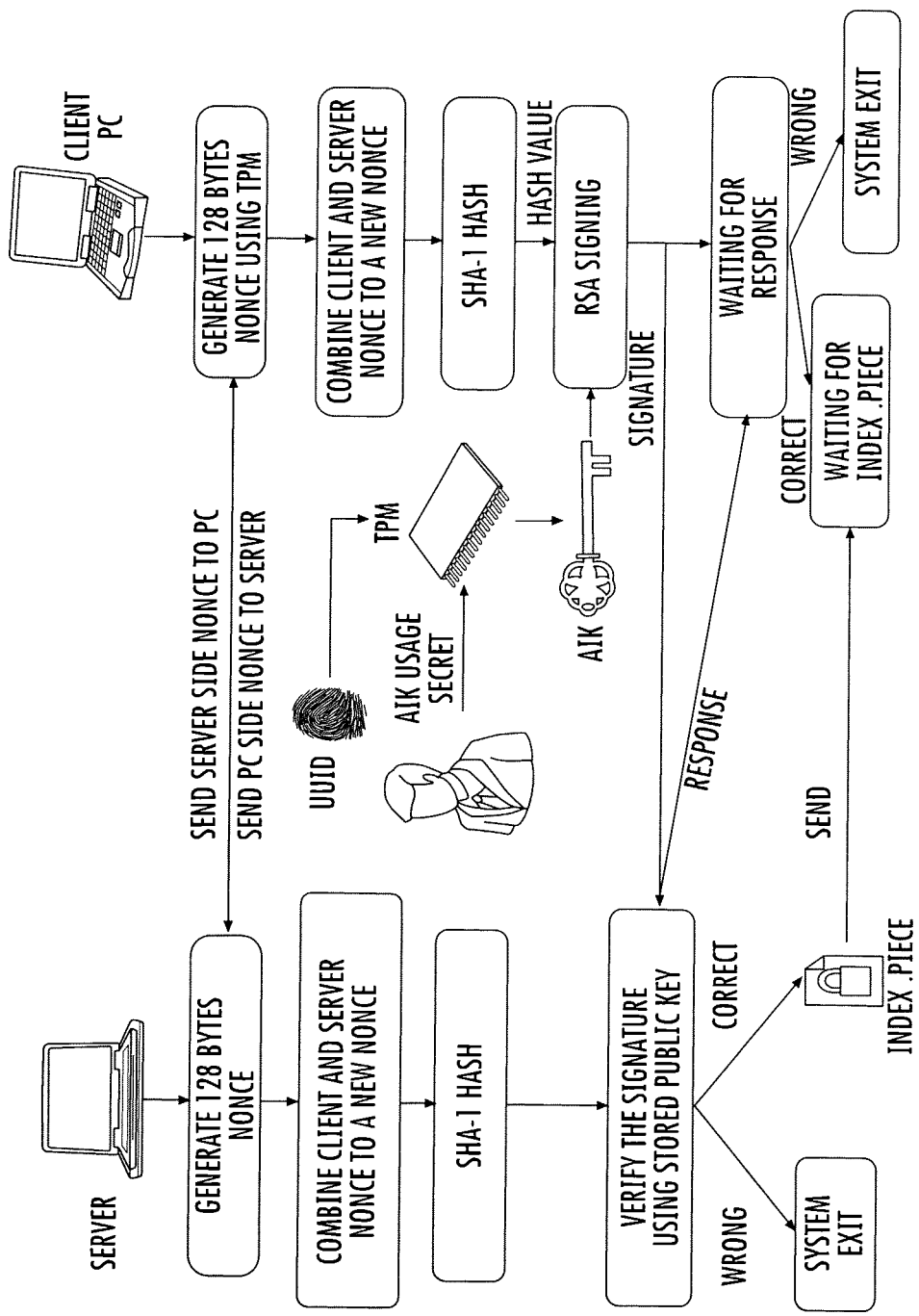
FIG. 116 shows a diagram of an identity attestation process in accordance with the present disclosure.

FIG. 116 shows a diagram of an identity attestation process.

The Trusted Computing Group (TCG) publishes specifications defining architectures, functions and interfaces that provide a baseline for a wide variety of computing platform implementations. Additionally, the TCG will publish specifications describing specific platform implementations such as the personal computer, PDA, cellular telephones and other computing equipment.

A Trusted Platform may include a computing platform that has a trusted component, sometimes in the form of built-in hardware, which it uses to create a foundation of trust for software processes. Platforms based on the TCG specifications will generally meet functional and reliability standards that allow increased assurances of trust. The TCG will publish evaluation criteria and platform specific profiles that may be used as a common yard stick for evaluating devices incorporating TCG technology. Achieving improved trust also requires operational integrity of maintenance processes after deployment.

Figure 117:
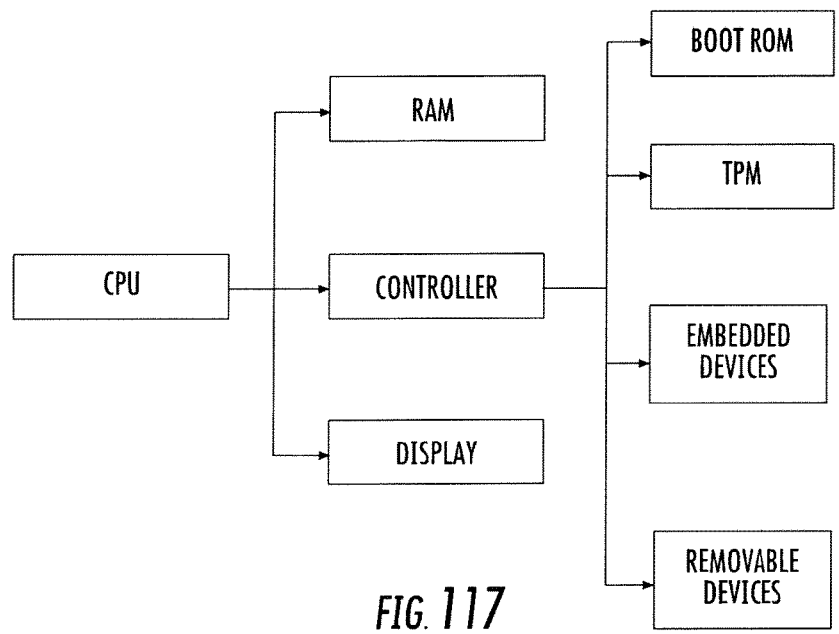
FIG. 117 shows a generic system architecture for a Personal Computer (PC) defined by TCG in accordance with the present disclosure.

FIG. 117 shows a generic system architecture for a PC defined by TCG. The TPM hardware along with its supporting software and firmware provides the platform root of trust. It is able to extend its trust to other parts of the platform by building a tree of trust, where each link extends its trust to the next one. The TPM is basically a secure microcontroller with added cryptographic functionalities. To simplify system integration into the PC platform, the TPM uses the Low Pin Count (LPC) bus interface to attach to the PC chipset.

The TPM provides a set of crypto capabilities that allow certain crypto functions to be executed within the TPM hardware. Hardware and software agents outside of the TPM do not have access to the execution of these crypto functions within the TPM hardware, and as such, can only provide I/O to the TPM.

In case of the PC platform, the hardware TPM is part of the mainboard and may not easily be removed or replaced. It is typically connected to the rest of the system via the LPC bus. The functionality of this hardware device resembles that of a smart card. A tamper resistant casing contains low-level blocks for asymmetric key cryptography, key generation, cryptographic hashing (SHA-1) and random number generation. With these components it is able to keep secret keys protected from any remote attacker. Additional high-level functionality consists of protected non-volatile storage, integrity collection, integrity reporting (attestation) and identity management. TPM is a passive device, a receiver of external commands. It does not measure system activity by itself but rather represents a trust anchor that cannot be forged or manipulated.

Figure 118:
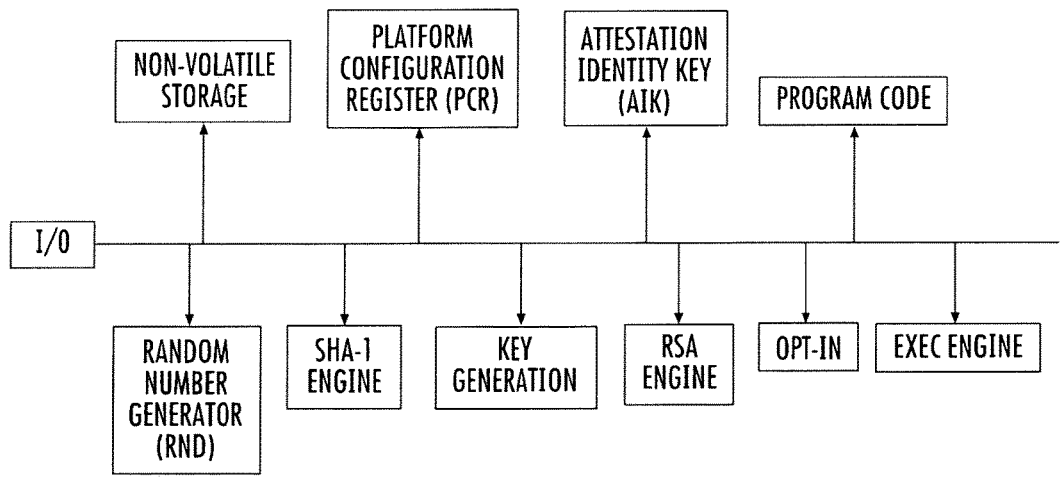
FIG. 118 shows a logical block diagram of a TPM. As a building block of a trusted platform, TPM components are trusted to work properly without additional oversight in accordance with the present disclosure.

FIG. 118 shows a logical block diagram of a TPM. As a building block of a trusted platform, TPM components are trusted to work properly without additional oversight. Trust in these components is derived from good engineering practices, manufacturing process and industry review.

The I/O component manages information flow over the communications bus. It performs protocol encoding/decoding suitable for communication over external and internal buses. It routes messages to appropriate components. The I/O component enforces access policies associated with the Opt-In component as well as other TPM functions requiring access control.

Non-volatile storage is used to store Endorsement Key (EK), Storage Root Key (SRK), owner authorization data and persistent flags. Platform Configuration Registers (PCR) can be implemented in either volatile or non-volatile storage. They are reset at system start or whenever the platform loses power. TCG provides a minimum number of registers to implement (16). Registers 0-7 are reserved for TPM use. Registers 8-15 are available for operating system and application use.

Attestation Identity Keys (AIK) must be persistent, but it is recommended that AIK keys be stored as Blobs in persistent external storage (outside the TPM), rather than stored permanently inside TPM non-volatile storage. TCG hopes TPM implementers will provide ample room for many AIK Blobs to be concurrently loaded into TPM volatile memory as this will speed execution.

Program code contains firmware for measuring platform devices. Logically, this is the Core Root of Trust for Measurement (CRTM). Ideally, the CRTM is contained in the TPM, but implementation decisions may require it be located in other firmware.

The TPM contains a true random-bit generator (RNG) used to seed random number generation. The RNG is used for key generation, nonce creation and to strengthen pass phrase entropy.

A Sha-1 message digest engine is used for computing signatures, creating key Blobs and for general purpose use.

TCG provides the RSA algorithm for use in TPM modules. Its recent release into the public domain combined with its long track record makes it a good candidate for TCG. The RSA key generation engine is used to create signing keys and storage keys. TCG requires a TPM to support RSA keys up to a 2048-bit modulus, and mandates that certain keys (the SRK and AIKs, for example) must have at least a 2048-bit modulus.

An Opt-In component implements TCG policy providing that TPM modules are shipped in the state the customer desires. This ranges from disabled and deactivated to fully enabled; ready for an owner to take possession. The Opt-In mechanism maintains logic and (if necessary) interfaces to determine physical presence state and ensure disabling operations are applied to other TPM components as needed.

An execution engine runs program code. It performs TPM initialization and measurement taking.

The TCG main specification may not provide the communications interfaces or bus architectures. These may be considered implementation decisions documented in the Platform Specific Specification(s). However, TCG does provide an interface serialization transformation that can be transported over virtually any bus or interconnect.

TCG provides that the TPM be physically protected from tampering. This includes physically binding the TPM module to the other physical parts of the platform (e.g., motherboard) such that it cannot be easily disassembled and transferred to other platforms. These mechanisms are intended to resist tampering. Tamper evidence measures are to be employed. Such measures enable detection of tampering upon physical inspection.

To implement the root of trust, TPM may utilize the tree of trust inside for key management to extend its trust to other parts of the platform. There are different types of key including Storage Root Key (SRK), Endorsement Key (EK), Attestation Identity Key (AIK), Signing Key, Storage Key, Bind Key, Legacy Key, and Authentication Key.

Figure 119:
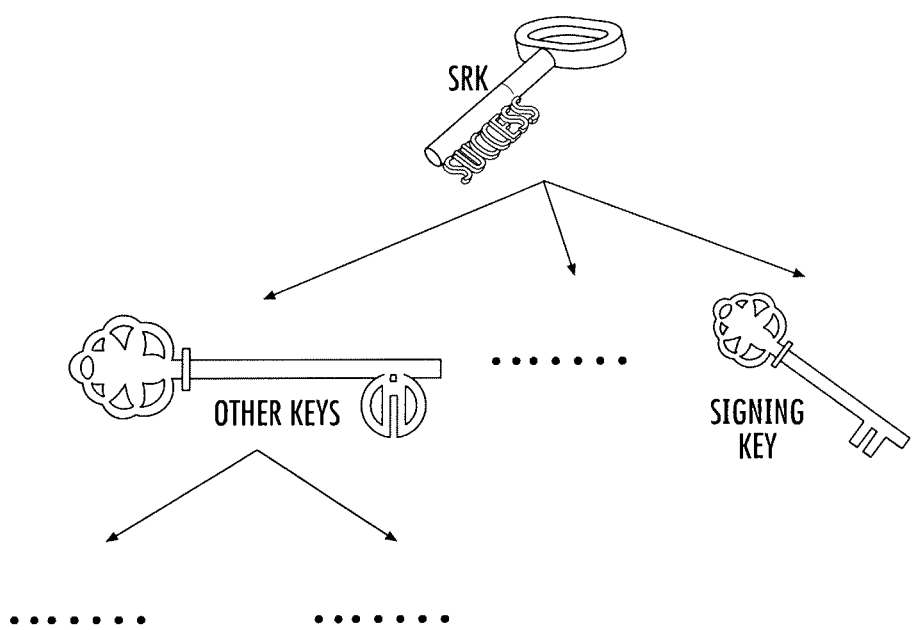
FIG. 119 shows the TPM key hierarchy, called tree of trust, where every TPM key has a parent key in the layer above in accordance with the present disclosure.

FIG. 119 shows the TPM key hierarchy, called tree of trust, where every TPM key has a parent key in the layer above. Here, any storage key may wrap several other storage keys or keys of other types (for signatures, identity establishment, etc.). At the root of the tree of trust is the Storage Root Key (SRK). Before a user or an application can load a key from the user persistent storage the Key Manager establishes and verifies the entire key chain up to SRK.

The Endorsement Key (EK) is a public/private key-pair. The size of the key-pair is mandated to have a modulus (a.k.a. key size) of 2048 bits. The private component of the key-pair is generated within the TPM and is never exposed outside the TPM. The EK is unique to the particular TPM and therefore the particular platform.

Much of the value (or trust) associated with the TPM comes from the fact that the EK is unique and that it is protected within the TPM at all times. This property is certified by the Endorsement Certificate (Cert). The same party that provides the EK may not provide the Endorsement Cert.

AIKs are used to provide platform authentication to a service provider. This is also called pseudo-anonymous authentication and is different from user authentication.

Signing keys are asymmetric general purpose keys used to sign application data and messages. Signing keys can be migratable or non-migratable. Migratable keys may be exported/imported between TPM devices. The TPM can sign application data and enforce migration restrictions.

Storage keys are asymmetric general purpose keys used to encrypt data or other keys. Storage keys are used for wrapping keys and data managed externally.

Bind keys may be used to encrypt small amounts of data (such as a symmetric key) on one platform and decrypt it on another.

Legacy Keys are keys created outside the TPM. They are imported to the TPM after which may be used for signing and encryption operations. They are migratable.

Authentication Keys are symmetric keys used to protect transport sessions involving the TPM.

The TPM may become a low cost commodity component, suitable for consumer class computing platforms. Therefore, the TPM itself may have limited runtime (volatile) and persistent (non-volatile) storage. TCG usage scenarios suggest unlimited storage may be advantageous. For this reason TPM external storage and a cache manager may be provided.

To allow for virtually unlimited keys and storage areas the RTS packages keys destined for external storage into encrypted key BLOBs. Key blobs are opaque outside the TPM and may be stored on any available storage device (e.g., Flash, Disk, and Network File Server). BLOB structures are bound to a particular TPM and may be sealed to a particular platform configuration as well. Blobs are referenced using a cryptographic hash of its contents, by handle or other suitable referencing mechanism. Reference identifiers disambiguate Blobs externally to the KCM or other application program performing the storage functions. Other information including Key Type and Key Attribute are available externally.

The TPM exposes interfaces that allow external programs the ability to manage the limited storage resources of the TPM. Management function is distinguished from application function by separating the ability to cache keys from the ability to use a key. Key Cache Managers (KCM) will generally only be concerned with caching keys, while applications may be concerned about key usage. A noted exception is storage keys which are used to protect other keys. The KCM will likely control both caching and use of storage keys.

Keys sealed to a particular platform configuration may be loaded even when the platform is outside the intended configuration. This allows flexibility in transitioning the platform between readiness states without impacting its ability to obtain needed keys. Security is maintained because configuration is checked each time it is used, hence loading need not be checked. The KCM tracks available key slots and determines when it is appropriate to expel a key and replace with another. The TPM does not provide proactive notification when Key Slots are depleted or when applications need to use a particular key. As such, application programs may need to inform the KCM when such events occur or the KCM needs to implement a TPM interface layer, through which applications obtain TPM services$_4$. The TPM provides interfaces to prepare keys for transitioning between TPM and Storage Device. The KCM generally will not render keys in the clear.

Designers of secure distributed systems, when considering exchange of information between systems, should identify the endpoints of communication. The composition and makeup of the endpoint is as important to the overall security of the system as is the communications protocol. TCG designers assert endpoints are generally comprised of asymmetric keys, key storage and processing that protects protocol data items.

Classic message exchange based on asymmetric cryptography suggests that messages intended for one and only one individual can be encrypted using a public key. Furthermore, the message can be protected from tampering by signing with the private key. Keys are communication endpoints and improperly managed keys can result in loss of security. Additionally, improperly configured endpoints may also result in loss of security. The TPM aids in improving security by providing both key management and configuration management features such as Protected Storage, Measurement and Reporting. These features can be combined to "seal" keys and platform configuration making endpoint definition stronger.

TCG provides four classes of protected message exchange: Binding, Signing, Sealed-Binding (Sealing) and Sealed-Signing.

Binding is the traditional operation of encrypting a message using a public key. That is, the sender uses the public key of the intended recipient to encrypt the message. The message is only recoverable by decryption using the recipient's private key. When the private key is managed by the TPM as a nonmigratable key, only the TPM that created the key may use it. Hence, a message encrypted with the public key, "bound" to a particular instance of a TPM. It is possible to create migratable private keys that are transferable between multiple TPM devices. As such, binding has no special significance beyond encryption.

Signing also in the traditional sense, associates the integrity of a message with the key used to generate the signature. The TPM tags some managed keys as signing only keys, meaning these keys are only used to compute a hash of the signed data and encrypt the hash. Hence, they cannot be misconstrued as encryption keys.

Sealing takes binding one operation further. Sealed messages are bound to a set of platform metrics specified by the message sender. Platform metrics specify platform configuration state that must exist before decryption is allowed. Sealing associates the encrypted message (actually the symmetric key used to encrypt the message) with a set of PCR register values and a non-migratable asymmetric key.

A sealed message is created by selecting a range of PCR register values and asymmetrically encrypting the PCR values plus the symmetric key used to encrypt the message. The TPM with the asymmetric decryption key may only decrypt the symmetric key when the platform configuration matches the PCR register values specified by the sender. Sealing is a powerful feature of the TPM. It provides assurance that a protected message is only recoverable when the platform is functioning in a very specific known configuration.

Signing operations can also be linked to PCR registers as a way of increasing the assurance that the platform that signed the message meets a specific configuration requirement. The verifier mandates that a signature must include a particular set of PCR registers. The signer, during the signing operation, collects the values for the specified PCR registers and includes them in the message, and as part of the computation of the signed message digest. The verifier can then inspect the PCR values supplied in the signed message, which is equivalent to inspecting the signing platform's configuration at the time the signature was generated.

As illustrated in system design discussions above, this exemplary implementation consists of five modules and each of them provide a different layer of security. Java is chosen as the computer language to provide all these functions, although other programming languages are within the scope of the present disclosure. The RSA SHARE FOR JAVA security library provides the programming API in this exemplary implementation. To communicate with TPM security chip, IAIK TCG Java software stack provides the Java implementation of TCG software stack and was chosen as the API for TPM programming. More exemplary implementation details are discussed herein.

In a synchronous logon system design, to make sure that the password transmitting between the client, the Android device, and the server may not reveal the password information and any one of the three devices doesn't possess the whole password, random number sequences are used as the representation of digits of password to be sent to server for verification. So before start the logon process, a random number sequences table should be generated both on the client PC and the Android Device. The tables on the two devices are different.

FIG. 120 shows a method for the password digit to random number sequence mapping.

After the random number sequence tables have been generated both on client and the Android Device, the random number sequences mapping of password should be sent to server and the SHA-256 hash value of the random number sequences mapping are calculated by server and stored on server side for password verification. FIG. 121 shows the hash value stored on the server side in the situation where the password is "sh05".

Figure 122:
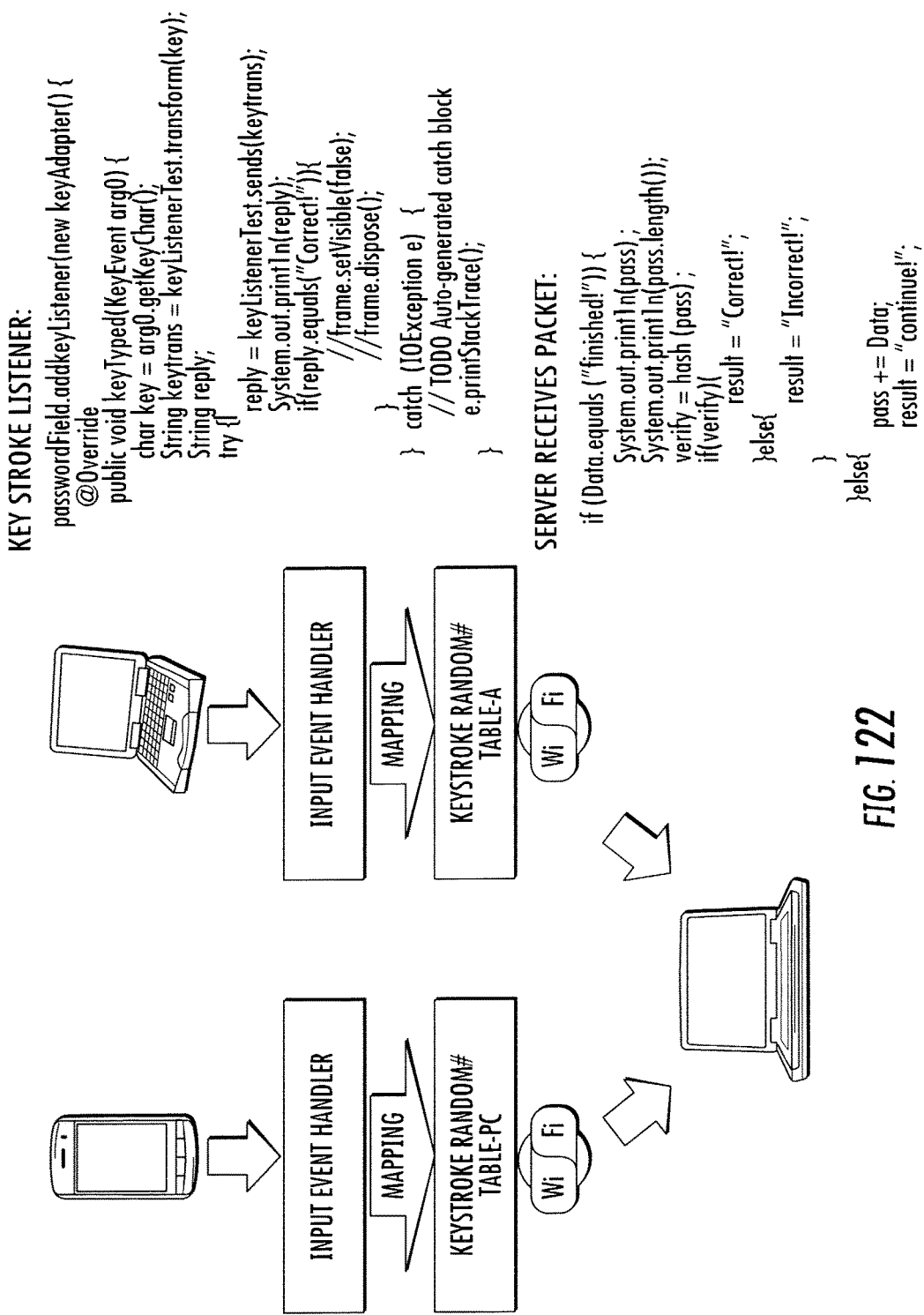

FIG. 122 shows an overview of the password verification process. After the user starts the three devices for password verification, the server is waiting on port 2228 for the incoming random number sequences. Then the user should input the password digits on the client PC and the Android Device separately following the input order set up in the random number table generation operation. In password field on the user password input window, key listener is added so that each user typing will trigger a key typed event which will perform the password digit to random number sequence mapping and will send the sequence to server side. On the server side every random number sequences is recombined into one new sequence based on the timestamp. Then after password input finished, the SHA-256 hash of the combined random number sequence is generated and compared to the correct one. Then the verification result may be feedback to client and the Android Device.

Figure 123:
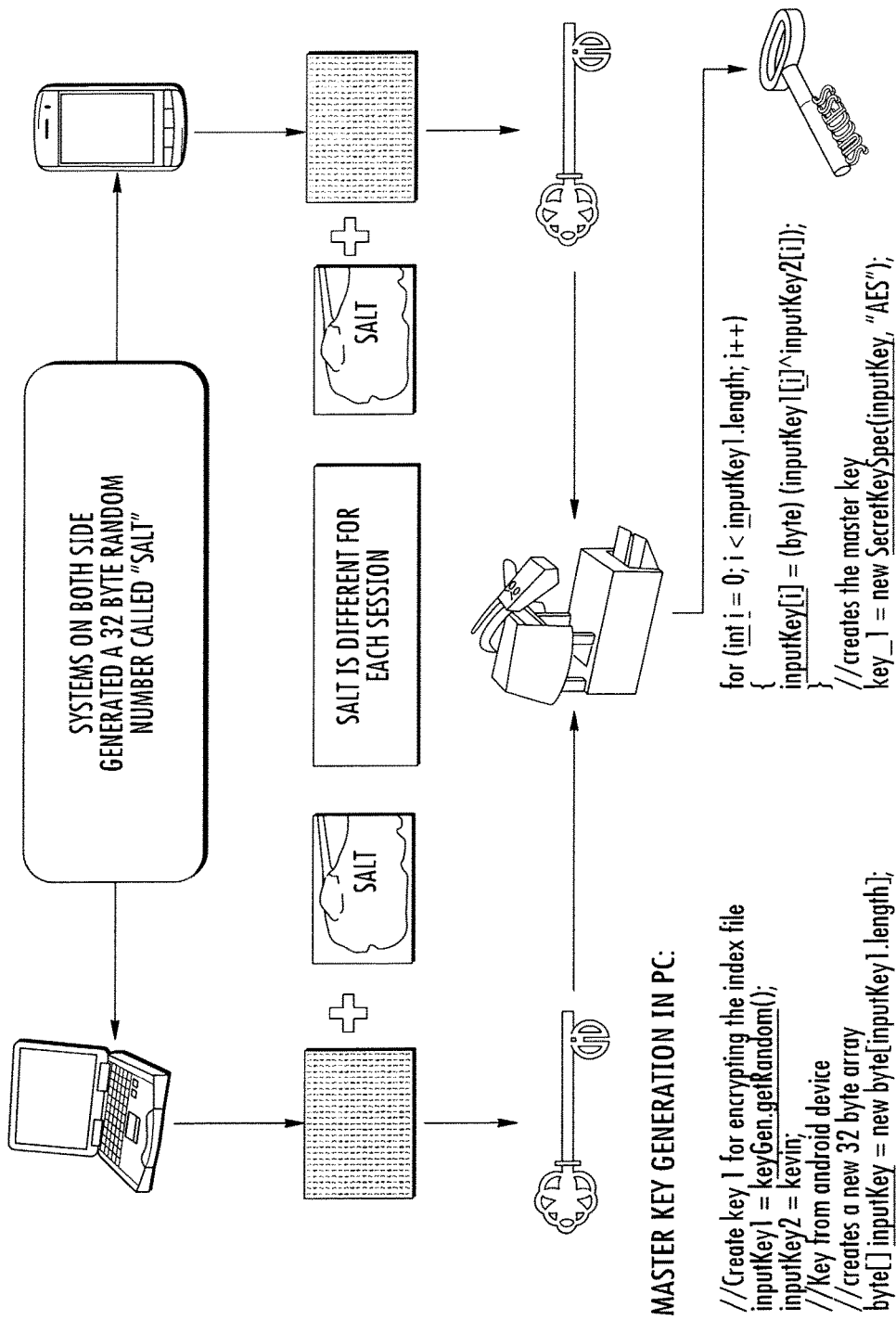

FIG. 123 shows an exemplary implementation of a master key generation method. FIG. 124 shows an exemplary implementation of an encryption key generation method. In this file encryption and decryption design, the index file is a critical point because it contains all the paths of the file pieces and the cryptographic keys. So for security consideration, the master key used for index file encryption and decryption is generated from two keys, one from the client PC and another from the Android Device. The two keys are XORed into the master key before the encryption takes place. In the process of key generation process on the client PC and the Android Device, random salt is added.

The key used for user file encryption and decryption is generated from a random number generator which utilize the system time with random salt added as the seed for random number generation.

Figure 125:
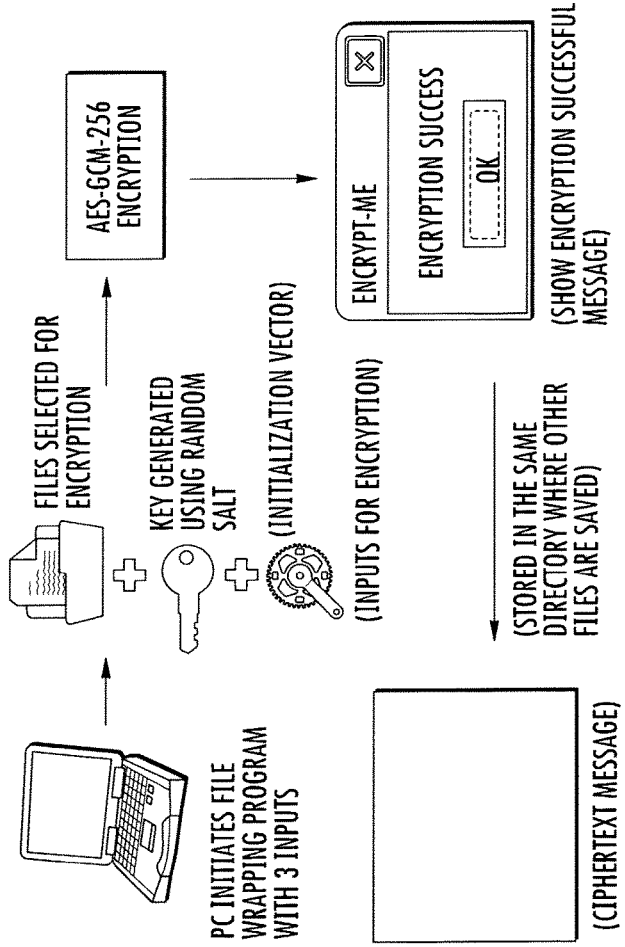
Figure 126:
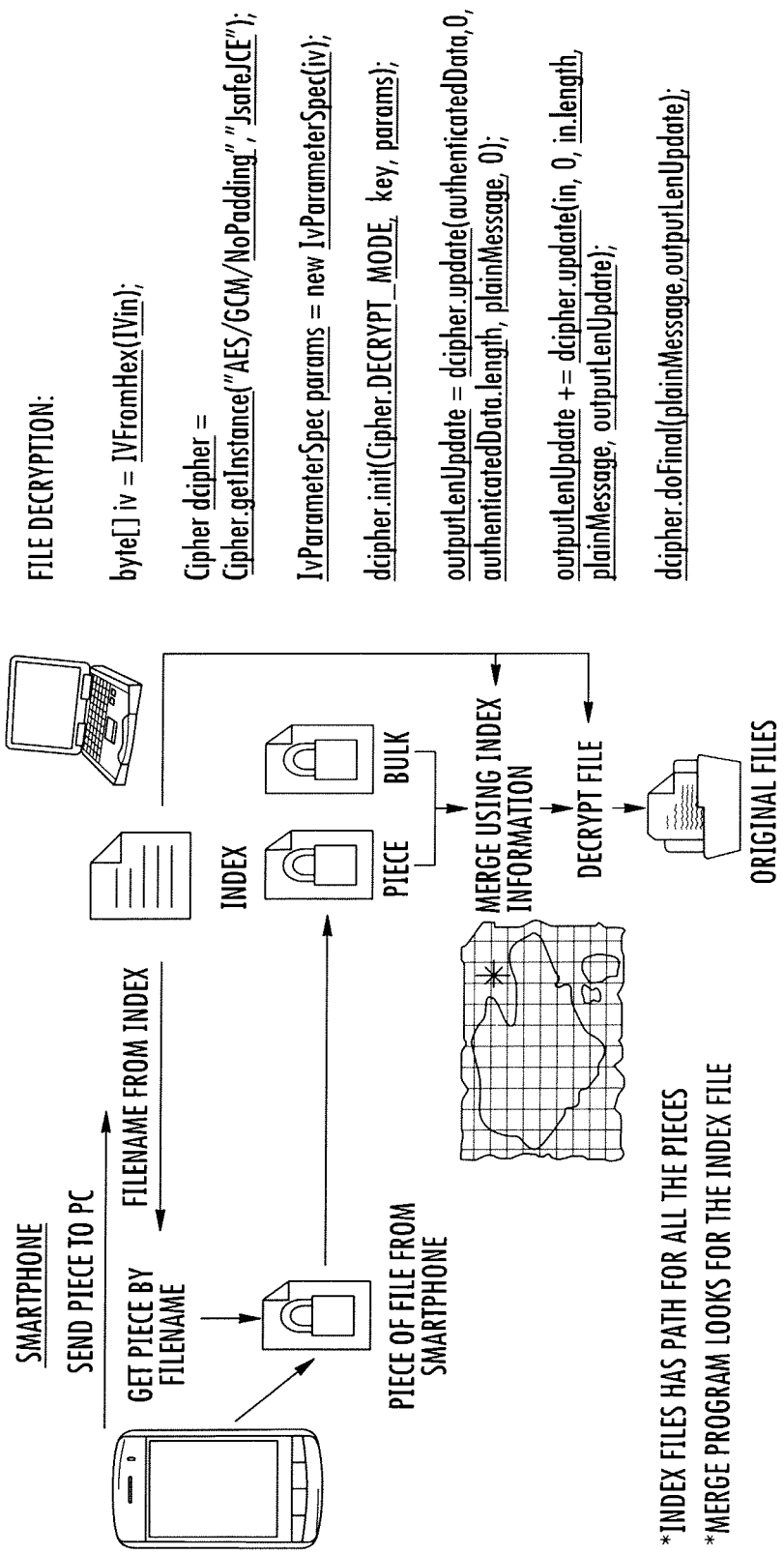

To achieve the requirement for protection over sensitive data and get better security level, AES-GCM mode encryption method was chosen as the cryptographic process standard for this exemplary implementation. FIG. 125 illustrates an exemplary file encryption implementation. FIG. 126 illustrates an exemplary file decryption implementation.

The file splitting may take place after the file encryption, and the file merging may be run before the file was sent to decryption. The file splitting and merging can be run twice respectively. One for encrypted personal file and another for encrypted index file. In this exemplary implementation, the splitting function randomly takes ⅕ of the data from the original file and replaces it with randomly generated bytes. The random data taken out is stored in a piece file. The file with the modified contents is then stored in a bulk file. The original file name, the key and IV used for encryption and the random byte locations are all stored in the index file which is split later.

Figure 127:
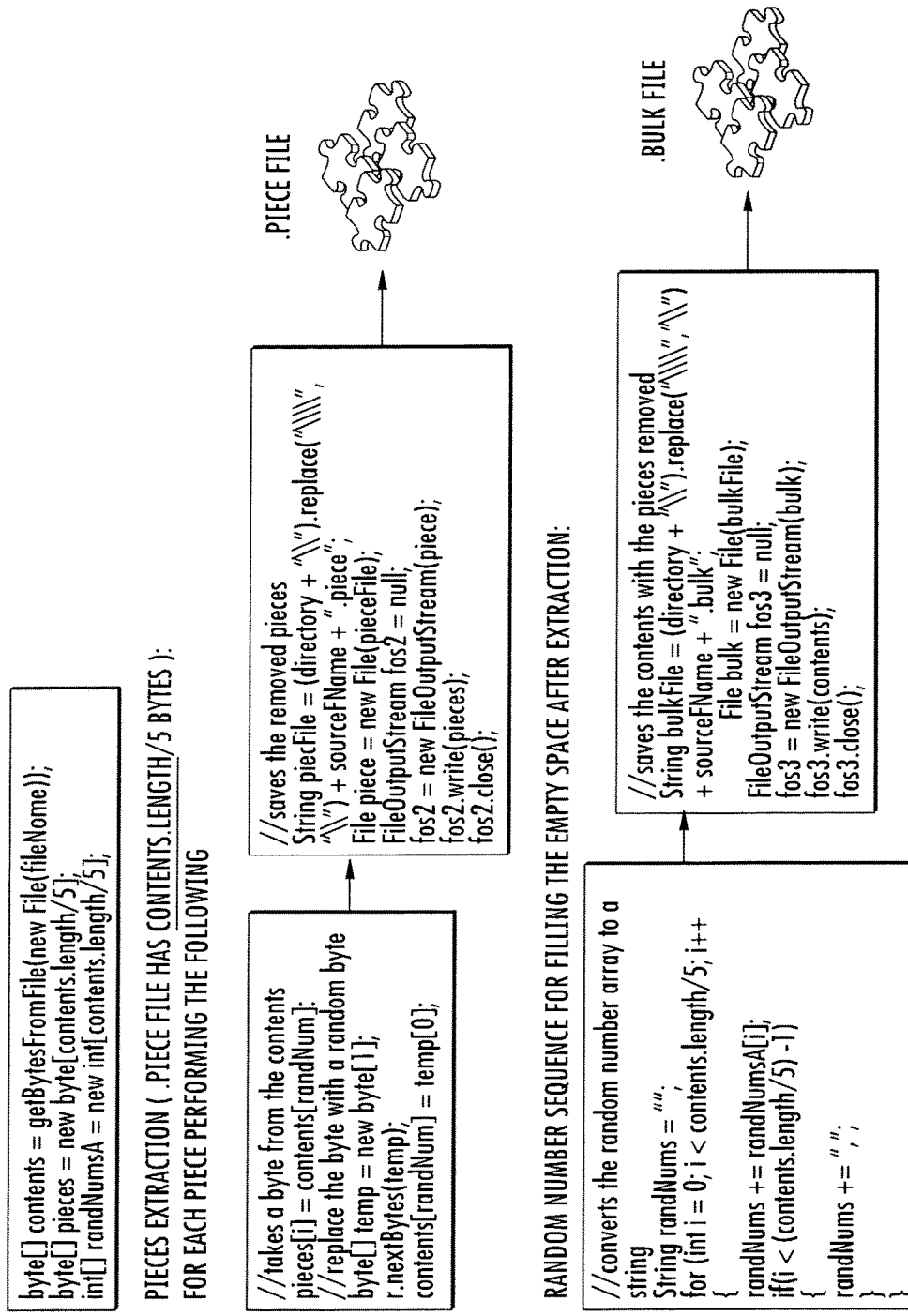

FIG. 127 shows an exemplary implementation for a file split. FIG. 128 shows an exemplary implementation for a file merge.

Random number generation is important for cryptographic key creation. To get better randomness and therefore better security, 64-bit system time (GMT) plus salt and password combination is used in this implementation as the seed for random number generator.

In file splitting process, random number generator is used to provide the random position as start point for content extraction. FIG. 129 shows an exemplary implementation for the random number generator.

As illustrated above, the index file plays an important role in the system design. It contains paths to the file pieces and keys to decrypt them. Thus, the index file may be encrypted by AES-GCM to be protected. The protection of the index file encryption key is also important. The TPM security chip is the better choice for this design to provide hardware protection over the index file encryption key which means TPM binding was used to bind the key to TPM.

Figure 130:
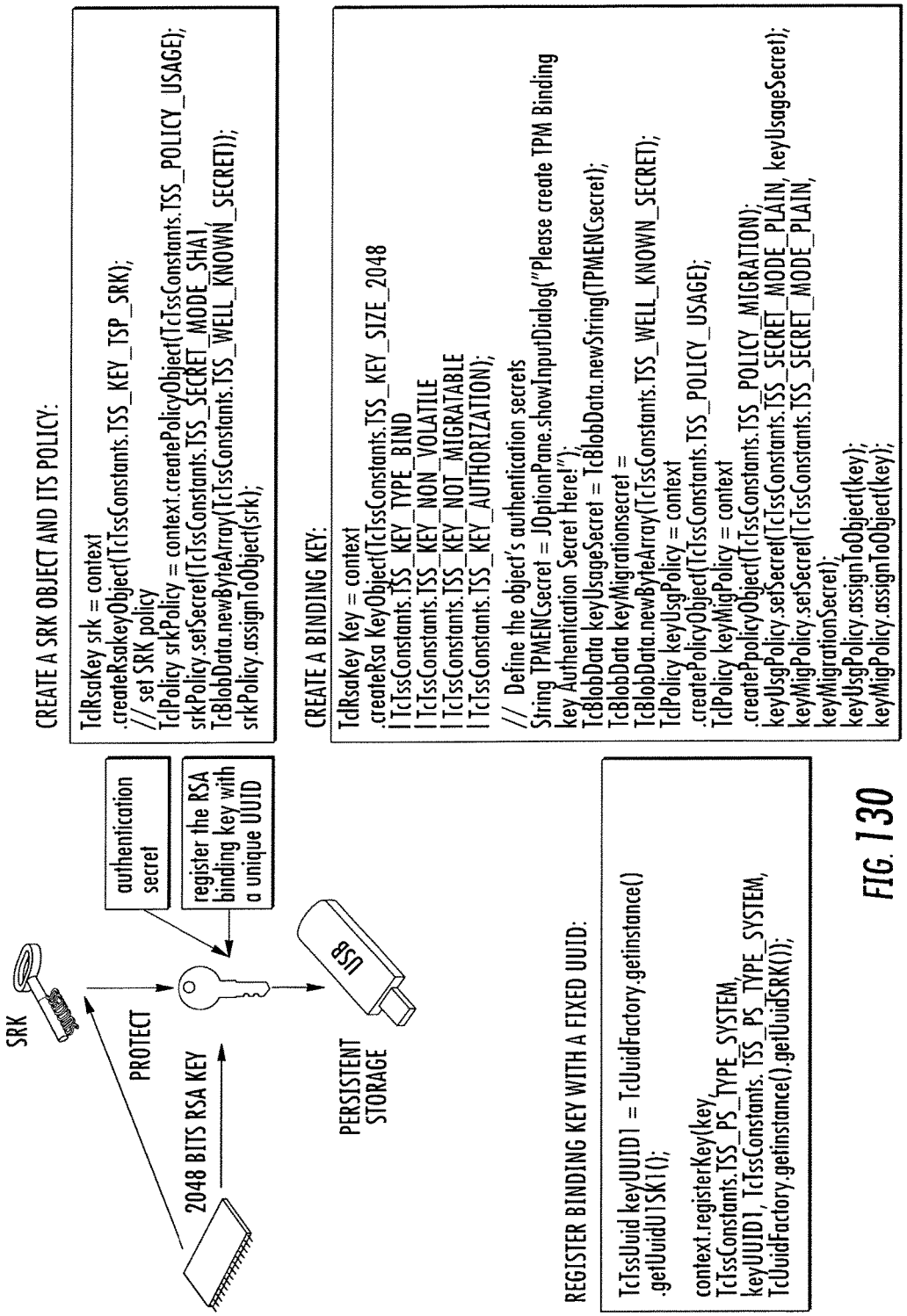

FIG. 130 illustrates an exemplary implementation of binding key creation. The root of the key hierarchy is the storage root key (SRK) which is generated at taking ownership and then stored inside the TPM permanently. In the creation of binding key, implementations in accordance with the present disclosure assign a (possibly globally) unique identifier called UUID to the key and register the key with the UUID. Then the key blobs are stored in the persistent storage in the OS file system. Later the program can use this UUID as reference to the requested key. Exemplary implementations also assign an unmigratable policy to the key object which means the key can never been migrated and can only be used by this specific TPM.

Figure 131:
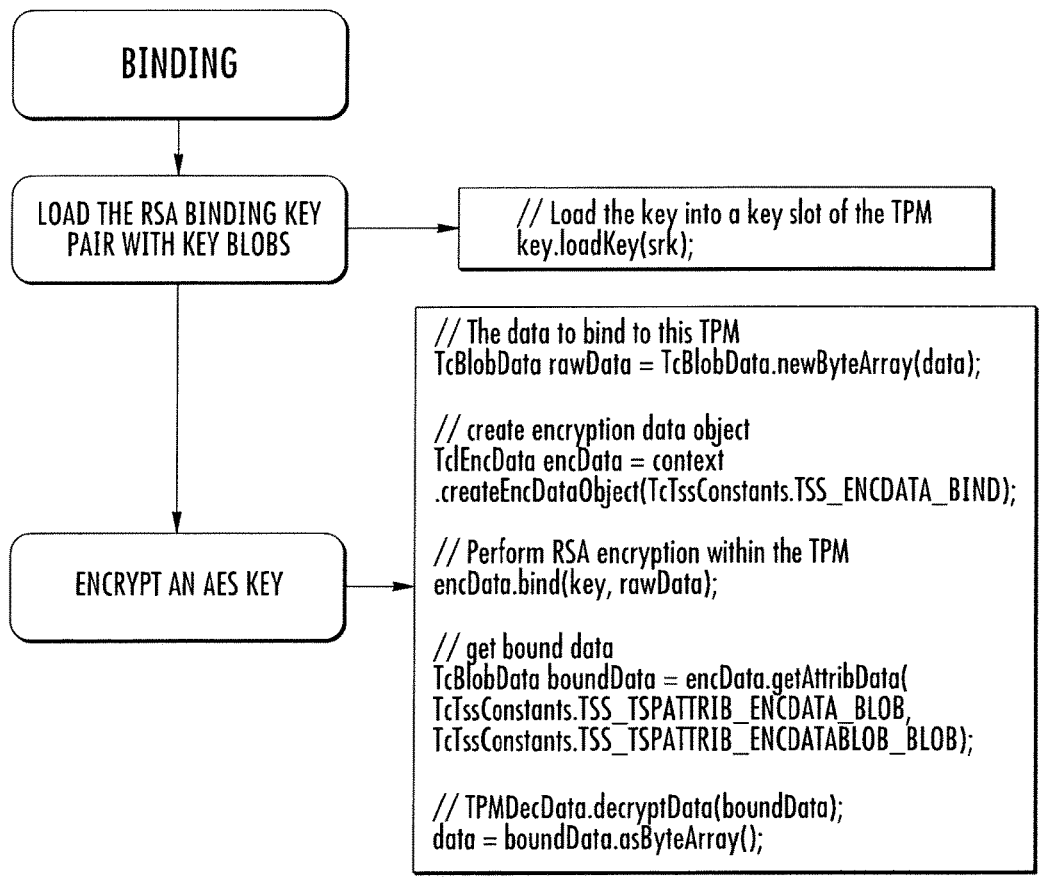

FIG. 131 illustrates an exemplary implementation for binding. After the binding key was created and stored in persistent storage, the binding process can take place. Binding is the traditional operation of encrypting a message using a public key. That is, the sender uses the public key of the intended recipient to encrypt the message. The message is only recoverable by decryption using the recipient's private key. When the private key is managed by the TPM as a non-migratable key only the TPM that created the key may use it. Hence, a message encrypted with the public key, "bound" to a particular instance of a TPM.

FIG. 132 illustrates an exemplary implementation for unbinding. When the binding key needs to be retrieved for unbinding process, it can be retrieved using UUID as reference.

After the index file was split into .piece file and .bulk file, to increase the difficulty to recover the index file pieces by attacker, the .piece file is sent to server for storage. In this illustrative embodiment, TPM is used to further prevent attackers from trying to recover the whole index file without the identification of TPM.

To do this, the TPM Attestation Identity Key (AIK) is used as the identity key of TPM and every time the PC wants to request the .piece file back, it has to identify the particular TPM to server which has the public AIK key stored.

FIG. 133 illustrates an exemplary implementation for Attestation Identify Key generation. AIK is regarded as an alias for the Endorsement Key. Each TPM can support many AIKs, thus the user can have many un-linkable keys that can be used to maintain anonymity between different service providers who require proof of identity. These AIKs must, therefore, be persistent and although they could be stored on the TPM non-volatile memory, for practical reasons the standards recommend keeping the AIK keys in secure external storage.

To identify the TPM is the specific TPM that the user own, the AIK key is used to generate a signature and send the signature to server which has the public AIK key stored. When the server verified the signature and makes sure the TPM is the correct one, it will send the index .piece file back to the client PC for file un-protection process.

Before the TPM use the AIK to sign, a new Nonce has to be generated and the hash value of the Nonce is signed by the AIK.

To generate the new Nonce, the client and server will both generate a nonce separately. The client use TPM random number generator to generate the nonce and the server use software random number generator which use system time as seed . After the two nonces were generated, the client and server will exchange the nonce with each other and then the final Nonce is generated on both sides by XORing the nonce from client and the nonce from server.

Finally, the SHA-1 hash value of Nonce was generated and the AIK signs on it for server verification as shown in FIG. 122.

FIG. 134 provides an overview of an exemplary UUID registration process. FIG. 135 provides an overview of an exemplary identity attestation implementation.

Implementations in accordance with the present disclosure use Java as the programming language due to advantages of Java. Java is a general-purpose, concurrent, class-based, object-oriented computer programming language that is designed to have few implementation dependencies. It is intended to let application developers "write once, run anywhere" (WORA), meaning that code that runs on one platform does not need to be recompiled to run on another. Java applications are typically compiled to byte code (class file) that can run on any Java virtual machine (JVM) regardless of computer architecture. Java is one of the most popular programming languages in use. Java's robustness, ease of use, cross-platform capabilities and security features provides worldwide web solutions. The ability to run the same program on many different systems is crucial to World Wide Web software and Java succeeds at this by being platform independent at both the source and binary levels. Also Java-based Android phone is a key point in this design to get better security, so Java programming language is the best choice. However, it should be understood that systems, components, and methodologies in accordance with the present disclosure may also be implemented with any other suitable programming language.

In at least one exemplary implementation, instead of using Sun security library, RSA BSAFE® Share for Java Platform (Share for Java) may be chosen as the toolkit for security implementation.

Share for Java provides various security features including cryptography, Public Key Infrastructure (PKI), and Transport Layer Security (TLS). Using cryptography, algorithms provide encryption, digital signatures, message digests and Pseudo Random Number Generation (PRNG). Using PKI technology, Digital Certificates may be used to identify secure servers on the Internet and are used with encrypted and signed email. TLS technology provides the security for secure https connections over the Internet.

Share for Java is a Java security toolkit. Share for Java contains two jar files: shareCrypto.jar: Cryptographic and PKI functionality implemented as a Java Cryptographic Extension (JCE) provider; and shareTLS.jar: SSL v3.0, TLS v1.0, v1.1 and v1.2 functionality implemented as a Java Secure Sockets Extension (JSSE) provider.

Before installation of the Share for Java toolkit, the correct Java Cryptography Extension (JCE) Jurisdiction Policy Files may be downloaded and installed first following the two operations: (1) extract the local_policy.jar and US_export_policy.jar files from the Downloaded.zip file; and (2) copy local_policy.jar and US_export_policy.jar to the <jdk install dir>/jre/lib/security directory, overwriting the existing policy files.

In accordance with Share for Java installation procedures, the Share for Java binary distribution directory structure is copied into a suitable location on the target system and the Share for Java toolkit.jar files, shareCrypto.jar and shareTLS.jar are added to the class path.

To Statically Register the Share for Java JCE and JSSE providers the shareCrypto.jar and shareTLS.jar are copied to <jdk install directory>/jre/lib/ext directory and the JCE and JSSE providers is added to the provider list in the <jdk install directory>/jre/lib/security/java.security file using the two lines below:

security.provider.1=com.rsa.jsafe.provider.JsafeJCE security.provider.2=com.rsa.jsse.JsseProvider Subsequently, all of the subsequent provider entries are modified, changing value of n in security.provider.n so the providers are in ascending order and each provider has a unique number.

The Trusted Computing Group (TCG) specifies the Trusted Platform Module (TPM) and the accompanying software infrastructure called TCG Software Stack (TSS). This system software defines interfaces to applications written in the C language. IAIK Java TCG Software Stack makes the TSS available to Java developers in a consistent and object oriented way.

The Trusted Computing Group (TCG) designed the TSS as the default mechanism for applications to interact with the TPM. In addition to forwarding application requests to the TPM the TSS provides a number of other services such as concurrent TPM access or a persistent storage on the hard disk for cryptographic keys generated inside the TPM.

TPMs are required to provide protected capabilities and at the same time are designed as low cost devices. Due to their inexpensive nature, the internal resources and external interfaces are kept to a minimum.

FIG. 136 shows the Trusted Computing Group Software Stack layers to provide usability, functionality and abstraction. Functions that require protected capabilities are implemented in the TPM while non-sensitive features which do not require hardware protection are implemented in software. To allow a common access to this Trusted Computing functionality, these software components are combined into the TSS and offer a standardized interface.

The TPM device driver (TDD) resides in the Kernel space. For a 1.1b TPM this driver is vendor specific since it just offers a proprietary interface to upper layers whereas 1.2 TPMs support generic TPM Interface Specification (TIS) drivers. TIS provide a vendor independent interface to access TPM functionality. It depends on the platform and the operating system but the TDD may also support additional functionality such as power management. Nowadays, all major operation systems ship with TIS drivers or at least support them.

The TSS Device Driver Library (TDDL) resides in User space. From the user's point of view it exposes an OS and TPM independent set of functions that allow a basic interaction with the TPM. This includes sending commands as byte streams to the TPM and receiving the TPM's responses. The TCG specifies the TDDL Interface (TDDLI) as a required set of functions implemented in the TDDL. The intention was to offer a standardized TPM interface regardless of the TPM vendor and the accompanying TPM device driver. This ensures that different TSS implementations can communicate with any given TPM. In contrast, the communication between the TDDL and the TPM is vendor specific. The TDDL is designed as a single-instance and single-threaded component.

The jTSS can operate on major Operating Systems used today, including releases of Windows, such as Windows 8 or Windows Server 2012.

The Linux OS implements the TDDL such that it opens the TPM device file (/dev/tpm*) provided by the underlying driver. Microsoft ships Windows Vista with a generic TIS driver that accesses the TPM via the so called TPM Base Services (TBS). This service interface should allow similar access to the TPM as the device file under Linux does.

FIG. 137 shows the main components of the Trusted Core Service (TCS) and their interactions. TCS is a system service and there is a single TCS instance for each TPM. The communication with the TPM relies on the TDDL and ensures that commands are properly serialized. The TCG defined the TCS Interface TCSI that specifies the communication between the TCS and the Trusted Service Provide TSP.

FIG. 138 shows how the TSP and the TCS can communicate either via local method calls or via the Simple Object Access Protocol (SOAP) interface. The standard access to the TSS for applications is the TSP interface. Applications can directly link to the TSP library and use this interface to access the TCS. Local calls are mainly used for testing purposes whereas the SOAP communication covers a larger range of applications.

FIG. 139 shows an overview of TSPI. The TSS Service provider (TSP) is the highest abstraction layer in the TSS and offers services defined by the TCG to applications. Due to the design as a system library, the TSP directly links to applications. For different applications several TSPs can coexists side by side and interact with one single TCS. Applications can access the TSP by a TCG defined TSP Interface (TSPI).

For the implementation, a context object serves as entry point to all functionality such as authorized and validated TPM commands, policy and key handling, data hashing, encryption, and PCR composition. The TSP can also be used to integrate the TPM in cryptographic libraries like PKCS#11.

The Java programming language evolved in the last years to a commonly accepted environment. The main advantages are a restrictive type and memory safety ideally suited for security relevant applications.

Although, the basic concepts and functionality of the native TSP remains the same in its Java counterpart, several aspects were changed to meet the object oriented nature of Java. TSS entities such as contexts, keys, hashes, or the TPM are represented by actual Java objects. This relieves developers from object handles and memory management as required in the original TSP. The Java interface provides all the flexibility and features of the underlying stack to Java developers. Existing resources such as TSPI based C-code can therefore easily be mapped to Java. Some relevant classes are described below.

TclContext: A context represents a connection to the TSS Core Services. One can either connect to a local or a remote TCS. A context allows specifying the connection host. The context creates all further TSS objects like policy objects and registers, loads or unregisters keys from the persistent storage. The context can close objects (release their handles), get information (capabilities) about the TCS as well as free TSS memory.

TclTPM: This class represents the TPM and parts of its functionality. It provides methods to take or clear TPM ownership, read and set the TPM status, obtain random numbers from the TPM, access time stamping functions, or read and extend PCR registers. Aside from low level functions, e.g., trigger a TPM self-test, it offers functions to create "attestation identities". Further, it can do quote operations to attest the current state of the platform represented by the contents of the PCR registers.

TclRsaKey: Instances of this class represent keys in the TPM's key hierarchy. It provides functionality to create a new key, load a key into a key slot of the TPM, or certify keys.

TclEncData: This class provides access to the TPM's bind/unbind and seal/unseal functions which encrypt data with a TPM key. If this key is not migratable only the TPM that did the bind operation is able to unbind the data. It is computationally unfeasible to decrypt data if the TPM and therefore the according private key are unavailable any more. Sealing takes this concept an operation further: This operation includes the platform configuration to encrypt data with a TPM key. By that, the sealed data can only be unsealed if the platform is in the state specified at seal time. The platform configuration is represented by the content of the TPM's PCRs.

TclHash: This class provides access to the TSS's hash algorithm SHA1. That includes unkeyed hash calculation and verification as well as keyed hash functions, e.g., create signatures of data blocks with a TPM key.

TclPcrComposite: The platform configuration registers (PCRs) can be used to attest the state of a platform (quote operation) or to seal data to a specific configuration. Instances of this class select one or more PCRs and hand them to the quote or seal functions.

TclPolicy: The policy class handles authorization data for TSS objects such as keys. The authorization data consists of the SHA-1 hash of the user password. Note that different character encodings (ASCII, UTF-16LE Unicode, etc.) will hash to different values. Alternatively to setting a password, a pop-up window will ask the user to enter the appropriate secret. UTF-16LE Unicode without a zero string termination should be used.

TclNvRam: This class stores the attributes of a region of non-volatile RAM inside the TPM. It can be used for defining, releasing, reading or writing such a region. An example is the Endorsement Key certificate shipped with Infineon TPMs.

FIG. 140 shows a network diagram used in connection with exemplary implementation in accordance with the present disclosure. To run this exemplary implementation, two PCs and one Android Device are needed, and at least one PC equipped with TPM, wherein one PC is acting as the server, and the PC equipped with TPM is acting as the client. FIGS. 141-152 pertain to synchronous log on operations.

FIG. 141 shows a screen display in which a user can input a server IP address on a client PC. FIG. 142 shows a screen display in which a user can input a server address on the Android Device.

FIG. 143 and FIG. 144 show screen displays in which, after the server IP has been input, a user may click "OK" on both devices and then the password input window is shown on both the client and the Android Device.

FIG. 145 shows a screen display on the server side, in which the server is ready to receive the random number sequences that represent the password input.

FIG. 146 and FIG. 147 show screen displays by which the password can be input on both the client PC and the Android Device one by one. On the client, at the same time that each digit has been typed, the digit is mapped into a random number sequence and that is sent to server. On the Android Device, after each digit has been typed, user has to click "send" button, and then the digit is mapped to a random number sequence and that is sent to server for verification.

FIG. 148 illustrates the server side, where the sent random number sequences are received and stored into a random number sequence string based on the order of arriving time.

FIG. 149 illustrates a screen display in which, after the password input has finished on the Client and the Android device, the user can click the "finish" button on the Client password input window.

FIG. 150 shows a screen display in the situation after pressing the "Finish" button on the Android Device. This will send a signal to server telling the password input is finished and the verification can then take place. After the password has been verified, the server will give feedback to the client and the Android device.

FIG. 151 shows a screen display in which clicking the "OK" button results in the cryptographic window being shown on the client side.

FIG. 152 shows a screen display in which, on the Android side, after the password has been verified, the next cryptographic window is shown.

FIGS. 153-155 pertain to operations performed in file encryption and splitting.

FIG. 153 shows a screen display in which, upon pressing the "Protect" button, the file chooser is open for user, and the user can select the file that will be encrypted.

FIG. 154 shows a screen display with a confirmation box that will pop up after the files have been chosen, after the user clicks the "Open" button, and after the protection process starts and the AES-GCM encryption and file splitting process take place.

FIG. 155 shows a screen display in which, after a user clicks "OK" and within 15 seconds, the user has to click "Connect" on the Android Device to receive the split file pieces.

At the same time, the index file is created, and then it is encrypted and split into .piece and .bulk file.

FIGS. 156 pertains to operations performed as part of TPM bindings. FIG. 156 shows a screen display in which a user inputs the password for the binding key. Then, the TPM binding protection will take place to protect the index file encryption key.

Then, the usage policy and secret policy is assigned to the binding key object and the index file encryption key is bound to TPM.

FIGS. 157-158 pertain to operations performed as part of TPM attestation identify key generation. FIG. 157 shows a screen display in which a user inputs the password for the signing key. Then, TPM will generate the RSA signing key pair and distribute the index .piece file to server side for storage.

FIG. 158 shows a screen display in which, after the Signing key pair has been generated, the public key and the index .piece file is sent to server for storage.

Following these operations, the Protection process may be considered complete.

Turning to TPM signature verification, FIG. 159 shows a screen display in which an authentication secret can be entered. The signing key pair has to be retrieved and loaded on TPM by providing the authentication secret.

Then the server and TPM may both generate a new nonce and send the nonce to each other, then the two nonce will XOR with each other into a new nonce on both client and server. After that, a SHA-1 hash value is generated using the new generated nonce.

Then TPM will sign on the SHA-1 hash value and send the signature to server for verification. After the TPM identity has been verified by server, the index .piece file can be sent back to client for the merging and decryption process.

FIG. 160 shows a screen display by which a user inputs the authentication secret to TPM to unbind the key. This is done because to decrypt the index file, the index file cryptographic key has to be unbound from TPM.

FIG. 161 and FIG. 162 show screen displays after file pieces are sent back to the client. After the index file crypto key has been retrieved, the index file then can be decrypted. Then user has to get all the file pieces back to client for merging and decrypting by click the "decrypt" button on the Android Device.

After the file has been decrypted, it is saved back to the original folder and then user can reset the application status by clicking "Reset" button. Then all the intermediate files are deleted.

A description is now provided regarding efficiency measurements in term of latency for an exemplary implementation. Measurements were taken by dividing the exemplary implementation into four parts to measure the execution latency for each part, after which the total protection latency and unprotection latency were separately determined.

To set up the measurement, different file sizes and file numbers were provided as different test groups. For each group, execution latency was measured 10 times in seconds. The results are set forth herein.

This exemplary implementation utilized three devices: Server PC, Client PC and Android Phone. The hardware configurations for this exemplary implementation are provided in Tables 19-21.

TABLE 19

| Server: Lenovo y470 | |
| --- | --- |
| Processor | Intel ® Core ™ i7-2630QM Processor with Intel Turbo Boost Technology* 2.0 (2.0 GHz, 6 MB Cache) |
| Operating System | Windows ® 7 Professional |
| Video Graphics | NVIDIA ® GeForce ® 550M 1 GB/2 GB graphics Intel ® HD Graphics 3000 |
| Memory | 8 GB DDR3 1066/1333 MHz memory |
| Hard Drive | SATA 750 GB 5400 rpm HDD |
| Wireless LAN Adapters | Intel ® Centrino(R) Wireless-N 2200 |

TABLE 20

| Client: Lenovo ThinkPad T530 | |
| --- | --- |
| Processor | Intel ® Core ™ i7-3730QM Processor @2.4 GHz (6M Cache, up to 3.70 GHz) |
| Operating System | Windows ® 7 Home Premium |
| Video Graphics | NVIDIA NVS 5400M Graphics, 1 GB DDR3 Memory |
| Memory | 8 GB DDR3 - 1600 MHz (1 DIMM) |
| Hard Drive | SATA 1 TB 5400 rpm HDD |
| TPM | Trusted Platform Module 1.2 |
| Wireless LAN Adapters | Intel ® Centrino(R) Wireless-N 2200 |

TABLE 21

| Android Phone: HTC One X | |
|---|---|
| Processor | Qualcomm ® Snapdragon ™ 600, Quad Core, 1.7 GHz |
| Platform | Android ™ with HTC Sense ™ |
| Memory | 2 GB DDR2 |
| Total Storage | 32 GB |
| Network | LTE: US (AT&T): 700/850/AWS/1900 MHz |
| Wi-Fi ® | Wi-Fi ®: IEEE 802.11 a/ac/b/g/n |

The synchronous logon system execution includes the interaction among the Android Device, the client PC and server. For testing, different file size and file numbers were used as different test groups. For each group, measurements of execution latency in seconds were taken 10 times. The difference between each group is mainly due to the user input speed. Here, Logon Latency =User Input Latency +Network Latency +Verification Latency. Table 22 shows logon system measurement (Unit: Seconds, KB: Kilo Bytes)

TABLE 22

| File size & number | Group | | | | | | | | | | |
|---|---|---|---|---|---|---|---|---|---|---|---|
| | 1 | 2 | 3 | 4 | 5 | 6 | 7 | 8 | 9 | 10 | Average |
| File number: 1 File size: 12 KB | 13.1 | 11.7 | 10.9 | 11.2 | 12.7 | 10.2 | 9.7 | 9.2 | 10.1 | 12.2 | 11.1 |
| File number: 2 File size: 24 KB | 10.5 | 9.8 | 10.6 | 10.3 | 9.4 | 11.3 | 9.3 | 10.5 | 9.1 | 11.2 | 10.2 |
| File number: 3 File size: 36 KB | 14.1 | 10.2 | 9.2 | 12.4 | 12.7 | 10.8 | 11.2 | 10.3 | 9.6 | 11.5 | 11.2 |
| File number: 5 File size: 300 KB | 10.3 | 10.9 | 11.5 | 12.7 | 10.7 | 9.1 | 9.5 | 10.2 | 11.9 | 12.3 | 10.91 |
| File number: 2 File size: 100 KB | 12.1 | 10.2 | 11.4 | 12.5 | 9.4 | 9.6 | 12.2 | 10.3 | 11.3 | 14.0 | 11.3 |

In the protection process, the encryption and splitting efficiency is given in the term of execution latency. Here, File Encryption & Splitting Latency=AES/GCM Encryption Latency+File Splitting Latency. Table 23 illustrates file encryption and split measurement (Unit: Seconds, KB: Kilo Bytes)

TABLE 23

| File size & number | Group | | | | | | | | | | |
|---|---|---|---|---|---|---|---|---|---|---|---|
| | 1 | 2 | 3 | 4 | 5 | 6 | 7 | 8 | 9 | 10 | Average |
| File number: 1 File size: 12 KB | 0.67 | 0.68 | 0.69 | 0.7 | 0.68 | 0.73 | 0.77 | 0.71 | 0.79 | 0.77 | 0.719 |
| File number: 2 File size: 24 KB | 0.91 | 0.85 | 0.76 | 0.77 | 0.78 | 0.78 | 0.82 | 0.80 | 0.79 | 0.78 | 0.8 |
| File number: 3 File size: 36 KB | 0.92 | 0.83 | 0.83 | 0.89 | 0.87 | 0.91 | 0.82 | 0.85 | 0.82 | 0.87 | 0.86 |
| File number: 5 File size: 300 KB | 3.34 | 3.34 | 3.41 | 3.33 | 3.33 | 3.44 | 3.32 | 3.34 | 3.34 | 3.33 | 3.352 |
| File number: 2 File size: 100 KB | 1.8 | 1.12 | 1.14 | 1.14 | 1.15 | 1.14 | 1.13 | 1.15 | 1.15 | 1.14 | 1.206 |

In the unprotection process, the decryption and merging efficiency is measured. Here, File Merging & Decryption Latency=AES/GCM Decryption Latency+File Merging Latency. Table 24 shows File Decryption & Merge Measurement (Unit: Seconds, KB: Kilo Bytes).

TABLE 24

| File size & number | Group | | | | | | | | | | |
|---|---|---|---|---|---|---|---|---|---|---|---|
| | 1 | 2 | 3 | 4 | 5 | 6 | 7 | 8 | 9 | 10 | Average |
| File number: 1<br>File size: 12 KB | 0.01 | 0.011 | 0.01 | 0.01 | 0.017 | 0.01 | 0.011 | 0.009 | 0.009 | 0.01 | 0.0107 |
| File number: 2<br>File size: 24 KB | 0.006 | 0.017 | 0.017 | 0.009 | 0.017 | 0.009 | 0.008 | 0.017 | 0.008 | 0.009 | 0.0117 |
| File number: 3<br>File size: 36 KB | 0.026 | 0.074 | 0.027 | 0.034 | 0.046 | 0.032 | 0.044 | 0.045 | 0.042 | 0.033 | 0.0403 |
| File number: 5<br>File size: 300 KB | 0.092 | 0.052 | 0.042 | 0.063 | 0.082 | 0.073 | 0.065 | 0.067 | 0.085 | 0.091 | 0.0712 |
| File number: 2<br>File size: 100 KB | 0.023 | 0.008 | 0.011 | 0.016 | 0.008 | 0.011 | 0.014 | 0.011 | 0.013 | 0.012 | 0.0127 |

In the protection process, the TPM binding efficiency is given in the term of execution latency. The total time includes the user input time for the binding key usage secret and migration secret. Thus, the difference mainly depends on the user input speed. Here, Key Binding Latency=SRK Generation Latency+Binding Key retrieve Latency+Key Binding Latency. Table 25 shows TPM binding measurement (Unit: Seconds, KB: Kilo Bytes)

TABLE 25

| File size & number | Group | | | | | | | | | | |
|---|---|---|---|---|---|---|---|---|---|---|---|
| | 1 | 2 | 3 | 4 | 5 | 6 | 7 | 8 | 9 | 10 | Average |
| File number: 1<br>File size: 12 KB | 1.7 | 1.57 | 1.63 | 1.65 | 1.62 | 1.57 | 1.66 | 1.63 | 1.65 | 1.67 | 1.635 |
| File number: 2<br>File size: 24 KB | 1.67 | 1.59 | 1.65 | 1.6 | 1.6 | 1.65 | 1.63 | 1.66 | 1.58 | 1.67 | 1.63 |
| File number: 3<br>File size: 36 KB | 1.68 | 1.66 | 1.59 | 1.62 | 1.71 | 1.67 | 1.64 | 1.63 | 1.66 | 1.69 | 1.655 |
| File number: 5<br>File size: 300 KB | 1.7 | 1.55 | 1.66 | 1.69 | 1.73 | 1.58 | 1.62 | 1.65 | 1.64 | 1.69 | 1.651 |
| File number: 2<br>File size: 100 KB | 1.57 | 1.68 | 1.58 | 1.59 | 1.56 | 1.59 | 1.62 | 1.52 | 1.6 | 1.58 | 1.589 |

In the unprotection process, the TPM unbinding latency is measured and the total time includes the user input time for binding key usage secret. So the difference mainly depends on the user input speed. Here, Key Unbinding Latency=SRK Generation Latency+Binding Key retrieve Latency +Key Unbinding Latency. Table 26 shows TPM unbinding measurement (Unit: Seconds, KB: Kilo Bytes)

TABLE 26

| File size & number | Group | | | | | | | | | | |
|---|---|---|---|---|---|---|---|---|---|---|---|
| | 1 | 2 | 3 | 4 | 5 | 6 | 7 | 8 | 9 | 10 | Average |
| File number: 1<br>File size: 12 KB | 1.68 | 1.64 | 1.69 | 1.67 | 1.53 | 1.57 | 1.66 | 1.62 | 1.64 | 1.71 | 1.641 |
| File number: 2<br>File size: 24 KB | 1.59 | 1.69 | 1.74 | 1.63 | 1.69 | 1.67 | 1.71 | 1.72 | 1.66 | 1.62 | 1.672 |
| File number: 3<br>File size: 36 KB | 1.6 | 1.61 | 1.59 | 1.66 | 1.58 | 1.62 | 1.67 | 1.65 | 1.66 | 1.67 | 1.631 |
| File number: 5<br>File size: 300 KB | 1.67 | 1.85 | 1.73 | 1.77 | 1.62 | 1.69 | 1.67 | 1.73 | 1.74 | 1.7 | 1.717 |
| File number: 2<br>File size: 100 KB | 1.87 | 1.89 | 1.8 | 1.78 | 1.78 | 1.78 | 1.69 | 1.72 | 1.75 | 1.78 | 1.78 |

The process of TPM identification to server mainly includes two operations. First, the client and server exchange the new generated nonce and both produce a final Nonce using the received nonce and self-created nonce. Second, TPM signature signing and server verification are performed. The total time includes the user input time for AIK usage secret. Here, Identity Attestation Latency=SRK Generation Latency+AIK Retrieve Latency+RSA Signing Latency+Signature Verification Latency+Network Latency. Table 27 includes identity attestation measurement (Unit: Seconds, KB: Kilo Bytes)

TABLE 27

| File size & number | Group | | | | | | | | | | Average |
|---|---|---|---|---|---|---|---|---|---|---|---|
| | 1 | 2 | 3 | 4 | 5 | 6 | 7 | 8 | 9 | 10 | |
| File number: 1 File size: 12 KB | 1.4 | 1.36 | 1.67 | 1.4 | 1.34 | 1.44 | 1.36 | 1.41 | 1.4 | 1.36 | 1.414 |
| File number: 2 File size: 24 KB | 1.4 | 1.31 | 1.37 | 1.4 | 1.9 | 1.33 | 1.35 | 1.4 | 1.32 | 1.35 | 1.413 |
| File number: 3 File size: 36 KB | 1.39 | 1.42 | 1.43 | 1.38 | 1.4 | 1.52 | 1.36 | 1.41 | 1.33 | 1.32 | 1.396 |
| File number: 5 File size: 300 KB | 1.5 | 1.5 | 1.47 | 1.55 | 1.52 | 1.57 | 1.46 | 1.5 | 1.53 | 1.52 | 1.512 |
| File number: 2 File size: 100 KB | 1.5 | 1.47 | 1.39 | 1.33 | 1.43 | 1.44 | 1.5 | 1.39 | 1.42 | 1.5 | 1.437 |

The protection latency may be measured and the latency given in the term of seconds. The protection process latency mainly includes the latencies of file encryption and split, TPM binding process. Here, Total protection latency=Password Logon System Latency+File Encryption & Splitting Latency+Key Binding Latency+AIK & File Distribution Latency. Table 28 shows protection measurement (Unit: Seconds, KB: Kilo Bytes)

TABLE 28

| File size & number | Group | | | | | | | | | | Average |
|---|---|---|---|---|---|---|---|---|---|---|---|
| | 1 | 2 | 3 | 4 | 5 | 6 | 7 | 8 | 9 | 10 | |
| File number: 1 File size: 12 KB | 18.1 | 19.4 | 17.2 | 18.7 | 19.7 | 19.6 | 18.5 | 19.4 | 20.2 | 19.1 | 18.99 |
| File number: 2 File size: 24 KB | 19.7 | 21.3 | 20.5 | 22.5 | 19.6 | 22.1 | 20.2 | 21.4 | 20.5 | 22.1 | 20.99 |
| File number: 3 File size: 36 KB | 20.3 | 21.4 | 23.2 | 20.6 | 22.3 | 22.5 | 23.4 | 21.4 | 20.9 | 24.4 | 22.04 |
| File number: 5 File size: 300 KB | 67.8 | 64.9 | 63.4 | 61.8 | 62.2 | 63.1 | 64.1 | 62.4 | 67.2 | 66.3 | 64.32 |
| File number: 2 File size: 100 KB | 33.4 | 22.3 | 23.0 | 22.8 | 23.7 | 22.5 | 26.7 | 23.2 | 25.2 | 22.7 | 24.55 |

The unprotection latency may be measured and the latency given in the term of seconds. The unprotection process latency mainly includes the latencies of TPM identity attestation, file decryption and merge, TPM unbinding process. Here, Total Unprotection latency=Password Logon System Latency+TPM Identity Attestation Latency+Key Unbinding Latency+File Merging & Decryption Latency. Table 29 shows unprotection measurement (Unit: Seconds, KB: Kilo Bytes)

TABLE 29

| File size & number | Group | | | | | | | | | | |
|---|---|---|---|---|---|---|---|---|---|---|---|
| | 1 | 2 | 3 | 4 | 5 | 6 | 7 | 8 | 9 | 10 | Average |
| File number: 1<br>File size: 12 KB | 15.7 | 16.0 | 14.1 | 16.0 | 16.2 | 16.0 | 15.9 | 15.2 | 17.7 | 17.2 | 16.0 |
| File number: 2<br>File size: 24 KB | 16.3 | 17.1 | 18.6 | 19.1 | 17.7 | 17.2 | 17.8 | 18.2 | 18.3 | 19.0 | 17.93 |
| File number: 3<br>File size: 36 KB | 19.3 | 15.5 | 19.8 | 21.2 | 21.7 | 21.2 | 21.7 | 19.2 | 16.4 | 19.3 | 19.53 |
| File number: 5<br>File size: 300 KB | 50.0 | 47.1 | 43.3 | 46.3 | 47.2 | 46.4 | 49.1 | 50.2 | 47.4 | 50.5 | 47.75 |
| File number: 2<br>File size: 100 KB | 26.8 | 18.7 | 19.7 | 24.1 | 20.2 | 27.2 | 20.1 | 19.2 | 21.2 | 20.1 | 21.73 |

In terms of security design, the illustrative embodiment of the present disclosure may be thought of as mainly five modules that, when combined smoothly with each other, provide security protection over personal information. Each module adds a layer of security to the overall design. The synchronous log on scheme may utilize the Android Device and the client PC as the input devices and to implement the input digits to random number mapping. Each digit of password is input alternately on android phone and the client PC, and at the same time each digits is mapped into certain length random number sequence and sent to server for verification. On the server side, the SHA-256 hash value of correct random number sequence, which the hash value of received random number sequence is compared to, is stored. The result of the compare is sent back to PC and android for the next operation.

An encryption/decryption scheme is provided that may utilize AES-256 as the encryption method which was considered to be strong enough for current security requirement. The AES keys are generated based on a unique seed which is based on system generated time stamp. To play against side channel attack and timing attack, GCM mode is introduced into this design. The security of GCM mode relies on the fact that the underlying block cipher cannot be distinguished from a random permutation. Finally, a randomly generated salt was added to play against brute force attack.

A program is provided to split the encrypted files into pieces and bulks based on random numbers. Junk data are also injected into the split files. The paths and keys of the pieces are stored into an index file. Index file is further used for merging the pieces back to the original file. The index file may also be encrypted by AES-GCM and split by the splitting program. In the decryption process, the recovery of all the files may start from the index file.

A TPM key binding/unbinding process may be provided. Binding generally includes the operation of encrypting a message using a public key. That is, the sender uses the public key of the intended recipient to encrypt the message. The message is recoverable by decryption using the recipient's private key. When the private key is managed by the TPM as a non-migratable key only the TPM that created the key may use it. Hence, a message encrypted with the public key, "bound" to a particular instance of a TPM. Keys are communication endpoints and improperly managed keys can result in loss of security. Thus, the TPM in this exemplary implementation aids in improving security by providing key management. In detail, the final index file encryption key is the root of the whole cryptographic process, so it is binding with TPM for concrete protection. In decryption process, the index file encryption key is recovered using the corresponding private key by providing correct identity to TPM.

A TPM signature authorization process may be provided. To defeat attackers pretending to be the correct client with the unique TPM trying to get the distributed index file pieces on server, the TPM identity attestation scheme is designed in this illustrative embodiment. In the end of encryption process, TPM will generate an Attestation Identity Key which is 2048 bits RSA signing key pair and the public key is sent to server for storage. In the first place of decryption process, the TPM has to provide server the signature generated by previous generated Attestation Identity Key, after the signature is verified by server using stored public key, then the index file pieces can be sent back to client for the next operation of decryption process.

Through the overall design, the TPM binding protection and TPM identity attestation provides advantages compared to alternative security protection software. It offers a solution for the storage and protection of the software key, which is problematic for alternative security software design. The TPM identity attestation adds another layer of security over protection. It prevents the attacker from recovering the index file bypassing the TPM.

As shown above, the disclosed exemplary system works smoothly and after multiple tests, it turns out to be very stable and trustable.

For the overall system design, each module may add a layer of security to the overall protection and they rely on one another. FIG. 163 illustrates the system's security dependency. In Table 10 all the cryptographic processes over the target files are considered and the security strength is measured in term of symmetric key size. The equivalent symmetric key size of RSA-2048 bits is 112 bits. Table 30 shows cryptographic processes security strength

TABLE 30

| File Encryption AES KEY | File Encryption IV | Index Encryption AES Key | Index Encryption IV | TPM Binding RSA Key | TPM Storage Root Key | Total |
|---|---|---|---|---|---|---|
| 256 bits | 168 bits | 256 bits | 168 bits | 112 bits | 112 bits | 112 bits |

In fact, the cloud storage and TPM hardware security features are added over all the cryptographic processes. The cloud storage of file pieces together with the identity attestation function provided by TPM makes the file pieces can only be recovered by the authorized user. The TPM adds the whole cryptographic processes with hardware security features which bound the final index encryption key to a stable and strongly protected hardware and makes sure that only the authorized user with possession of the specific TPM can recover the whole processes. The security features of each module are provided in Table 31.

TABLE 31

| | | |
|---|---|---|
| Multi-endpoint Synchronous Logon module | 1. | Random number sequence projection to password digits are verified on server end; |
| | 2. | Password is input separately on multi-endpoint to play against key logger and screen capturer. |
| AES-GCM Encryption-Decryption module | 1. | AES-256 bits is used to get the best protection and performance; |
| | 2. | GCM mode is used for AES pattern to play against side channel attack. |
| File split-merge module | 1. | Origin for file pieces cloud storage; |
| | 2. | Obfuscate attackers from collecting the whole files; |
| TPM Key Binding-Unbinding module | 1. | Act as the reference point for software cryptographic processes; |
| | 2. | Add hardware securities over the whole cryptographic processes; |
| | 3. | Bound index encryption key with TPM to provide physical boundary from the reach of malicious attacker. |
| | 4. | Based on storage root key which provide the root of trust for storage. |
| TPM Identity Attestation Module | 1. | Based on the unique Attestation Identity Key (AIK) bound with unique identity UUID |
| | 2. | Random generated UUID and 2048 bits AIK together provides the identity proof for the specific TPM and authorized user; |
| | 3. | Only the user possessing the UUID, AIK and TPM can provide authorized identity to recover all the cloud storage file pieces. |

In Table 32, the security abilities and weakness of each module are listed.

TABLE 32

| | Modules | Abilities | Weakness |
|---|---|---|---|
| Security Scenarios | Multi-endpoint Synchronous Logon System | Key Logger, Screen Capturer, Offline Dictionary Attack, Social Engineering, Spyware | Man in the middle attack, eavesdropping |
| | AES-GCM Encryption Decryption | Brute-force attack | |
| | File Split-Merge | Physical theft of asset, Data Modification, Resource Manipulation, Zero Day Attack, Side Channel Attack | One file only split into two pieces, better cloud based security features can be made by splitting into more pieces |
| | TPM Key Binding-Unbinding | Backdoor or Command/Control, Physical Theft of Asset, RAM Scraper, Violation of Acceptable Policies, virus and worms, Compromised-Key Attack, Software Trojans | 1. TPM utilize the RSA PKI which is a weakening to the security strength and efficiency. 2. The binding key, which is protected by SRK, is stored outside TPM. If it is not well managed, it could be stolen or destroyed. |
| | TPM Identity Attestation | Abuse of System Access, Authentication Bypass, Phishing, Violation of Acceptable Policies, Identity Spoofing, Resource Manipulation, Flame | 1. AIK is not issued by CA. 2. Man in the middle attack. 3. SHA-1 Hash for signing |

The systems, methodologies, and components disclosed above create a TPM-enhanced cloud-based file protection system. Cloud computing will increase in importance going forward. Due to possessions of multiple personal computing devices, such as laptop, desktop, phone and tablet, cloud computing security integrating all these computing powers becomes available. Cloud storage of file pieces can successfully confuse hackers. In cloud computing, one must have full access to the file system, each cloud endpoint should provide identity proof to the other endpoints for trust. Based on unique Endorsement Key and root of trust, TPM can function as the identity proof by using Attestation Identity Key. Attestation Identity Key cloud be issued by CA through proving the possession of unique Endorsement Key in the TPM.

Alternative systems with only software cryptographic processes face a conundrum which is the storage and protection of the cryptographic keys. Traditionally, the keys being stored on hard drive plainly is like leaving a spare front door key somewhere in the yard. Security is just relying on a key-sized hiding place that the hacker cannot find. This presents a weakness for alternative implementations. Incorporating TPM into the crypto system provides a solution to this technical problem and escalates the file protection system to the hardware level. Thus, in accordance with the present disclosure, utilizing TPM's key binding feature and identity attestation feature, drawbacks of alternative software cryptographic processing implementations are addressed by TPM's root of trust and key binding and the cloud computing can be fully accessed by providing identity attestation.

Password protection can also benefit from cloud computing. In the disclosed illustrative embodiments, a password is separately inputted on the client PC and the Android Device and mapped into random number sequences to be sent to sever for verification. This design makes sure no one cloud endpoint has the full password or password hash. It can successfully defeat key logger and screen capturer, and it is also resistant to dictionary attack and social engineer.

Finally, the disclosed systems, components, and methodologies, which in this illustrative embodiment consisted of 5 layers protection, is a good implementation and combination of security, reliability, availability, efficiency and easy to use. AES-GCM is used as the reliable encryption-decryption scheme which provides high level symmetric cryptographic security. Due to the popularity and variety of personal computing devices, there are need and trend to better utilize multiple mobile computing devices to improve both efficiency and security. This information system which utilizes the computing powers of PCs and the Android Device explored the cloud computing security features by using file splitting-merging scheme to further obfuscate the protected information by file pieces distribution. And as the major part of the design, to solve the cryptographic key protection weakness of solely software cryptographic processes, TPM is introduced into the system design to provide key binding function and also provide identity attestation function to protect the file distribution process. And for the password protection, a synchronous logon system which fully utilized the PCs and the Android Device is designed so that the possession of any of these computing devices cannot reveal the whole original password.

After the system latency measurement, the disclosed systems are efficient and suitable for small size file protection due to the high possibility of network transmission failure for files over 300 Kilo Bytes. As shown by way of screenshots above, the system is easy to use, as it only requires a user to click a button and go on, with all underlying cryptographic processes transparent for users.

Other improvements and features are within the scope of this disclosure. In the synchronous Logon System, random numbers mapping to password digits could be updated and saved each time after user logon and used with random salt to generate cryptographic keys. Then the password logon process could further confuse hackers and get better protection over user password. And also the random sequence could further extend the randomness of key creation.

In addition, in the AIK creation process, AIK could be registered and authorized through Certificate Agent by providing the possession of unique Endorsement Key. Then AIK could be used as the substitution of Endorsement Key and avoid the reveal of Endorsement Key.

According to illustrative embodiments, various mechanisms discussed above may combine to provide intrusion detection and prevention capabilities. By way of example, in illustrative embodiments, all of the OTPs and ACL items that are required for network access may need to be completely correct, such that a failure at any single point is detected as an intrusion and blocked. Moreover, even if one or more of the authentication checkpoints are compromised, intrusions may still be detected. According to one benefit of illustrative embodiments in accordance with the present disclosure, there are no false positives for intrusion detection. Although not all intrusion events may be attacks (e.g., a valid client attempting to login with corrupted authentication information is correctly detected as an intrusion), in certain implementations there may be no detected intrusions that are false positives. Moreover, the ACL system implemented by IDACS as discussed herein may provide significantly high intrusion detection performance and can be used to trace back to the source of attacks and generate real-time forensics reports based on specific ACL violations.

Network security systems in accordance with the present disclosure can be used for a variety of applications, and generally may be suitable for any networked environment. In one example, network security systems in accordance with the present disclosure can be used in connection with industrial networks.

Industrial Networks may be divided into three general areas, each of which should be logically partitioned from the others by some security mechanism, such as a firewall. FIG. 164 shows an exemplary industrial network.

The depicted Industrial Network includes an Industrial Control System consisting of Programmable Logic Controllers (PLCs) which control the elements of and industrial process, such as sensors, motors, and pumps. The Industrial Control System also contains a Control Console, which is used to issue instructions or write firmware to, or collect performance data from the PLCs. The depicted Industrial Network also includes a Supervisory Network, also known as Supervisory Control And Data Acquisition (SCADA), which provides external control and performance data recording for the Industrial Control System. Finally, the depicted Industrial Network connects these networks to company intranets and/or the Internet, enabling the packaging of performance data into real-time reports that can be viewed remotely.

FIG. 165 shows how an illustrative IDACS network topology described above may be used for Industrial Control Systems. The illustrative topology is divided into three functional areas: Customers, Network, and Endpoints. Endpoints are generally similar to servers or databases, in that they may receive commands (e.g., Read, Write, or Execute) from the Customers. Customers were discussed above, and as explained, may consist of a human user paired with a computer or control console and relevant security tokens (smartcard, password, etc.) needed to communicate over the Industrial Control System. The Network may consist of all communication lines between the Customers and Endpoints.

The Network connects Customers and Endpoints through a series of security servers, including Security Agents and Super Security Agents, such as those described above.

Whenever a Customer or an Endpoint connects to the Network, it may download a User Agent (UA), which operates in connection with other network components in the manner described above.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A system for protecting a data file stored in a cloud based storage system, comprising:
   computer-executable software code stored on one or more non-transitory data storage devices for:
   authenticating a synchronous password received by a plurality of computing devices, a first portion of the synchronous password being received by one of the plurality of computing devices, and a second portion of the synchronous password being received by another of the plurality of computing devices;
   encrypting a selected data file using a key determined through the use of a space-time jointly evolving function generated by one of the plurality of computing devices;
   splitting the selected data file into a plurality of file fragments;
   storing each of the plurality of file fragments in a random location on the plurality of computing devices; and
   generating an index file that includes a file storage path for each file fragment and a security key for each file fragment, the index file configured to be used to merge the plurality of file fragments into the selected data file.

2. The system of claim 1, further comprising:
   computer-executable software code stored on one or more non-transitory data storage devices for:
   encrypting the index file using a second key determined through the use of a second space-time jointly evolving function generated by one of the plurality of computing devices based on the state of each of the plurality of computing devices;
   splitting the index file into a plurality of index file fragments, wherein a size of each index file fragment is randomly determined; and
   storing each of the plurality of index file fragments in a separate location on the plurality of computing devices of the system.

3. The system of claim 2, wherein the plurality of file fragments and the plurality of index file fragments are stored at random locations in a cloud based storage system to avoid side channel attacks to the selected data file and the index file.

4. The system of claim 1, wherein one of the plurality of computing devices of the system is a smartphone, a smartcard, a token, a Trusted Platform Module (TPM), or a USB-based flash drive device.

5. The system of claim 1, wherein:
   the synchronous password comprises an ordered combination of a plurality of symbols, and
   the first portion of the synchronous password includes a first subset of symbols of the plurality of symbols and the second portion of the synchronous password includes a second subset of symbols of the plurality of symbols, the second subset of symbols being different than the first subset of symbols.

6. The system of claim 5, wherein the first subset of symbols includes every other symbol of the plurality of symbols and the second subset of symbols includes the remaining symbols of the plurality of symbols.

7. The system of claim 6, further comprising: computer-executable software code stored on one or more non-transitory data storage devices for receiving the plurality of symbols of the synchronous password by the plurality of computing devices in the ordered combination of the synchronous password.

8. The system of claim 1, wherein the space-time jointly evolving function is generated based on the state of the plurality of computing devices of the system.

9. The system of claim 1, further comprising computer-executable software code stored on one or more non-transitory data storage devices for generating a transformed synchronous password by mapping the synchronous password to a random number based on the state of the plurality of computing devices.

10. The system of claim 1, further comprising computer-executable software code stored on one or more non-transitory data storage devices for binding each of the plurality of file fragments using a public key generated by a Trusted Platform Module using internal states of the plurality of computing devices.

11. The system of claim 1, further comprising computer-executable software code stored on one or more non-transitory data storage devices for generating a random function seeded using the state of each of the plurality of computing devices, and wherein the steps of splitting the selected data file, storing each of the plurality of file fragments, and generating the index file are performed using the random function.

12. The system of claim 1, wherein the plurality of computing devices are spatially separated computing devices.

13. The system of claim 1, wherein:
   the system is configured to prevent any one of the plurality of computing devices from having possession of the synchronous password or from deriving the synchronous password based on an authentication function used to authenticate the synchronous password; and
   the system is configured to prevent interception or derivation of the synchronous password by attackers.

* * * * *